United States Patent [19]

Manning et al.

[11] Patent Number: 4,504,907

[45] Date of Patent: Mar. 12, 1985

[54] HIGH SPEED DATA BASE SEARCH SYSTEM

[75] Inventors: Bennett W. Manning, Eagan; Leo J. Slechta, Jr., Rosemount, both of Minn.; Kuo Y. Wen, Donners Grove, Ill.

[73] Assignee: Sperry Corporation, New York, N.Y.

[21] Appl. No.: 469,610

[22] Filed: Feb. 24, 1983

Related U.S. Application Data

[63] Continuation of Ser. No. 161,993, Jun. 23, 1980, abandoned.

[51] Int. Cl.[3] ................................................ G06F 7/22

[52] U.S. Cl. ..................................................... 364/200

[58] Field of Search ... 364/200 MS File, 900 MS File

[56] References Cited

U.S. PATENT DOCUMENTS

| | | | |
|---|---|---|---|
| 3,349,375 | 10/1967 | Seeber et al. | 364/200 |
| 3,435,423 | 3/1969 | Fuller et al. | 364/900 |
| 3,648,254 | 3/1972 | Beausoleil | 364/200 |
| 3,766,533 | 10/1973 | Black et al. | 364/200 |
| 3,906,455 | 9/1975 | Houston | 364/200 |
| 3,972,726 | 7/1976 | Waitman et al. | 364/900 |
| 4,104,717 | 8/1978 | Fujimura | 364/200 |
| 4,152,762 | 5/1979 | Bird et al. | 364/200 |
| 4,223,380 | 9/1980 | Antonaccio | 364/200 |

*Primary Examiner*—James D. Thomas
*Assistant Examiner*—David Y. Eng
*Attorney, Agent, or Firm*—William C. Fuess; Kenneth T. Grace; Marshall M. Truex

[57] ABSTRACT

A high speed data base search system which contains a general purpose computer coupled to a special purpose processor called the High Speed Search Function or HSSF. The HSSF may be external to the computer having a standard Input/Output communication path. An alternative approach places the HSSF internal to the computer providing communication via an internal bus. The HSSF is identical in either configuration except for the interface logic. The HSSF is programmable by the computer to perform complex searches on variable size data bases. The internal memory of the HSSF is loaded with the data base to be searched. Registers within the HSSF are loaded with reference words which define the search bounds. The field format register of the HSSF is loaded with a definition of the data base. The field comparison register is loaded to define the field-by-field search criteria. The Boolean Expression loaded into the HSSF defines which compare results are to be considered a hit. Once loaded by the computer, the HSSF performs the defined complex search without use of computer resources.

13 Claims, 110 Drawing Figures

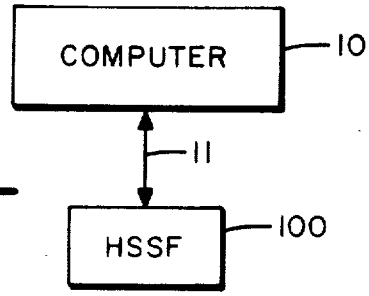
Fig. 1
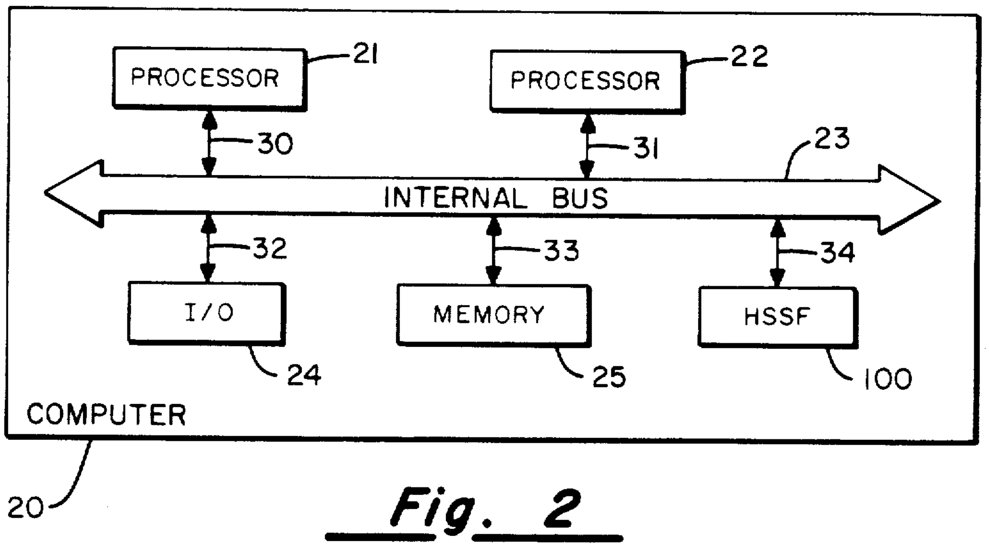
Fig. 2
| INTERFACE LOGIC 220 | | |
|---|---|---|
| ELEMENT | | FIGURES |
| TRANSCEIVER | 221 | 21 |
| CONTROL MEMORY | 222 | 22, 23 |
| TRANSMITTER | 223 | 24 |
| CHANNEL CMD REG | 224 | 25, 26 |
| TRANSCEIVER | 225 | 27 |
| O/T/BA | 226 | 28 |
| BIU CONTROL | 227 | 29, 30, 31, 32 |
Fig. 18

| ARRAY SLICE | BIT POSITION | |
|---|---|---|
| | HSSF BUS | MEMORY ARRAY |
| 0 | 0-7 | 0-7 |
| 1 | 8-15 | 8-15 |
| 2 | 16-23 | 16-23 |
| 3 | 24-31 | 24-31 |
| 4 | 0-7 | 32-39 |
| 5 | 8-15 | 40-47 |
| 6 | 16-23 | 48-55 |
| 7 | 24-31 | 56-63 |
| 8 | 0-7 | 64-71 |
| 9 | 8-15 | 72-79 |
| 10 | 16-23 | 80-87 |
| 11 | 24-31 | 88-95 |
| 12 | 0-7 | 96-103 |
| 13 | 8-15 | 104-111 |
| 14 | 16-23 | 112-119 |
| 15 | 24-31 | 120-127 |

| MPC 240 | | |
|---|---|---|
| ELEMENT | | FIGURES |
| BRANCH ADDR | 241 | 33 |
| VECTOR REG | 242 | 34 |
| INTERRUPTS | 243 | 35 |
| CONSTANT MUX | 244 | 36 |
| ALU, ACC | 245,250 | 37, 38, 39 |
| CONDITION MUX | 246 | 48 |
| 2910 SEQUENCER | 247 | 40 |
| PROM / IR | 248 | 41 |
| INDEX REG | 249 | 46 |
| ACC BUFFER | 250,255 | 42 |
| ZERO DETECT | 251 | 43 |
| ALS REG | 252 | 48 |
| RAM | 253 | 44,45 |
| FUNCTION, DEST, SOURCE DECODE | 254 | 47 |
| BUFFER | 256 | 46 |

Fig. 19

| SEQUENCER 260 | | |
|---|---|---|
| ELEMENT | | FIGURES |
| BOOLEAN EVALUATOR MEMORY | 261 | 49, 50, 51, 52, 53, 54, 55 |
| LIMIT REG | 262 | 56 |
| FLD ADDR REG | 263 | 57 |
| DELAY REG | 264 | 58 |
| RD/WR/SEARCH SEQUENCER | 265 | 59, 60, 61, 62, 63, 64 |
| HIT STACK | 266 | 65, 66, 67, 68, 69, 70, 71 |
| BUFFER | 267 | 75 |
| MDROU | 268 | 72, 73 |
| MDROL | 269 | 72, 73 |
| MDRIU | 270 | 73, 74 |
| MDRIL | 271 | 73, 74 |
| MAR STACK | 272 | 76, 77 |
| BUFFER | 274 | 57 |
| BUFFER | 275 | 77 |
| CLOCK | 276 | 78, 79 |

Fig. 20

HIGH SPEED DATA BASE SEARCH SYSTEM

This is a continuation of application Ser. No. 161,993, filed June 23, 1980 now abandoned.

BACKGROUND OF THE INVENTION

The present invention generally relates to digital processing systems and more specifically relates to digital processing system architectures employing both general purpose and special purpose processing elements used to efficiently operate on variable size data bases.

Performing complex searches using general purpose processors can prove quite inefficient if multiple instructions are required to operate upon each field of each record. Yet the search tasks may be quite simple in nature and very repetitive in relation to the normal tasks accomplished by general purpose processors. A special purpose processor can be designed which will efficiently search a given data base. Such special purpose processors are common in the communication industry, for example. Most such processors, however, are not sufficiently flexible to be applied to a wide range of data base search problems.

SUMMARY OF THE INVENTION

The present invention employs a special purpose processor which efficiently performs complex data base searches, but is also flexible. The special purpose processor is called the High Speed Search Function (HSSF). The HSSF is loaded by a general purpose processor with the data base to be searched and all necessary search parameters. Thereafter, the search is performed by the HSSF totally asynchronous to the operation of the general purpose processor. Since the data base is actually loaded into the dedicated memory of the HSSF, the HSSF does not cycle share memory with the general purpose processor during the search. This makes the HSSF faster and also provides minimum impact upon the general purpose processor.

The data base memory and comparison logic of the HSSF are modularly expandable to increase both record size (i.e., number of bits per record) and data base size (i.e., number of records in the data base) as required. By expanding both data base size and record size in this fashion, comparisons are always made on a record to record basis.

The data base is defined to the HSSF by loading a field format register which specifies field size (i.e, bits per field for each field in a record). Each field of a record is compared against the corresponding field of the supplied reference words. The field comparison register is loaded with the field-by-field comparison criteria. A record is found to be a "hit" if the boolean evaluator of the HSSF shows the desired correlation of the field-by-field comparisons within the record. An additional search parameter available is called the link field. The link field specifies a field to be used which contains the record address of the next record to be searched. By linking records in this way, a subset of the data base may be searched.

BRIEF DESCRIPTION OF THE DRAWINGS

FIG. 1 shows the processing system with the HSSF external to the computer.

FIG. 2 shows the processing system with the HSSF internal to the computer.

FIG. 18 shows the Figure Numbers for each element of INTERFACE LOGIC 220.

FIG. 19 shows the Figure Numbers for each element of MPC 240.

FIG. 20 shows the Figure Numbers for each element of SEQUENCER 260.

DESCRIPTION OF THE PREFERRED EMBODIMENT

The present invention is incorporated into the High Speed Search Function (HSSF) product of the assignee of this invention. Other inventions incorporated into this product are disclosed and claimed in related U.S. patent applications entitled, Variable Speed Cycle Time for Synchronous Machines, Ser. No. 161,987, and Variable Search Criteria, Ser. No. 161,983. It is apparent to those skilled in the art that the present invention and the related inventions are applicable to embodiments having architectures differing from the HSSF.

FIG. 1 shows the High Speed Search Function, HSSF 100 in its "outboard" configuration. That is, HSSF 100 is a stand-alone entity which interfaces with COMPUTER 10 via Input/Output cable 11. HSSF 100 is treated by COMPUTER 10 as if it were a peripheral device. COMPUTER 10 programs HSSF 100 to perform specified searches and other data base computations. The outboard configuration is most desirable for use with a COMPUTER 10 which would require extensive and/or costly modification to interface with HSSF 100 in any way other than a standard Input/Output channel. To the extent that the Input/Output channel imposes severe bandwidth restrictions in transfers from COMPUTER 10 to HSSF 100, the performance of the outboard configuration becomes limited. The transfer of the entire data base to HSSF 100, as explained below, does limit this disadvantage, however.

FIG. 2 shows HSSF 100 as functionally (and probably physically) integral to COMPUTER 20. HSSF 100 communicates with PROCESSOR 21, PROCESSOR 22, I/O 24 and MEMORY 25 via INTERNAL BUS 23. For most applications, the inboard configuration is preferable.

Figure 3:
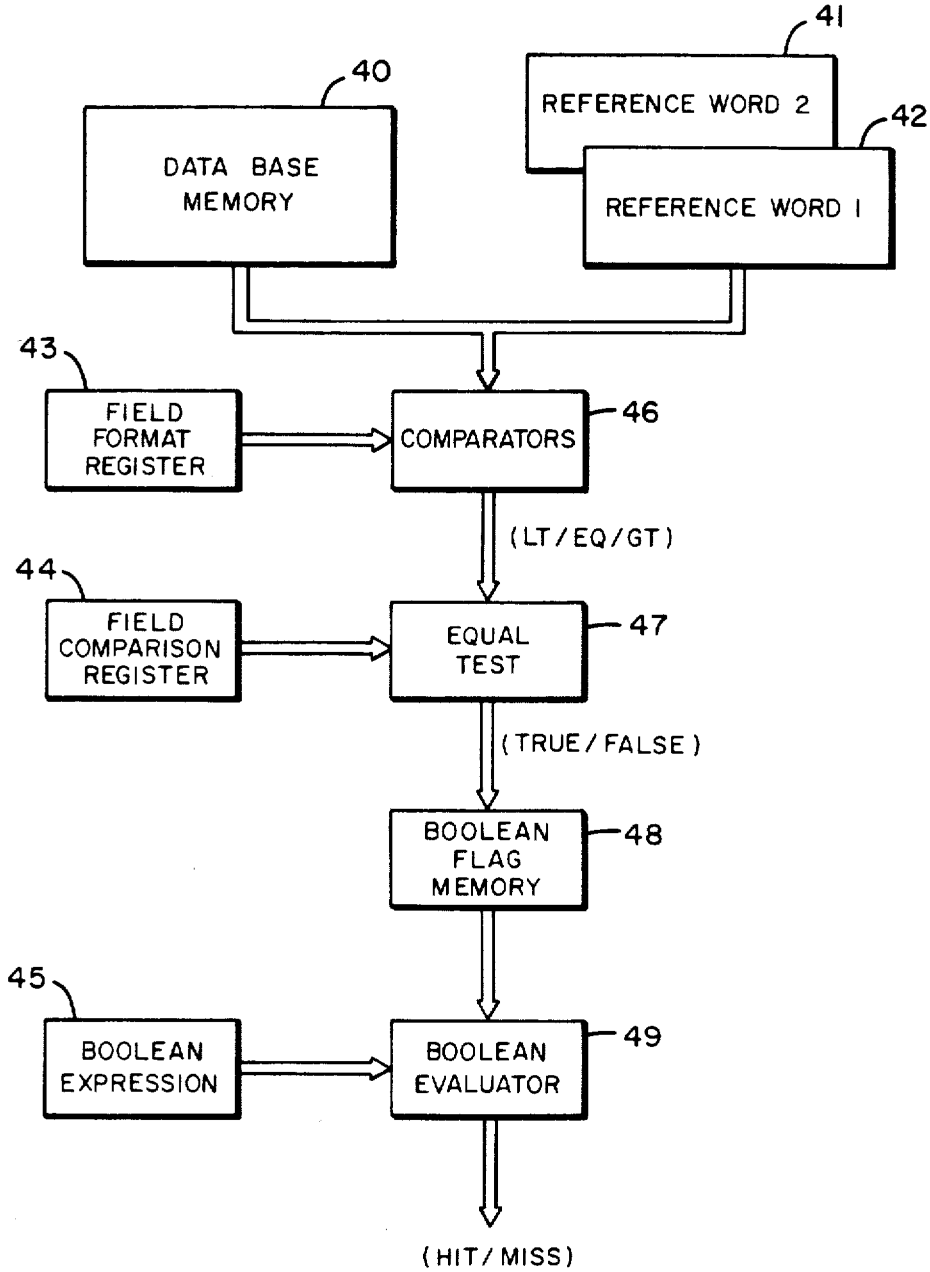
FIG. 3 shows the operation of the HSSF.

FIG. 3 illustrates the basic operation of HSSF 100. DATA BASE MEMORY 40 is loaded with the entire file to be searched. DATA BASE MEMORY 40 contains one record per addressable location. For normal searches, only REFERENCE WORD 1 42 is used. REFERENCE WORD 1 42 is an entire record in length. FIELD FORMAT REGISTER 43 is loaded with a description of the format of a record. That is, FIELD FORMAT REGISTER 43 defines the location and the length of each field within a record. DATA BASE MEMORY 40 can, therefore, contain files using a wide variety of formats. Notice that REFERENCE WORD 1 42 is one record having the same format as the records in DATA BASE MEMORY 40 (i.e., format defined by FIELD FORMAT REGISTER 43).

COMPARATORS 46 compare each field of one record read from DATA BASE MEMORY 40 to each field of REFERENCE WORD 1 42. Since a record is one addressable location of DATA BASE MEMORY 40, all fields are compared simultaneously. By reading successive records of DATA BASE MEMORY 40 and comparing against REFERENCE WORD 1 42, the entire file stored in DATA BASE MEMORY 40 is searched.

COMPARATORS 46 output an indication of the compare results for each field of each record compared. The indications are simple LT (i.e., less than), EQ (i.e., equal), and GT (i.e., greater than). These indications are compared against the contents of FIELD COMPARISON REGISTER 44 by EQUAL TEST 47. FIELD COMPARISON REGISTER 44 defines an expected result for the comparison of each field of a record. If the expected result for a field is the same as the comparison indication for that field of a record, EQUAL TEST 47 outputs a TRUE response for that field. If the expected result is not the same as the comparison indication, EQUAL TEST 47 outputs a FALSE response for that field. The TRUE or FALSE response for each field is stored in BOOLEAN FLAG MEMORY 48.

BOOLEAN EXPRESSION 45 is a logical expression which is loaded before the initiation of a search. BOOLEAN EVALUATOR 49 performs the set of logical operations specified by BOOLEAN EXPRESSION 45 upon the contents of BOOLEAN FLAG MEMORY 48. The Output of BOOLEAN EVALUATOR 49 is a simple HIT or MISS indication for a given record. That is, BOOLEAN EVALUATOR 49 generates a HIT if BOOLEAN EXPRESSION 45 is satisfied by the contents of BOOLEAN FLAG MEMORY 48. Similarly, a MISS is generated if BOOLEAN EXPRESSION 45 is not satisfied.

Notice that HSSF 100 successively fetches records from DATA BASE MEMORY 40, and a single HIT/MISS is generated for each based upon the values of REFERENCE WORD 1 42, FIELD FORMAT REGISTER 43, FIELD COMPARISON REGISTER 44, and BOOLEAN EXPRESSION 45. REFERENCE WORD 2 41 is loaded for "range" searches. To performs a range search, COMPARATORS 46 compare each record against two values (i.e., REFERENCE WORD 1 42 and REFERENCE WORD 2 41) to provide "within" and "without" indications.

Figure 4:
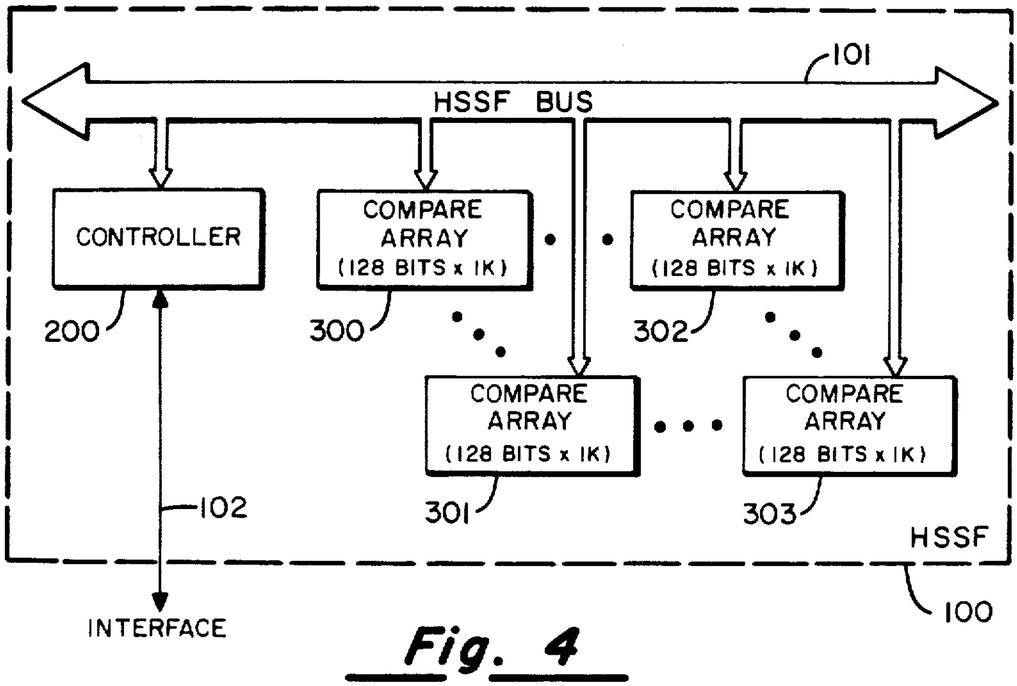
FIG. 4 shows the major elements of the HSSF.

FIG. 4 shows the internal organization of HSSF 100. HSSF BUS 101 interconnects CONTROLLER 200 and one or more COMPARE ARRAYS's 300, 301, 302, 303. INTERFACE 102 corresponds to Input/Output cable 11 in the outboard configuration and to cable 34 in the inboard configuration (see also FIG. 2). Basically, CONTROLLER 200 contains the control and sequencing circuitry required for HSSF 100 regardless of the size or nature of the data base (i.e., file to be searched).

The circuitry which varies according to data base size is found in the COMPARE ARRAY's. Using a single COMPARE ARRAY (i.e., COMPARE ARRAY 300) would permit the handling of a data base of up to 1024 records wherein each record has up to 128 bits. Adding more COMPARE ARRAY's in the direction of COMPARE ARRAY 301 increases the number of records (i.e., addressable locations) without changing the maximum record size. Similarly, the record size may be expanded (in 128 bit increments) by adding COMPARE ARRAY's in the direction of COMPARE ARRAY 302. By locating all circuitry dependent upon data size within the COMPARE ARRAY's, COMPARATORS 46, REFERENCE WORD 1 42, REFERENCE WORD 2 41, etc. are all expanded appropriately to accommodate the expansion of DATA BASE MEMORY 40 (see also FIG. 3). Up to 16 COMPARE ARRAYS may be used providing a file size of 4096 records wherein each record has up to 512 bits, for example.

Figure 5:
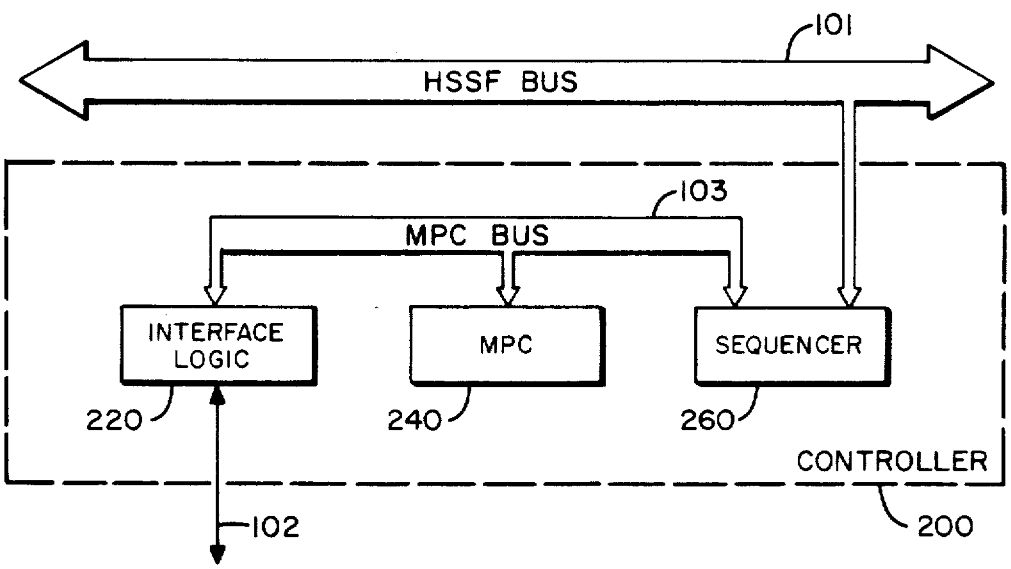
FIG. 5 shows the major elements of CONTROLLER 200.

FIG. 5 shows the overall structure of CONTROLLER 200. MPC BUS 103 couples elements INTERFACE LOGIC 220, Microprogrammed Controller MPC 240, and SEQUENCER 260. INTERFACE LOGIC 220 is that element which is different for outboard and inboard configurations. INTERFACE LOGIC 200 must have circuitry to match the desired protocol via cable 102. Since MPC 240 is the overall HSSP 100 control element, its microprogram must be altered slightly to accomodate different interface schemes. SEQUENCER 260 communicates directly with the COMPARE ARRAY's via HSSF BUS 101. Because of the speeds required to achieve the desired performance levels, the actual sequence control of the COMPARE ARRAY's is implemented using special purpose hardwired logic rather than general purpose, microprogrammed logic.

Figure 6:
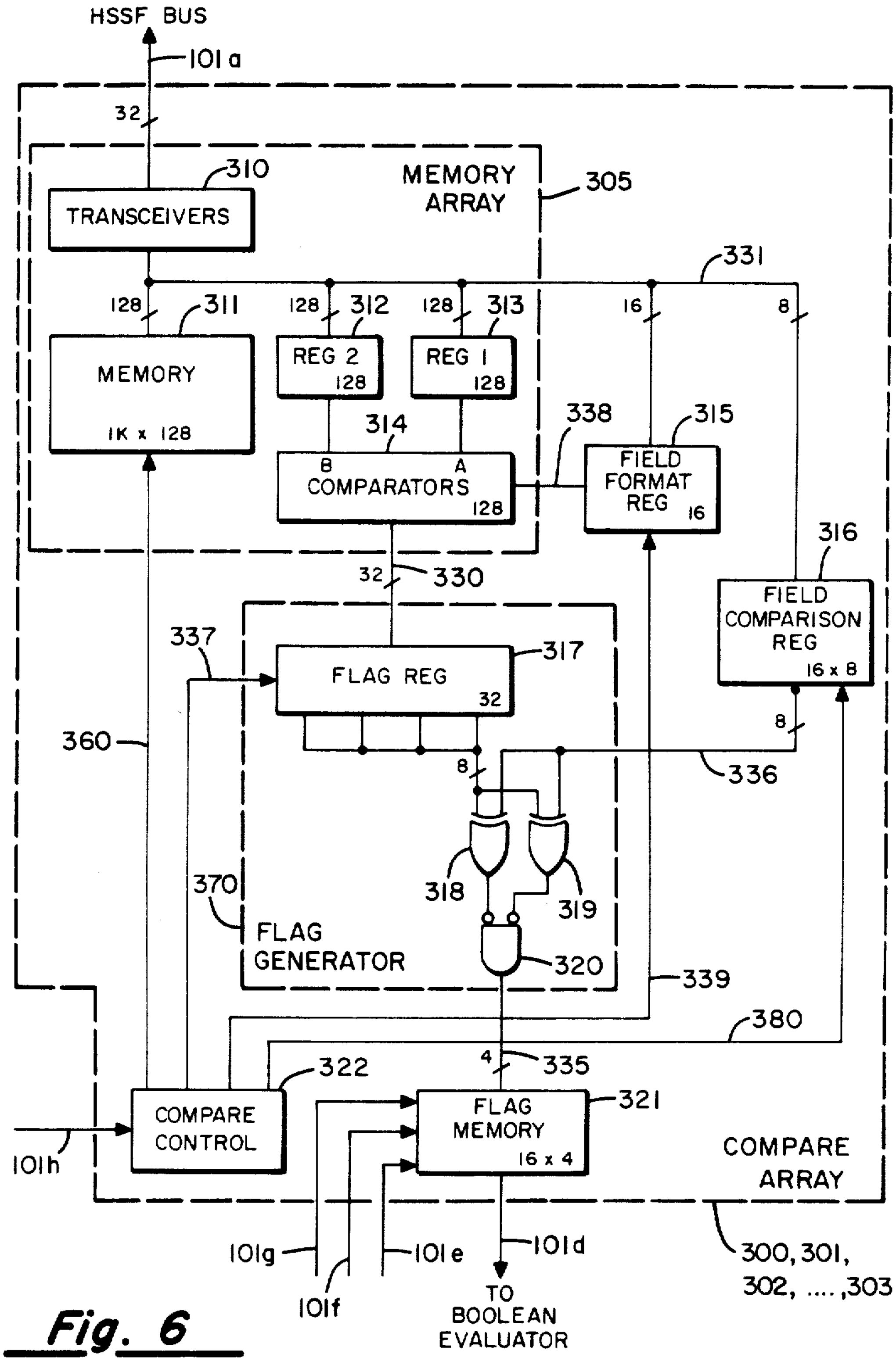
FIG. 6 shows the major elements of a COMPARE ARRAY.

FIG. 6 shows the details of one COMPARE ARRAY (e.g. COMPARE ARRAY 300). MEMORY ARRAY 305 contains TRANSCEIVERS 310, MEMORY 311, REG 2 312, REG 1 313, and COMPARATORS 314. TRANSCEIVERS 310 provides a 32 bit data interface with HSSF BUS 101 (i.e., HSSF BUS 101*a*). Since the basic word size of COMPARE ARRAY 300 is 128 bits, data is received as four 32 bit quarter words. MEMORY 311 is loaded in this manner such that each of its 1024 (i.e., 1K) addressable locations may be loaded with a 128 bit word. Notice that this may be an entire record or only a portion thereof, since other COMPARE ARRAY's may contain other portions of the record.

REG 2 312 and REG 1 313 are loaded with the contents of an addressable location of MEMORY 311 and the Reference Word, respectively. COMPARATORS 314 perform the arithmetic comparison. Each byte (i.e., all 16 bytes) of the 128 bit words are compared yielding a two bit result (i.e., less than, equal to, or greater than) result for each of the 16 bytes. The resulting 32 signals are transferred via cable 330 to be stored in FLAG REG 317.

FIELD FORMAT REG 315 defines the width and starting position of each field. FIELD FORMAT REG 315 has 16 bit positions wherein each bit position corresponds to one of the 16 bytes of the 128 bit word. If a given bit position in FIELD FORMAT REG 315 is set, the corresponding byte position of the 128 bit word is the most significant byte a field. If a given bit position is clear, the corresponding byte position is not the most significant byte. The arithmetic comparison is performed for all bytes. However, the result from a lesser significant byte is propagated to the next more significant byte when the comparison result for the more significant byte is equal to. In this fashion, the compare result for the most significant byte of a field is the compare result for the entire field.

FIELD COMPARISON REG 316 is loaded with the expected result for each field. Gates 318, 319, and 320 perform the logical comparison for four bytes in parallel. The result of the logical comparison is a true or false for each byte which is called a flag. The flags are stored in FLAG MEMORY 321. COMPARE CONTROL 322 contains the logic which controls the COMPARE ARRAY.

Figures 7, 8:
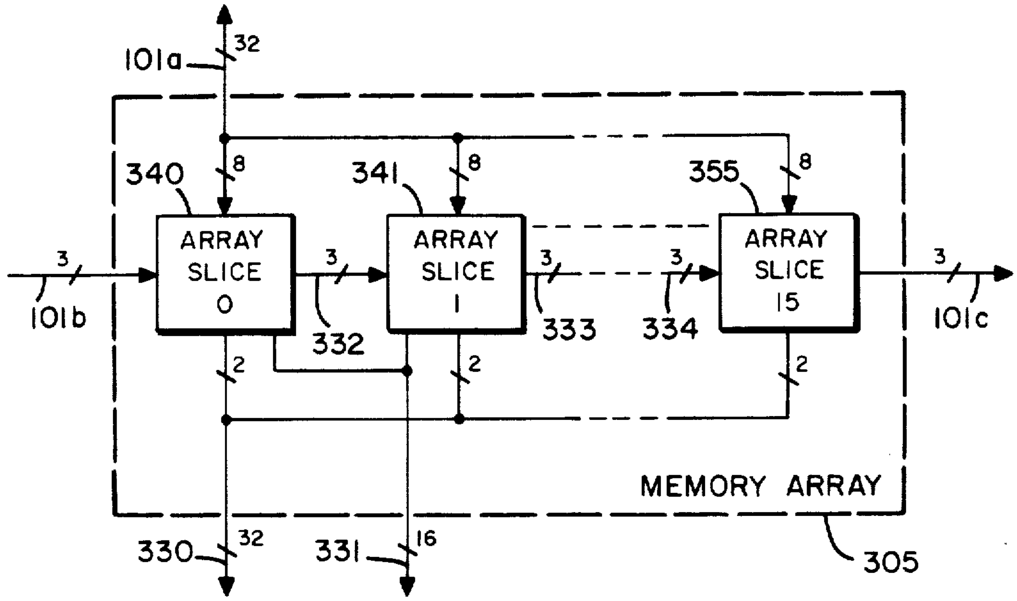
FIG. 7 shows the construction of MEMORY ARRAY 305.
FIG. 8 shows the relationship between ARRAY SLICE and bit positions.

FIG. 7 shows the construction of MEMORY ARRAY 305. As is shown in FIG. 6, MEMORY ARRAY 305 contains TRANSCEIVERS 310, MEMORY 311, REG 2 312, REG 1 313, and COMPARATORS 314. As can be seen in FIG. 7 these elements are arranged in MEMORY ARRAY 305 such that all of MEMORY ARRAY 305 can be constructed of 16 ARRAY SLICES (i.e., ARRAY SLICE Ø 340, ARRAY SLICE 1 341, . . . , ARRAY SLICE 15 355). Each of the 16 ARRAY SLICES is similar in construction and operation. Each ARRAY SLICE stores and processes one eight bit byte. The 32 bit input via cable 101*a* (i.e., data portion of HSSF BUS 101) is cabled to the ARRAY SLICES such that the least significant byte is cabled to ARRAY SLICES Ø, 4, 8 and 12. The remainder are cabled in similar fashion. FIG. 8 provides a table correlating ARRAY SLICE with bit positions. Cables 332, 333, . . . , 334 provide for the carry of comparison results from one byte to another to facilitate multi-byte fields as shown in FIG. 7. Similarly, cables 101*b* and 101*c* provide for the carry of comparison results to and from other COMPARE ARRAY's. The comparison results require two bits per ARRAY SLICE (i.e., byte) which are combined as cable 330. Cable 331 provides a 16 bit interface which is coupled through HSSF BUS 101 to CONTROLLER 200. This permits a two bye read of MEMORY 311 for the linking function as discussed further below.

Figure 9:
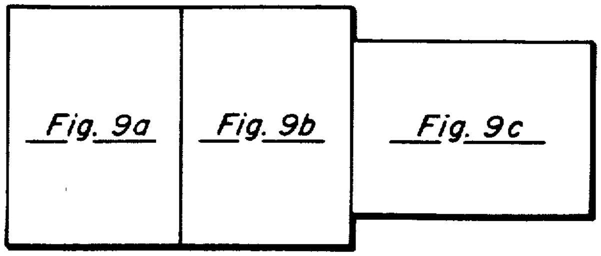
FIG. 9, consisting of FIGS. 9*a*, *b*, and *c*, shows the detailed construction of ARRAY SLICE Ø 340.
Figure 9A:
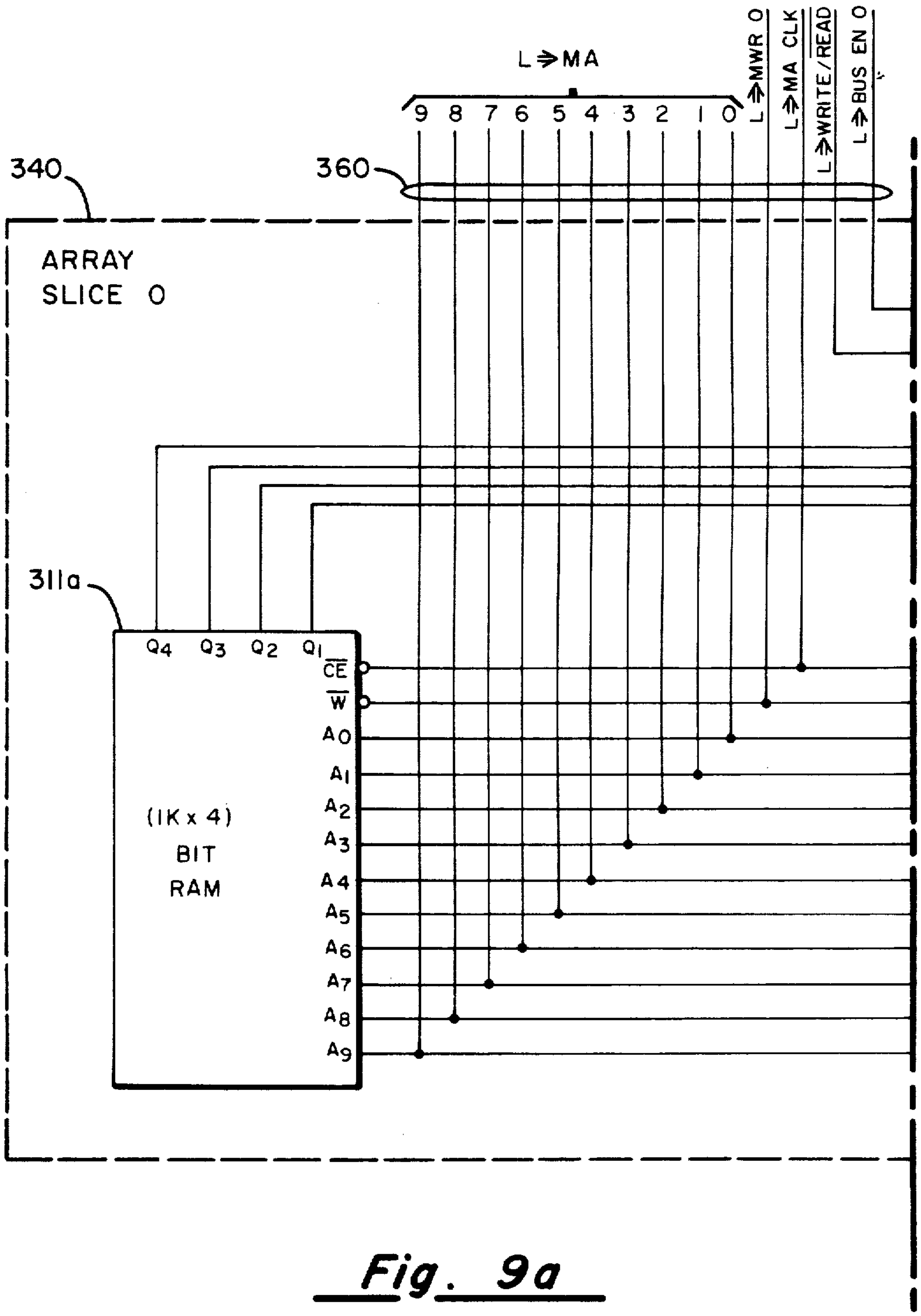
Figure 9B:
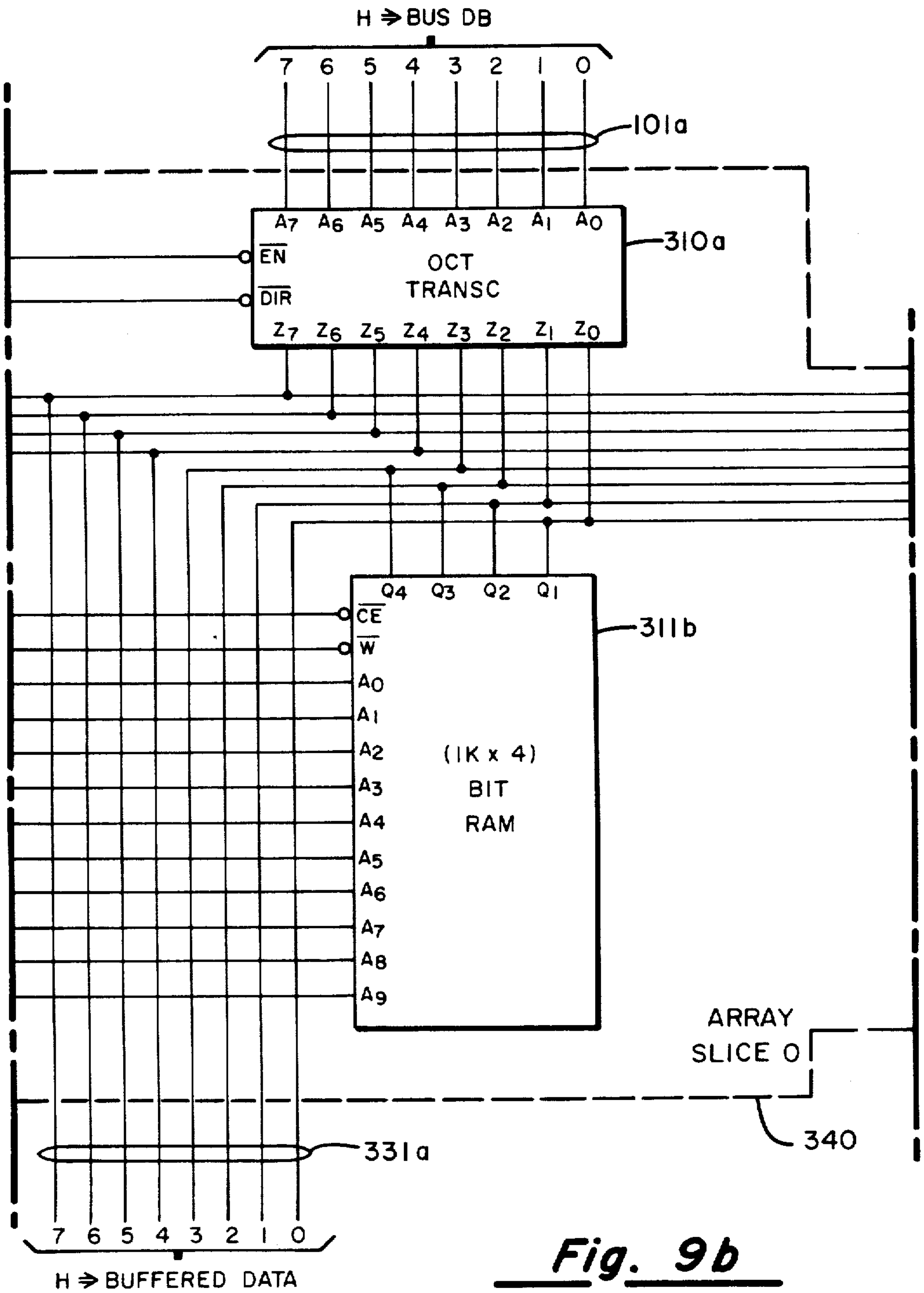
Figure 9C:
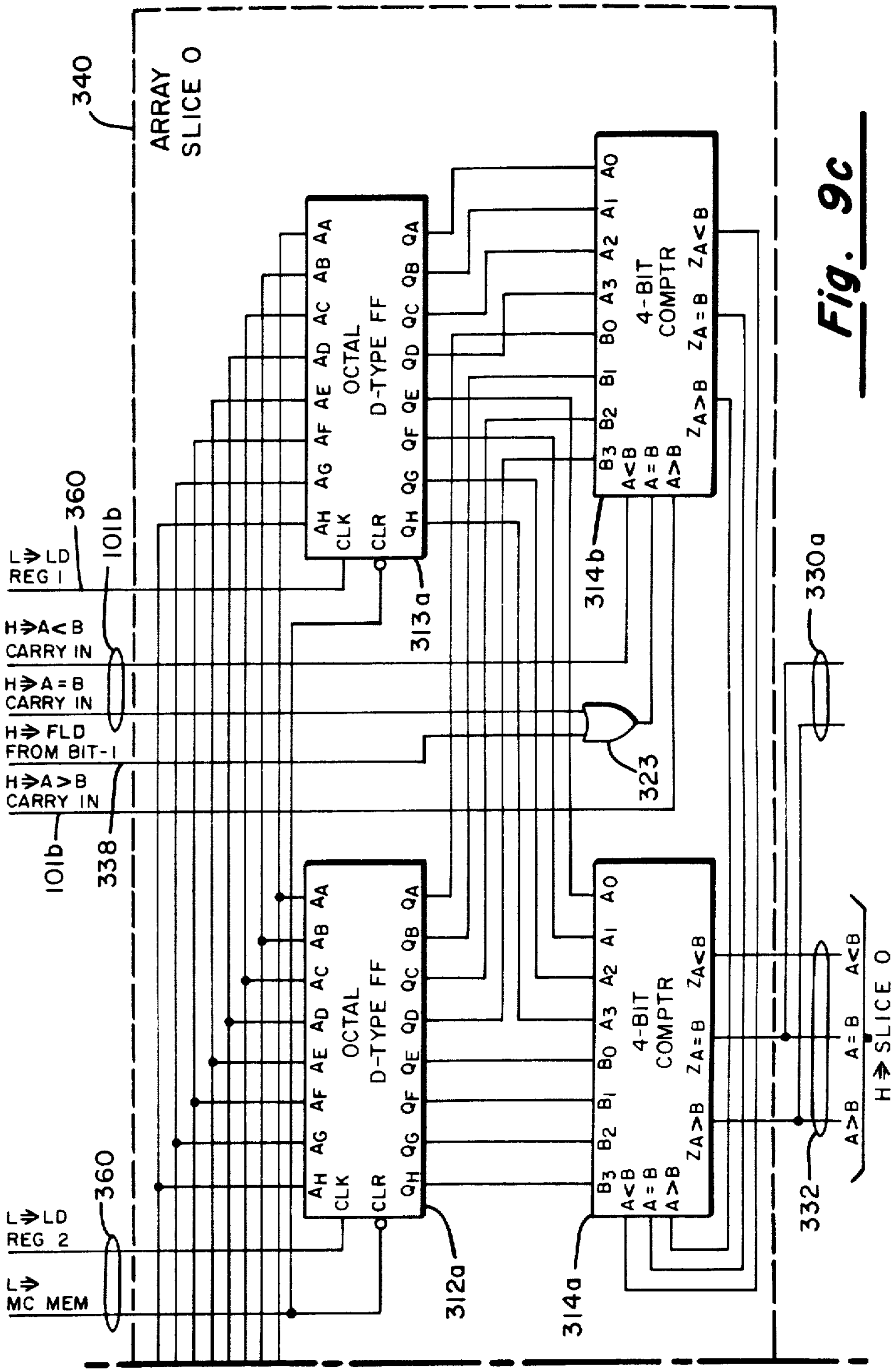

FIG. 9, consisting of FIGS. 9*a*, *b*, and *c*, shows the detailed construction of ARRAY SLICE Ø 340. OCT TRANSC 310*a* provides the buffering between HSSF BUS 101*a* and the ARRAY SLICE for one eight bit byte. RAM 311*a* and 311*b* together store 1024 eight bit bytes of the data base. OCTAL D-TYPE FF 312*a* and 313*a* are one byte slices of REG 2 312 and REG 1 313, respectively. 4-BIT COMPTR 314*a* and 314*b* are wired to provide a one byte arithmetic comparison. The output of Gate 323 provides the enable to equal comparison to 4-BIT COMPTR 314*b*. The equal comparison is enabled if either:

1. Signal H→FLD FROM BIT-1 is present signifying that the next least significant byte is the most significant byte of a field and therefore the instant byte is the least significant (perhaps only) byte of a field; or 2. Signal H→A=B CARRY IN is present signifying that the next least significant byte had a result of equal to. Since FIG. 9 depicts ARRAY SLICE Ø 340, the comparison results carry in is via cable 101*b* (i.e., portion of HSSF BUS 101) from the most significant byte of the next least significant COMPARE ARRAY. Results carry out is via cable 332 to the next more significant byte (i.e., to ARRAY SLICE 1 341). Cable 330*a* transfers the compare results to FLAG REG 317. Cable 331*a* is shown as coupling OCT TRANSC 310*a* to other ARRAY SLICES since not all ARRAY SLICES have transceivers. This is merely an economic concern since HSSF BUS 101 only uses a 32 bit parallel data word.

Cable 360 provides control signals and information from COMPARE CONTROL 322. Most prominent is the ten bit memory address (i.e., MA) supplied to address RAM 311*a* and 311*b*. Also present in cable 360 are the signals which enable and clock OCT TRANSC 310*a*, RAM 311*a* and 311*b*, and OCTAL D-TYPE FF 312*a* and 313*a*. Of great interest is signal L→WRITE/$\overline{\text{READ}}$. This signal permits RAM 311*a* and 311*b* to be read and the data to be placed on HSSF BUS 101 via OCT TRANSC 310*a* and cable 101*a*. As explained below, certain bytes (i.e., link field) are read from a record which point to the next (not necessarily sequential) record to be compared.

Figure 10:
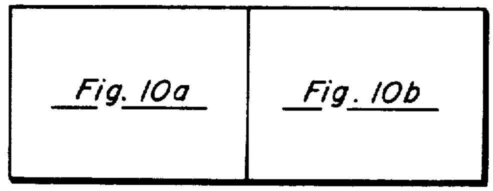
FIG. 10, consisting of FIGS. 10*a* and *b*, shows the detailed construction of FLAG GENERATOR 370.
Figure 10A:
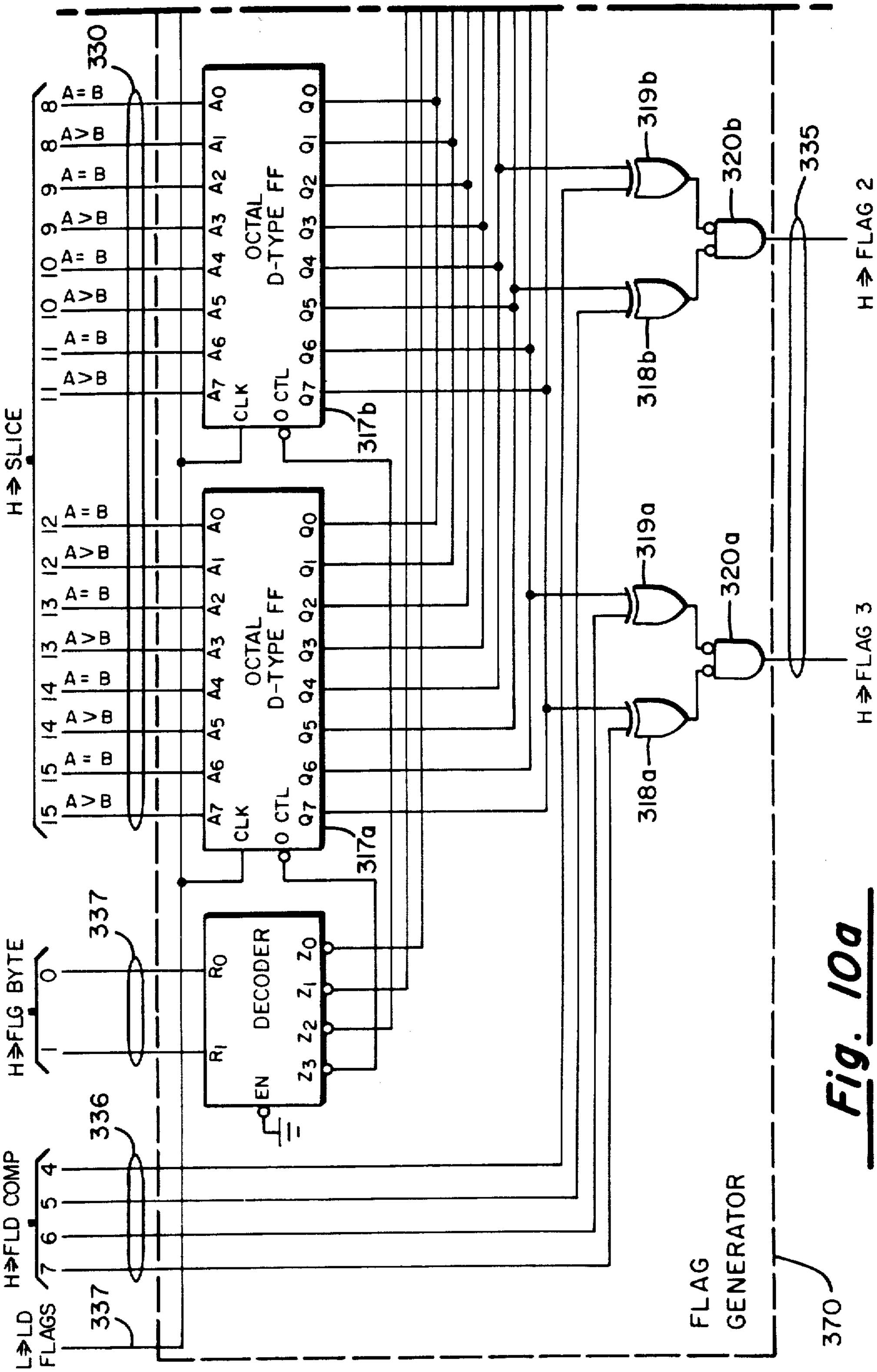
Figure 10B:
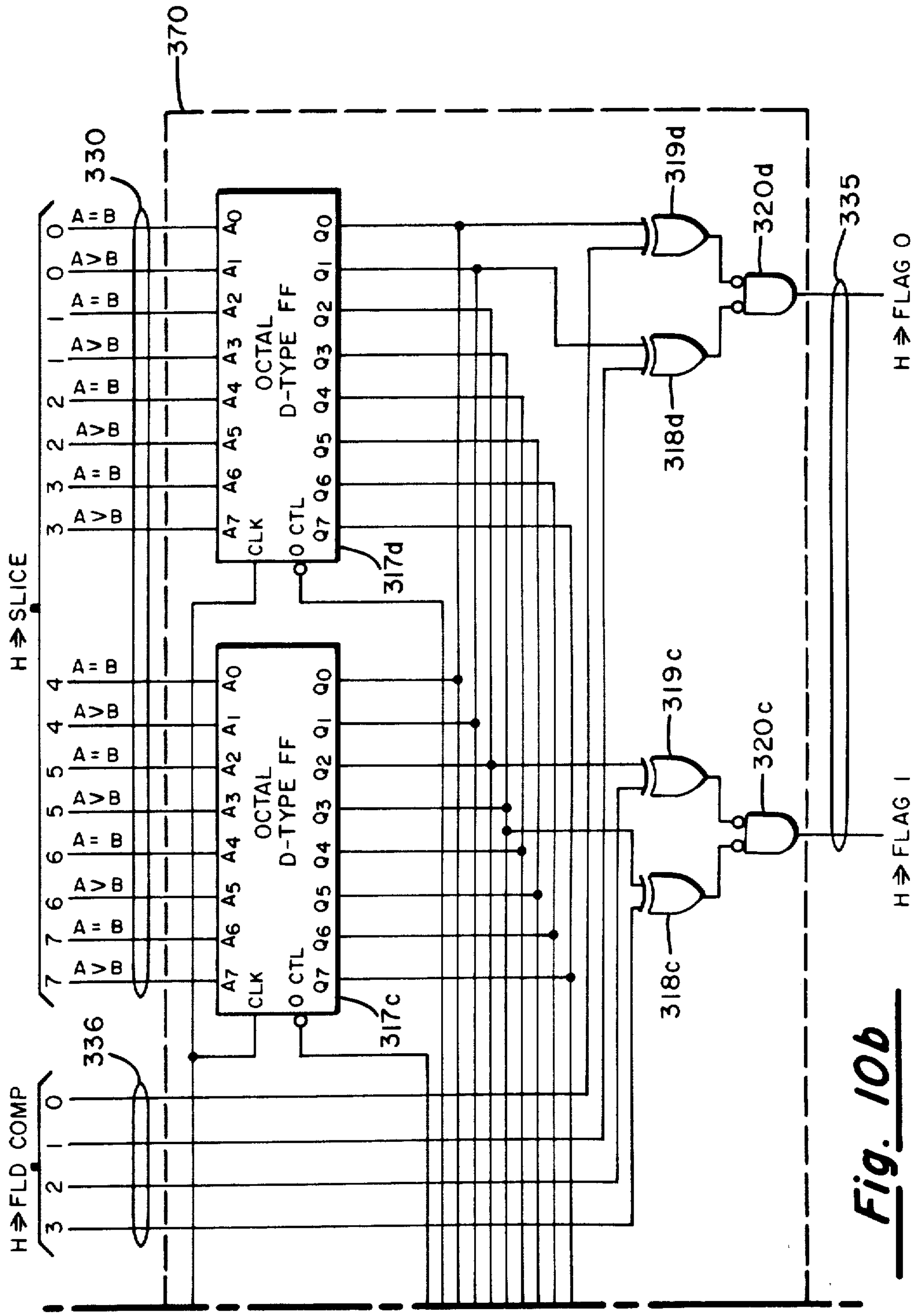

FIG. 10, consisting of FIGS. 10*a* and *b*, shows the detailed construction of FLAG GENERATOR 370. The arithmetic comparison results are transferred from the ARRAY SLICES to OCTAL D-TYPE FF 317*a*, 317*b*, 317*c*, and 317*d* which collectively are FLAG REG 317 as shown in FIG. 6. Referring again to FIG. 10, FLAG REG 317 is used to store the arithmetic comparison results which are generated in parallel for the logical comparison which is performed four bytes at a time. The two bit byte selection (i.e., H→FLAG BYTE O and H→FLAG BYTE 1) is received via cable 337, decoded as shown, and used to enable OCTAL D-TYPE FF 317*a*, 317*b*, 317*c*, 317*d* in turn.

The logical comparison is performed by exclusive-or's 318*a*, 318*b*, 318*c*, 318*d*, 319*a*, 319*b*, 319*c*, 319*d*. They exclusive-or the arithmetic comparison results (i.e., less than, equal to, or greater than) stored in FLAG REG 317 (i.e., OCTAL D-TYPE FF 317*a*, 317*b*, 317*c*, 317*d*) with the expected results received from FIELD COMPARISON REG 316 via cable 316. A close view of the circuitry will confirm the convention used for FLAG REG 317 is:

00→Less Than
01→Equal To
10→Greater Than
11→Undefined

Since FIELD COMPARISON REG 316 is inverting, the convention used for expected results received via cable 336 is:

11→Less Than
10→Equal To
01→Greater Than
00→Undefined

Because these conventions are complimentary, the exclusiveors provide gates 320*a*, 320*b*, 320*c*, and 320*d* lows when the inputs are functionally equal (but logically opposite). Cable 335 transfers the outputs of gates 320*a*, 320*b*, 320*c*, and 320*d* to FLAG MEMORY 321 for storage. Notice that a high signal (i.e., H→FLAG) means that an arithmetic comparison and an expected result were equivalent for the corresponding byte. Notice also that as with the arithmetic comparison, the logical comparison is performed for all bytes even though only the most significant byte of a field represents a valid result for that field.

Figure 11:
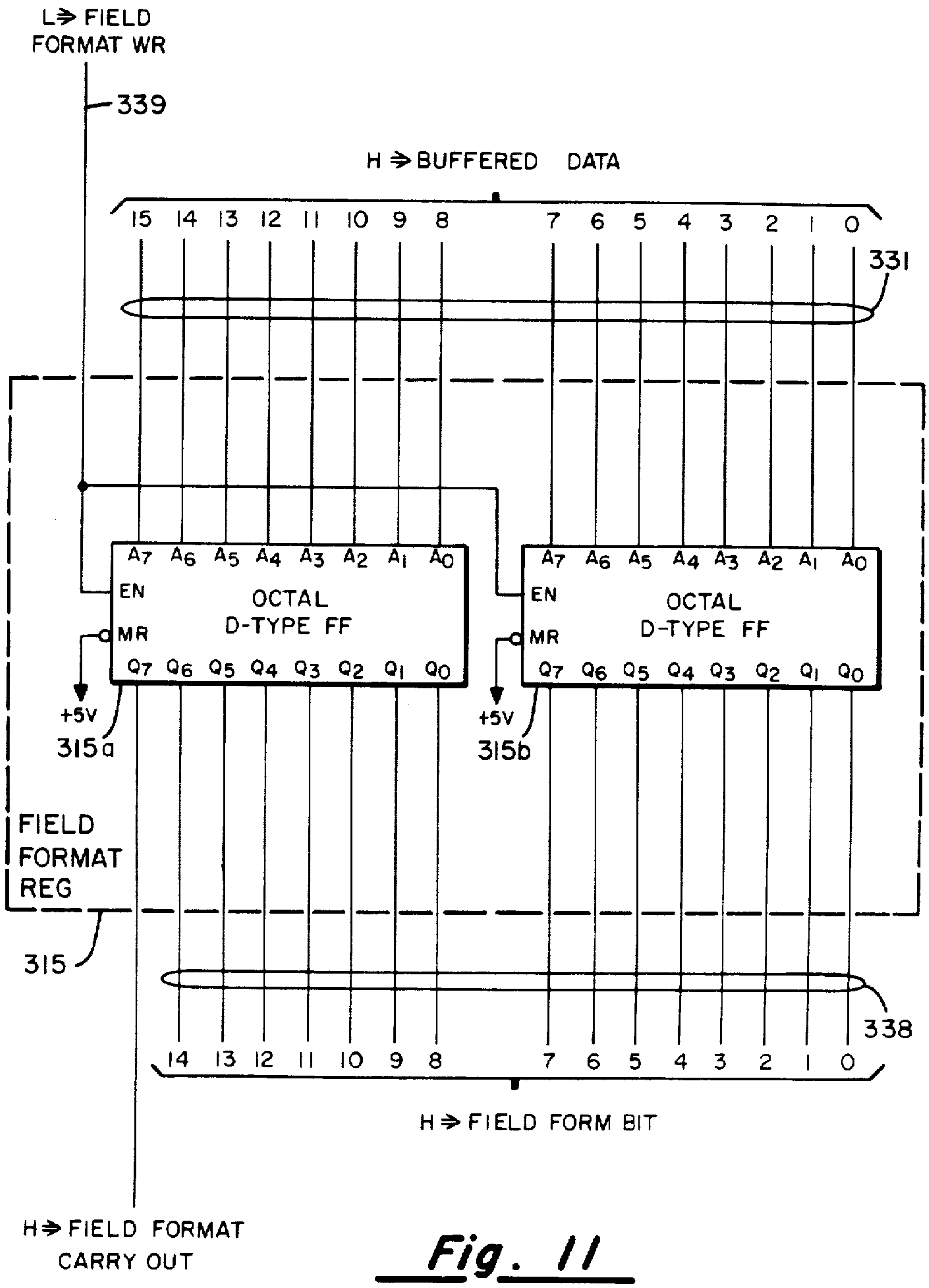
FIG. 11 shows the detailed construction of FIELD FORMAT REG 315.

FIG. 11 shows the detailed construction of FIELD FORMAT REG 315, which uses OCTAL D-TYPE FF 315*a* and 315*b*. As explained above, FIELD FORMAT REG 315 has one bit position corresponding to each of the 16 bytes of the 128 bit word stored and processed by a COMPARE ARRAY. If a given bit of FIELD FORMAT REG 315 is set (i.e., contains a binary one), the corresponding byte of the 16 bytes stored and processed by that COMPARE ARRAY is the most significant byte of a field. Similarly, a bit position which is clear means that the corresponding byte is not the most significant byte of the field.

FIELD FORMAT REG 315 is loaded with a 16 bit word via cable 331 which is simply 16 bit positions of HSSF BUS 101 after buffering (see also FIG. 9).

FIELD FORMAT REG 315 is loaded under command of signal L→FIELD FORMAT WR received from COMPARE CONTROL 322 via line 339. The output of FIELD FORMAT REG 315 is used for arithmetic comparison as discussed above. Notice that the most significant bit position is transferred to the next most significant COMPARE ARRAY (if any) as signal H→FIELD FORMAT CARRY OUT.

Figure 12:
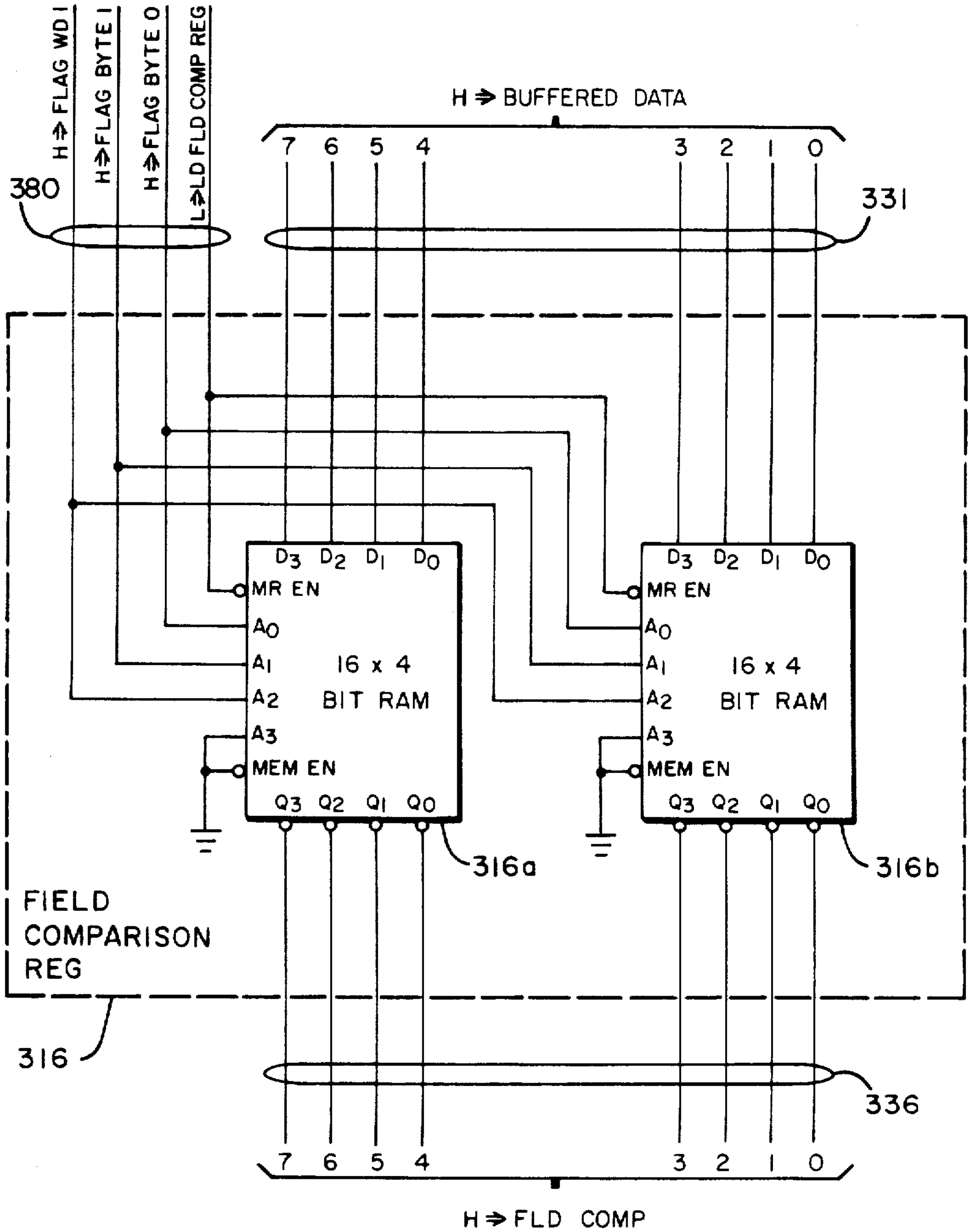
FIG. 12 shows the detailed construction of FIELD COMPARISON REG 316.

The detailed construction of FIELD COMPARISON REG 315 is shown in FIG. 12. Notice that FIELD COMPARISON REG 316 uses 16×4 BIT RAM's 316*a* and 316*b* rather than registers. This is done to lower the cost and has no significant performance disadvantages since FLAG MEMORY 321 stores the flags four at a time rather than all in parallel. To load 16×4 BIT RAM 316*a* and 316B, cable 331 transfers the buffered data from HSSF BUS 101 in eight bit bytes. 16×4 BIT RAM 316*a* and 316*b* are loaded before initiation of a search with control signals and addressing supplied by COMPARE CONTROL 322 via cable 380. Notice that only eight addressable locations are used, but 8×8 BIT RAM's are not conveniently available at this time.

The output of FIELD COMPARISON REG 316 is transferred for logical comparison to FLAG GENERATOR 370 via cable 336. As mentioned above, FIELD COMPARISON REG 316 inverts the data from input to output.

Figure 13:
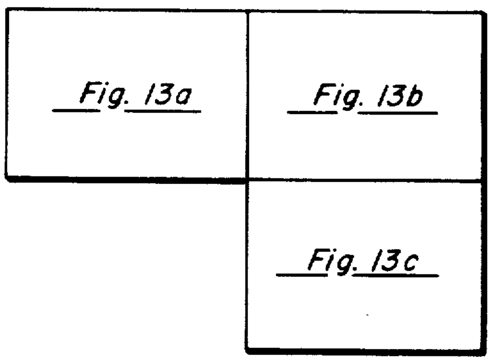
FIG. 13, consisting of FIGS. 13*a*, *b*, and *c*, shows the detailed construction of FLAG MEMORY 321.
Figure 13A:
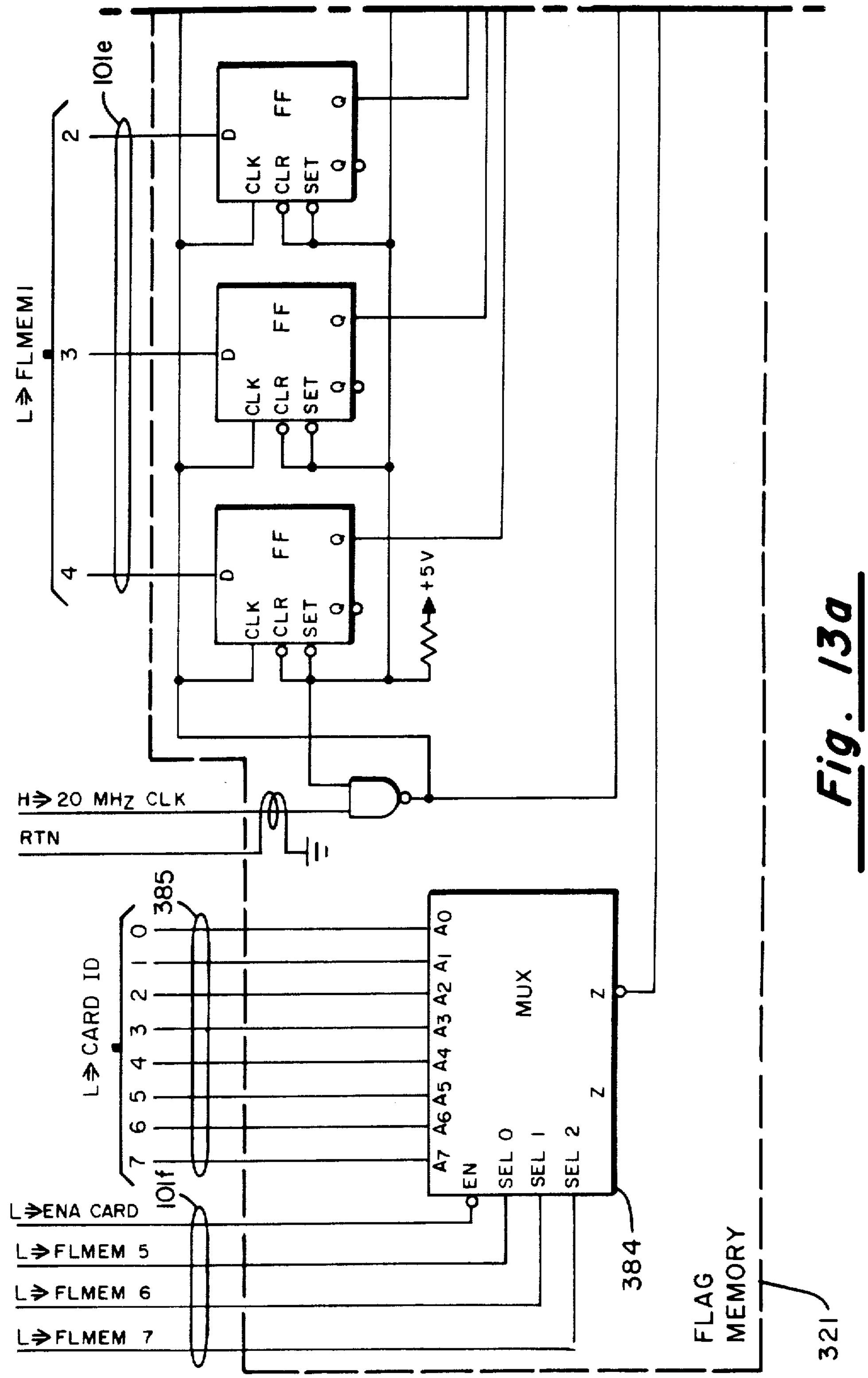
Figure 13B:
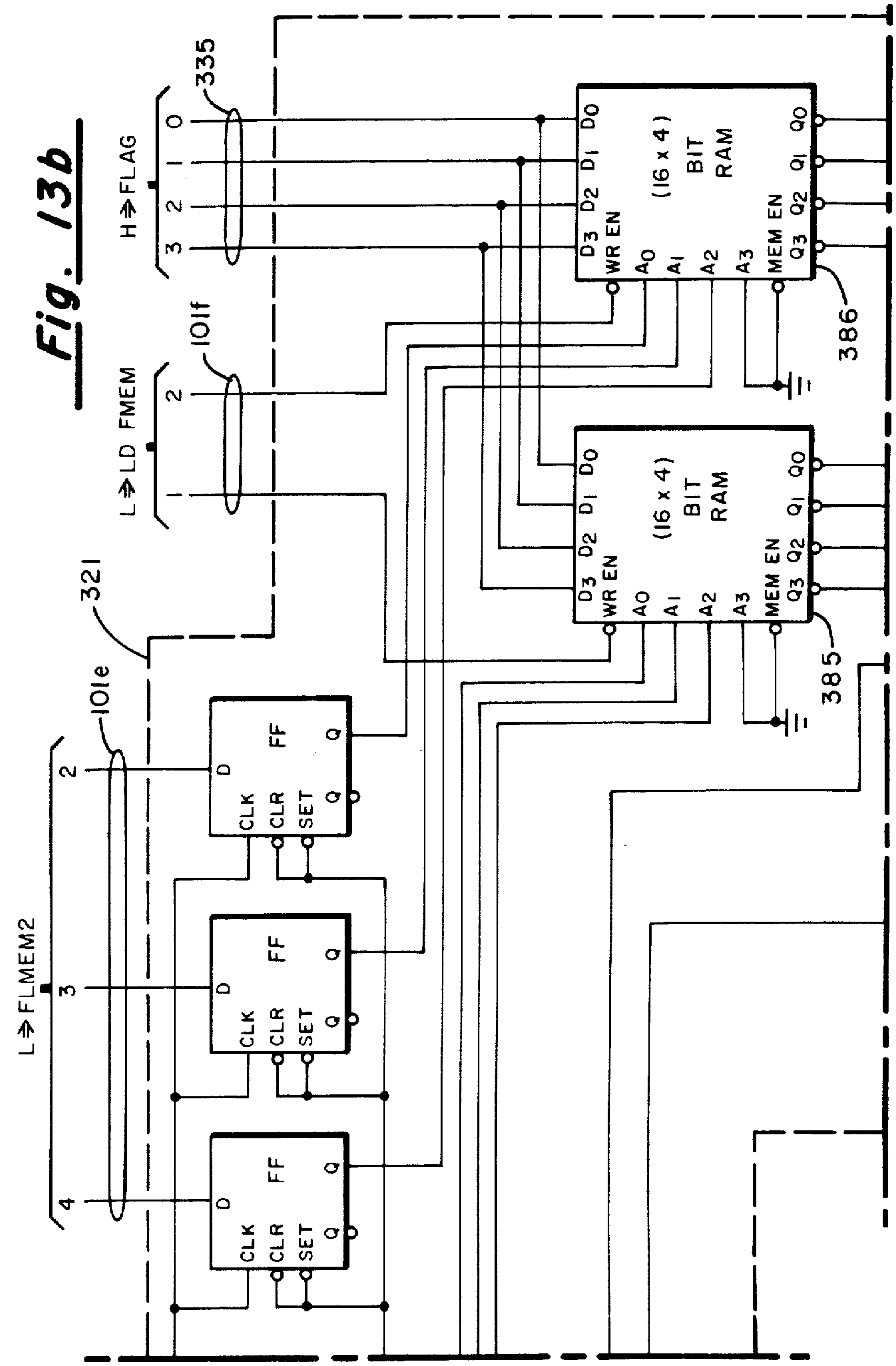
Figure 13C:
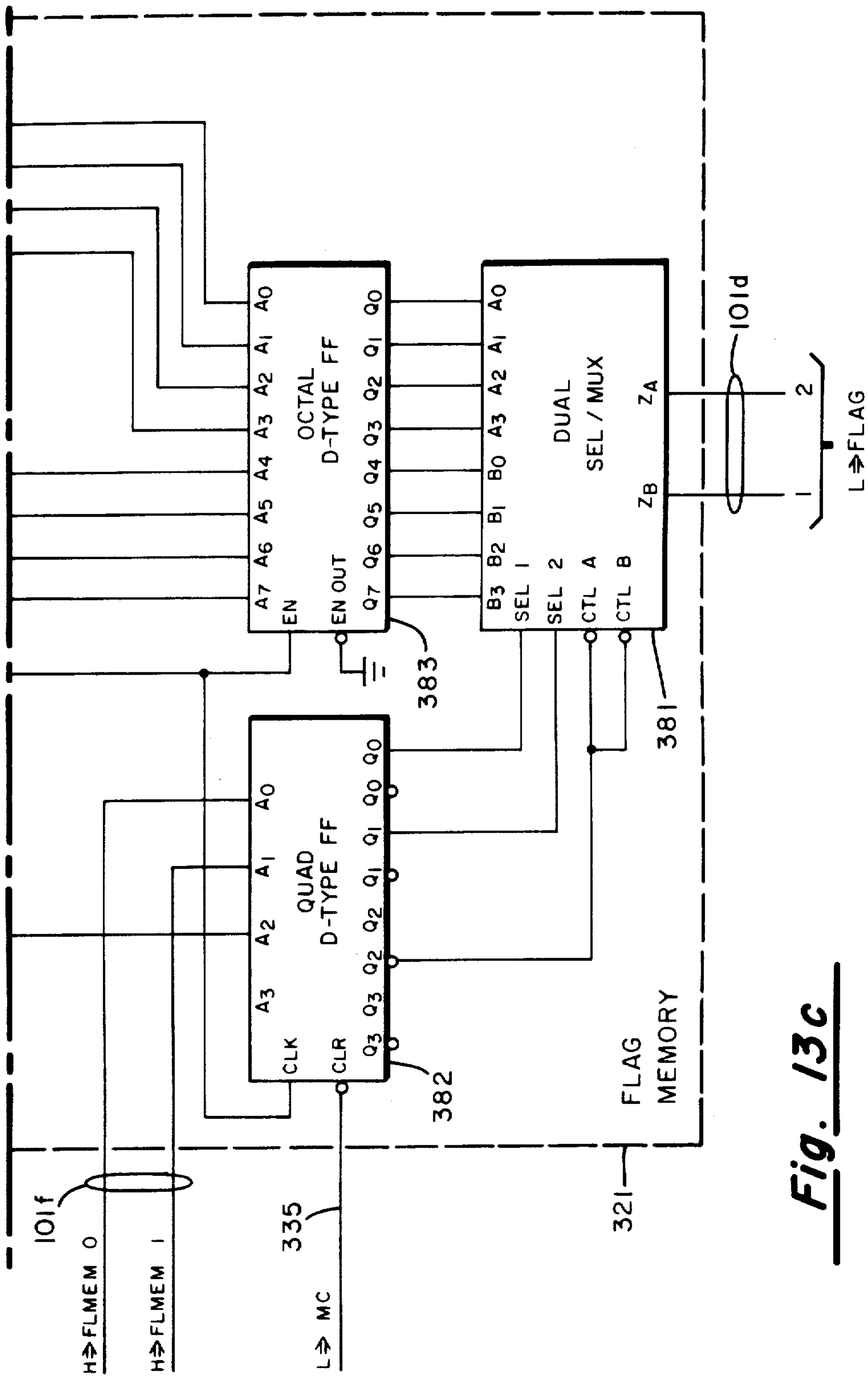

FIG. 13, consisting of FIGS. 13*a, b,* and *c,* shows the detailed construction of FLAG MEMORY 321. The addressing information for FLAG MEMORY 321 is received from HSSF BUS 101 via cable 101*e*. The addressing information is stored in D-TYPE FF's as shown. 16×4 BIT RAM 385 and 386 are used as the storage elements. As with FIELD COMPARE REG 316, only eight of the 16 addressable locations are used. The flags are received from FLAG GENERATOR 370 via cable 335 for storage. Control signals L→LD FLMEM 1 and L→LD FLMEM 2 are received from SEQUENCER 260 via HSSF BUS 101 and cable 101*f*. The four bit outputs of 16×4 BIT RAM 385 and 386 are stored in OCTAL D-TYPE FF 383 which is synchronously clocked from the Boolean Evaluator by signal H→20 MHz CLK.

The procedure for reading FLAG MEMORY 321 is optimized for efficient performance of the Boolean Evaluator located in SEQUENCER 260. Though the Boolean Evaluator is discussed in detail below, it should be remembered at this point that the Flags stored in FLAG MEMORY 321 are variables to be used by the Boolean Evaluator to determine if user supplied BOOLEAN EXPRESSION 45 is satisfied (see also FIG. 3). Therefore, MUX 384, QUAD D-TYPE FF 382, and DUAL SEL/MUX 381 are used to permit convenient reading of 16×4 BIT RAM 385 and 386 during Boolean Evaluation. To enhance performance one of 16×4 BIT RAM 385 and 386 is alternately read while the other is written.

Signals H→FLMEM 0 and H→FLMEM 1 are received from SEQUENCER 260 (i.e., Boolean Evalutor) via HSSF BUS 101 and cable 101*f*. These signals are stored by QUAD D-TYPE FF 382. These signals are used as inputs SEL 1 and SEL 2 of DUAL SEL/MUX 381 which selects output signals L→FLAG 1 and L→FLAG 2 based upon inputs SEL 1 and SEL 2. This selection corresponds to a selection of which flag to read of the four stored in parallel in in each of 16×4 BIT RAM 385 and 386.

QUAD D-TYPE FF 382 also stores (and complements) the output of MUX 384 which is used to enable DUAL SEL/MUX 381 for output. This is required, since cable 101*d* is a common bus from all COMPARE ARRAY's to the Boolean Evaluator. MUX 384 ensures that DUAL SEL/MUX 381 is only enabled for output when the Boolean Evalutor is addressing that specific COMPARE ARRAY. To enable DUAL SEL/MUX 381, MUX 384 must receive a coincident one of the L→CARD X signal inputs and the corresponding encoded designation from signals L→FLMEM 5-7. The L→CARD X signal input corresponds to the physical location of a COMPARE ARRAY. Signals L→FLMEM 5-7 are derived from user supplied BOOLEAN EXPRESSION 45. Therefore, it can be seen that MUX 384 permits utilization of a number of identical COMPARE ARRAY's (each COMPARE ARRAY is one printed circuit card) which differ only by the physical location.

Figure 14:
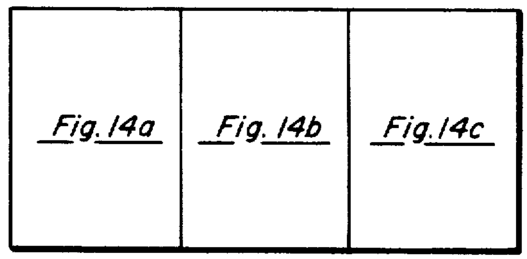
FIG. 14, consisting of FIGS. 14*a*, *b*, and *c*, shows the detailed construction of COMPARE CONTROL 322.
Figure 14A:
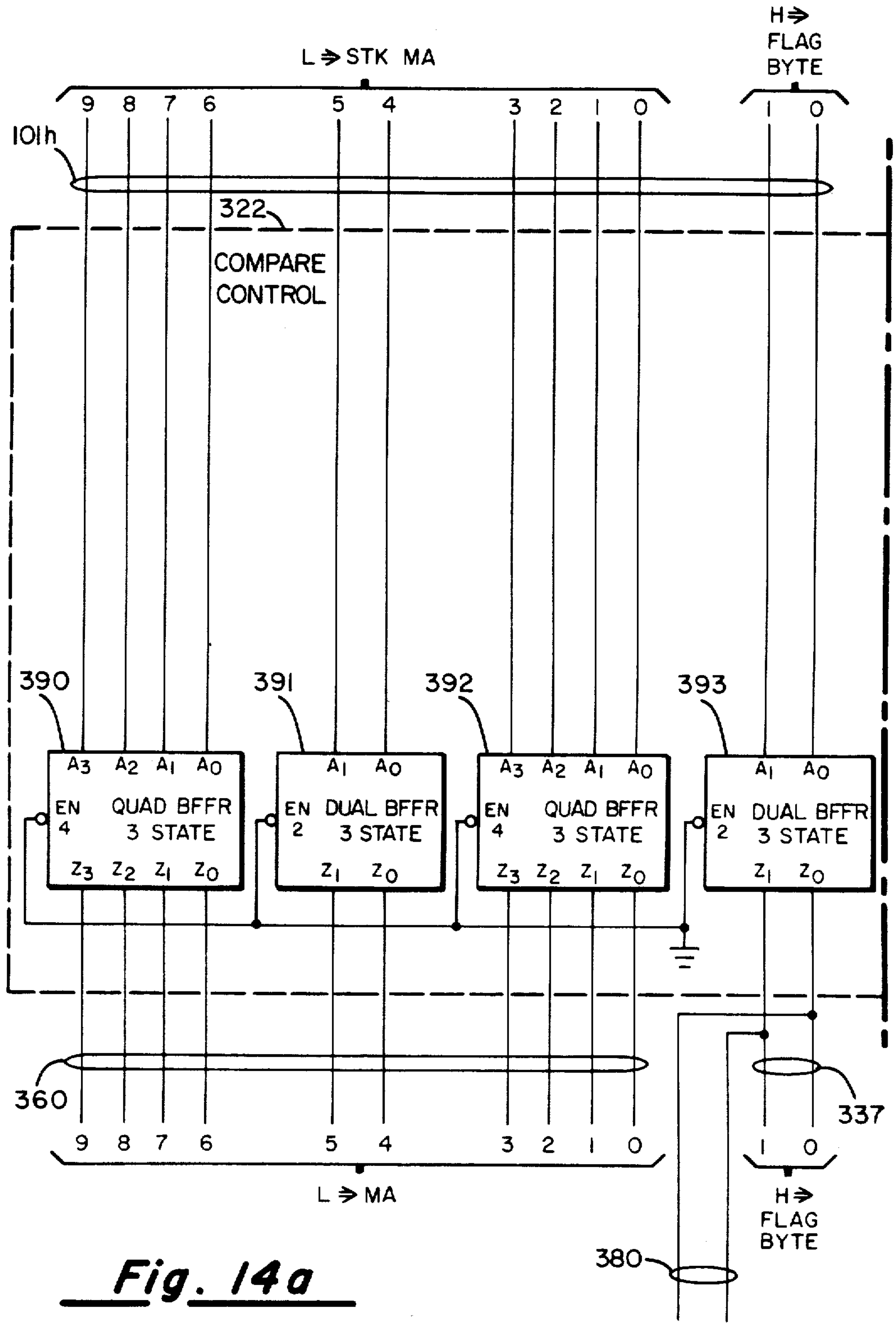
Figure 14B:
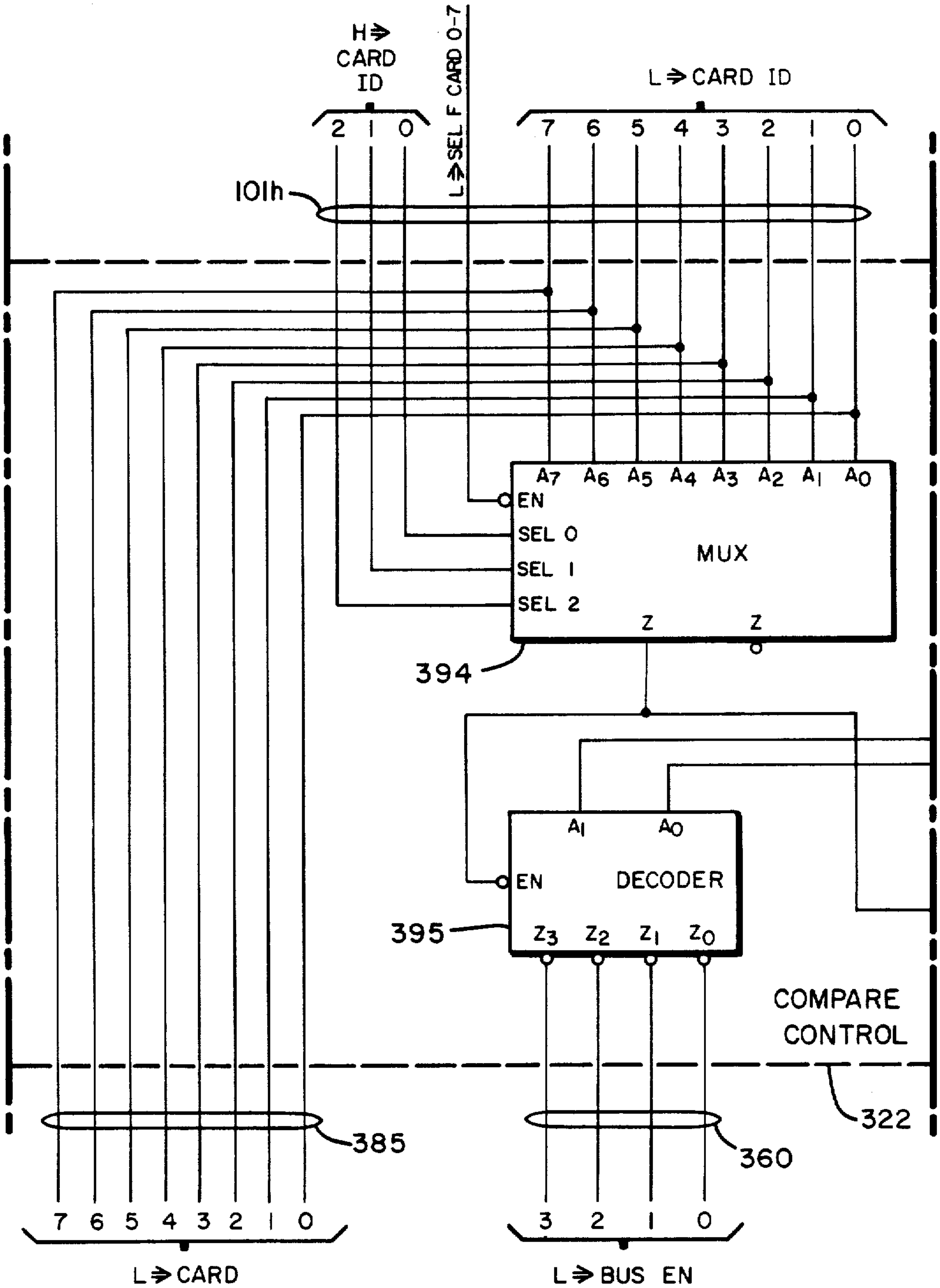
Figure 14C:
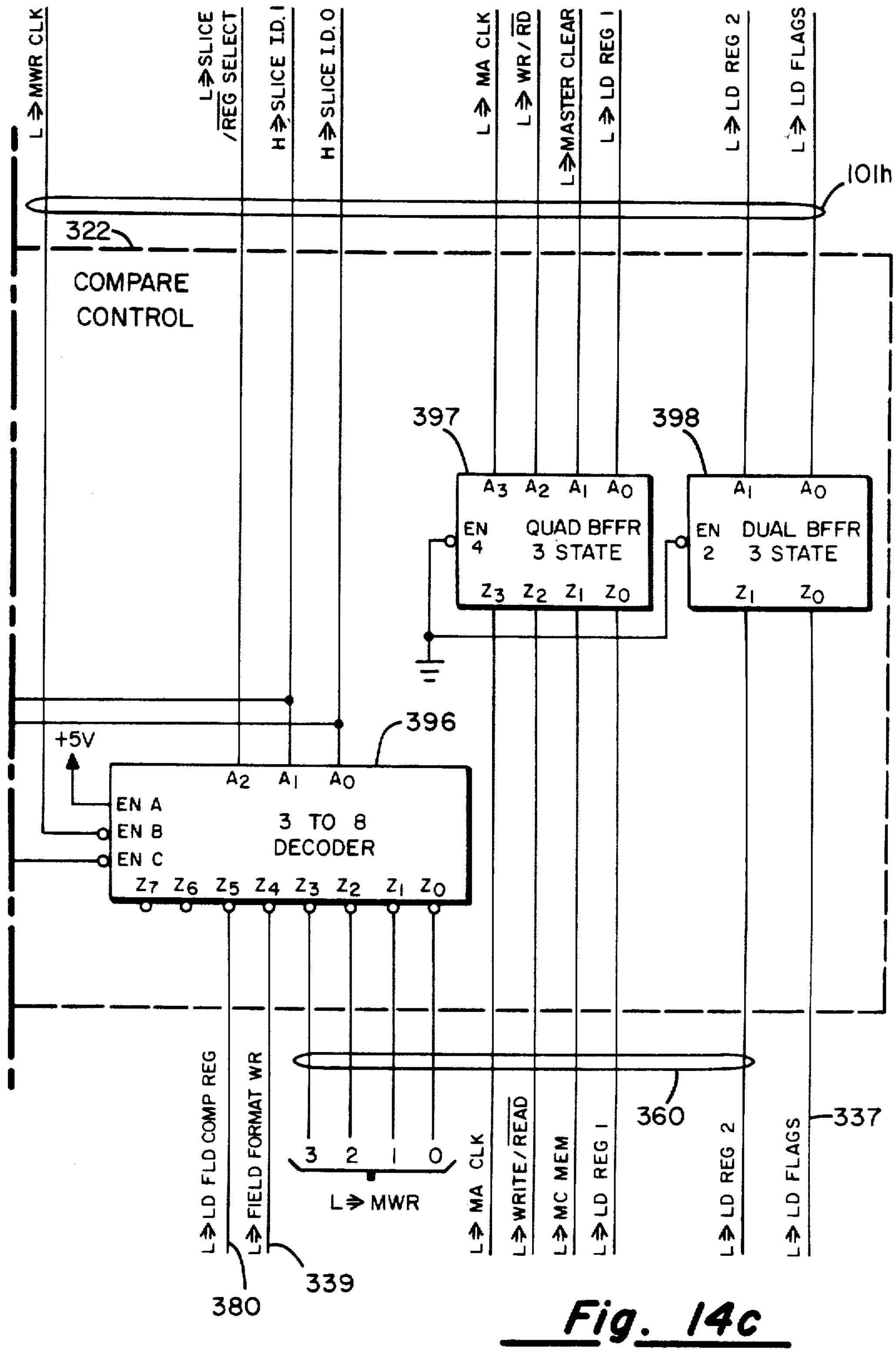

FIG. 14, consisting of FIGS. 14*a, b,* and *c,* provides a detailed view of COMPARE CONTROL 322. Notice that virtually all control signals are received via cable 101*h* from HSSF BUS 101. QUAD BFFR 3 STATE 390, 391 and 392 receive the ten address lines, convert the electrical level, and output to MEMORY 311 via cable 360. Similarly, control signals H→FLAG BYTE 0 and 1, L→REG 1 and 2, L→LD FLAGS, L→MA CLK, L→WR/RD, and L=MASTER CLEAR are received by DUAL BFFR 3 STATE 397, electrically buffered, and distributed within the COMPARE ARRAY.

MUX 394 receives the L→CARD X signal from the physical placement of the COMPARE ARRAY. As above, MUX 394 ensures that the COMPARE ARRAY addressed by H→CARD ID 0, 1, and 2 corresponds to the proper physical location causing the output of MUX 394 to enable DECODER 395 and 3 TO 8 DECODER 396. The outputs of DECODER 395 and 3 to 8 DECODER 396 are used to control addressing and loading of the desired ARRAY SLICE WITHIN THE COMPARE ARRAY and to enable the address read from a link field onto HSSF BUS 101.

Referring again to FIG. 4, the preceeding discussion focused on the detailed construction and operation of COMPARE ARRAY 300 (the other COMPARE ARRAY's are identical). The following discussion treats CONTROLLER 200 in equivalent detail. Notice that CONTROLLER 200 interfaces to the COMPARE ARRAYS via HSSF BUS 101 and to the external environment via cable 102. Referring again to FIG. 5, CONTROLLER 200 is seen as containing INTERFACE LOGIC 220, MPC 240, and SEQUENCER 260. INTERFACE LOGIC 220 contains the circuitry which interfaces with the external environment via cable 102. MPC 240 provides overall system level control. SEQUENCER 260 controls and perform the detailed steps of a data base search. SEQUENCER 260 communicates with the COMPARE ARRAY's via HSSF BUS 101. MPC BUS 103 is the main communication path within CONTROLLER 200.

Figure 15:
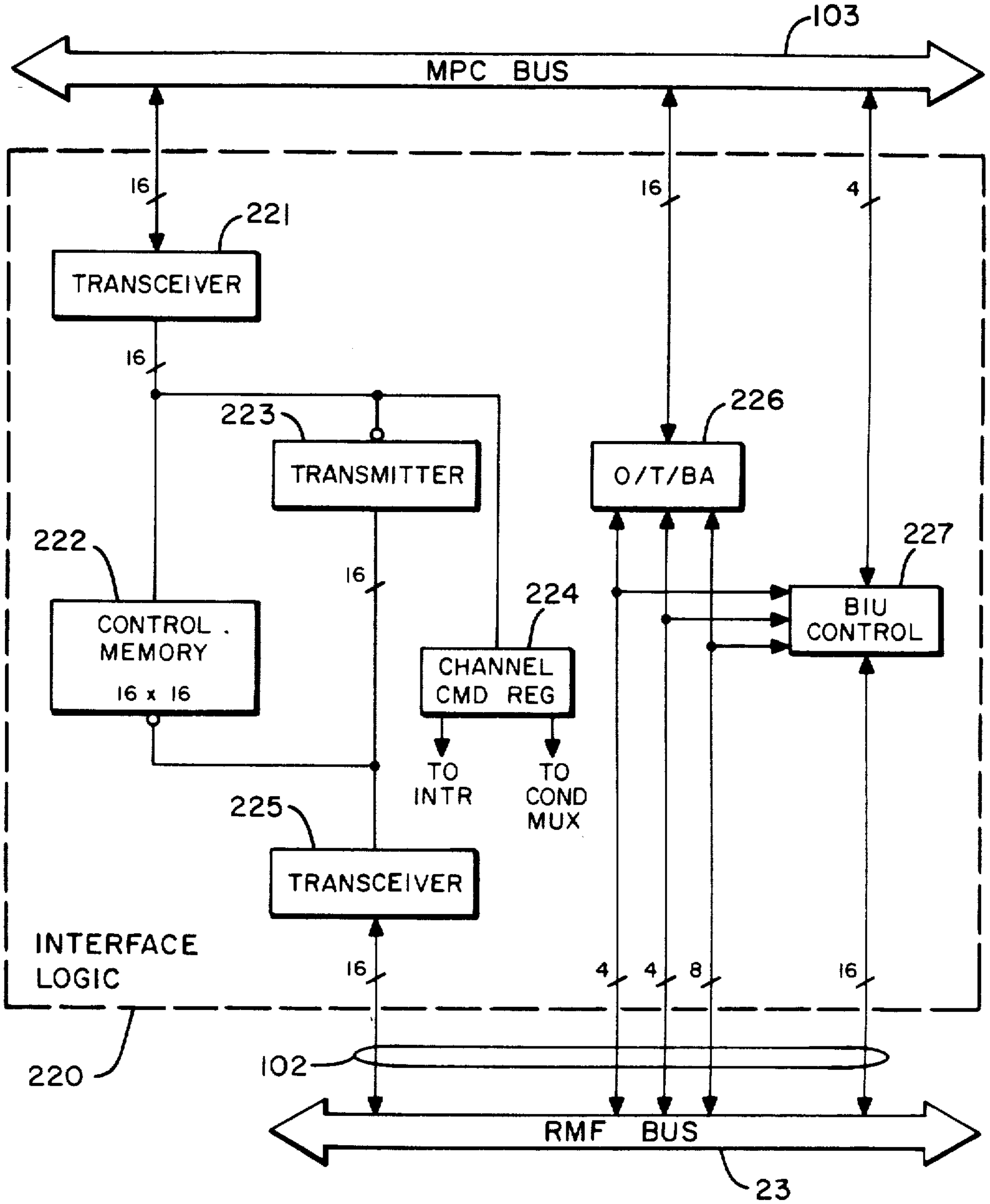
FIG. 15 shows the major elements of INTERFACE LOGIC 220.

FIG. 15 is a block diagram of INTERFACE LOGIC 220 for the preferred inboard configuration. As discussed above, the inboard configuration is most desirable subject to packaging constraints. The communication path between INTERFACE LOGIC 220 and the other system elements in this configuration could use a number of protocols. Used herein is a busing structure called RMF (i.e., Reconfigurable Modular Family) Bus 23. The RMF Bus protocol has been implemented in a number of military products of the assignee including AN/AYK-15A and AN/UYK-502 computers. Because these products are avaialbe in the marketplace and the specific bus Protocol used is not important to the present invention, the RMF Bus protocol is discussed herein to the extent required to disclose the preferred embodiment. The preferred embodiment uses the AN/UYK-502 as the general purpose host processor.

TRANSCEIVER 221 couples INTERFACE LOGIC data paths to the 16 bit, bi-directional MPC BUS 103. Similarly TRANSCEIVER 225 couples circuitry to 16 bit RMF Bus 23. Most of the control of the interface to RMF BUS 23 is supplied by BIU (i.e., Bus Interface Unit) CONTROL 227. O/T/BA 226 contains the registers which store Operation (i.e., Op) Code, Type Code, and Bus Address. CHANNEL CMD REG 224 stores bus interface commands. CONTROL MEMORY 222 is used for buffering commands and data.

Figure 16:
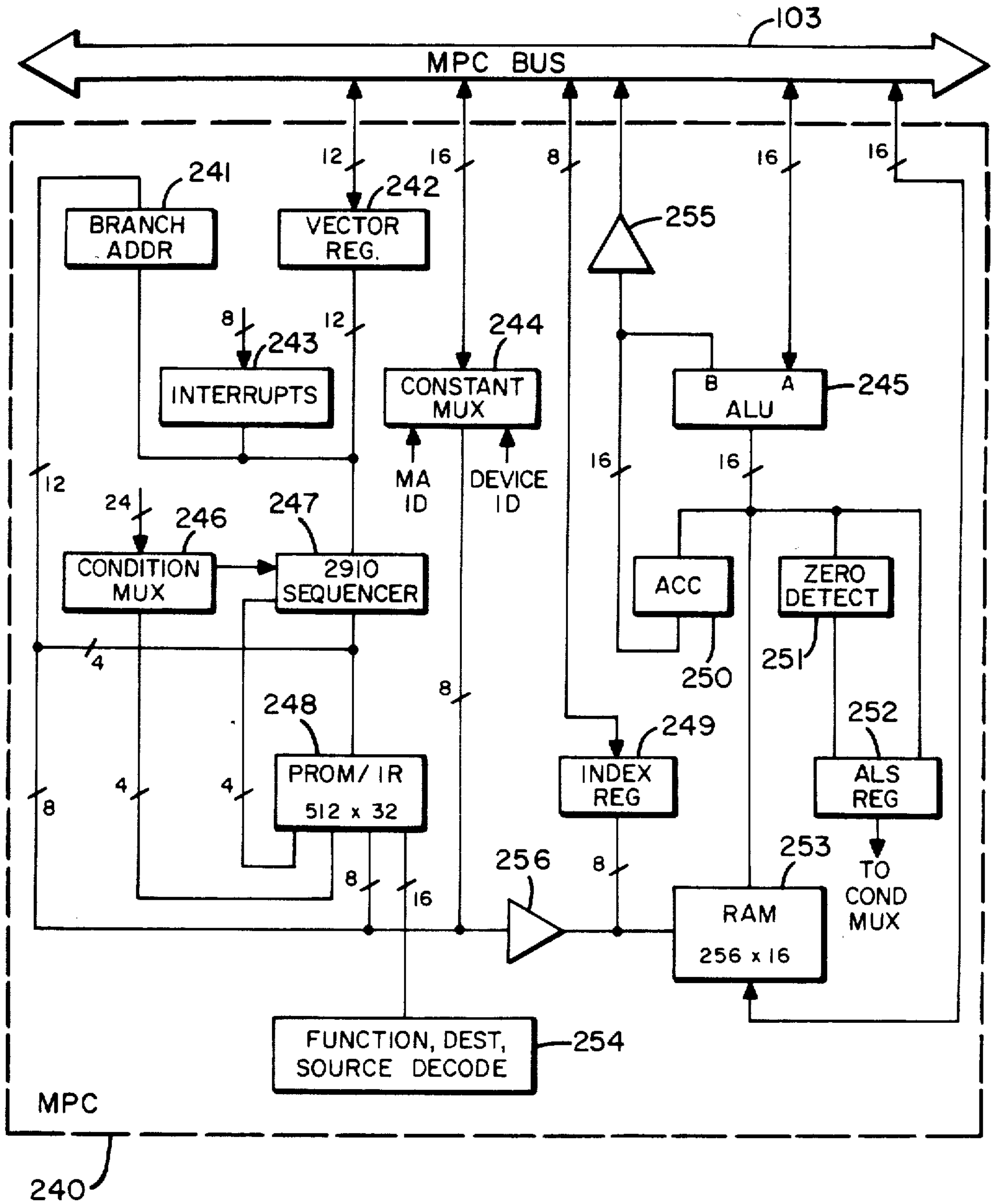
FIG. 16 shows the major elements of MPC 240.

FIG. 16 provides an overall block diagram of MPC 240. A central component is 2910 SEQUENCER 247 which is an AMD Model 2910, microsequencer device. PROM/IR 248 stores the microprogram. RAM 253 provides working storage. The remaining elements are special purpose circuits to provide ALU functions to or enhance existing functions of the basic microsequencer. MPC 240 interfaces with all other elements via MPC BUS 103.

Figure 17:
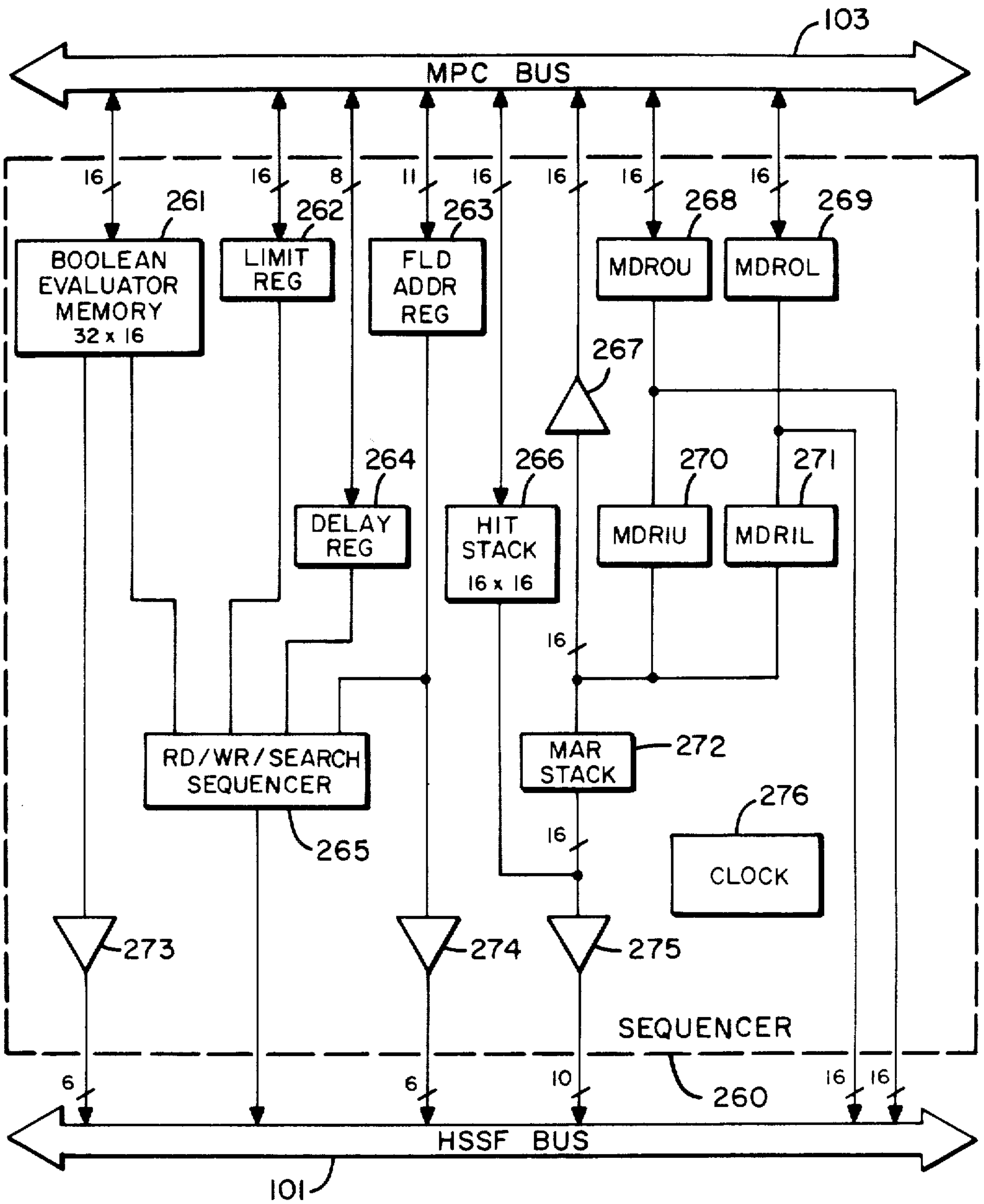
FIG. 17 shows the major elements of SEQUENCER 260.

FIG. 17 is a block diagram of SEQUENCER 260. SEQUENCER 260 has the special purpose circuitry used to control the search operations. Special purpose circuitry is required for these functions to provide the desired performance. BOOLEAN EVALUATOR MEMORY 261 stores the Boolean Expression in a form most conveniently used by the Boolean Evaluator portion of RD/WR/SEARCH SEQUENCER 265. LIMIT REG 262 terminates the search upon searching of a given number of records. DELAY REG 264 shows the per record search timing to accomodate searches having large, multi-byte fields and Boolean Expressions having large numbers of terms. FLD ADDR REG 263 stores the address within the record of the link field.

HIT STACK 226 stores the addresses of records found to be hits. MAR (Memory Address Register) STACK 272 is used to store the record address to be searched. The input and output memory data registers (i.e., MDRIU 270, MDRIL 271, MDROU 268, and MDROL 269) buffer data between MPC Bus 103 and HSSF BUS 101. CLOCK 276 supplies the overall synchronizing signals.

FIG. 18 shows the Figures herein disclosing the detailed construction and operation of each major element of INTERFACE LOGIC 220. FIG. 19 shows the Figures illustrating the detailed construction and operation of each of the major elements of MPC 240. Similarly, each major element of SEQUENCER 260 has corresponding Figures showing detailed construction and operation as contained in FIG. 20.

Figure 21:
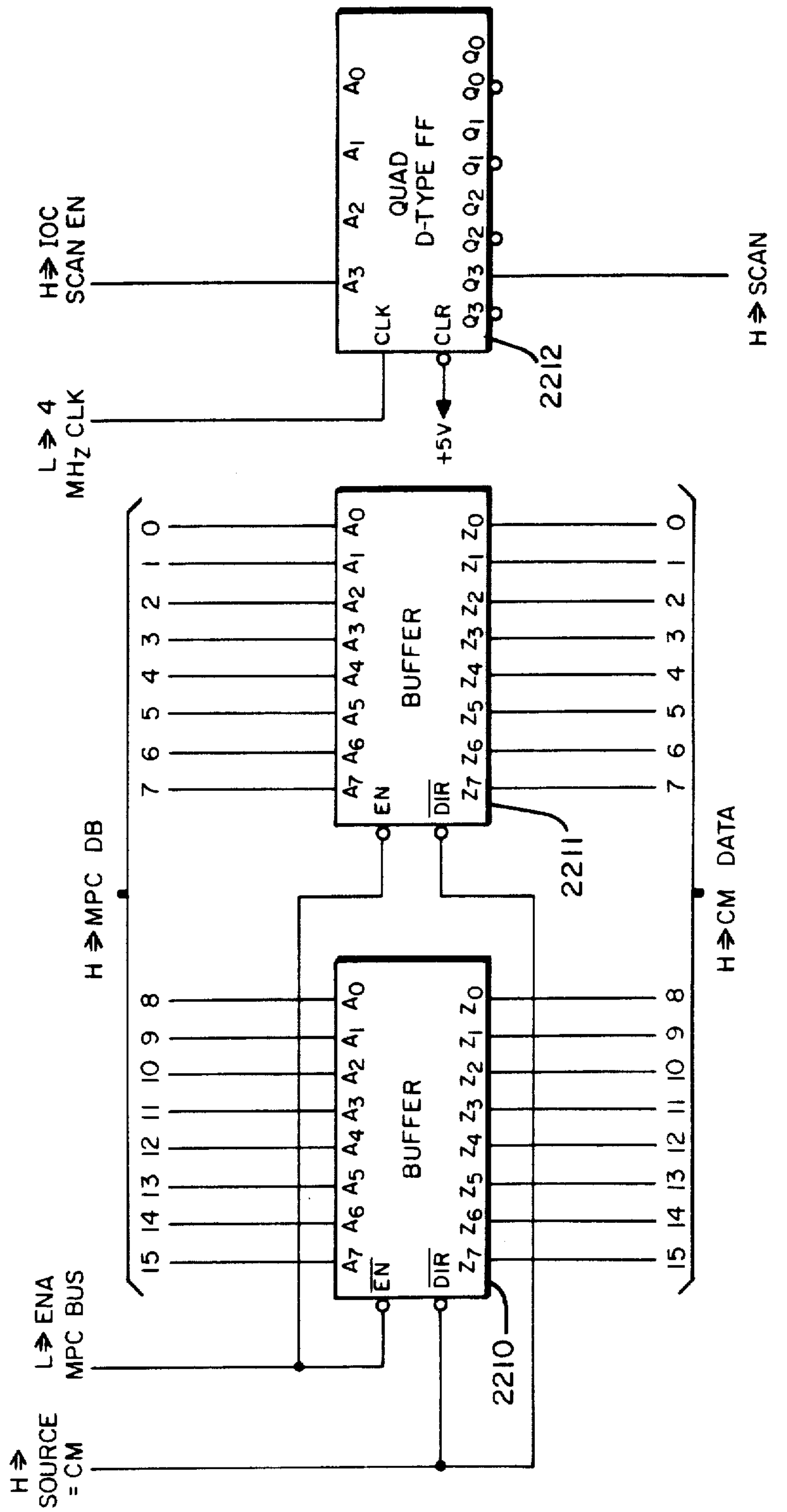
FIG. 21 shows the detailed construction of TRANSCEIVER 221.

FIG. 21 shows the detailed construction of TRANSCEIVER 211. OCTAL XCEIVER 2210 and 2211 are bidirectional devices which interface CONTROL MEMORY 222 to MPC BUS 103. Signal L→ENA MPC BUS is generated by BIU CONTROL 227 (see also FIG. 30). Signal H→SOURCE=CM is generated by PROM/IR 248 (see also FIGS. 41 and 47) as MPC Instruction bit 6. QUAD D-TYPE FF 2212 is used to synchronize signal H→IOC SCAN EN received from RMF Bus 23.

Figure 22:
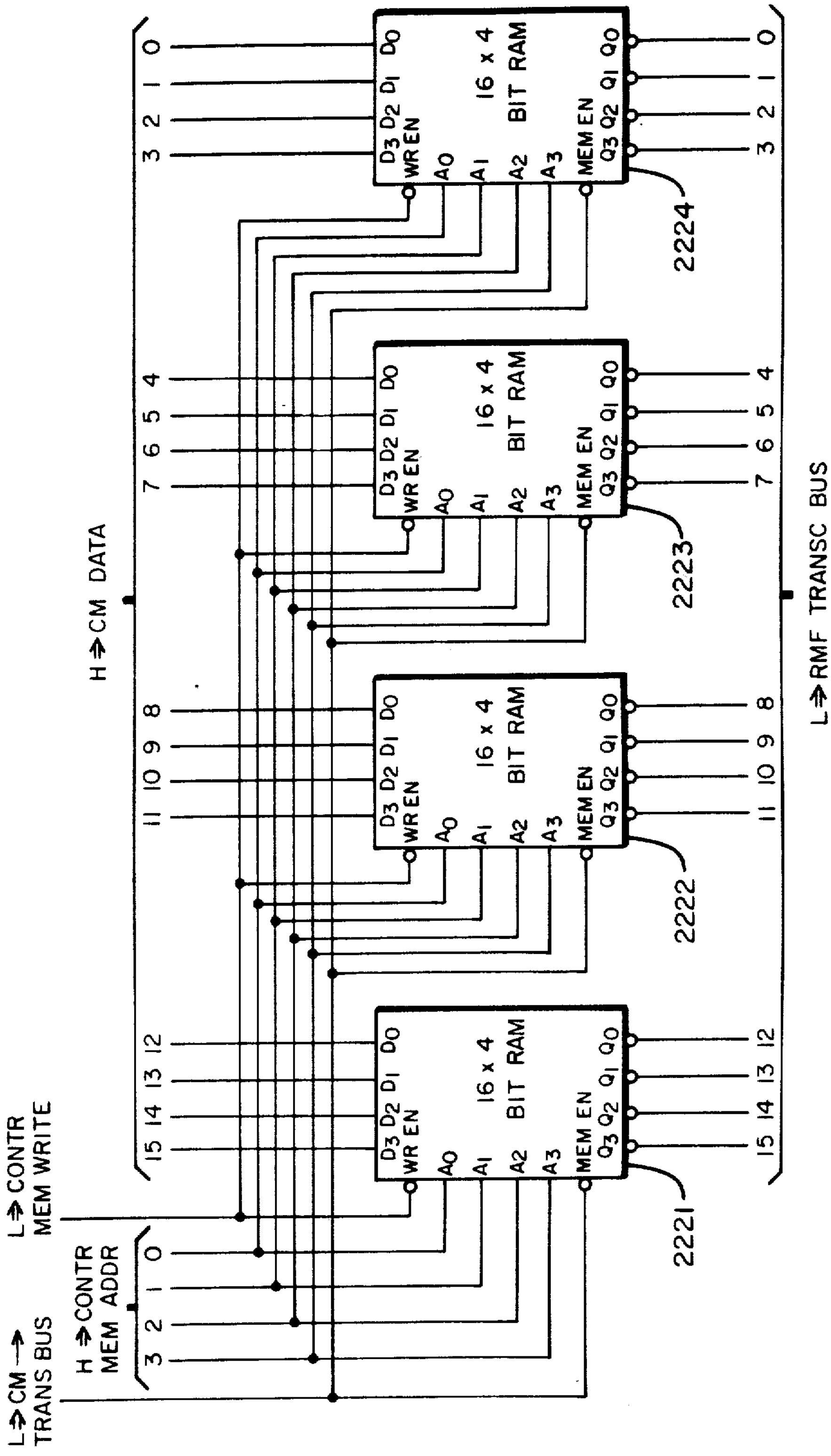
FIG. 22 shows the detailed construction of CONTROL MEMORY 222.

FIG. 22 shows CONTROL MEMORY 222 which buffers data between RMF BUS 23 and MPC BUS 103. CONTROL MEMORY 222 consists of 16×4 BIT RAM 2221, 2222, 2223, and 2224. The 16 bit data input is received directly from TRANSCEIVER 221 or TRANSMITTER 223. The 16 bit data output is transferred to TRANSCEIVER 225 and TRASMITTER 223. CONTROL MEMORY 222 is addressed by QUAD D-TYPE FF 2225 or BUFFERS 2226 and 2228 (see also FIG. 23). The control signals (i.e., signals L→C→TRANS BUS and L→CONTR MEM WRITE) are discussed below along with disclosure of BIU CONTROL 227 (see also FIG. 30).

Figure 23:
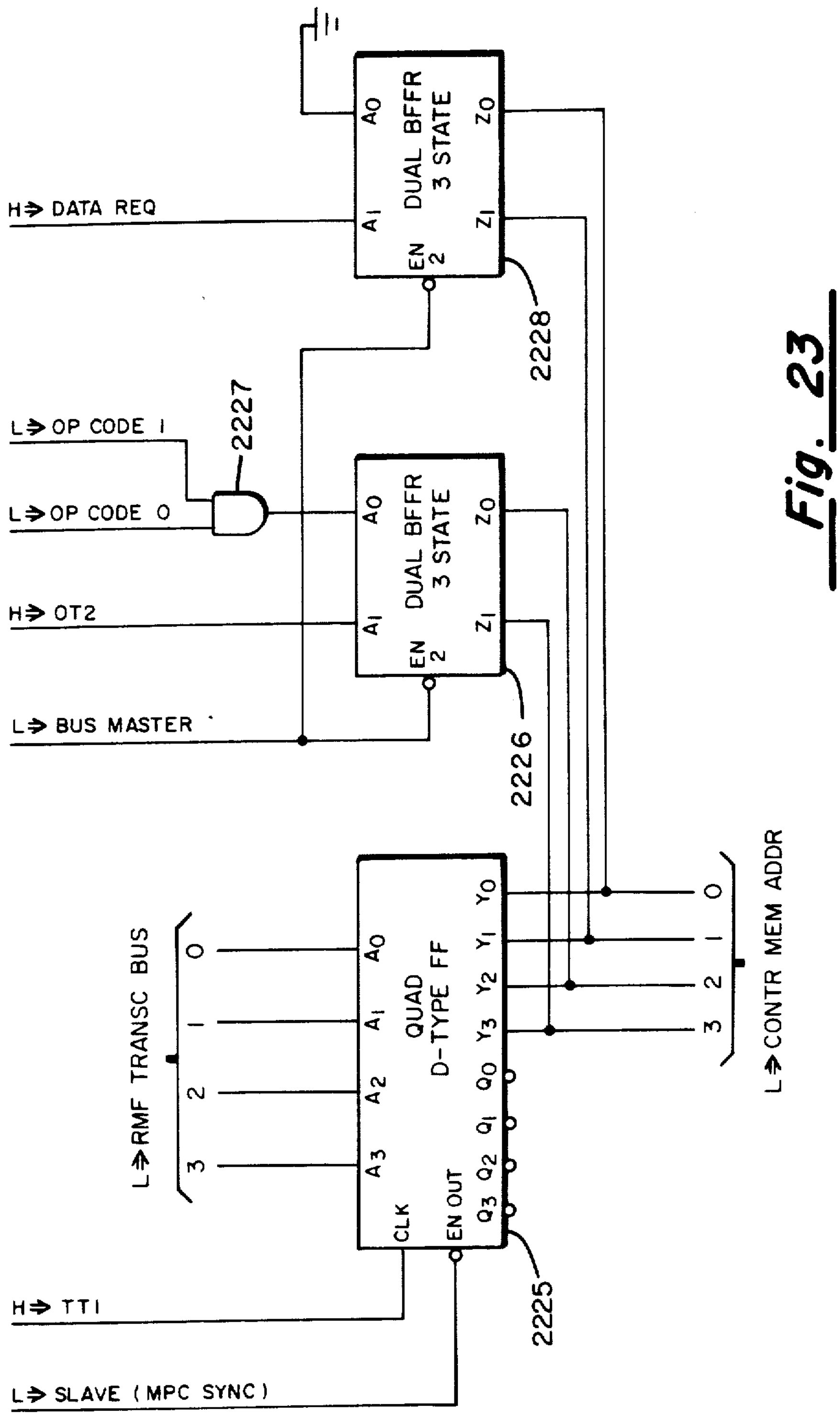
FIG. 23 shows the addressing circuitry for CONTROL MEMORY 222.

FIG. 23 shows the circuitry for addressing CONTROL MEMORY 222. QUAD D-TYPE FF 2225 is used as a four bit address register. The QUAD D-TYPE FF 2225 input data is received from TRANSCEIVER 225 (see also FIG. 27) permitting INTERFACE LOGIC 220 to receive addresses for CONTROL MEMORY 222 from RMF BUS 23. QUAD D-TYPE FF 2225 is enabled for output by signal L→SLAVE (MPC SYNC) which is generated by INTERFACE control logic (see also FIG. 52). QUAD D-TYPE FF 2225 is clocked by timing signal H→TT1 (i.e., Terminator Timing Phase 1) generated by BIU CONTROL 227 which discussed below and shown in FIG. 29.

Figure 29:
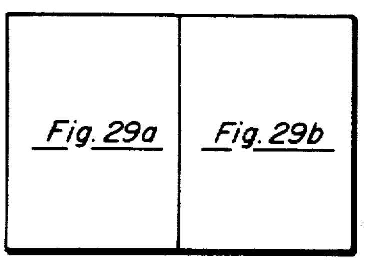
FIG. 29, consisting of FIGS. 29*a* and *b*, shows the connections to the Bus Interface Unit Control Hybrid.

As can be seen in FIG. 23, the four bit control memory address can also be provided by DUAL BFFR 3 STATE 2226 and 2228 when enabled by signal L→BUS MASTER which is generated by BIU CONTROL 227 (see also FIG. 29). Therefore, it can be seen that when in the slave mode (i.e., HSSF 100 is terminator or receiver of commands and/or data from RMF BUS 23), CONTROL MEMORY 222 is externally addressed by RMF BUS 23 via TRANSCEIVER 225 and QUAD D-TYPE FF 225. Similarly, when HSSF 100 is bus master, CONTROL MEMORY 222 is internally addressed by DUAL BFFR 3 STATE 2226 and 2228. The actual addressing used when internal addressing is used (i.e., in bus master mode) are control and timing signals generated by O/T/BA 226 and BIU CONTROL CONTROL 227 (see also FIGS. 28, 29, and 30). CONTROL MEMORY 222 can also be addressed by MPC 240 with MULTIPLEXER 2561 (see also FIG. 48).

Figure 24:
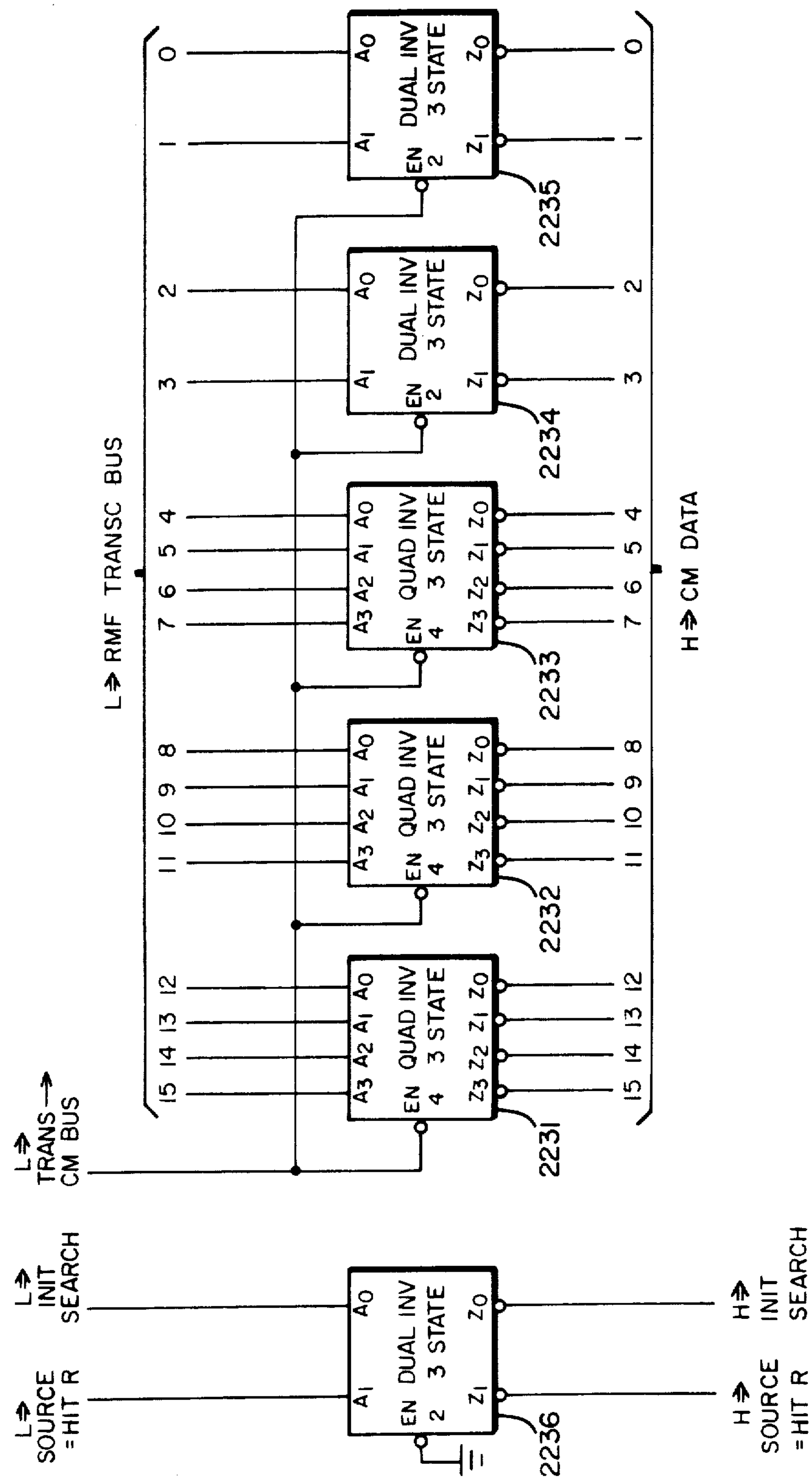
FIG. 24 shows the detailed construction of TRANSMITTER 223.

TRANSMITTER 223 is shown in detail in FIG. 24. TRANSMITTER 223 consists of QUAD INV 3 STATE 2231, 2232, and 2233 and DUAL INV 3 STATE 2234 and 2235. These devices simply couple the output of TRANSCEIVER 225 to the input of CONTROL MEMORY 222 when enabled by signal L→TRANS→CM BUS generated by BIU CONTROL 227. Present also in FIG. 24 is DUAL INV 3 STATE 2236 which is simply an inverting device used in MPC 240 and SEQUENCER 260.

Figure 25:
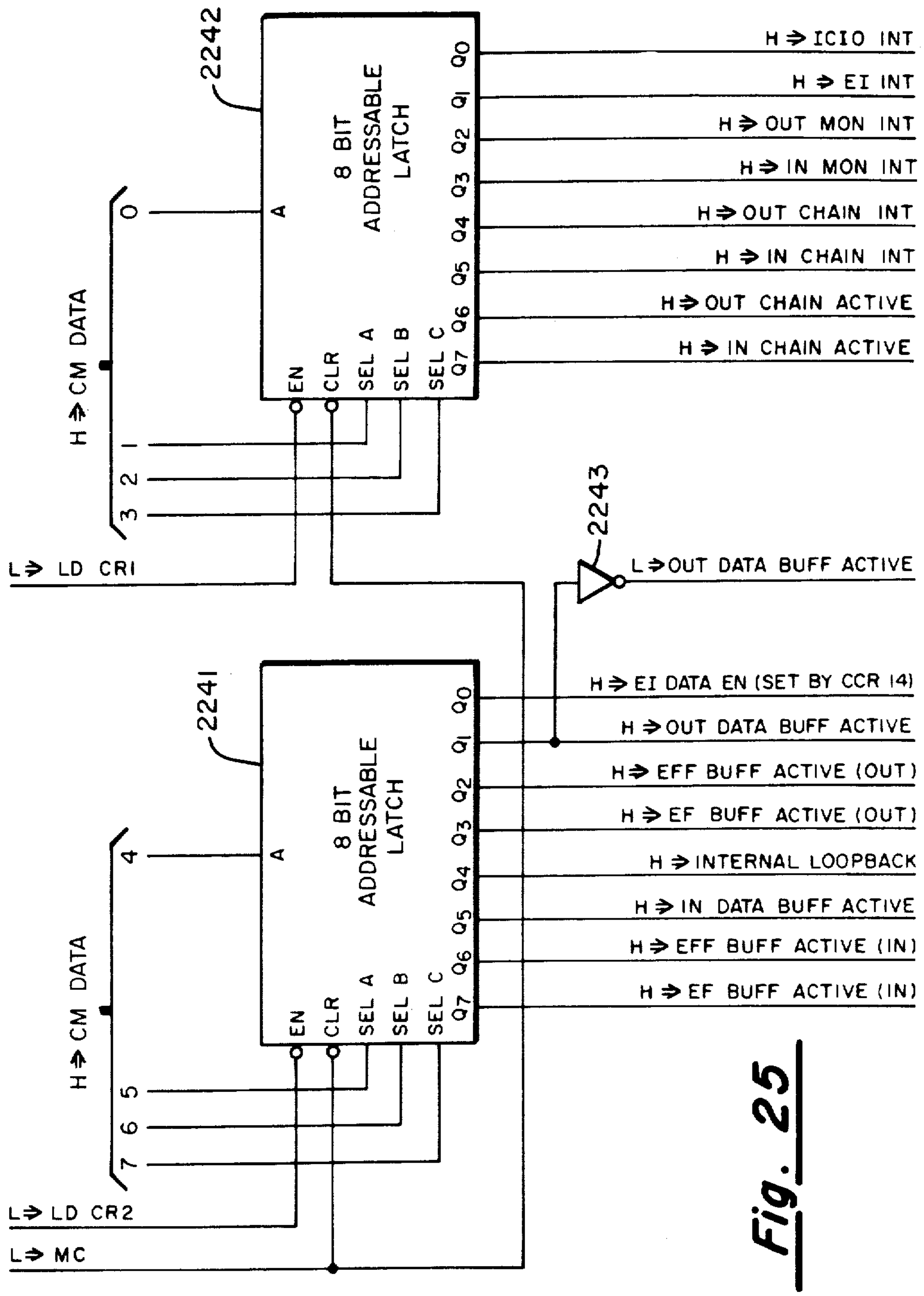
FIG. 25 shows the detailed construction of CHANNEL CMD REG 224.
Figure 26:
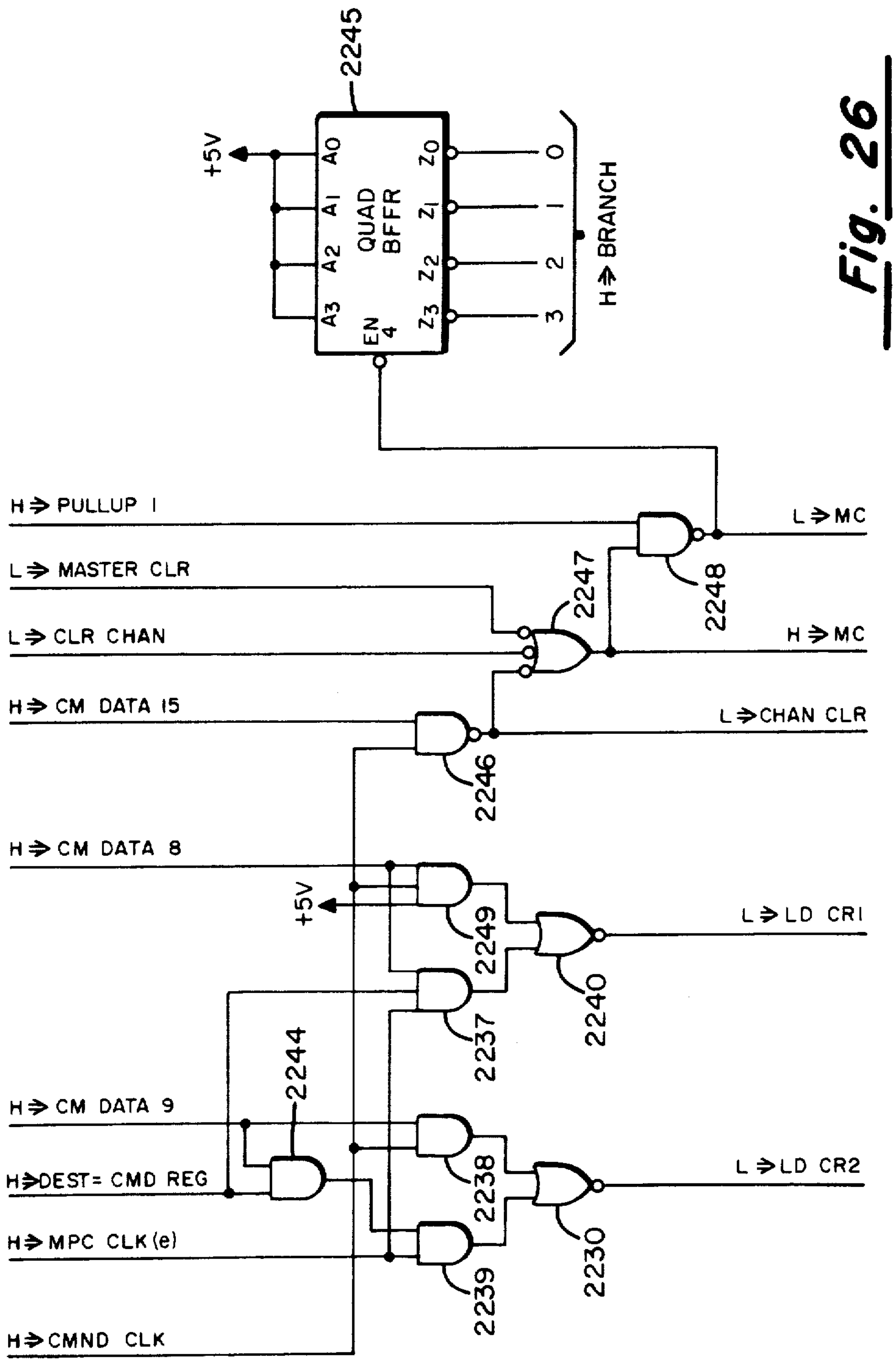
FIG. 26 shows the decoding circuitry for CHANNEL CMD REG 224.

FIGS. 25 and 26 show CHANNEL CMD REG 224. The register is implemented using 8 BIT ADDRESSABLE LATCH 2241 and 2242. These devices store the status signals which control the active transfers on RMF BUS 23. 8 BIT ADDRESSABLE LATCH 2242 has signal H→CM DATA 0 as its input. Addressing is accomplished using signals H→CM DATA 1, 3 and 3. These correspond to other bit positions (i.e., 1, 2 and 3) of the output of CONTROL MEMORY 222. 8 BIT ADDRESSABLE LATCH 2241 similarly has bit position 4 as its data input and bit positions 5, 6 and 7 as its addressing inputs. Signal L→MC (i.e., Master Clear) clears CHANNEL CMD REG 224 as shown. Signals L→LD CR 1 and L→LD CR 2 enable loading of 8 BIT ADDRESSABLE LATCH 2242 and 2241, respectively. These signals are generated by CHANNEL CMD REG 224 control circuitry shown in FIG. 26. The CHANNEL CMD REG 224 output signals are mode commands to MPC 240. These signals are used by the circuitry shown in FIG. 48 which is discussed below as a portion of the CONDITION MUX 246 element of MPC 240.

As stated above, FIG. 26 shows the circuitry which controls the operation of CHANNEL CMD REG 224. Gates 2246, 2247 and 2248 generate the L→CHAN (i.e., Channel) CLR, H→MC and L→MC signals which clear the significant control storage elements. The Master Clear signals may be generated by a channel clear generated internally (i.e., signal H→CLR CHAN (S1) by BIU CONTROL 227 (see also FIG. 32) or by a master clear received from RMF BUS 23 (i.e., Signal L→MASTER CLR).

Referring again to FIG. 26, gates 2230 and 2240 generate the signals which enable loading of CHANNEL CMD REG 224. Signal L→LD CR 1 is generated by the coincidence of signals H→CM DATA 8 (i.e., bit position 8 of output of CONTROL MEMORY 222) and H→CMD CLK (i.e., control signal generated by BIU CONTROL 227) or by the coincidence of signal H→MPC CYCLE (e) (generated by CLOCK 276), signal H→DEST=CMD REG (generated by MPC 240), and H→CM DATA 8. As can be seen in FIG. 26, signal L→LD CR 2 is similarly generated.

FIG. 26 also shows QUAD BFFR 2245 whose output (i.e., signals H→BRANCH 0-3 ) is wire-ored with the corresponding output of PROM/IR 248 whenever signal L→MC is present. This ensures that MPC 240 is returned to a known microprogram state following a master clear.

Figure 27:
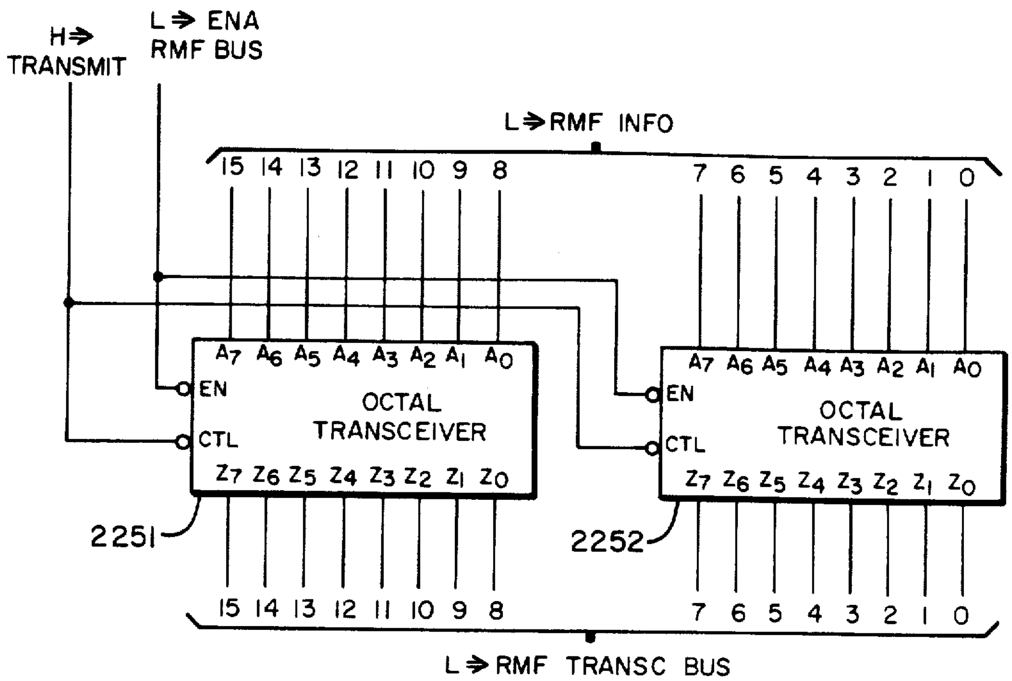
FIG. 27 shows the detailed construction of TRANSCEIVER 225.

FIG. 27 shows TRANSCEIVER 225 in detail. TRANSCEIVER 225 contains OCTAL TRANSCEIVER 2251 and 2252. TRANSCEIVER 225 interfaces the 16 bit CONTROL MEMORY 222 output circuit to RMF BUS 23. The enable signal, L→ENA RMF BUS, and control signal, H→TRANSMIT, are generated by BIU CONTROL 227 (see also FIG. 30).

Figure 28:
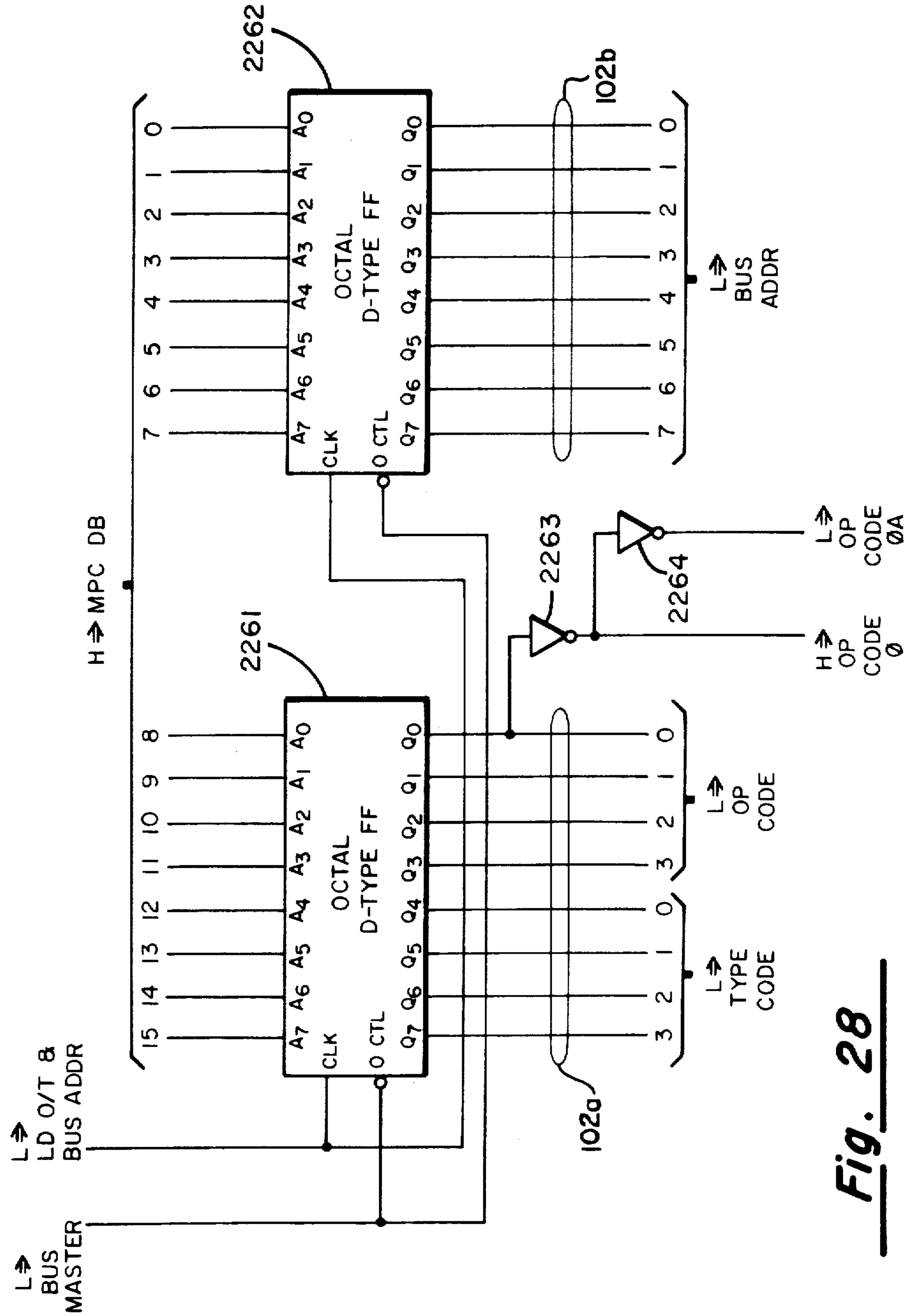
FIG. 28 shows the detailed construction of O/T/BA 226.

FIG. 28 shows the detailed construction and operation of O/T/BA 226. Functionally, this element stores the four bit Op (i.e., operation) Code, the four bit Type Code, and eight bit Bus Address for controlling transfers on RMF BUS 23. The Op Code, Type Code, and Bus Address use dedicated lines of RMF BUS 23. OCTAL D-TYPE FF 2262 stores Op Code and Type Code. The data input to OCTAL D-TYPE FF 2261 and 2262 is via the 16 data bits of MPC BUS 103. In this way, MPC 240 is capable of loading OCTAL D-TYPE FF 2261 and 2262 for controlling data transfers on RMF BUS 23.

OCTAL D-TYPE FF 2261 and 2262 are enabled (at input CTL) by signal L→BUS MASTER which is generated by BIU CONTROL 227 (see also FIG. 29). Signal L→LD O/T & BUS ADDR clocks OCTAL D-TYPE FF 2261 and 2262. This signal is generated by FUNCTION, DEST, SOURCE DECODE 254 (see also FIG. 47). By referring to FIGS. 28 and 30, it can be seen that the four bit Type Code is also supplied by OCTAL D-TYPE FF 2261 and cable 102*a* to BIU CONTROL 227. Inverters 2263 and 2264 shown in FIG. 28 supply Op Code Ø in compliment and true state delayed by one and two gate propagation times, respectively.

Figure 29A:
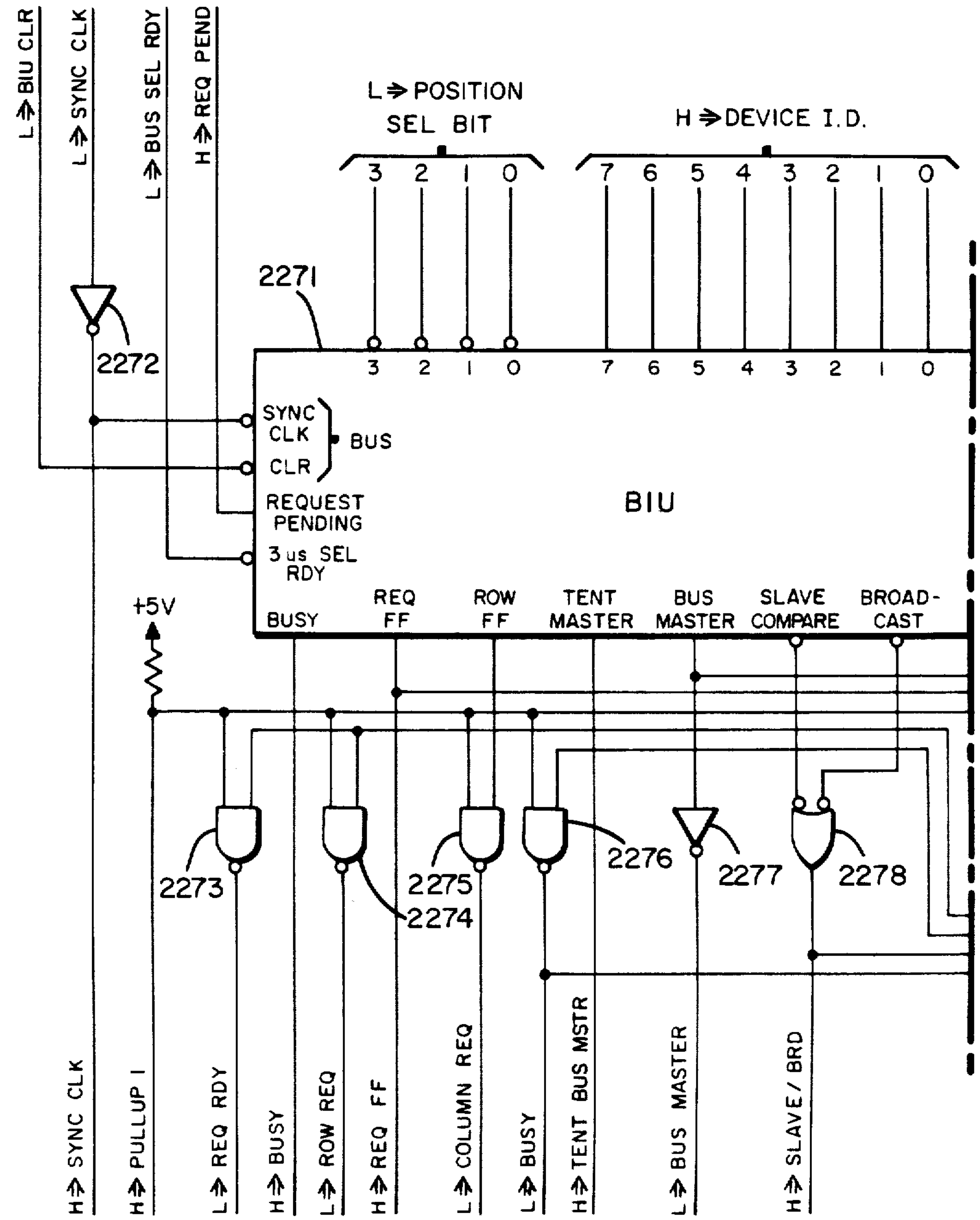
Figure 29B:
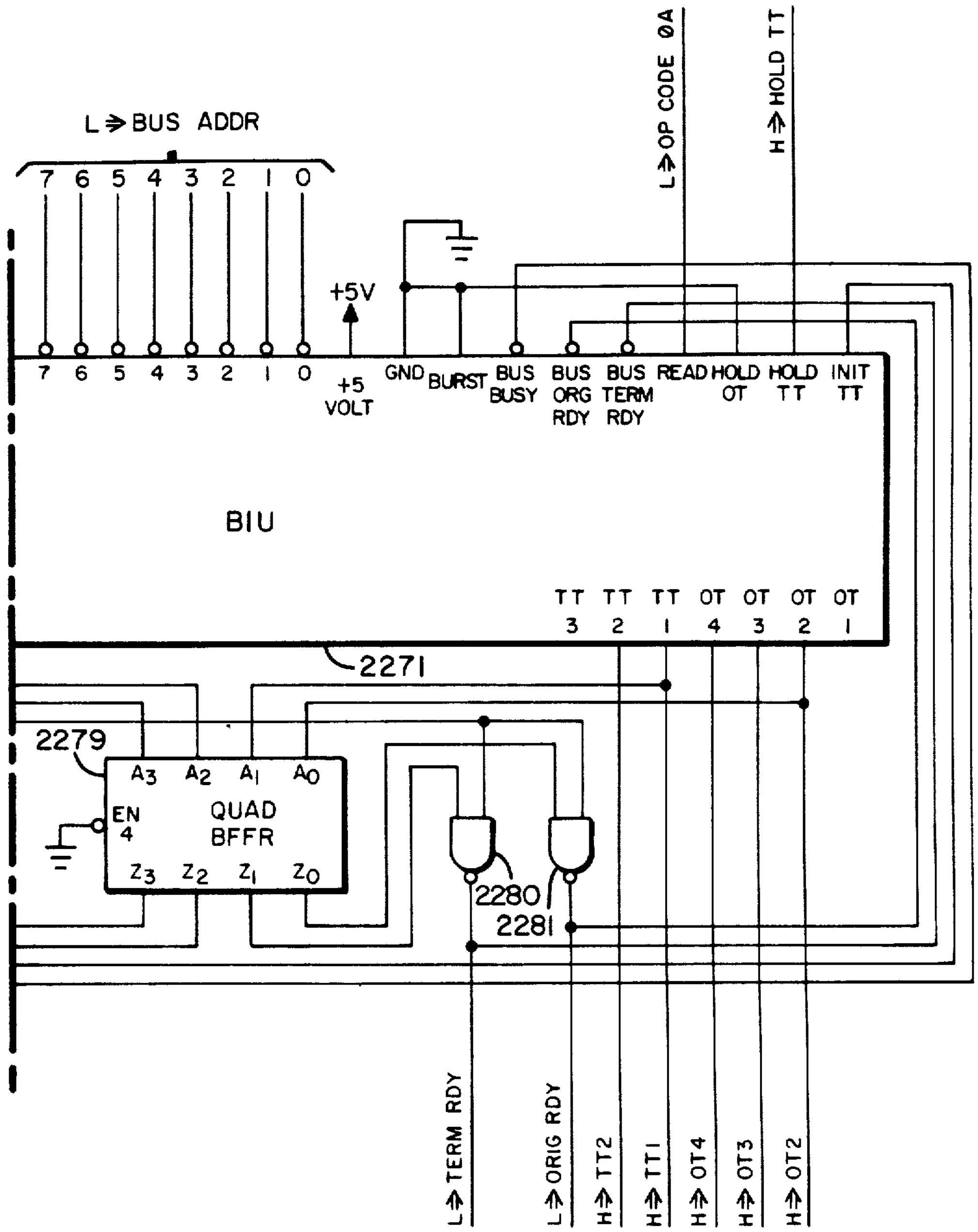

FIGS. 29, 30, 31 and 32 show the detailed construction and operation of BIU CONTROL 227. FIG. 29, consisting of FIGS. 29*a* and *b*, shows the use of BIU 2271. This is a hybrid package available from the assignee of this invention as Part Number 7016961. This part is currently in use in the AN/UYK-502 military computer. BIU 2271 receives as input the RMF BUS 23 control signals and generates control signals for RMF BUS 23 and timing signals for use internal to HSSF 100.

The major inputs include the eight bit BUS ADDRESS by which the Bus Master (i.e., device currently in control of RMF BUS 23) addresses the Terminator (i.e., device currently being controlled by RMF BUS 23). POS SEL (i.e., Position Selection) and DEVICE I.D. are used to arbitrate usage of RMF BUS 23. Arbitration is the process whereby the Bus Master for the next bus transfer cycle is determined. The timing signals output by BIU 2271 includes OT (i.e., Originator Timing) 1-4 and TT (i.e., Terminator Timing) 1-3.

Figure 30:
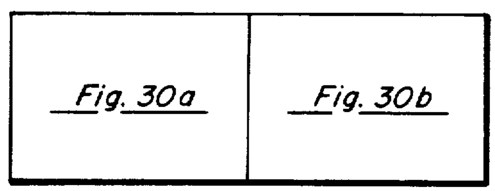
FIG. 30, consisting of FIGS. 30*a* and *b*, shows the Bus Control Circuitry.
Figure 30A:
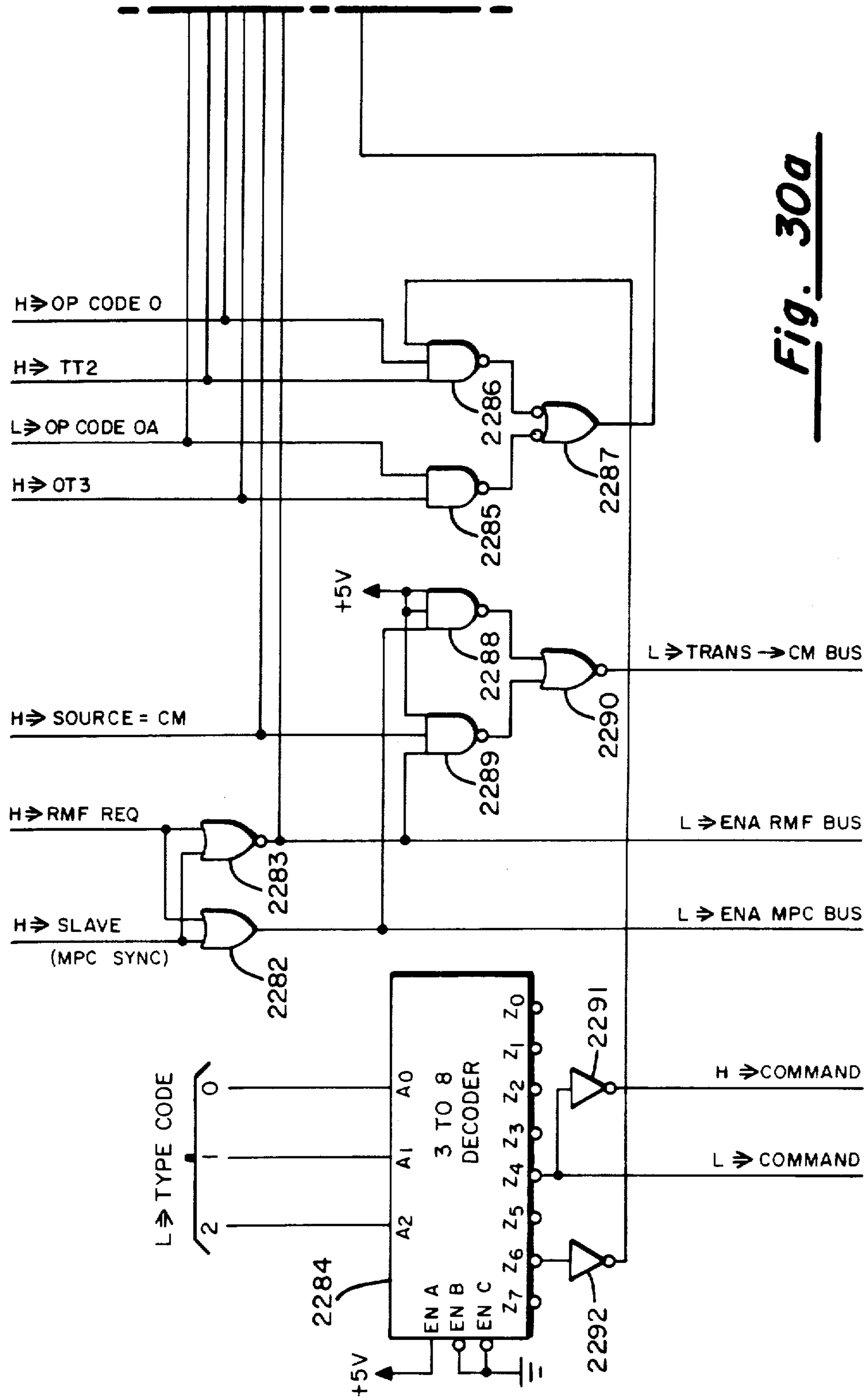
Figure 30B:
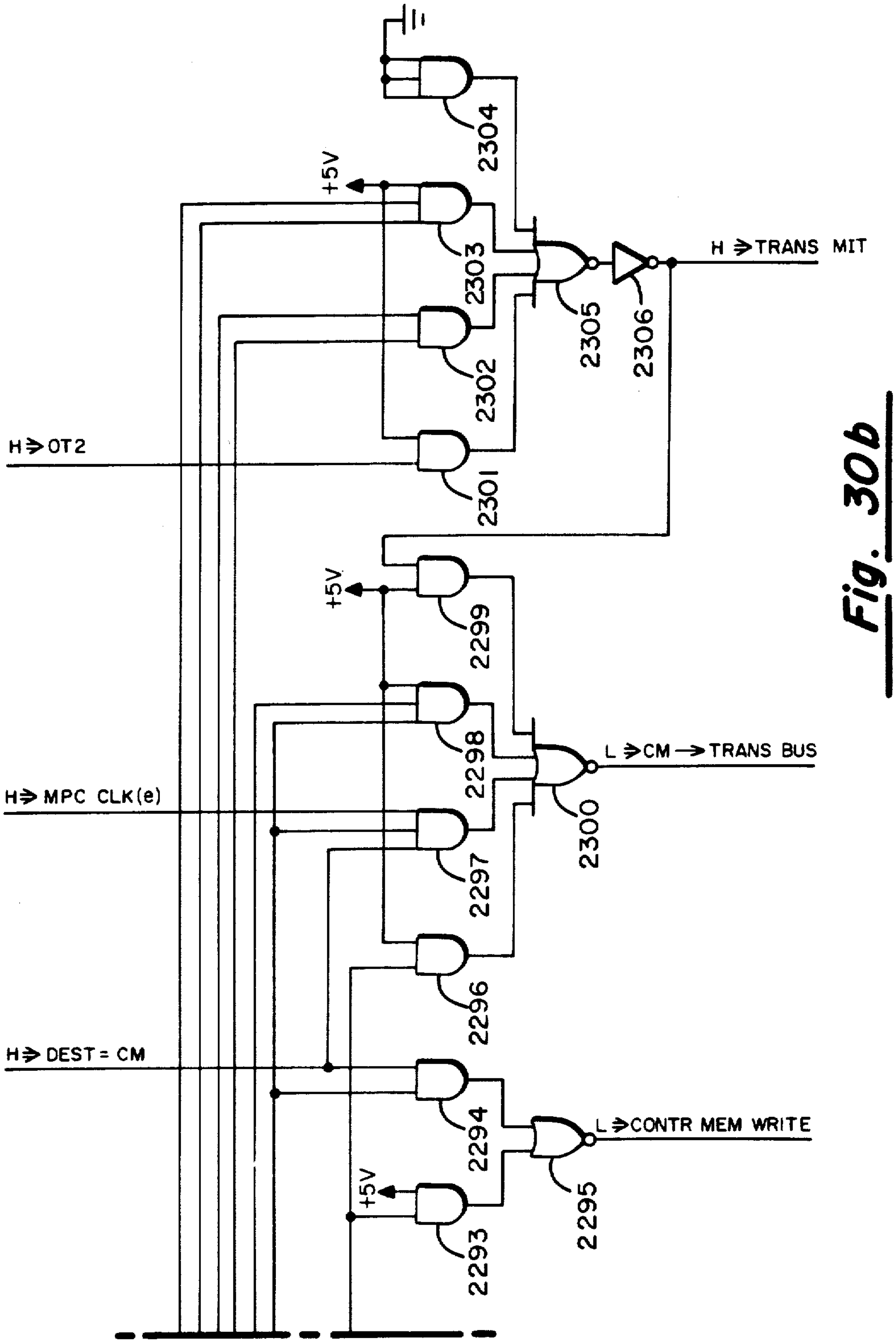

FIG. 30, consisting of FIGS. 30*a* and *b*, shows additional circuitry of BIU CONTROL 227. The signals generated are used to control various data transfers. Signal H→TRANSMIT, for example is used to control TRANSCEIVER 225 (see also FIG. 27). Similarly, signal L→ENA RMF BUS is used to enable TRANSCEIVER 225. Signals L→CONTR MEM WRITE and L→CM→TRANS BUS are used to control operation of CONTROL MEMORY 222 (see also FIG. 22). Signal L→TRANS→CM BUS controls TRANSMITTER 223 (shown in FIG. 24), and signal L→ENA MPC BUS controls TRANSCEIVER 221 (as shown in FIG. 21). Signal H→COMMAND is used within BIU CONTROL 227 (see also FIG. 32). Signal L→COMMAND is not used.

These outputs are generated as shown in FIG. 30 from the timing and control signal inputs. The Type Code is received from O/T/BA 226 as explaind above. Signals H→OP CODE O and L→OP CODE OA are similarly derived. Timing signals OT2, TT2, and OT3 are generated by BIU 2271. Signals H→SLAVE (MPC SYNCH) and H→RMF REQ are generated by 4 BIT LATCH 2590 and gate 2595, respectively (see also FIG. 52). The remaining inputs are received from MPC 240 and are generated as explained below.

Figure 31:
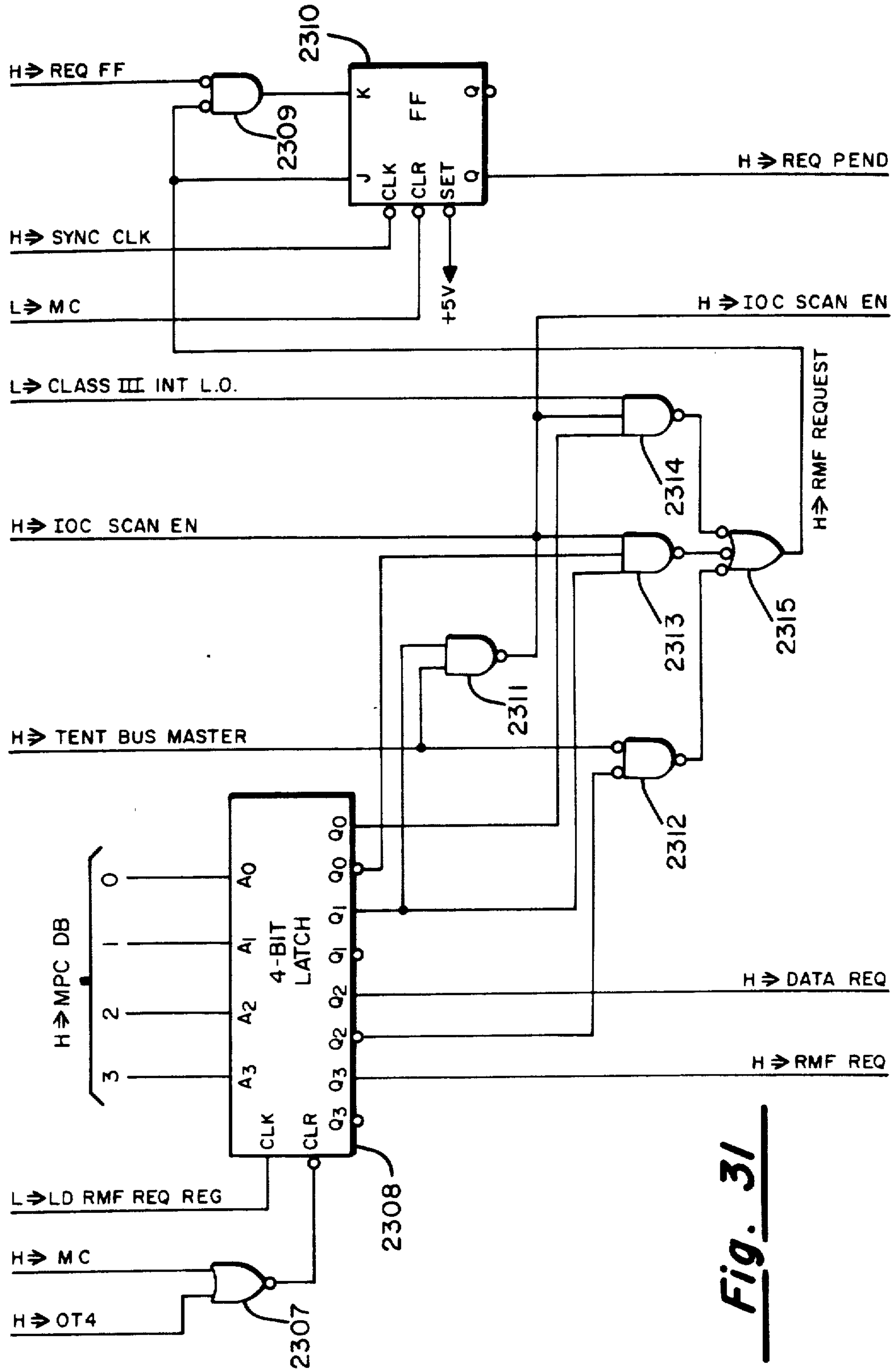
FIG. 31 shows the detailed construction of the RMF bus request logic.
Figure 32:
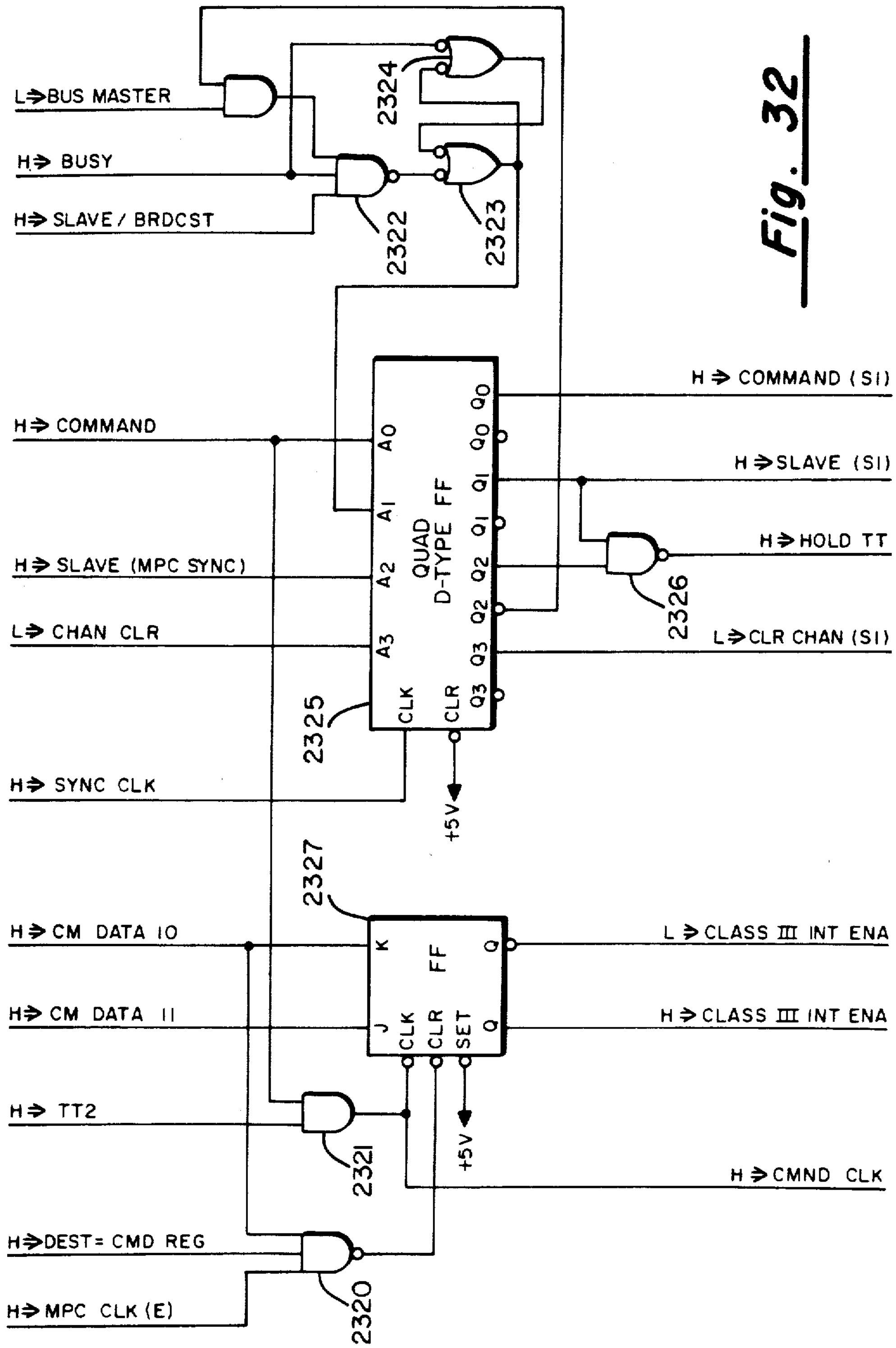
FIG. 32 shows the detailed construction of the interrupt enable logic.

FIGS. 31 and 32 show additional circuitry of BIU CONTROL 227. As explained above, the specific circuitry of INTERFACE LOGIC 220 disclosed is directed to the inboard configuration of HSSF. See FIG. 2. In the preferred embodiment INTERNAL BUS 23 is RMF BUS 23 and uses the RMF protocol. In this configuration, PROCESSOR 21 and 22 are AN/UYK-502 processors. It can readily be appreciated that INTERFACE LOGIC 220 would be different to accomodate different protocols on INTERNAL BUS 23 for other inboard configurations. Similarly, the outboard configuration of FIG. 1 would require other circuiry within INTERFACE LOGIC 220. For this reason, the discussion of INTERFACE LOGIC 220 has been presented in summary fashion.

Referring again to FIG. 16, the block diagram of MPC 240 is presented. As explained above, MPC 240 is based upon the AMD Model 2910 microsequencer. Each element of MPC 240 is discussed in detail below. It may be helpful to the reader to consult FIG. 16 for this discussion. Reference to FIG. 19 may also be helpful for it shows which Figures provide the detail for each of the major elements of MPC 240.

Figure 33:
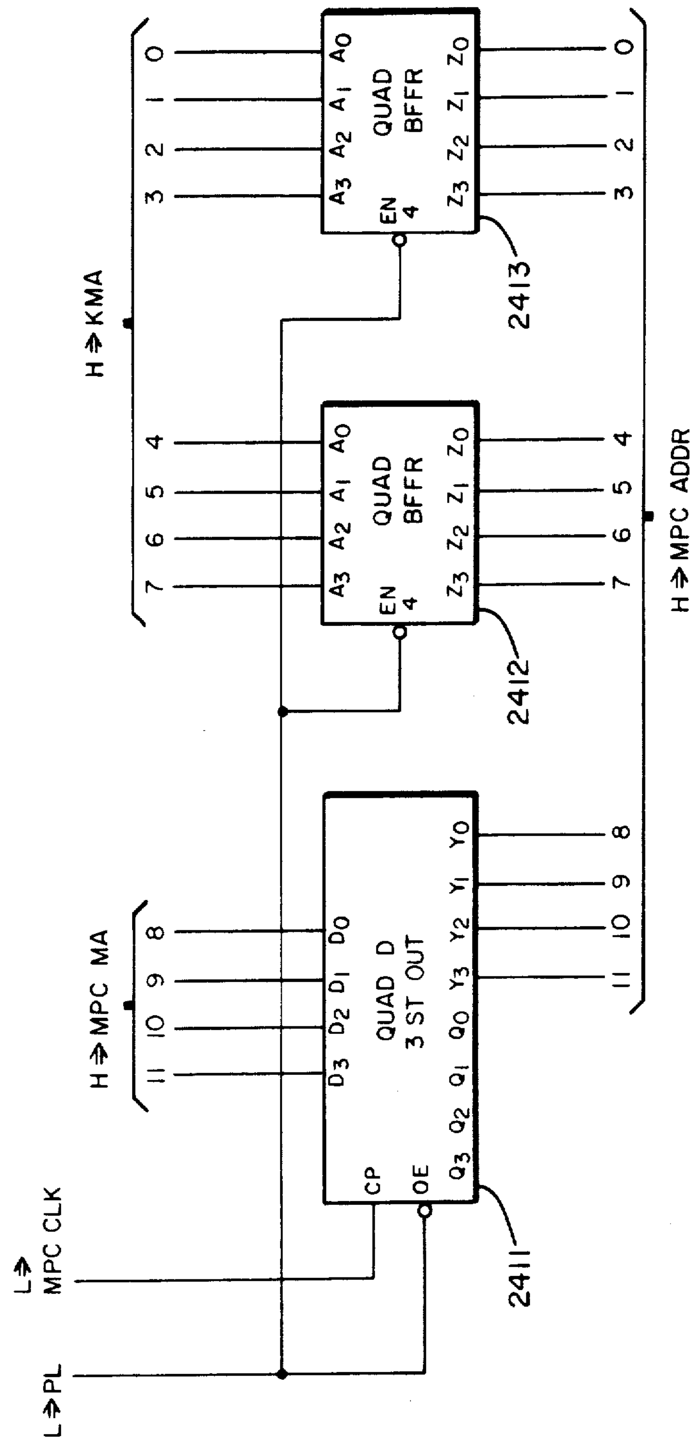
FIG. 33 shows the detailed construction of BRANCH ADDR 241.

FIG. 33 shows the detail of element BRANCH ADDR (i.e., Address). QUAD BFFR 2412 and 2413 serve as buffers between PROM/IR 248 (shown in FIG. 41) and 2910 SEQUENCER 247 (shown in FIG. 40). That is, QUAD BFFR 2412 and 2413 buffer the branch address between the PROM (containing the microprogram) and the microsequencer (i.e., 2910 SEQUENCER 247). QUAD D 3 ST OUT 2411 serves as a page register in that it stores and makes available to 2910 SEQUENCER 247 the most significant bit positions (i.e., 8, 9, 10, and 11) of the current 2910 SEQUENCER address. This is necessary since the address space $2^{12}$ addressable locations and PROM/IR 248 supplies only eight bits. BRANCH ADDR 241 is enabled by signal L→PL which is generated by 2910 SEQUENCER 247. QUAD D 3 ST OUT, 2411 is also clocked by CLOCK 276 (see also FIG. 78).

Figure 34:
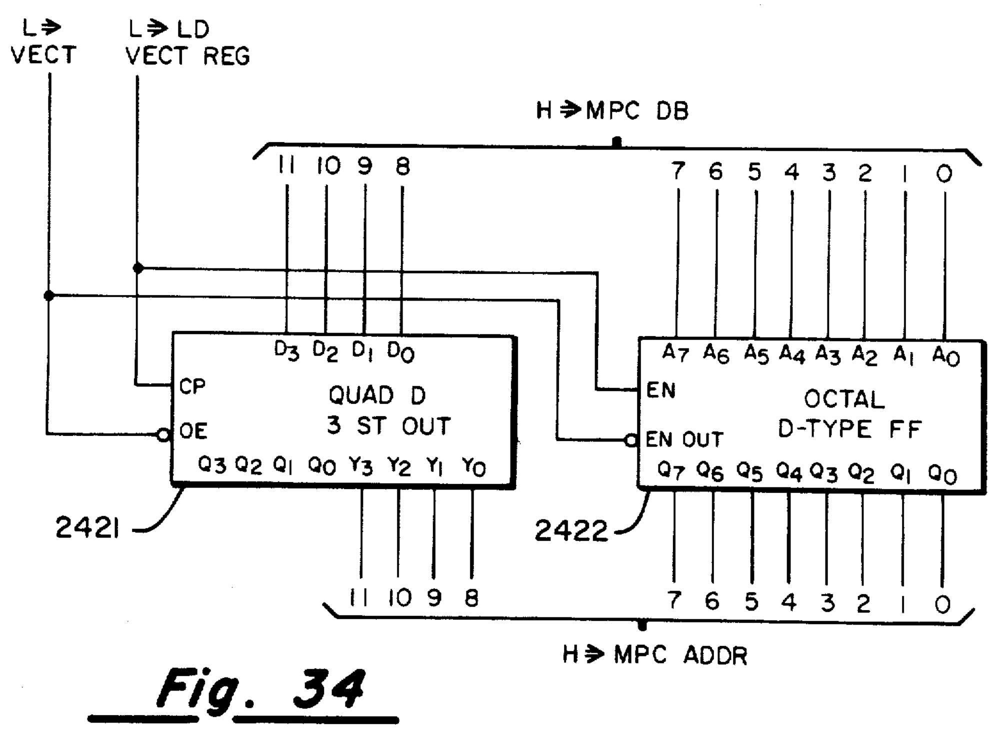
FIG. 34 shows the detailed construction of VECTOR REG 242.

FIG. 34 shows the detailed construction and operation of VECTOR REG 242, which contains OCTAL D-TYPE FF 2422 and QUAD D 3 ST OUT 2421. The purpose of VECTOR REG 242 is to receive a 12 bit jump address from MPC BUS 103, store it temporarily, and transfer it to 2910 SEQUENCER 247 to execute an interpage jump instruction. VECTOR REG 242 is enabled for input by signal L→LD VECT REG received from FUNCTION, DEST, SOURCE DECODE 254 (see also FIG. 47). VECTOR REG 242 is enabled for output by signal L→VECT generated by 2910 SEQUENCER 247.

Figure 35:
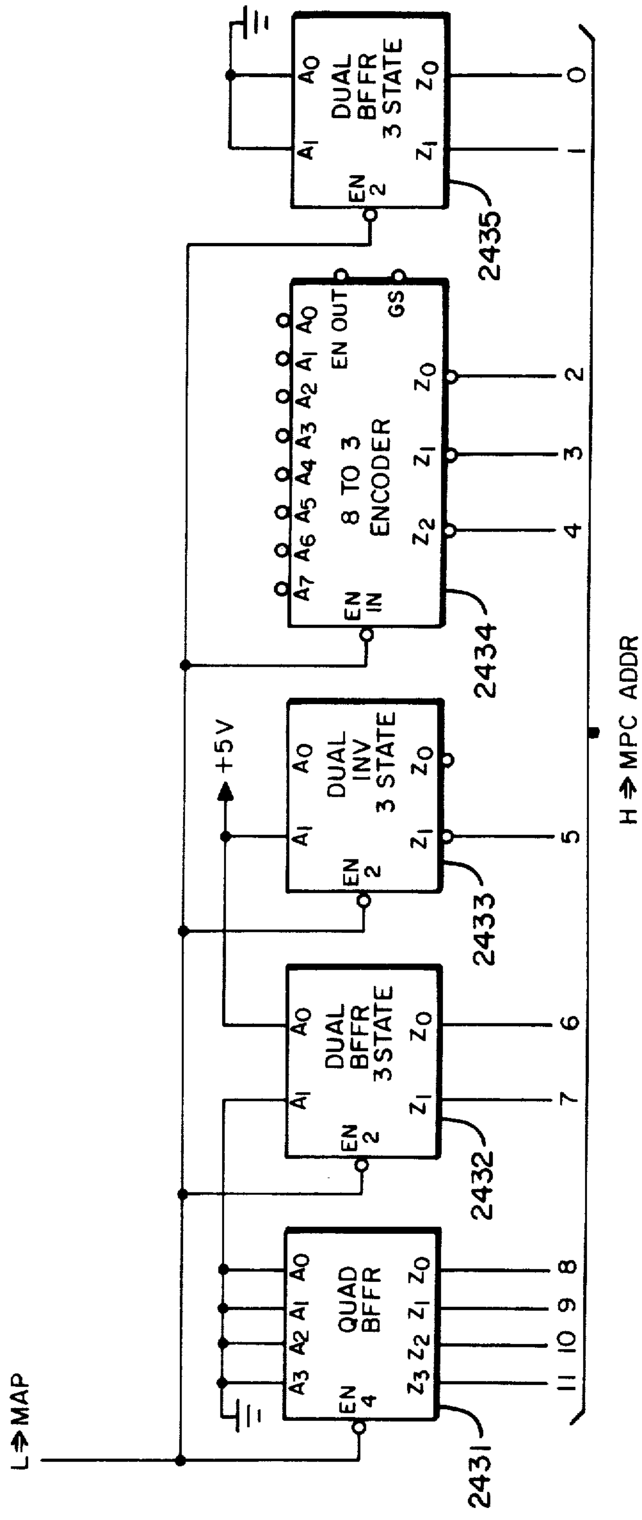
FIG. 35 shows the detailed construction of INTERRUPTS 243.

FIG. 35 shows elment INTERRUPTS 243, which is not currently in use. INTERRUPTS 243 provides the optional capability to supply interrupt entrance addresses for interrupts. When enabled by signal L→MAP generated by 2910 SEQUENCER 247, a one of the eight inputs to 8 to 3 ENCODER 2434 would be low signifying a particular interrupt. 8 to 3 ENCODER 2432 would generate a unique interrupt entrance address, therefrom. DUAL BFFR 3 STATE 2435 and 2432 DUAL INV 3 STATE 2433, and QUAD BFFR 2431 generate constants for addressing bit positions 0, 1, 5, 6, 7, 8, 9, 10, and 11.

Figure 36:
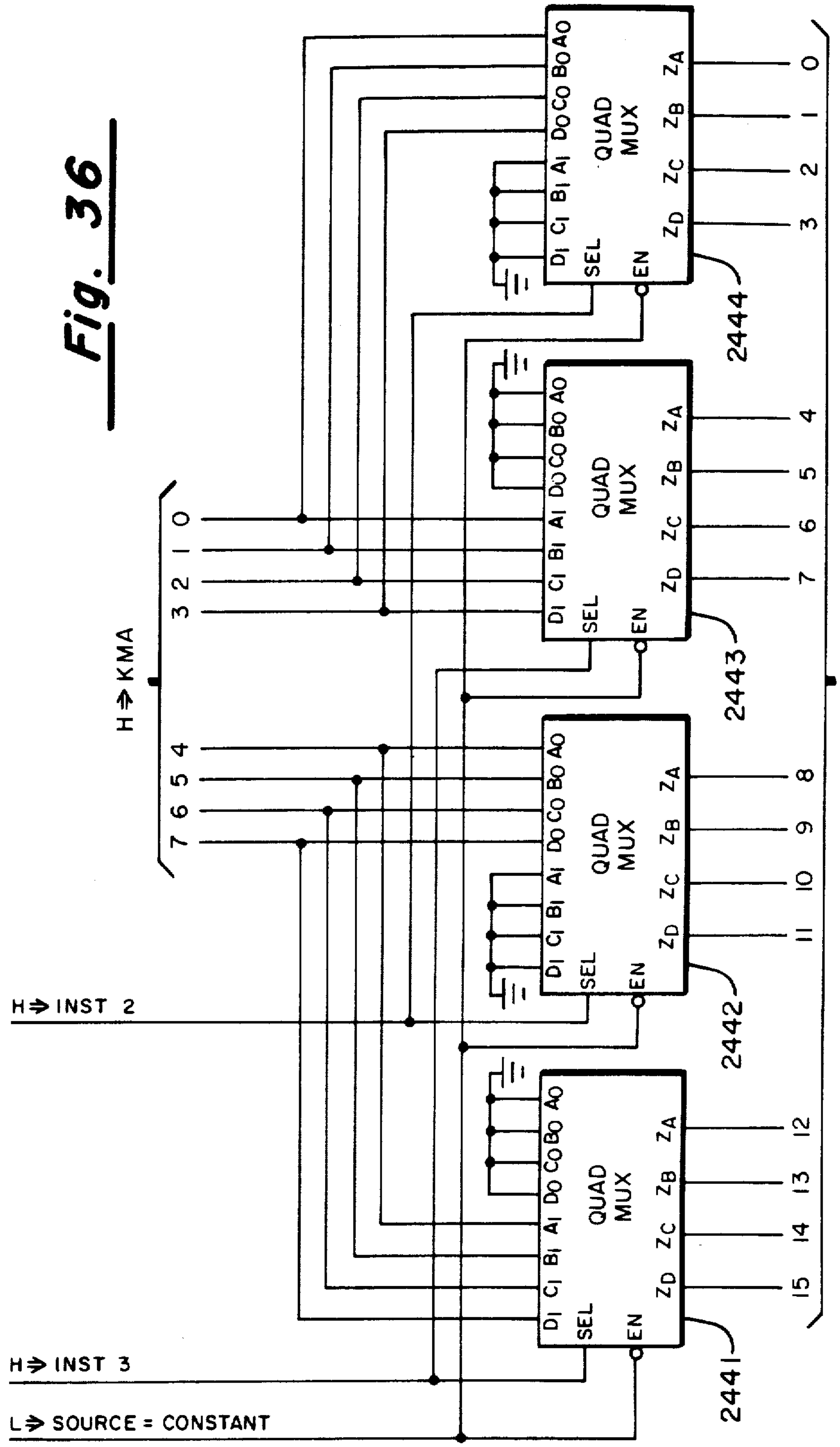
FIG. 36 shows the detailed construction of CONSTANT MUX 244.

FIG. 36 shows CONSTANT MUX (i.e., Multiplexer) 244 which is used to place required constants on MPC BUS 103. CONSTANT MUX 244 uses QUAD MUX 2441, 2442, 2443, and 2444 each of which can select from binary zeroes or the output of PROM/IR 248 (see also FIG. 41). CONSTANT MUX 244 is enabled for output by signal L→SOURCE=constant generated by FUNCTION, DEST, SOURCE DECODE 254 (see also FIG. 47). Selection for CONSTANT MUX 244 is based upon the signals H→INST 2 and H→INST 3 as shown. These signals are read from PROM/IR 248. See FIG. 41.

Figure 37:
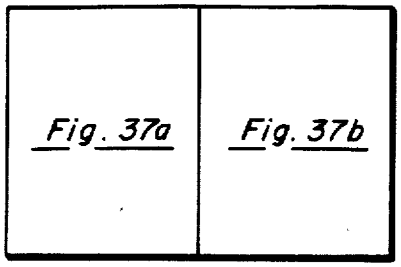
FIG. 37, consisting of FIGS. 37*a* and *b*, shows the detailed construction of the upper byte of ALU 245.
Figure 38:
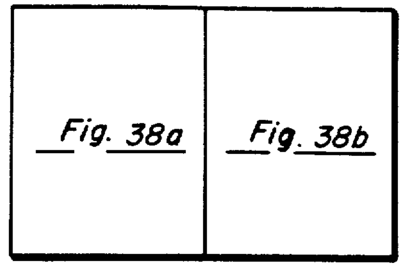
FIG. 38, consisting of FIGS. 38*a* and *b*, shows the detailed construction of the lower byte of ALU 245.
Figure 37A:
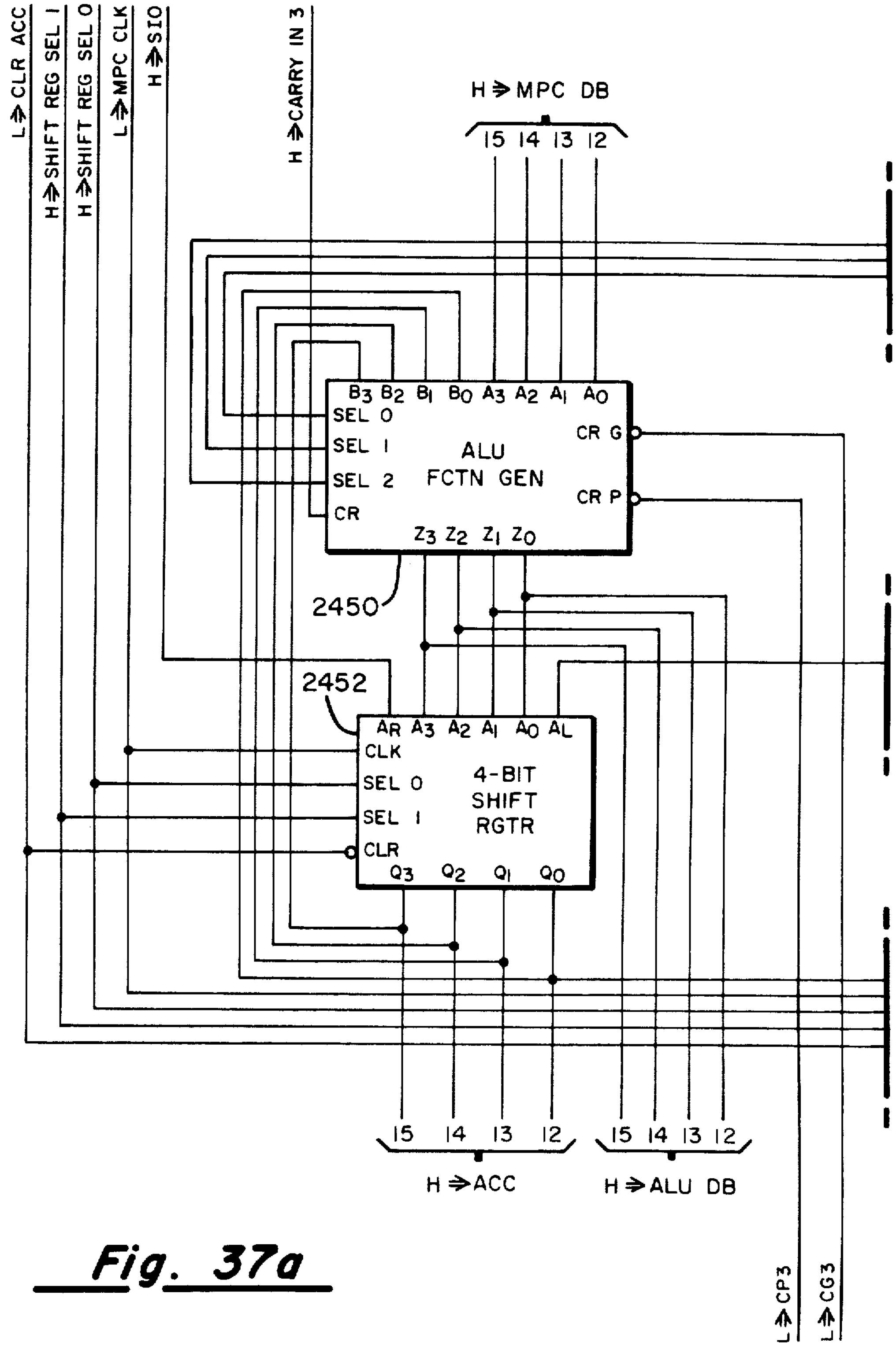
Figure 37B:
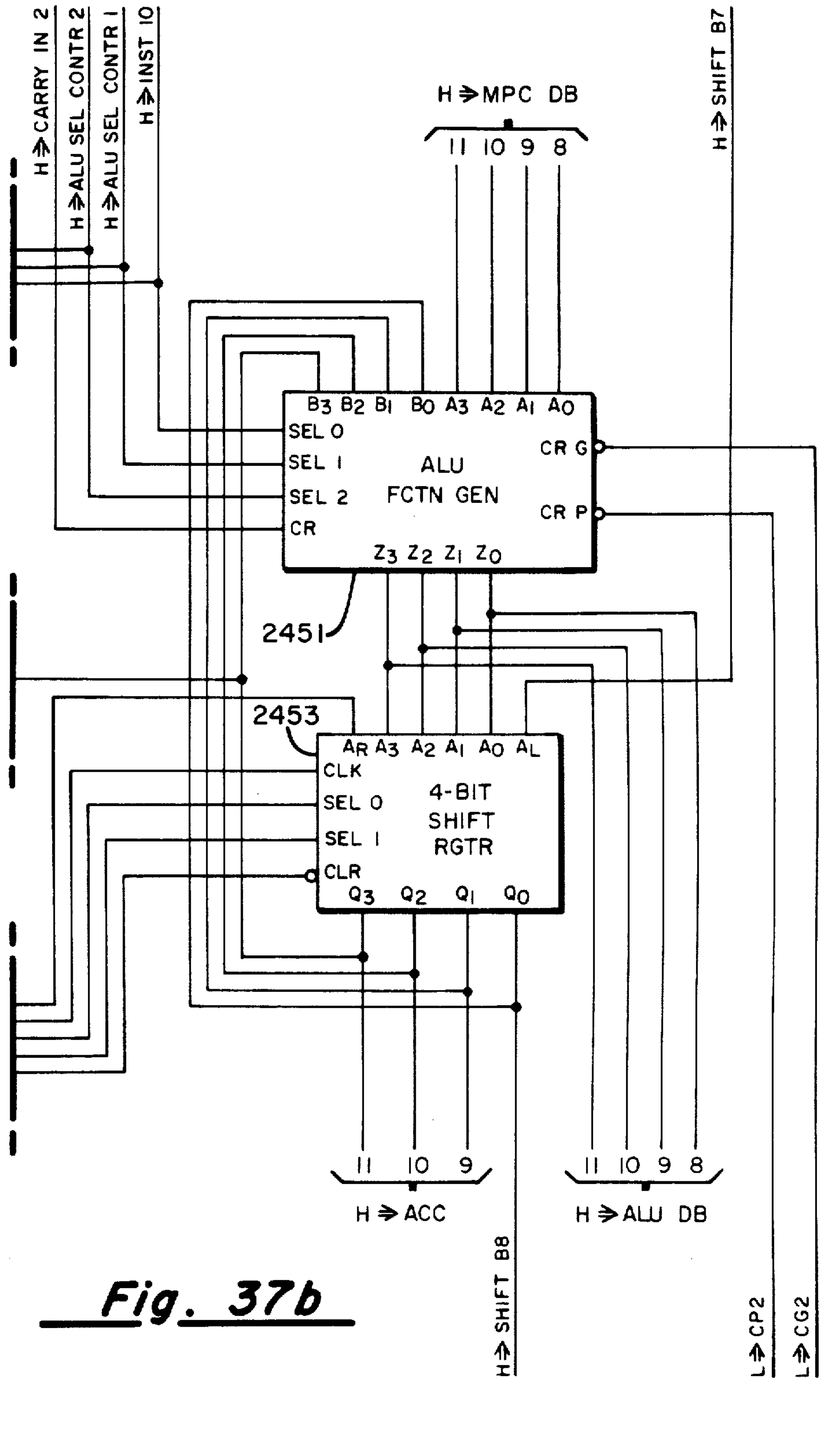
Figure 38A:
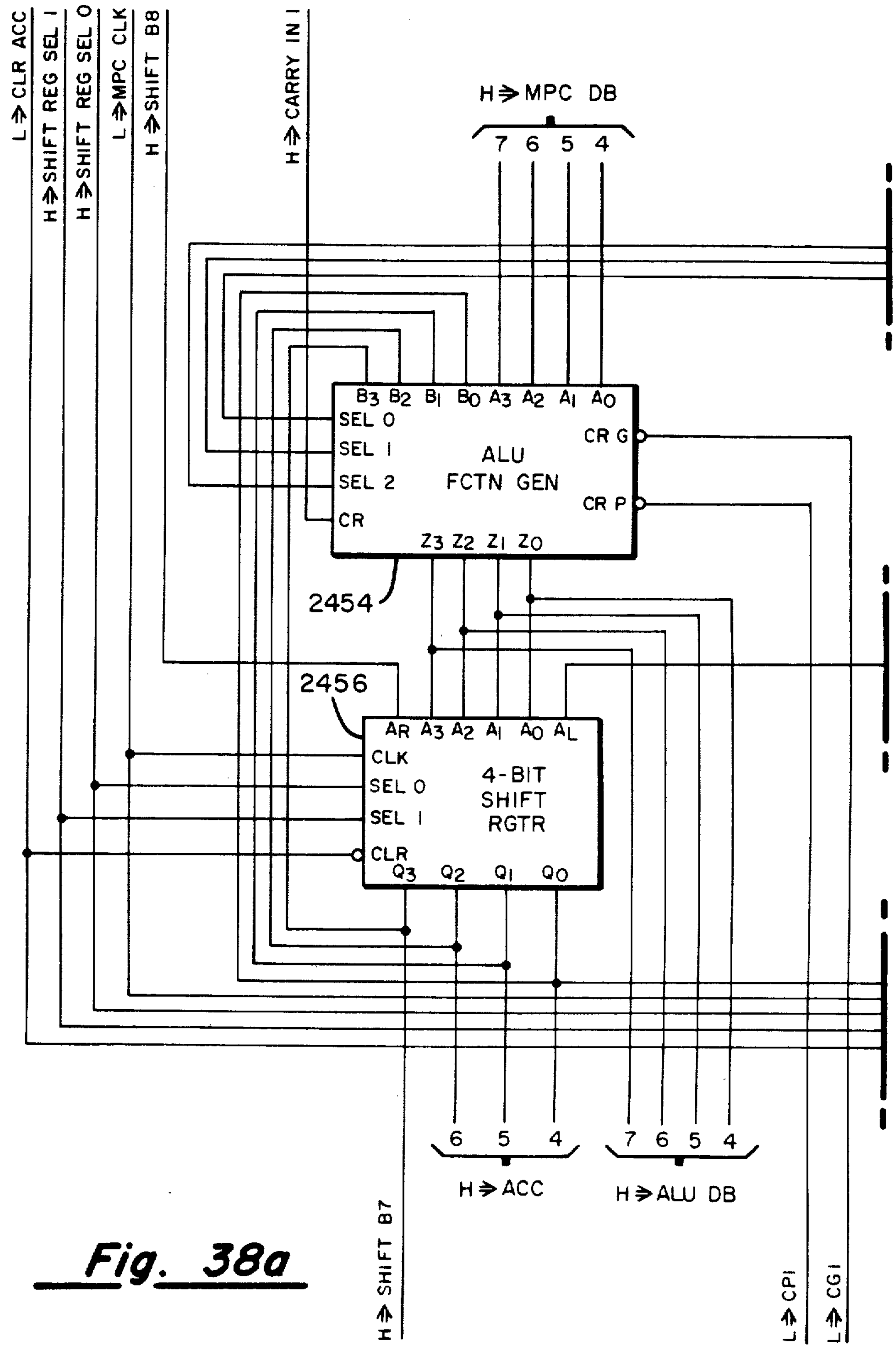
Figure 38B:
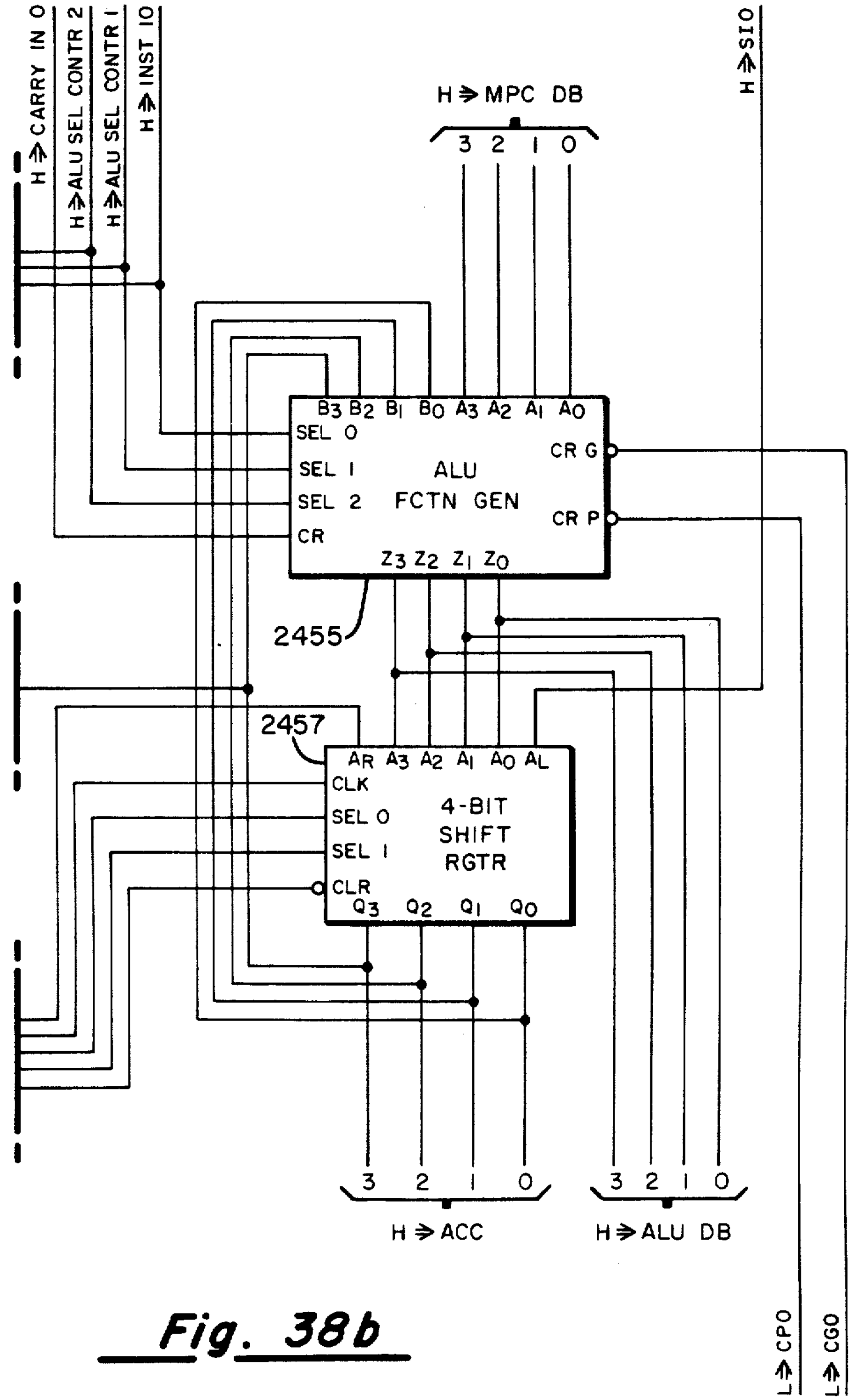
Figure 39:
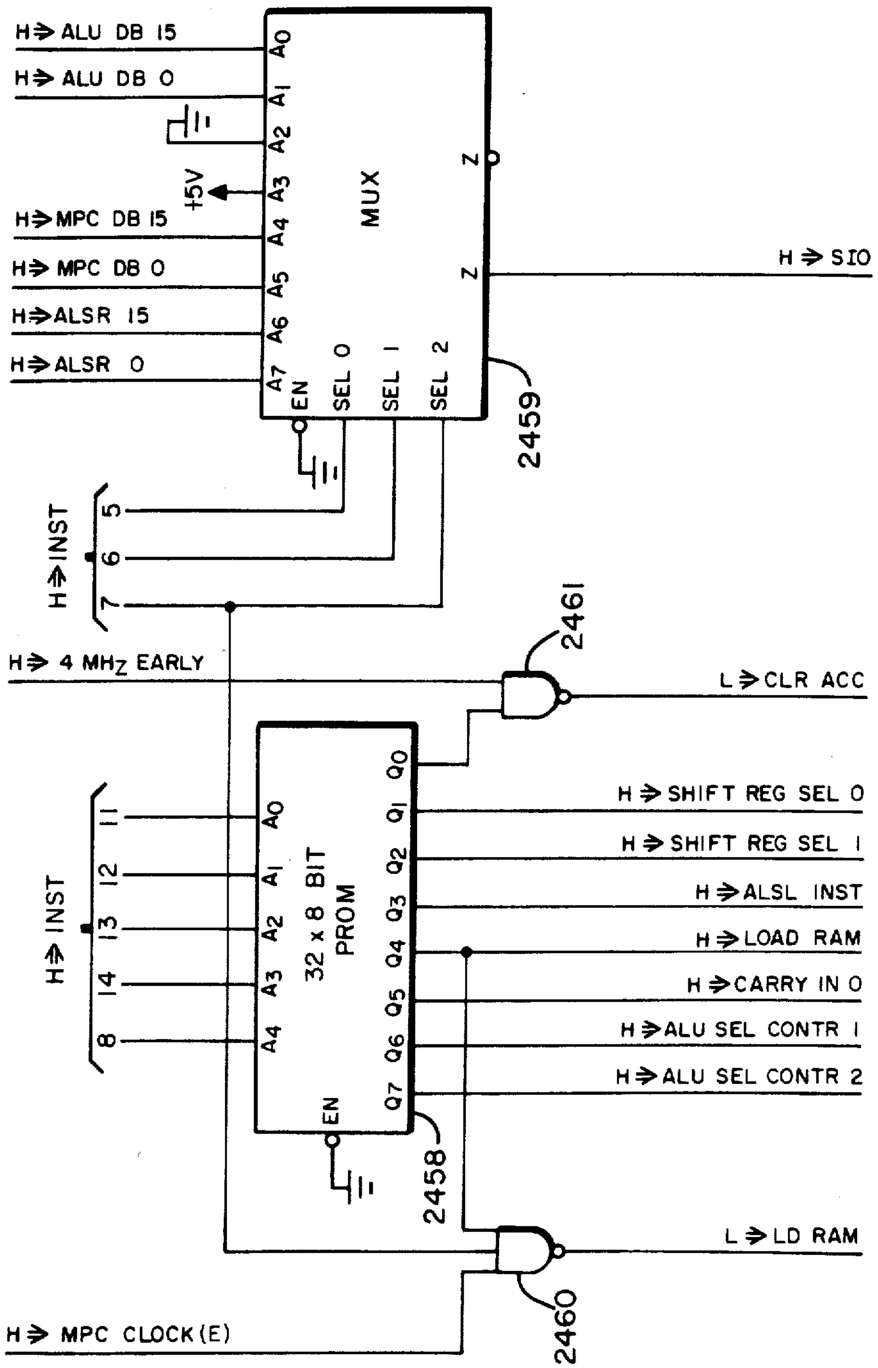
FIG. 39 shows the detailed construction of control circuitry of ALU 245 and ACC 250.

The elements ALU (i.e. Arithmetic Logic Unit) 2 and ACC (i.e., Accumulator) 250 ae shown in FIGS. 3 38, and 39. FIG. 37, consisting of FIGS. 37*a* and shows the upper byte (i.e., bit positions 8–15) where FIG. 38, consisting of FIGS. 38*a* and *b*, shows t lower byte (i.e., bit positions 0–7). FIG. 39 shows cc trol circuitry for ALU 245 and ACC 250. ALU 245 u four bit ALU FCTN (i.e., Function) GEN (i.e., Gene tor) 2450, 2451, 2454, and 2455 which are of the ty 54LS381. ACC 250 uses 4-BIT SHIFT RGTR 24 2453, 2456, and 2457. These eight devices (i.e., fc function generators and four shift registers) provide t major arithmetic capability of MPC 240. The two 16 data inputs to ALU 245 are from MPC BUS 103 a ACC (i.e., Accumulator) 250 as shown. The primary bit data output is ALU 245 is to ACC 250 and RA 253. The output of ACC 250 is gated through BUFFI 255 to MPC BUS 103.

The construction and operation of the upper byte a lower byte of ALU 245 are very similar as can be se by comparing FIGS. 37 and 38. FIG. 39 shows t control circuiry for ALU 245. 32×8 BIT PROM 24 is addressed by the output of PROM/IR 248 (see a FIG. 41). The outputs of 32×8 BIT PROM 2458 used to control the operation of ALU 245 and AC 250.

Signal H→SIO is generated by MUX 2459 whi makes a selection based upon the output (i.e., INST 5 of PROM/IR 248.

Figure 40:
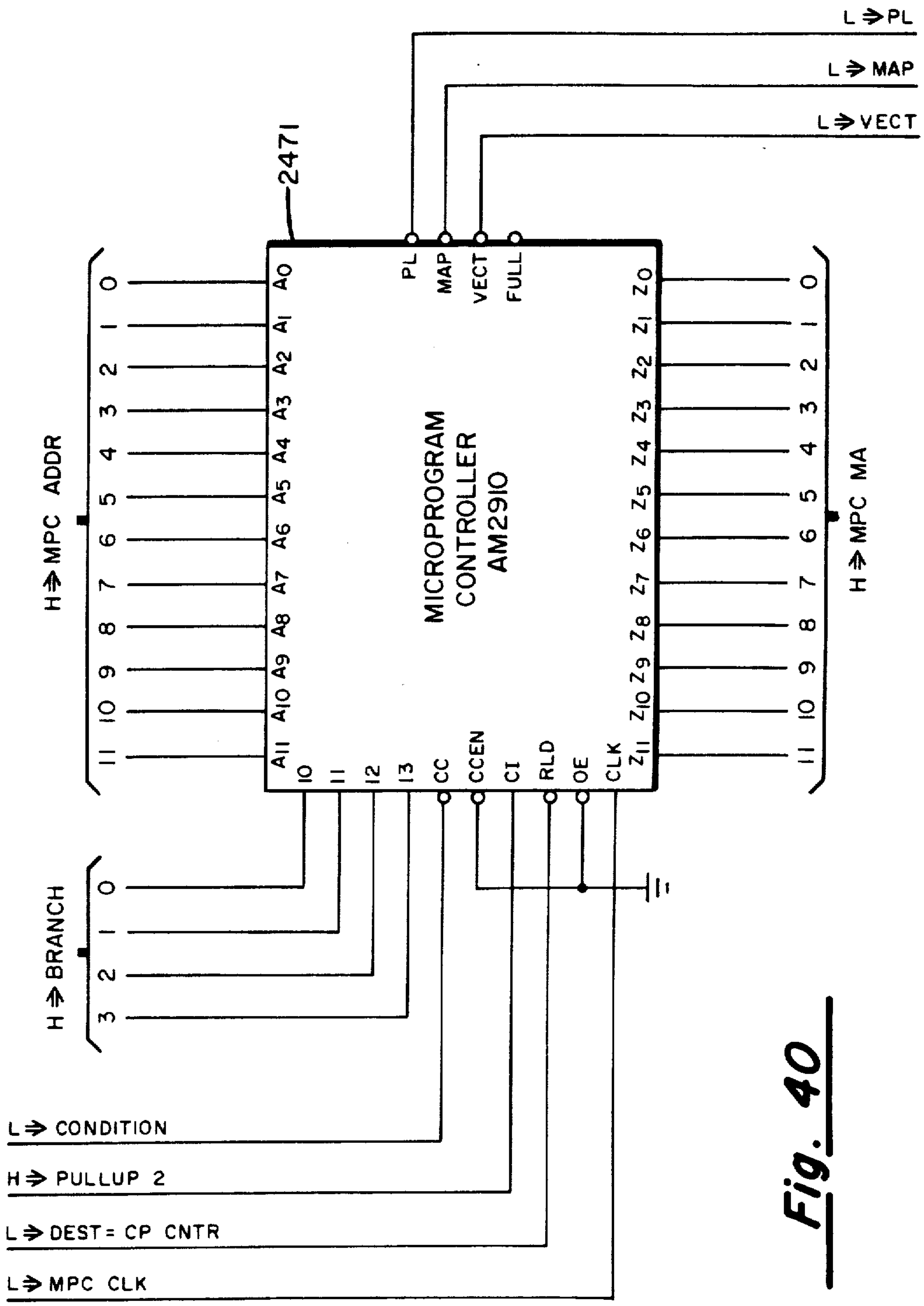
FIG. 40 shows the detailed construction of 2910 SEQUENCER 247.

FIG. 40 shows that 2910 SEQUENCER 247 is imp mented using MICROPROGRAM CONTROLLI 2471. The use of the AMD 2910 microsequencer standard in the art. Of more interest is the microp gram which is disclosed in the listing, below.

Figure 41:
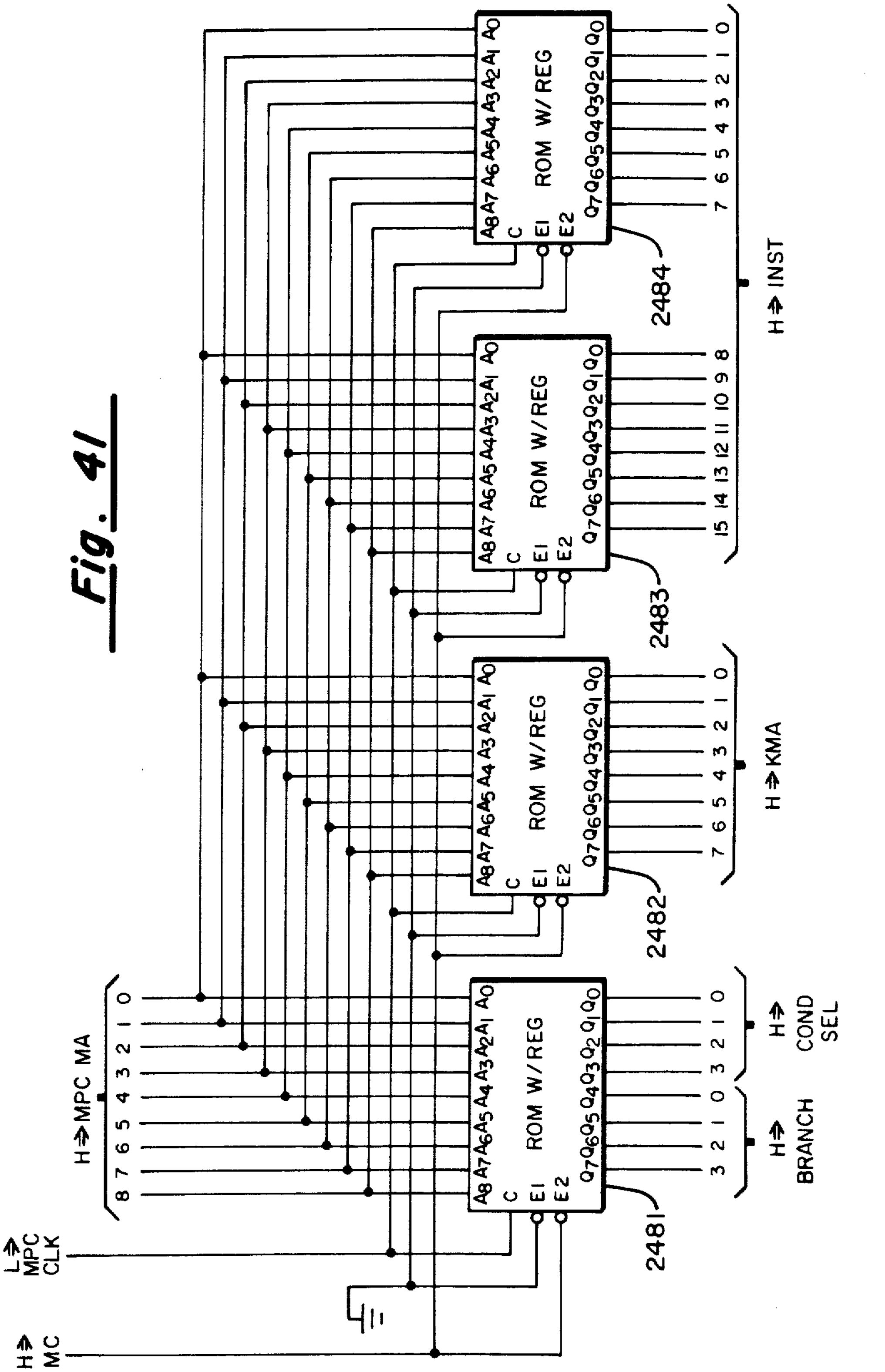
FIG. 41 shows the detailed construction of PROM/IR 248.

PROM/IR 248 is shown in FIG. 41 as consisting four storage devices, ROM W/REG 2481, 2482, 24 and 2484. As is expected these devices are addressed 2910 SEQUENCER 247, cleared by signal H→M and clocked by signal L→MPC CLK generated element CLOCK 276 (see also FIG. 78). ROM W/RI 2483 and 2484 supply the 16 bit instruction word (i Signals H→INST 0–INST 15). ROM W/REG 2 supplies the constant inputs to CONSTANT MUX (see also FIG. 36) and the branch address inputs BRANCH ADDR 247 (see also FIG. 33). RC W/REG 2481 supplies signals H→COND SEL 0–3 the element CONDITION MUX 246 (see also FI 48). These signals are used to make the condition sel tion. Three remaining four bit positions of RC W/REG 2481 are the four branch signals input to 2 SEQUENCER 247 (see also FIG. 40). The microcc listing contained herein below describes the content PROM/IR 248.

```
KMIKE*TUNA1(1).HSSFRUN/MICRO
        @QUAL   WUCC
        @USE ASM$PF,KMIKE*TUNA1.
        @ASG,A ASM$PF.
        @ASG,CP  THSSFFLE.,F2/2/POS/4
        @BRKPT PRINT$/THSSFFLE
        @ADDL*FA12/REL.PRTBIG
        M. KELLEHER
        4230-
        C52465
        STA 107
        MS U2525
        @PRT KMIKE*TUNA1.HSSFRUN/MICRO
        @PDP,UL KMIKE*TUNA1.MICROPROC/HSSF
        @HDG,P MICROCODE FOR HIGH SPEED SEARCH FUNCTION (HSSF)
        @*UTBIG.GPAJO,S KMIKE*TUNA1.HSSFMICRO,KMIKE*TUNA1.ABHSSF
        @CULL.SE ASM/60,KMIKE*TUNA1.HSSFMICRO
```

```
@PACK KMIKE*TUNA1.
@BRKPT PRINT$
@FREE THSSFFLE.
@SYM THSSFFLE.,4,RMWUCC
@PDP,UL KMIKE*TUNA1.MICROPROC/HSSF
PDP12R2 SL74R1 04/15/80 09:11:50 (38->39)    R1
PE                 PHSSFS*    PROC        0 .
                              WRD         32 .
                    . HSSF MICROINSTRUCTION PROC
                   FSA*       FORM        4,4,8,2,7,5,2 .
                    .         FORMAT 1 - MOVE INSTRUCTION    M D,S,RA   A C,DA
                   FSB*       FORM        4,4,8,4,3,2,5,2 .
                    .         FORMAT 2 - ARITH/LOGIC INSTRUCTION   AL M,AR,S,RA   A C,BA
                   FSC*       FORM        4,4,8,8,3,3,2 .
                    .         FORMAT 3 - SHIFT INSTRUCTION    S SF,RA   A C,DA
                   FSD*       FORM        4,4,8,7,2,5,2 .
                    .         FORMAT 4 - LOAD INSTRUCTION    L AR,S,RA   A C,DA
                   FSE*       FORM        32 .
                    .         FORMAT FOR ILLEGAL INSTRUCTION FUNCTION
                   P          PROC        4,1   . FORMAT 1 - MOVE INSTRUCTIONS
                   M1**       NAME        0 . MOVE (GROUP 1)
                   M2**       NAME        2 . MOVE (GROUP 2)
                              DO P(1)>3 , TXT '.......... TOO MANY OPERANDS ..........' .
                              DO P(1)<3 , TXT '.......... TOO FEW OPERANDS ..........' .
                              DO P(3)>2 , TXT '.......... TOO MANY OPERANDS ..........' .
                              DO P(3)<2 , TXT '.......... TOO FEW OPERANDS ..........' .
                              DO P(2,1)>017 , TXT '.......... AM2910 INST TOO LARGE ..........' .
                              DO P(3,1)>017 , TXT '.......... CONDITION FIELD TOO LARGE ..........' .
                              DO P(3,2)>0377 , TXT '.......... ADDRESS FIELD TOOLARGE ..........' .
                              DO P(1,1)>0177 , TXT '.......... DESTINATION TOO LARGE ..........' .
                              DO P(1,2)>037 , TXT '.......... SOURCE FIELD TOO LARGE ..........' .
                              DO P(1,3)>3 , TXT '.......... RAM ADDR/SELECT TOO LARGE ..........' .
                              FSA         P(2,1),P(3,1),P(3,2),P(0,0),P(1,1),P(1,2),P(1,3) .
                              END .
                   P          PROC        4,T         . FORMAT 2 - ARITH/LOGIC INSTRUCTIONS
                   A1**       NAME        4 . ARITHMETIC (GROUP 1)
                   AC1**      NAME        5 . ARITHMETIC WITH CARRY (GROUP 1)
                   L1**       NAME        6 . LOGICAL (GROUP 1)
                   A2**       NAME        014 . ARITHMETIC (GROUP 2)
                   AC2**      NAME        015 . ARITHMETIC WITH CARRY (GROUP 2)
                   L2**       NAME        016 . LOGICAL (GROUP 2)
                              DO P(1)>4 , TXT '.......... TOO MANY OPERANDS ..........' .
                              DO P(1)<4 , TXT '.......... TOO FEW OPERANDS ..........' .
                              DO P(3)>2 , TXT '.......... TOO MANY OPERANDS ..........' .
                              DO P(3)<2 , TXT '.......... TOO FEW OPERANDS ..........' .
                              DO P(2,1)>017 , TXT '.......... AM2910 INST TOO LARGE ..........' .
                              DO P(3,1)>017 , TXT '.......... CONDITION FIELD TOO LARGE ..........' .
                              DO P(3,2)>0377 , TXT '.......... ADDRESS FIELD TOOLARGE ..........' .
                              DO P(1,1)>7 , TXT '.......... M-FIELD TOO LARGE ..........' .
                              DO P(1,2)>3 , TXT '.......... ACC RAM DEST TOO LARGE ..........' .
                              DO P(1,3)>037 , TXT '.......... SOURCE FIELD TOO LARGE ..........' .
                              DO P(1,4)>3 , TXT '.......... RAM ADDR/SELECT TOO LARGE ..........' .
                              FSB         P(2,1),P(3,1),P(3,2),P(0,0),P(1,1),P(1,2),P(1,3),P(1,4) .
```

```
                 END .
P                PROC      4,1        . FORMAT 3 - SHIFT INSTRUCTIONS
SR1**            NAME      0160 . SHIFT RIGHT (GROUP 1)
SL1**            NAME      0161 . SHIFT LEFT (GROUP 1)
SR1S**           NAME      0162 . SHIFT RIGHT,SET STATUS (GROUP 1)
SL1S**           NAME      0163 . SHIFT LEFT,SET STATUS (GROUP 1)
SR2**            NAME      0360 . SHIFT RIGHT (GROUP 2)
SL2**            NAME      0361 . SHIFT LEFT (GROUP 2)
SR2S**           NAME      0362 . SHIFT RIGHT,SET STATUS (GROUP 2)
SL2S**           NAME      0363 . SHIFT LEFT,SET STATUS (GROUP 2)
                 DO P(1)>2 , TXT '********** TOO MANY OPERANDS **********' .
                 DO P(1)<2 , TXT '********** TOO FEW OPERANDS **********' .
                 DO P(3)>2 , TXT '********** TOO MANY OPERANDS **********' .
                 DO P(3)<2 , TXT '********** TOO FEW OPERANDS **********' .
                 DO P(2,1)>017 , TXT '********** AM2910 INST TOO LARGE **********' .
                 DO P(3,1)>017 , TXT '********** CONDITION FIELD TOO LARGE **********' .
                 DO P(3,2)>0377 , TXT '********** ADDRESS FIELD TOOLARGE **********'
                 DO P(1,1)>7 , TXT '********** SHIFT FIELD TOO LARGE **********' .
                 DO P(1,2)>3 , TXT '********** RAM ADDR/SELECT TOO LARGE **********'
                 FSC       P(2,1),P(3,1),P(3,2),P(0,0),P(1,1),0,P(1,2) .
                 END .
P                PROC      4,1        . FORMAT 4 - LOAD INSTRUCTION
LDN1**           NAME      074 . LOAD COMPLEMENT SOURCE (GROUP 1)
LDN1S**          NAME      075 . LOAD NOT SOURCE,SET STATUS (GRP 1)
LD1**            NAME      076 . LOAD SOURCE (GROUP 1)
LD1S**           NAME      077 . LOAD SOURCE,SET STATUS (GROUP 1)
LDN2**           NAME      0174 . LOAD COMPLEMENT SOURCE (GROUP 2)
LDN2S**          NAME      0175 . LOAD NOT SOURCE,SET STATUS (GRP 2)
LD2**            NAME      0176 . LOAD SOURCE (GROUP 2)
LD2S**           NAME      0177 . LOAD SOURCE,SET STATUS (GROUP 2)
                 DO P(1)>3 , TXT '********** TOO MANY OPERANDS **********' .
                 DO P(1)<3 , TXT '********** TOO FEW OPERANDS **********' .
                 DO P(3)>2 , TXT '********** TOO MANY OPERANDS **********' .
                 DO P(3)<2 , TXT '********** TOO FEW OPERANDS **********' .
                 DO P(2,1)>017 , TXT '********** AM2910 INST TOO LARGE **********' .
                 DO P(3,1)>017 , TXT '********** CONDITION FIELD TOO LARGE **********' .
                 DO P(3,2)>0377 , TXT '********** ADDRESS FIELD TOOLARGE **********'
                 DO P(1,1)>3 , TXT '********** ACC RAM DEST TOO LARGE **********' .
                 DO P(1,2)>037 , TXT '********** SOURCE FIELD TOO LARGE **********' .
                 DO P(1,3)>3 , TXT '********** RAM ADDR/SELECT TOO LARGE **********'
                 FSD       P(2,1),P(3,1),P(3,2),P(0,0),P(1,1),P(1,2),P(1,3) .
                 END .
ILLOPS**         PROC      0          . ILLEGAL OPERATION CODE
                 TXT '********** ILLEGAL INSTRUCTION FUNCTION **********' .
                 FSE       0 .
                 END .
SETADR**         PROC      1          . LOCATION COUNTER SETTING OPERATOR
                 RES       SETADR(1,1)-$ .
                 END .
                 END .

END PDP   ERRORS : NONE
@HDG,P MICROCODE FOR HIGH SPEED SEARCH FUNCTION (HSSF)
@*U1610.GPA30,S KMIKE*TUNA1.HSSFMICRO,KMIKE*TUNA1.ABHSSF
CYCLE 20   GPA ASSEMBLED BY V-6   ON 15 APR 80 AT   09:11:51
```

MICROCODE FOR HIGH SPEED SEARCH FUNCTION (HSSF)

DATE 041500

```
/ .
*ULTRA    HSSF .
          FHSSF$ .
  . HIGH SPEED SEARCH FUNCTION MICROCODE
  . ****************************************************************
  .       MOVE INSTRUCTION
  .
  .       M     D,S,RA        A     C,BA . COMMENTS
  .
  .       M = MOVE INSTRUCTION FIELD (15-14)
  .               M1 = 0 , MOVE(GROUP 1)
  .               M2 = 2 , MOVE(GROUP 2)
  .       D = DESTINATION FIELD  (13-7)
  .       S = SOURCE FIELD  (6-2)
  .       RA = RAM ADDRESS SELECT FIELD (1-0)
  .
  .       A = AM2910 INSTRUCTION FIELD (31-28)
  .       C = CONDITION FIELD (27-24)
  .       BA = BRANCH ADDRESS FIELD (23-16)
  .
  . ---------------------------------------------------------------
  .       ARITHMETIC,LOGIC INSTRUCTION
  .
  .       AL   M,AR,S,RA      A    C,BA . COMMENTS
  .
  .       AL = ARITHMETIC/LOGIC INSTRUCTION FIELD (15-12)
  .               A1 = 4 , ARITHMETIC (GROUP 1)
  .               AC1= 5 , ARITHMETIC WITH CARRY(GROUP 1)
  .               L1 = 6 , LOGICAL (GROUP 1)
  .               A2 = 014 , ARITHMETIC(GROUP 2)
  .               AC2= 015 , ARITHMETIC WITH CARRY(GROUP 2)
  .               L2 = 016 , LOGICAL(GROUP 2)
  .       M = M-FIELD (11-9)
  .       AR = ACC/RAM DESTINATION FIELD (8-7)
  .       S = SOURCE FIELD (6-2)
  .       RA = RAM ADDRESS SELECT FIELD (1-0)
  .
  .       A = AM2910 INSTRUCTION FIELD (31-28)
  .       C = CONDITION FIELD (27-24)
  .       BA= BRANCH ADDRESS FIELD (23-16)
  .
  . ---------------------------------------------------------------
  .       SHIFT INSTRUCTION
  .
  .       S     SF,RA         A     C,BA . COMMENTS
  .
  .       S = SHIFT INSTRUCTION INSTRUCTION FUNCTION FIELD (15-0)
  .               SR1 = 0160 , SHIFT RIGHT (GROUP 1)
  .               SL1 = 0161 , SHIFT LEFT (GROUP 1)
  .               SRIS= 0162 , SHIFT RIGHT,SET STATUS REGISTER (GROUP 1)
```

```
                                .           SL1S= 0163 . SHIFT LEFT,SET STATUS REGISTER (GROUP 1)
                                .           SR2 = 0360 . SHIFT RIGHT (GROUP 2)
                                .           SL2 = 0361 . SHIFT LEFT (GROUP 2)
                                .           SR2S= 0362 . SHIFT RIGHT,SET STATUS REGISTER 2 (GROUP 2)
                                .           SL2S= 0363 . SHIFT LEFT, SET STATUS REGISTER 2 (GROUP 2)
                                .     SF = SHIFT FIELD (7-5)
                                .     RA = RAM ADDRESS SELECT FIELD (1-0)
                                .
                                .     A = AM2910 INSTRUCTION FIELD (31-20)
                                .     C = CONDITION FIELD (27-24)
                                .     BA= BRANCH ADDRESS FIELD (23-16)
                                .
                                . ----------------------------------------------------------------
                                .     LOAD INSTRUCTION
                                .
                                .     L     AR,S,RA      A     C,BA . COMMENTS
                                .
                                .     L = LOAD INSTRUCTION FUNCTION FIELD (15-9)
                                .           LDM  =  074 . LOAD COMPLEMENT SOURCE (GROUP 1)
                                .           LDNIS=  075 . LOAD NOT SOURCE,SET STATUS REGISTER (GROUP 1)
                                .           LD1  =  076 . LOAD SOURCE (GROUP 1)
                                .           LD1S =  077 . LOAD SOURCE,SET STATUS REGISTER (GROUP 1)
                                .           LDN2 = 0174 . LOAD COMPLEMENT SOURCE (GROUP 2)
                                .           LDN2S= 0175 . LOAD NOT SOURCE,SET STATUS REGISTER (GROUP 2)
                                .           LD2  = 0176 . LOAD SOURCE (GROUP 2)
                                .           LD2S = 0177 . LOAD SOURCE,SET STATUS REGISTER (GROUP 2)
                                .     AR = ACC RAM DESTINATION FIELD (8-7)
                                .     S  = SOURCE FIELD (6-2)
                                .     RA = RAM ADDRESS SELECT FIELD (1-0)
                                .
                                .     A  = AM2910 INSTRUCTION FIELD (31-20)
                                .     C  = CONDITION FIELD (27-24)
                                .     BA = BRANCH ADDRESS FIELD (23-16)
                                .
                                . ****************************************************************
                               . SHIFT FIELD (BITS 5-7)
             00000000000       A15     EQU     0        . ACCUMULATOR 15
             00000000001       A0      EQU     1        . ACCUMULATOR 0
             00000000002       ZER     EQU     2        . ZERO
             00000000003       UNO     EQU     3        . ONE
             00000000004       MD0     EQU     4        . MPC DATA BUS 0
             00000000005       MD15    EQU     5        . MPC DATA BUS 15
             00000000006       SIGN    EQU     6        . ALS SIGN
             00000000007       ALS0    EQU     7        . ALS BIT 0
                               . RAM ADDRESS SELECT FIELD (BITS 0-1)
             00000000000       I0      EQU     0        . INDEX REGISTER DECREMENT
             00000000001       I1      EQU     1        . INDEX REGISTER INCREMENT
             00000000002       I       EQU     2        . INDEX REGISTER (NO DEC OR INC)
             00000000003       A       EQU     3        . INSTRUCTION ADDRESS REG FIELD (BA)
                               . ACC/RAM DESTINATION FIELD (BITS 7-8)
             00000000000       NO      EQU     0        . NOOP
```

```
MICROCODE FOR HIGH SPEED SEARCH FUNCTION (HSSF)                                   DATE 041580
          00000000001     R        EQU      1          . RAM
          00000000002     AC       EQU      2          . ACCUMULATOR
          00000000003     AR       EQU      3          . ACCUMULATOR AND RAM
                          . ARITHMETIC M FIELD (BITS 9-11)
          00000000000     ZR       EQU      0          . ZERO
          00000000001     ZRS      EQU      1          . ZERO - SET STATUS REGISTER
          00000000002     SBS      EQU      2          . ACC LESS SOURCE
          00000000003     SBSS     EQU      3          . ACC LESS SOURCE - SET STATUS REG
          00000000004     SBA      EQU      4          . SOURCE LESS ACC
          00000000005     SBAS     EQU      5          . SOURCE LESS ACC - SET STATUS REG
          00000000006     ADD      EQU      6          . SOURCE + ACC
          00000000007     ADDS     EQU      7          . SOURCE + ACC (SET STATUS REG)
                          . LOGICAL M FIELD (BITS 9-11)
          00000000000     EOR      EQU      0          . SOURCE EXOR ACC
          00000000001     EORS     EQU      1          . SOURCE EXOR ACC (SET STATUS REG)
          00000000002     OR       EQU      2          . SOURCE OR ACC
          00000000003     ORS      EQU      3          . SOURCE OR ACC (SET STATUS REG)
          00000000004     AND      EQU      4          . SOURCE AND ACC
          00000000005     ANDS     EQU      5          . SOURCE AND ACC (SET STATUS REG)
          00000000006     ONE      EQU      6          . ONES
          00000000007     ONES     EQU      7          . ONES (SET STATUS REGISTER)
                          . DESTINATION FIELD (BITS 7-13)
          00000000000     NOD      EQU      0          . NO DESTINATION
          00000000001     DECHP    EQU      1          . DECREMENT HIT STACK REGISTER
          00000000002     INDR     EQU      2          . INDEX REGISTER
          00000000003     LCTR     EQU      3          . LOAD AMD2910 LOOP/REPEAT COUNTER
          00000000004     CMD      EQU      4          . CHANNEL COMMAND REGISTER
          00000000005     SPSE     EQU      5          . PAUSE THE SEARCH OPERATION
          00000000006     FDAR     EQU      6          . FIELD ADDRESS REGISTER
          00000000007     SLR      EQU      7          . SEARCH LIMIT REGISTER
          00000000010     VECR     EQU      010        . VECTOR REGISTER
          00000000011     BEM      EQU      011        . BOOLEAN EVALUATION MEMORY
          00000000012     ZBMA     EQU      012        . ZERO BOOLEAN EVAUATOR MEMORY
          00000000013     DEL      EQU      013        . DELAY REGISTER
          00000000014     MDROL    EQU      014        . MEMORY DATA REGISTER (LOWER)
          00000000015     OTB      EQU      015        . OP CODE, TYPE CODE/BUS ADDRESS
          00000000016     MDROU    EQU      016        . MEMORY DATA REGISTER (UPPER)
          00000000017     RMFR     EQU      017        . RMF REQUEST REGISTER
          00000000020     IWC      EQU      020        . INPUT WORD COUNT
          00000000021     IBAP     EQU      021        . INPUT BUFFER ADDRESS POINTER
          00000000022     ICAP     EQU      022        . INPUT CHAIN ADDRESS POINTER
          00000000023     DFUD23   EQU      023        . UNASSIGNED
          00000000024     OWC      EQU      024        . OUTPUT WORD COUNT
          00000000025     OBAP     EQU      025        . OUTPUT BUFFER ADDRESS POINTER
          00000000026     OCAP     EQU      026        . OUTPUT CHAIN ADDRESS POINTER
          00000000027     EICAP    EQU      027        . INPUT VECTOR ADDRESS
          00000000030     DFUD30   EQU      030        . UNASSIGNED
          00000000031     IDATA    EQU      031        . INPUT DATA
          00000000032     DFUD32   EQU      032        . UNASSIGNED
          00000000033     DFUD33   EQU      033        . UNASSIGNED
          00000000034     DFUD34   EQU      034        . UNASSIGNED
          00000000035     ODATA    EQU      035        . OUTPUT DATA
```

```
MICROCODE FOR HIGH SPEED SEARCH FUNCTION (HSSF)                                    DATE 041580
154.        00000000036        DFUD36    EQU    036     . UNASSIGNED
155.        00000000037        IVECT     EQU    037     . EXTERNAL INTERRUPT CHAIN ADDRESS POINTER
156.        00000000040        MARW      EQU    040     . MEMORY ADDRESS REGISTER WRITE
157.        00000000043        MAR1      EQU    043     . MEMORY ADDRESS REG. REFERENCE WORD 1
158.        00000000042        MARR      EQU    042     . MEMORY ADDRESS REGISTER RECORD
159.        00000000041        MAR2      EQU    041     . MEMORY ADDRESS REG REFERENCE WORD 2
160.                           . NOTE** DFUD44-DFUD177 ARE UNASSIGNED
161.                           . SOURCE FIELD (BITS 2-6)
162.        00000000000        RAM       EQU    0       . RANDOM ACCESS MEMORY
163.        00000000001        ACC       EQU    1       . ACCUMATOR
164.        00000000002        HITR      EQU    2       . HIT REGISTER
165.        00000000003        SFUD3     EQU    3       . UNASSIGNED
166.        00000000004        MDRL      EQU    4       . MEMORY DATA REGISTER (LOWER)
167.        00000000005        MDRU      EQU    5       . MEMORY DATA REGISTER (UPPER)
168.        00000000006        SFUD6     EQU    6       . UNASSIGNED
169.        00000000007        SFUD7     EQU    7       . UNASSIGNED
170.        00000000010        KL        EQU    010     . CONSTANT LOWER
171.        00000000011        KZ        EQU    011     . CONSTANT ZERO
172.        00000000012        KD        EQU    012     . CONSTANT DOUBLE
173.        00000000013        KU        EQU    013     . CONSTANT UPPER
174.        00000000013        MAN       EQU    013     . MEMORY ARRAY BOARD ID
175.        00000000014        SFUD14    EQU    014     . UNASSIGNED
176.        00000000015        SFUD15    EQU    015     . UNASSIGNED
177.        00000000016        SFUD16    EQU    016     . UNASSIGNED
178.        00000000020        IWC       EQU    020     . INPUT WORD COUNT
179.        00000000021        IBAP      EQU    021     . INPUT BUFFER ADDRESS POINTER
180.        00000000022        ICAP      EQU    022     . INPUT CHAIN ADDRESS POINTER
181.        00000000023        SFUD23    EQU    023     . UNASSIGNED
182.        00000000024        OWC       EQU    024     . OUTPUT WORD COUNT
183.        00000000025        OBAP      EQU    025     . OUTPUT BUFFER ADDRESS POINTER
184.        00000000026        OCAP      EQU    026     . OUTPUT CHAIN ADDRESS POINTER
185.        00000000027        EICAP     EQU    027     . INPUT VECTOR ADDRESS
186.        00000000030        SFUD30    EQU    030     . UNASSIGNED
187.        00000000031        IDATA     EQU    031     . INPUT DATA
188.        00000000032        SFUD32    EQU    032     . UNASSIGNED
189.        00000000033        SFUD33    EQU    033     . UNASSIGNED
190.        00000000034        SFUD34    EQU    034     . UNASSIGNED
191.        00000000035        ODATA     EQU    035     . OUTPUT DATA
192.        00000000036        SFUD36    EQU    036     . UNASSIGNED
193.        00000000037        IVECT     EQU    037     . EXTERNAL INTERRUPT CHAIN ADDRESS POINTER
194.        00000000017        SFUD17    EQU    017     . UNASSIGNED
195.                           . AM2910 INSTRUCTION FIELD (BITS 28-31)
196.        00000000000        JZ        EQU    0       . RESET OR JUMP TO ZERO
197.        00000000001        CJS       EQU    1       . CONDITIONAL JUMP TO SUBROUTINE
198.        00000000002        JSCAN     EQU    2       . JUMP SCAN
199.        00000000003        CJR       EQU    3       . CONDITIONAL BRANCH
200.        00000000004        PUSH      EQU    4       . PUSH-CONDITIONAL LOAD COUNTER
201.        00000000005        JSBR      EQU    5       . JUMP TO SUBROUTINE VIA BRANCH ADDRESS
202.        00000000006        CJD       EQU    6       . CONDITIONAL JUMP DATA
203.        00000000007        JBR       EQU    7       . CONDITIONAL BRANCH VIA BRANCH ADDRESS
204.        00000000010        RPST      EQU    010     . REPEAT LOOP,COUNTER # ZERO
205.        00000000011        RPBA      EQU    011     . REPEAT PIPELINE REGISTER COUNTER # ZERO
```

```
MICROCODE FOR HIGH SPEED SEARCH FUNCTION (HSSF)
                                                                  DATE 041500
00000000012     CRIN    EQU   012     . CONDITIONAL RETURN FROM SUBROUTINE
00000000013     COP     EQU   013     . CONDITIONAL BRANCH AND POP
00000000014     LDCT    EQU   014     . LOAD COUNTER AND CONTINUE
00000000015     LOOP    EQU   015     . TEST END OF LOOP
00000000016     CONT    EQU   016     . CONTINUE
00000000017     TWB     EQU   017     . THREE WAY BRANCH
                . CONDITION FIELD 1 (BITS 24-27)
00000000000     TRUE    EQU   0       . LOGICAL TRUE
00000000001     FALSE   EQU   1       . LOGICAL FALSE
00000000002     NZ      EQU   2       . NOT ZERO
00000000003     ZERO    EQU   3       . ZERO
00000000004     NEG     EQU   4       . NEGATIVE
00000000005     POS     EQU   5       . POSITIVE
00000000006     ODD     EQU   6       . ODD (ALU BIT 0)
00000000007     EVEN    EQU   7       . EVEN (ALU BIT 0)
00000000017     IOSE    EQU   017     I/O SCAN ENABLED
00000000011     LKOUT   EQU   011     . IOI INTERRUPT LOCK OUT
00000000012     SACT    EQU   012     . SEQUENCE ACTIVE
00000000013     NSA     EQU   013     . NOT SEQUENCE ACTIVE
00000000014     NOHIT   EQU   014     . NO HIT
00000000015     ODA     EQU   015     . OUTPUT DATA ACTIVE
00000000016     RMFD    EQU   016     . RMF REQUEST
00000000010     CI17    EQU   *010    . UNASSIGNED
                . CONDITION FIELD 2 (BITS 24-27)
00000000000     GUP     EQU   0       . GLOBAL UPDATE (FOR LATER USE)
00000000001     OMI     EQU   1       . OUTPUT MONITOR INTERRUPT
00000000002     IMI     EQU   2       . INPUT MONITOR INTERRUPT
00000000003     OCI     EQU   3       . OUTPUT CHAIN INTERRUPT
00000000004     ICI     EQU   4       . INPUT CHAIN INTERRUPT
00000000005     OCA     EQU   5       . OUTPUT CHAIN ACTIVE
00000000006     ICA     EQU   6       . INPUT CHAIN ACTIVE
00000000007     EIE     EQU   7       . EXTERNAL INTERRUPT ENABLE
00000000010     C10     EQU   010     . UNASSIGNED
00000000000     IDA     EQU   0       . INPUT DATA ACTIVE
00000000012     C3IE    EQU   012     . CLASS 3 INTERRUPT ENABLE
00000000013     INOV    EQU   013     . INDEX REGISTER OVERFLOW
00000000014     C14     EQU   014     . UNASSIGNED
00000000015     C15     EQU   015     . UNASSIGNED
00000000016     C16     EQU   016     . UNASSIGNED
00000000017     C17     EQU   017     . UNASSIGNED
                .
                . ********************************************************
                . *                                                      *
                . *                                                      *
                . * HIGH SPEED SEARCH FUNCTION (HSSF) FIRMWARE PROGRAM   *
                . * PURPOSE : TO CONTROL A HARDWARE SEARCH THRU A        *
                . * DATA BASE FOR HIT AND ADDRESS                        *
                . ********************************************************
00000000000     BAPO    EQU   0                                   . OUTPUT BUFFER
                                                                  . ADDRESS POINTER
00000000001     WCO     EQU   01                                  . OUTPUT WORD COUNT
00000000002     WCI     EQU   02                                  . INPUT WORD COUNT
```

MICROCODE FOR HIGH SPEED SEARCH FUNCTION (HSSF) DATE 041580

```
00000000003     DAPI     EQU   03      . INPUT BUFFER
                                       . ADDRESS POINTER
00000000006     RAM6     EQU   06      . OP/TY/BA COMP OF
                                       . 7/71/376=0104001
00000000007     IDOTD    EQU   07      . OP/TY/BA COMP OF
                                       . 5/6/376=0124401
                                       . FOR WRITE INTO
                                       . 502 MLM
00000000010     OTR      EQU   010     .
                                       . OP/TY/BA COMP OF
                                       . 4/4/376=1135401
                                       . FOR ED 502 MEM
00000000011     RMOF     EQU   011     . RESET MEM OUTP FF
                                       . = 0404
00000000012     RMIF     EQU   012     . RESET MON INP FF
                                       . =0406
00000000013     RCIR     EQU   013     . RESET IN CHAIN FF
                                       . = 0410
00000000014     RCOR     EQU   014     . RESET OUT CHAIN FF
                                       . = 0412
00000000015     RLOD     EQU   015     . RESET OUT DATA ACT
                                       . = 01040
00000000016     REID     EQU   016     . RESET INPUT DATA
00000000017     XXY      EQU   017     . ACT = 01041
00000000020     GDEI0    EQU   020     . GD EI FOR LDFF(1)
00000000021     GDEI1    EQU   021     . GD EI FOR LFCN(2)
00000000022     GDEI2    EQU   022     . FOR LATER USE
00000000023     GDEI3    EQU   023     . GD EI FOR LDEX(4)
00000000024     GDEI4    EQU   024     . GD EI FOR WRRD(J)
00000000025     GDEI5    EQU   025     . FOR LATER USE
00000000026     GDEI6    EQU   026     . GD EI FOR RDRE(6)
00000000027     GDEI7    EQU   027     . FOR LATER USE
00000000030     BAD0     EQU   030     . WC=0 FOR LDFF 0
00000000031     BAD1     EQU   031     . WC=0 FOR LFCN 1
00000000032     BAD2     EQU   032     . WC=0 FOR WRRD 2
00000000033     BAD3     EQU   033     . WC=0 FOR RDRE(OUT)
00000000034     BAD4     EQU   034     . WC=0 FOR RDRE(IN)
00000000035     BAD5     EQU   035     . WC=0 FOR SRCH 5
00000000036     BAD6     EQU   036     . WC=0 FOR LDEX
00000000037     BAD7     EQU   037     . WC=0 FOR LDEX
00000000040     BAD10    EQU   040     . WC=0 FOR LDEX
00000000041     BAD11    EQU   041     . WC=0 FOR LDEX
00000000042     BAD12    EQU   042     . SPARE
00000000043     BAD13    EQU   043     . SPARE
00000000044     ERR0     EQU   044     . FUN CODE ERROR
00000000045     ERR1     EQU   045     .
00000000046     OFW      EQU   046     . OVERFLOW EI
00000000047     XXX      EQU   047     . SPARE
00000000050     WRS0     EQU   050     . WORKING REGISTERS
00000000051     WRS1     EQU   051     . WORKING REGISTERS
00000000052     WRS2     EQU   052     . WORKING REGISTERS
00000000053     WRS3     EQU   053     . WORKING REGISTERS
```

```
MICROCODE FOR HIGH SPEED SEARCH FUNCTION (HSSF)                                              DATE 041500
                                    00000000054      WRS4    EQU   054
                                    00000000100      RSAVW   EQU   0100                   . WORKING REGISTERS
                                    00000000101      LKSAV   EQU   0101                   . REC NO SAVE (WR)
                                    00000000102      PRSAV   EQU   0102                   . LINK COUNTER SAVE
                                    00000000103      LSAV    EQU   0103                   . PREDECESSOR SAVE
                                    00000000104      WR      EQU   0104                   . LINK SAVE
                                    00000000105      RSAVR   EQU   0105                   . WORKING REGISTER
                                    00000000106      RS      EQU   0106                   . REC NO SAVE (RD)
                                    00000000107      RSS     EQU   0107                   . MEM SLICE ADDR (RD)
                                                                                          . MEM SLICE ADDR FOR
                                    00000000113      WCS     EQU   0113                   . SRCH
                                    00000000115      HCNT    EQU   0115                   . WORD COUNT SAVE
                                    00000000116      EVEC    EQU   0116                   . HIT ADDR REGISTER
                                    00000000117      CSAV1   EQU   0117                   . SET ERROR VECTOR
                                    00000000120      CSAV2   EQU   0120                      . CHAR BYTE 1
                                    00000000121      CCSAV   EQU   0121                      . CHAR BYTE 2
                                    00000000200      WR200   EQU   0200                      . CHAR COUNT
                                    00000000201      CHFLG   EQU   0201                   . SPACE
                                    00000000202      PRFLG   EQU   0202                   . 1ST CHAR FLAG
                                    00000000203      FPFLG   EQU   0203                   . PARENS FLAG
                                    00000000204      NTFLG   EQU   0204                   . 1ST PARENS FLAG
                                    00000000205      SAVE    EQU   0205                   . NO FLAG
                                    00000000206      INST    EQU   0206                   . OPER SAVE TEMP
                                    00000000207      BAPH    EQU   0207                   . INSTRUCTION SAVE
                                    00000000210      DELSA   EQU   0210                   . BUF AD PRT,HIT CNT
                                                                                          . SAVE DELAY REGISTER
                                    00000000211      BSCNT   EQU   0211                   . FOR INC
                                    00000000300      CSAV0   EQU   0300                   . ADDR OEM INST SAVE
                                    00000000301      CSAV3   EQU   0301                   . LOEX SAVE
                                    00000000302      CSAV4   EQU   0302                   . LOEX
                                                                                          . LOEX
                                                     . **************************************
                                                     . *                                    *
                                                     . * HSSF SELF TEST INTENTIONALLY NOOPED *
                                                     . *                                    *
                                                     . **************************************
 T     00   000000   16 00 337 076 2 10 2                    SETADR 0 . SSSSSSSSSSSSSSSSSSSSSSSSSSSSSSSSSSSSS
            000001   03 00 375 0 000 00 0    SELFT   LDI    AC,KL,1             CONT    ,PREP
                                                     MI     ,,0                 CDR     TRUE,THP    . SELF TEST COMPL
                                                                                                    . GO TO PREPARE
                                                                                                    .   THE RAM WITH
                                                     . ********************************************** .   CONSTANTS
                                                     . *
                                                     . *  IN TERMINATE - COMMON SUBROUTINE TO SEND GOOD/BAD*
                                                     . *  EI TO 502 ON COMPO OF DATA IN TO 502            *
                                                     . *                                                   *
                                                     . ***********************************************
            000002   16 00 016 0 004 30 3    ITERM   MI     CMG,RAM,A           CONT    ,REID
 T          000003   16 00 102 076 2 10 2                                                           . RESET INPUT DATA
            000004   03 00 375 0 000 00 0            LDI    AC,KL,1             CONT    ,CIDAT      . INTERRUPT)
                                                     MI     ,,0                 CDR     TRUE,THP    . PAGE 2 JUMP
                                                                                                    . IF IMI FALSE JUMP
                                                                                                    . TO SEND GOOD/BAD
                                                                                                    . TI STATUS WORD
```

```
MICROCODE FOR HIGH SPEED SEARCH FUNCTION (HSSF)                                     DATE 041500        PAGE    8
                                               . ****************************************************
                                               . *                                                  *
                                               . * OUT TERMINATE-COMMON SUBROUTINE TO SEND GOOD/BAD EI*
                                               . *            TO 502 ON COMP OF DATA OUT TO HSSF    *
                                               . *                                                  *
                                               . ****************************************************
         000005  16 00 015 0 004 00 3   OTERM   MI    CMD,RAM,A        CONT   ,REOD          . RESET
   T     000006  16 00 102 076 2 10 2           LDI   AC,KL,I          CONT   ,EIDAT         . PAGE 2 JUMP
         000007  03 00 375 0 000 00 0           MI    ,,0              CBR    TRUE,THP       . IF OMI FALSE JUMP
                                                                                             . TO SEND GOOD/BAD
                                                                                             . EI STATUS WORD
         000010  16 00 140 0 037 10 3   SCHI    MI    IVECT,KL,A       CONT   ,0140          . IOI INT VECTOR -
                                                                                             . IN CHAIN (MONIT)
         000011  16 00 006 0 015 00 3           MI    OTD,RAM,A        CONT   ,06            . OP/TY/BA 7/7/376
         000012  16 00 013 0 017 10 2           MI    RMFR,KL,I        CONT   ,013           . REQUEST TO RMF BUS
   T     000013  16 00 102 076 2 10 2           LDI   AC,KL,I          CONT   ,EIDAT         . NO-OP DELAY
         000014  03 16 014 0 006 00 0           MI    ,,0              CBR    RMFB,$         . JUMP TO SELF UNTIL
                                                                                             . RMF BUS FREE
         000015  16 00 004 0 004 13 2           MI    CMD,KU,I         CONT   ,04            . PATTERN FROM RAM
                                                                                             . TO RESET MONITO FF
         000016  03 00 064 0 000 00 0           MI    ,,0              CBR    TRUE,IDLE      . GO TO SUBROUT FOR
                                                                                             . SENDING EI STATUS
                                               . ****************************************************
                                               . *                                                  *
                                               . * READ RECORD-COMMAND WILL READ A RECORD FROM THE  *
                                               . *          MAB AND REPORT IT TO THE - 502          *
                                               . *                                                  *
                                               . ****************************************************
         000017  16 00 014 076 2 10 2   RDRE    LDI   AC,KL,I          CONT   ,014           . FORM FDAR CONTENTS
         000020  16 00 106 04 4 3 01 3          AI    AND,AR,ACC,A     CONT   ,RS            .
         000021  16 00 047 04 0 3 00 3          AI    ZR,AR,RAM,A      CONT   ,XXX           . MAKE SURE RS, XXX=0
                                                                                             . WAIT UNTIL NOT
                                                                                             . ACTIVE
         000022  05 00 177 0 000 00 0           MI    ,,0              JSBR   TRUE,CRD       . READ NEXT WORD
         000023  16 00 105 076 1 35 3           LDI   R,ODATA,A        CONT   ,RSAVR         .
         000024  16 00 015 0 004 00 3           MI    CMD,RAM,A        CONT   ,REOD          . RESET OD ACTIVE
                                                                                             . FOR ZERO TEST
         000025  03 03 027 0 000 00 0           MI    ,,0              CBR    ZERO,INDATI    . IF TRUE CONTINUE
         000026  16 00 047 06 6 3 00 3          LI    ONE,AR,RAM,A     CONT   ,XXX           . SET BAD FLAG
         000027  03 00 041 2 000 00 0   INDATI  M2    ,,0              CBR    IDA,INDAB      . IF IDA ACTIVE, INP
                                                                                             . DATA
                                                                                             . ACTIVE
         000030  16 00 145 0 037 10 3   INDAA   MI    IVECT,KL,A       CONT   ,0145          . IN CHAIN REQ
         000031  16 00 000 076 2 26 2           LDI   AC,OCAP,I        CONT   ,              . CM ICAP TO ACC
         000032  16 00 000 0 027 01 2           MI    EICAP,ACC,I      CONT   ,              . ICAP TO EICAP
         000033  16 00 006 0 015 00 3           MI    OTD,RAM,A        CONT   ,06            . OP/TY/BA
         000034  16 00 012 0 017 10 2           MI    RMFR,KL,I        CONT   ,012           . BUS CYCLE REQ
         000035  16 00 000 0 000 00 0           MI    ,,0              CONT   ,              . DELAY FOR RMFB
                                                                                             . SAMPLE
         000036  03 16 036 0 000 00 0           MI    ,,0              CBR    RMFB,$         . RMF BUSY WAIT
         000037  03 17 037 0 000 00 2           MI    ,,1              CBR    IOSE,$         . TEST I/O SCAN
         000040  03 00 027 0 000 00 0           MI    ,,0              CBR    TRUE,INDATI    . LOOK AGAIN IF INPUT
```

MICROCODE FOR HIGH SPEED SEARCH FUNCTION (HSSF)

DATE 041580

```
                                                                                    .
        000041  16 00 105 0 014 00 3   INDAB    M1    MDHOL,RAM,A     CONT   .RSAVR       . DATA ACTIVE
        000042  16 00 360 0 013 10 2   INDAB1   M1    DLL,KL,I        CONT   .0360        . REC ADDR TO MAB
        000043  16 00 000 0 040 04 2            M1    MARW,MDRL,I     CONT   .            . MINIMIZE DELAY
        000044  16 00 106 0 006 00 3            M1    FDAR,RAM,A      CONT   .RS          . MAR READ ADDR REG
                                                                                          . CMD MEM TO READ
        000045  16 00 004 076 2 10 2            LD1   AC,KL,I         CONT   .04          . REC NO
U       000046  16 00 106 05 0 2 00 3           AC1   SRA,AC,RAM,A    CONT   .RS          . ACC+4
        000047  16 00 106 06 4 3 01 3           L1    AND,AR,ACC,A    CONT   .RS          . READ SLICE PLUS 04
                                                                                          . RS-04 FOR NEXT
        000050  03 12 050 0 000 00 0            M1    ..0             CBR    SACT,S       . READ CYCLE
                                                                                          . TEST FOR READ DONE
        000051  05 00 213 0 031 05 2            M1    IDATA,MDRU,I    JSBR   TRUE,CWR     . READ DONE PASS
                                                                                          . WORDS TO CM AND
        000052  03 03 055 0 000 00 0            M1    ..0             CBR    ZERO,INDA2   . 502
        000053  05 00 213 0 031 04 2            M1    IDATA,MDRL,I    JSBR   TRUE,CWR     . TEST WC=0
                                                                                          . WORD FOR 502 MEMORY
                                                                                          . TEST WORD COUNT
        000054  03 02 042 0 000 00 0            M1    ..0             CBR    NZ,INDAB1    . = 0
                                                                                          .
                                                                                          . IF WC= 0 END OF
                                                                                          . MAR READ OF
        000055  16 00 047 077 2 00 3   INDA2    LD1S  AC,RAM,A        CONT   .XXX         . STATUS
        000056  03 02 061 0 000 00 2            M1    ..1             CBR    NZ,INDA3     . WORKING REGISTER
        000057  16 00 026 0 027 00 3            M1    EICAP,RAM,A     CONT   .GDEIG       . TEST BAD FLAG
        000060  03 00 062 0 000 00 0            M1    ..0             CBR    TRUE,INDA4   . GOOD EI STATUS
        000061  16 00 034 0 027 00 3   INDA3    M1    EICAP,RAM,A     CONT   .BAD4        . TO RESET REGISTERS
        000062  16 00 106 04 0 3 00 3  INDA4    A1    ZR,AR,RAM,A     CONT   .RS          . BAD EI STATUS
                                                                                          . ACC = 0
                                                                                          . READ SLICE BACK
        000063  03 00 002 0 000 00 0            M1    ..0             CBR    TRUE,ITERM   . ZERO
                                                                                        . . TERMINATE INPUT
                                       . ******************************************
                                       . *                                        *
                                       . * IDLE INTERRUPT HANDLER-SCAN FOR JUMPS TO*
                                       . *        SUBROUTINES                     *
                                       . *                                        *
                                       . ******************************************
T       000064  16 00 060 076 2 10 2   IDLE     LD1   AC,KL,I         CONT   .OUTD        . EXEC TO SENSE
                                                                                          .  INTERRUPTS AND
                                                                                          .  REQUESTS
        000065  03 15 375 0 000 00 0            M1    ..0             CBR    ODA,THP      . OUTDATA REQUEST
                                                                                          .  ACTIVE? PAGE JUMP
        000066  03 17 064 0 000 00 0            M1    ..0             CBR    IOSE,IDLE    . IF IOSE,IDLE . IF I
                                                                                          .  ENABLE BACK TO
T       000067  16 00 042 076 2 10 2            LD1   AC,KL,I         CONT   .ICIX        .  IDLE
                                                                                          . SENSE FOR IN CHAIN
        000070  03 04 375 2 000 00 0            M2    ..0             CBR    ICI,THP      .  INT.
                                                                                          . PAGE JUMP
T       000071  16 00 051 076 2 10 2            LD1   AC,KL,I         CONT   .OCIX        .
        000072  03 03 375 2 000 00 0            M2    ..0             CBR    OCI,THP      . SENSE OUT CHAIN
        000073  03 06 362 2 000 00 0            M2    ..0             CBR    ICA,ICR      . INT. PAGE JUMP
                                                                                          . PAGE JUMP
```

```
MICROCODE FOR HIGH SPEED SEARCH FUNCTION (HSSF)                                   DATE 041580
T      000074  16 00 032 076 2 10 2           LD1    AC,KL,I         CONT   ,OCR          . SENSE OUT CHAIN
       000075  03 05 375 2 000 00 0           M2     ,,0             CBR    OCA,THP       .  REQUEST PAGE 2
       000076  03 00 064 0 000 00 0           M1     ,,0             CBR    TRUE,IDLE     . NO SAMPLE RETURN
                                       . ************************************************
                                       . *                                              *
                                       . * LOAD FIELD FORMAT-DEFINES THE NUMBER OF BYTES IN *
                                       . *              EACH FIELD OF RECORD            *
                                       . *                                              *
                                       . ************************************************
                                                                                          . STATUS
       000077  05 00 177 0 000 00 0   LDFF    M1     ,,0             JSBR   TRUE,CRD      . JUMP TO COMMON
                                                                                          . READ 502 MEMORY
       000100  16 00 000 0 014 35 2           M1     MDROL,ODATA,I   CONT   ,             . STORE FIELD FORMAT
                                                                                          . WORD FORM ODATA-CM
                                                                                          . CARD ID=0
                                                                                          . BYTE ID=0
       000101  16 00 360 0 013 10 2           M1     DEL,KL,I        CONT   ,0360         . MINIMIZE DELAY
       000102  16 00 002 0 006 13 2           M1     FDAR,KU,I       CONT   ,02           . INITIATE STORE OF
       000103  03 12 103 0 060 00 0           M1     ,,0             CBR    SACT,$        . TEST FOR SEQUENCE A
       000104  16 00 001 077 2 00 3           LD1S   AC,RAM,A        CONT   ,WCO          . READ WC,SET SR
       000105  03 03 110 0 000 00 0           M1     ,,0             CBR    ZERO,LDF2     . TEST WC=ZERO
                                                                                          . DAP
       000106  16 00 030 0 027 00 3           M1     EICAP,RAM,A     CONT   ,DADO         .
       000107  03 00 005 0 000 00 0           M1     ,,0             CBR    TRUE,OTERM    . REPORT ERROR
                                                                                          . PATTERN FROM RAM
       000110  16 00 020 0 027 00 3   LDF2    M1     EICAP,RAM,A     CONT   ,GDEIO        . GOOD EI PATTERN
                                                                                          . FROM RAM
       000111  03 00 005 0 000 00 0           M1     ,,0             CBR    TRUE,OTERM    . GO TO OUT TERMINATE
                                                                                          . ROUTINE
                                       . ************************************************
                                       . *                                              *
                                       . * WRITE RECORD COMMAND-WRITE RECORDS ON MAU    *
                                       . *                                              *
                                       . ************************************************
       000112  16 00 001 077 2 00 3   WRRD    LD1S   AC,RAM,A        CONT   ,WCO          . WORD COUNT
       000113  03 02 116 0 000 00 0           M1     ,,0             CBR    NZ,WRRD1      . IF ZERO CONTINUE
                                                                                          . TO INPUT WORDS
                                                                                          . NOT ZERO SEND DAD
                                                                                          . EI STATUS
       000114  16 00 032 0 027 00 3           M1     EICAP,RAM,A     CONT   ,DAD2         . DAD EISTATUS
       000115  03 00 005 0 000 00 0           M1     ,,0             CBR    TRUE,OTERM    . GO TO SEND EI STATU
       000116  05 00 177 0 000 00 0   WRRD1   M1     ,,0             JSBR   TRUE,CRD      . TO COMMON READ ROUT
       000117  16 00 100 076 1 35 3           LD1    R,ODATA,A       CONT   ,RSAVW        . REC NO SAVED IN RAM
       000120  05 00 177 0 000 00 0           M1     ,,0             JSBR   TRUE,CRD      . READ LINE COUNTER
       000121  16 00 101 076 1 35 3           LD1    R,ODATA,A       CONT   ,LKSAV        . SAVE LINE COUNTER
       000122  05 00 177 0 000 00 0           M1     ,,0             JSBR   TRUE,CRD      . READ DRED NO
       000123  16 00 102 076 1 35 3           LD1    R,ODATA,A       CONT   ,PRSAV        . SAVE PRED NO
       000124  05 00 177 0 000 00 0           M1     ,,0             JSBR   TRUE,CRD      . READ LINK
       000125  16 00 103 076 1 35 3           LD1    R,ODATA,A       CONT   ,LSAV         . SAVE LINK
       000126  16 00 100 0 014 00 3           M1     MDROL,RAM,A     CONT   ,RSAVW        . REC. NO AS ADDR
       000127  16 00 000 0 040 04 2           M1     MARW,MDRL,I     CONT   ,             . FOR INIT. LOAD
       000130  16 00 100 076 2 00 3           LD1    AC,RAM,A        CONT   ,RSAVW        . REC NO TO ACC FOR
```

MICROCODE FOR HIGH SPEED SEARCH FUNCTION (HSSF)　　　　DATE 041580

```
                                                                                . TEST
000131 16 00 102 05 3 2 00 3        ACI   SUSS,AC,RAM,A    CONT   ,PRSAV        . ACC - PRSAV=,SET
                                                                                . SR
000132 16 00 001 076 2 13 2         LDI   AC,KU,I          CONT   ,01           . WRITE CMD
000133 16 00 014 04 6 2 10 2        AI    ADD,AC,KL,I      CONT   ,014          . SET FDAR TO MSB OF
                                                                                . RECORD
000134 16 00 104 06 4 3 01 3        LI    AND,AR,ACC,A     CONT   ,WR           . TO WR IN RAM
000135 16 00 360 0 013 10 2         MI    DLL,KL,I         CONT   ,0360         . MINIMIZE DELAY
000136 03 03 152 0 000 00 0         MI    ,,0              CBR    ZERO,FIRST    . IF REC NO LESS PR
                                                                                . SAV = ZERO THEN
                                                                                . AN INITIAL LOAD
                                                                                . FROM SOME STARTING
000137 16 00 102 0 016 00 3         MI    MDROU,RAM,A      CONT   ,PRSAV        . ADDR AS 0
                                                                                . THIS ROUTINE
                                                                                . APPENDS AN NEW
                                                                                . RECORD TO AN
000140 16 00 000 0 040 05 2         MI    MARW,MDRU,I      CONT   ,             . EXISTING RECORD
000141 16 00 014 0 006 10 2         MI    FDAR,KL,I        CONT   ,014          . MEM ADD FOR WRITE
000142 03 12 142 0 000 00 0         MI    ,,0              CBR    SACT,$        . READ COMMAND
000143 16 00 100 0 016 00 3         MI    MDROU,RAM,A      CONT   ,RSAVW        . WAIT FOR COMPLETE
000144 16 00 000 0 014 04 2         MI    MDROL,MDRL,I     CONT   ,             . REC # AS LINK ADDR
000145 16 00 001 076 2 13 2         LDI   AC,KU,I          CONT   ,01           . RESTORE UPPER HALF
000146 16 00 014 04 6 2 10 2        AI    ADD,AC,KL,I      CONT   ,014          . SET FDAR TO MSB OF
                                                                                . RECORD
000147 16 00 000 0 006 01 2         MI    FDAR,ACC,I       CONT   ,             . OF SLICE
000150 03 12 150 0 000 00 0         MI    ,,0              CBR    SACT,$        . WRITE BACK IN SLICE
                                                                                . TST SEQ ACTIVE
000151 16 00 000 0 040 05 2         MI    MARW,MDRU,I      CONT   ,             .
                                                                                . WRITE ADDR OF NE
000152 16 00 200 0 016 13 2  FIRST  MI    MDROU,KU,I       CONT   ,0200         . RECORD
000153 03 00 160 0 000 00 0         MI    ,,0              CBR    TRUE,WRU      . SET END
000154 05 00 177 0 000 00 0  INTLD  MI    ,,0              JSBR   TRUE,CRD      . GET UPPER FOR SLICE
000155 16 00 000 0 016 35 2         MI    MDROU,ODATA,I    CONT   ,0            . GO TO COMMON RD
000156 16 00 001 077 2 00 3         LDIS  AC,RAM,A         CONT   ,WCO          . LOAD LOWER OF SLICE
                                                                                . TEST WORD COUNT
000157 03 03 172 0 000 00 0         MI    ,,0              CBR    ZERO,WRZ      .
000160 05 00 177 0 000 00 0  WRU    MI    ,,0              JSBR   TRUE,CRD      . TO ZERO MDROU
000161 16 00 000 0 014 35 2         MI    MDROL,ODATA,I    CONT   ,0            . GET MDROU
000162 16 00 001 077 2 00 3         LDIS  AC,RAM,A         CONT   ,WCO          .
000163 03 03 173 0 000 00 0         MI    ,,0              CBR    ZERO,WRZ1     .
000164 16 00 104 0 006 00 3         MI    FDAR,RAM,A       CONT   ,WR           . WRITE THE SLICE
000165 03 12 165 0 000 00 0         MI    ,,0              CBR    SACT,$        . FDAR WRITE CMD
000166 16 00 104 076 2 00 3         LDI   AC,RAM,A         CONT   ,WR           . TST SEQ ACTIVE
000167 16 00 004 05 2 2 10 2        ACI   SBS,AC,KL,I      CONT   ,04           . NOT ZR,INC WR
                                                                                . DEC BY 04 FOR 04
000170 16 00 104 06 4 3 01 3        LI    AND,AR,ACC,A     CONT   ,WR           . 010,014
000171 03 00 154 0 000 00 0         MI    ,,0              CBR    TRUE,INTLD    . RESTORE NEW VALUE
000172 16 00 000 0 014 10 2  WRZ    MI    MDROL,KL,I       CONT   ,0            . TO GET NEXT SLICE
                                                                                . ZERO MDROU FOR WR
000173 16 00 104 0 006 00 3  WRZ1   MI    FDAR,RAM,A       CONT   ,WR           .
000174 03 12 174 0 000 00 0         MI    ,,0              CBR    SACT,$        . TST SEQ ACTIVE
                                                                                . IF NOT DELAY
```

```
MICROCODE FOR HIGH SPEED SEARCH FUNCTION (HSSF)                                                    DATE 041580
          000175  16 00 024 0 027 00 3            MI     EICAP,RAM,A         CONT    ,GDEI4        . GOOD EI=05
          000176  03 00 005 0 000 00 0            MI     ..0                 CBR     TRUE,OTERM    . OTERM THIS PAGE
                                          . ***************************************************
                                          . *                                                 *
                                          . * ROUTINE READ OUTPUT WORD FROM 502 MEMORY-READ WORD*
                                          . *              DEC WC,INC BAP AND RETURN          *
                                          . *                                                 *
                                          . ***************************************************
          000177  16 00 010 0 015 00 3    CRD     MI     OTB,RAM,A           CONT    ,OTR          . INITIATE XFER FROM
                                                                                                   . 502 MEMORY
                                                                                                   . OP/TY/DA
          000200  16 00 014 0 017 10 3            MI     RMFR,KL,A           CONT    ,014          . REQUEST BUS CYCLE
          000201  16 00 001 076 2 10 3            LDI    AC,KL,A             CONT    ,01           . LOAD INC OF 1
          000202  16 00 000 04 6 2 06 3           AI     ADD,AC,RAM,A        CONT    ,DAPO         . INC DAP
          000203  16 00 000 06 4 3 01 3           LI     AND,AR,ACC,A        CONT    ,DAPO         . SAVE DAP
          000204  16 00 001 076 2 00 3            LDI    AC,RAM,A            CONT    ,WCO          . WC TO ACC FOR DEC
          000205  16 00 001 05 3 2 10 3           ACI    SUSS,AC,KL,A        CONT    ,01           . ACC-KL(1),SET
                                                                                                   . COND FOR ZERO TEST
          000206  16 00 001 06 4 3 01 3           LI     AND,AR,ACC,A        CONT    ,WCO          . SAVE WC
          000207  03 16 207 0 000 00 2            MI     ..I                 CBR     RMFD,$        . TEST FOR BUS CYCLE
                                                                                                   . COMPLETE
          000210  16 00 000 0 025 00 3            MI     OBAP,RAM,A          CONT    ,DAPO         . BAP TO CM
          000211  16 00 001 0 024 00 3            MI     OWC,RAM,A           CONT    ,WCO          . WC TO CM
          000212  12 00 000 0 000 00 2            MI     ..I                 CRTN    .             . RETURN TO CALLER
                                          . ************************************************
                                          . *                                              *
                                          . *  COMMON WRITE ROUTINE OF 502 MEMORY          *
                                          . *                                              *
                                          . ************************************************
          000213  16 00 377 076 2 10 2    CWR     LDI    AC,KL,I             CONT    ,0377         .
          000214  16 00 017 04 6 2 13 2           AI     ADD,AC,KU,I         CONT    ,017          . MASK
          000215  16 00 002 06 4 3 20 3           LI     AND,AR,INC,A        CONT    ,WCI          .
          000216  16 00 003 076 1 21 3            LDI    R,IBAP,A            CONT    ,DAPI         . SAVE BAP FOR INC
          000217  16 00 007 0 015 00 3            MI     OTB,RAM,A           CONT    ,IDOTB        . OP TYP DA FOR RMF
                                                                                                   . BUS CYCLE
          000220  16 00 014 0 017 10 2            MI     RMFR,KL,I           CONT    ,014          . 014 TO RMFR FOR
                                                                                                   . DATA REQUEST
          000221  16 00 001 076 2 10 2            LDI    AC,KL,I             CONT    ,01           . ACC = 1 FOR WC DEC
          000222  16 00 002 05 4 2 00 3           ACI    SUB,AC,RAM,A        CONT    ,WCI          . SOURCE (WC) LESS
                                                                                                   . ACC
          000223  16 00 002 06 5 3 01 3           LI     ANDS,AR,ACC,A       CONT    ,WCI          . RESTORE WC IN
          000224  16 00 001 076 2 10 2            LDI    AC,KL,I             CONT    ,01           . ACC=1 FOR INC DAP
          000225  16 00 003 04 6 2 00 3           AI     ADD,AC,RAM,A        CONT    ,DAPI         . SOURCE (DAP) PLUS
                                                                                                   . ACC
          000226  16 00 003 06 4 3 01 3           LI     AND,AR,ACC,A        CONT    ,DAPI         . RESTORE INC DAP
          000227  03 16 227 0 000 00 2            MI     ..I                 CBR     RMFD,$        . BUS CYCLE IF NOT
                                                                                                   . DELAY HERE
          000230  16 00 003 0 021 00 3            MI     IDAP,RAM,A          CONT    ,DAPI         . DAP TO CM
          000231  16 00 002 0 020 00 3            MI     IWC,RAM,A           CONT    ,WCI          . WC TO CM
          000232  12 00 000 0 000 00 2            MI     ..I                 CRTN    .             . SUBR RETURN
                                          . ***************************************************
                                          . *                                                 *
                                          . * SEARCH RECORD(NORMAL)-THIS ROUTINE MAKES SEARCH *
                                          . *                                                 *
                                          . ***************************************************
```

MICROCODE FOR HIGH SPEED SEARCH FUNCTION (HSSF)                                DATE 041500

```
000233  03 12 233 0 000 00 0  SRCH   MI    ..0              CBR   SACT,$        . REPORT SEQUENCE
                                                                                . IN PROGRESS
000234  16 00 050 0 002 10 2  SRCH1  MI    INDR,KL,I        CONT  .050          . FOR STORING PARAM
000235  05 00 177 0 000 00 2  SRCH2  MI    ..I              JSUB  TRUE,CRD      . READ THE STARTING
                                                                                . RECORD NO. OF THE
                                                                                . SEARCH
000236  16 00 000 076 1 35 1         LDI   R,ODATA,II       CONT  .             . STORE PARAM
000237  16 00 001 077 2 00 3         LDIS  AC,RAM,A         CONT  .WCO          . TEST WC=0
000240  03 02 244 0 000 00 2         MI    ..I              CBR   NZ,SRCH3      . ALL PARAM INPUTTED
                                                                                . RETURN FOR THE
000241  16 00 001 076 2 13 2         LDI   AC,KU,I          CONT  .01           .
000242  16 00 014 04 6 2 10 2        AI    ADD,AC,KL,I      CONT  .014          .
000243  16 00 107 06 4 3 01 3        LI    AND,AR,ACC,A     CONT  .RSS          . SETUP FOR FDAR
                                                                                . REST OF THE PARAM
000244  16 00 053 0 002 10 2  SRCH3  MI    INDR,KL,I        CONT  .053          . SETUP INDEX REF WOR
000245  16 00 360 0 013 10 3         MI    DEL,KL,A         CONT  .0360         . MIN DELAY
000246  16 00 050 0 014 00 3         MI    MDROL,RAM,A      CONT  .WR50         . MOVE START REC NO
000247  16 00 000 0 042 04 2         MI    MARR,MDRL,I      CONT  .             . TO MAR
000250  16 00 003 076 2 13 2         LDI   AC,KU,I          CONT  .03           . FORM ADDR FOR
000251  16 00 377 04 6 2 10 2        AI    ADD,AC,KL,I      CONT  .0377         . REF WORD=1022 DEC
000252  16 00 000 0 014 01 2         MI    MDROL,ACC,I      CONT  .             . MOVE ADDR TO
000253  16 00 000 0 043 04 2         MI    MAR1,MDRL,I      CONT  .             . MAR1 AND
000254  16 00 050 0 040 04 2         MI    MARW,MDRL,I      CONT  .             . MARW
000255  16 00 000 076 2 10 2         LDI   AC,KL,I          CONT  .0            . CLEAR ACC
000256  16 00 052 05 2 2 00 3        ACI   SBS,AC,RAM,A     CONT  .WR52         . COMPLIMENT LIMIT
000257  16 00 000 0 007 01 2         MI    SCR,ACC,I        CONT  .             . STORE LIMIT
000260  16 00 003 0 010 10 2         MI    VECH,KL,I        CONT  .03           . SETUP 2910 TO CYCLE
000261  06 01 000 0 003 00 2         MI    LCTR,,I          CJD   FALSE,        . FOUR TIMES
000262  16 00 000 0 016 00 1  SRCH4  MI    MDRDU,RAM,II     CONT  .             . STORE REFERENCE
000263  16 00 000 0 014 00 1         MI    MDROL,RAM,II     CONT  .             . WORD
000264  16 00 107 0 006 00 3         MI    FDAR,RAM,A       CONT  .RSS          . INIT STORE
000265  16 00 107 076 2 00 3         LDI   AC,RAM,A         CONT  .RSS          . DEC FOUR TO
000266  16 00 014 05 2 2 10 2        ACI   SBS,AC,KL,I      CONT  .014          . RSS TO GET
000267  16 00 107 06 4 3 01 3        LI    AND,AR,ACC,A     CONT  .RSS          . NEXT SLICE VALUE
000270  03 12 270 0 000 00 2         MI    ..I              CBR   SACT,$        . WAIT ON SEQ ACTIVE
000271  11 00 262 0 000 00 2         MI    ..I*             RPBA  .SRCH4        . LOOP FOUR TIMES
000272  03 00 273 0 012 00 2         MI    ZDMA,,I          CBR   TRUE,SRCH5    .
000273  16 00 015 0 004 00 3  SRCH5  MI    CMD,RAM,A        CONT  .REOD         . RESET ODA
000274  16 00 360 0 013 10 2         MI    DEL,KL,I         CONT  .0360         . MIN DELAY!!!!!!!
                                                                                . WILL NEED TO CHANGE
                                                                                . LATCH TO CALCULATED
                                                                                . DELAY FROM FORMAT
000275  16 00 377 076 2 10 2         LDI   AC,KL,I          CONT  .0377         . MASK FOR LINK FIELD
000276  16 00 051 06 4 2 00 3        LI    AND,AC,RAM,A     CONT  .WR51         . LINK FIELD TO ACC
000277  16 00 004 06 2 2 13 2        LI    OR,AC,KU,I       CONT  .04           . SET SEARCH BIT
000300  16 00 000 0 006 01 2         MI    FDAR,ACC,I       CONT  .             . INITIATE SEARCH
                                                                                . FOR 0200 RL=0
000301  03 00 313 2 000 00 0  SRCH6  M2    ..0              CBR   IDA,SRCH8     . TEST IN DATA ACTIVE
                                                                                . CHECK ICR
000302  16 00 000 076 2 26 2  SRCH7  LDI   AC,OCAP,I        CONT  .             . TO SEND ICR TO 502
000303  16 00 000 0 027 01 2         MI    EICAP,ACC,I      CONT  .             . CM OCAP TO ACC
000304  16 00 145 0 037 10 3         MI    IVECT,KL,A       CONT  .0145         . OCAP TO EICAP
                                                                                . OUT CHAIN REQ
```

```
MICROCODE FOR HIGH SPEED SEARCH FUNCTION (HSSF)                                                DATE 041580
        000305  16 00 006 0 015 00 3            MI    OIB,RAM,A        CONT  .06            . OP/TY/BA
        000306  16 00 012 0 017 10 2            MI    RMFR,KL,I        CONT  .012           . BUS CYCLE REQ
        000307  16 00 000 0 000 00 0            MI    ..0              CONT  .              . DELAY FOR RMFB
                                                                                            . SAMPLE
        000310  03 16 310 0 000 00 0            MI    ..0              CBR   RMFB,$         . RMF BUSY
        000311  03 17 311 0 000 00 0            MI    ..0              CBR   IOSE,$         . TEST IO SCAN
        000312  03 00 301 0 000 00 0            MI    ..0              CBR   TRUE,SRCHG     . RETURN TO CHECK
                                                                                            .   IO ACTIVE
        000313  16 00 207 076 3 21 3   SRCHB    LDI   AR,IBAP,A        CONT  .BAPH          . SAVE BAP FOR HT CNT
        000314  16 00 001 04 6 2 10 2           AI    ADD,AC,KL,I      CONT  .01            . INCR BAP FOR HITS
        000315  16 00 000 0 021 01 2            MI    IBAP,ACC,I       CONT  .              . WRITE BAP
        000316  03 14 327 0 000 00 0   SRCHOH   MI    ..0              CBR   NOHIT,SRCHUN   . CHECK FOR HIT
        000317  16 00 000 077 2 20 2            LDIS  AC,IWC,I         CONT  .0             . TEST WC=0
        000320  03 03 340 0 000 00 2            MI    ..1              CBR   ZERO,SRCH10    . FOR OVERFLOW EI
                                                                                            . WHERE USERS INPUT
                                                                                            . BUFFER NOT LARGE
                                                                                            . ENOUGH,WC=0 AND HIT
        000321  16 00 377 076 2 10 2            LDI   AC,KL,I          CONT  .0377          . MASK
        000322  16 00 017 04 6 2 13 2           AI    ADD,AC,KU,I      CONT  .017           .
        000323  16 00 000 0 001 10 2            MI    DLCHP,KL,I       CONT  .0             . SIMPLY ADDR DECHP
                                                                                            . TO DECREMENT
                                                                                            . COUNTER
        000324  16 00 000 06 4 2 02 2           LI    AND,AC,HITR,I    CONT  .0             .
        000325  05 00 213 0 031 01 2            MI    IDATA,ACC,I      JSDR  TRUE,CWR       . HIT ADDR TO 502
        000326  03 00 316 0 000 00 0            MI    ..0              CBR   TRUE,SRCHBH    . WC NOT ZERO,COUNT
                                                                                            . SEARCH SEQ
        000327  03 12 326 0 000 00 0   SRCHUN   MI    ..0              CBR   SACT,$-1       . NOT HIT CHECK FOR
                                                                                            . SEQ ACTIVE, IF
                                                                                            . ACTIVE CHECK FOR
                                                                                            . HIT AGAIN
        000330  16 00 011 0 027 10 2   SRCHOB   MI    EICAP,KL,I       CONT  .011           . SEQ NOT ACTIVE
        000331  16 00 207 0 021 00 3   SRCHBA   MI    IBAP,RAM,A       CONT  .BAPH          . HIT COUNT ADDR
                                                                                            . GOOD EI STATUS TO 5
        000332  16 00 000 0 005 10 2            MI    SPSE,KL,I        CONT  .              . STOP THE SEARCH
        000333  16 00 115 0 031 00 3            MI    IDATA,RAM,A      CONT  .HCNT          . HIT COUNT FROM RAM
        000334  05 00 213 0 000 00 0            MI    ..0              JSDR  TRUE,CWR       . TO COMMON FOR
                                                                                            . WRITING INTO 502
                                                                                            . MEMORY-WRITE HIT CO
        000335  16 00 000 076 2 10 0            LDI   AC,KL,0          CONT  .0             . ZERO HIT COUNT
        000336  16 00 115 076 1 01 3            LDI   R,ACC,A          CONT  .HCNT          . HCNT=0 FOR NT PASS
        000337  03 00 002 0 000 00 0            MI    ..0              CBR   TRUE,ITERM     . SEARCH COMPLETE
                                                                                            . GO TO TERM XFR
                                                                                            . AND REPORT EI
                                                                                            . STATUS
        000340  16 00 046 0 027 00 3   SRCH10   MI    EICAP,RAM,A      CONT  .OFW           . OVERFLOW EI STATUS
        000341  03 00 330 0 000 00 0            MI    ..0              CBR   TRUE,SRCHOB    . TO 502 MEMORY
                                                                                            . AFTER REPORT OF
                                                                                            . HIT COUNT
                                                SETADR 0375                                 .
        000375  16 00 001 04 6 2 13 2  THP      AI    ADD,AC,KU,I      CONT  .01            .
        000376  16 00 000 0 010 01 2            MI    VECR,ACC,I       CONT  .              .
        000377  06 00 000 0 000 00 0            MI    ..0              CJD   TRUE,          .
```

```
MICROCODE FOR HIGH SPEED SEARCH FUNCTION (HSSF)                                                  DATE 041500
                                                  ........................................
                                                  . .                                    .
                                                  . .  COMMAND JUMP TABLE-OUTPUT DATA COMMAND .
                                                  . .   READS.FUNCTION WORD TO DETERM JUMP  .
                                                  . .        FROM    TABLE                  .
                                                  . .                                    .
                                                  ........................................
                                                          SETADR    0400 . SSSSSSSSSSSSSSSSSSSSSSSSSSSSSSSSSSSSSSSSSSSSSSSS
          000400  00 00 000 0 000 00 0                    MI      ..0               J2       .            . MASTER CLEAR
  T       000401  03 00 020 0 000 00 0                    MI      ..0               CBR      TRUE,LDFFX   . FC = 0
                                                                                                          . LOAD FIELD FORMA
  T       000402  03 00 106 0 000 00 0                    MI      ..0               CBR      TRUE,LFCN    . ROUTINE
                                                                                                          . LOAD FIELD COMP
  T       000403  03 00 335 0 000 00 0                    MI      ..0               CBR      TRUE,ERRO    . NORMAL
  T       000404  03 00 143 0 000 00 0                    MI      ..0               CBR      TRUE,LBCX    . LOAD FIELD COMP RAN
  T       000405  03 00 022 0 000 00 0                    MI      ..0               CBR      TRUE,WRRDX   . LOAD BOOLEAN EXPRES
  T       000406  03 00 335 0 000 00 0                    MI      ..0               CBR      TRUE,ERRO    . WRITE RECORD
  T       000407  03 00 024 0 000 00 0                    MI      ..0               CBR      TRUE,RDREX   . UPDATE RECORD
  T       000410  03 00 335 0 000 00 0                    MI      ..0               CBR      TRUE,ERRO    . READ RECORD
  T       000411  03 00 026 0 000 00 0                    MI      ..0               CBR      TRUE,SRCHX   . DELETE RECORD
  T       000412  03 00 335 0 000 00 0                    MI      ..0               CBR      TRUE,ERRO    . SEARCH NORMAL
  T       000413  03 00 335 0 000 00 0                    MI      ..0               CBR      TRUE,ERRO    . SEARCH RANGE
  T       000414  03 00 335 0 000 00 0                    MI      ..0               CBR      TRUE,ERRO    . FUNCTION CODE
  T       000415  03 00 335 0 000 00 0                    MI      ..0               CBR      TRUE,ERRO    .    ERROR
  T       000416  03 00 335 0 000 00 0                    MI      ..0               CBR      TRUE,ERRO    .
  T       000417  03 00 335 0 000 00 0                    MI      ..0               CBR      TRUE,ERRO    .
          000420  16 00 077 0 010 10 2           LDFFX    MI      VLCR,KL,I         CONT     ,LDFF        .
          000421  06 00 000 0 000 00 0                    MI      ..0               CJD      TRUE,        . INTER PAGE JUMP
          000422  16 00 112 0 010 10 2           WRRDX    MI      VECR,KL,I         CONT     ,WRRD        . TO LOWER PAGE
          000423  06 00 000 0 000 00 0                    MI      ..0               CJD      TRUE,        . WHERE THESE
          000424  16 00 017 0 011 10 2           RDREX    MI      VECR,KL,I         CONT     ,RDRE        . ROUTINES ARE
          000425  06 00 000 0 000 00 0                    MI      ..0               CJD      TRUE,        .
          000426  16 00 233 0 010 10 2           SRCHX    MI      VECR,KL,I         CONT     ,SRCH        .
          000427  06 00 000 0 000 00 0                    MI      ..0               CJD      TRUE,        .
          000430  16 00 064 0 010 10 2           SCAN     MI      VECR,KL,I         CONT     ,IDLE        .
                                                                                                          . RETURN TO INT
          000431  06 00 000 0 000 00 0           TLP      MI      ..0               CJD      TRUE,        . AND HANDLER
                                                 ..................................................      .
                                                 . .                                              .
                                                 . .  INPUT CHAIN REQUEST-RESPONSE TO 502 INPUT CHAIN .
                                                 . .                     REQUEST                  .
                                                 . .                                              .
                                                 ..................................................
  /       000356  16 00 001 077 2 10 2                    SETADR 0356                . SSSSSSSSSSSSSSSSSSSSSSSSSSSSSSSSS
          000357  16 00 116 0 037 00 3           EIST     LDIS    AC,KL,I           CONT     ,01          . SET FLAG FOR EI DAT
                                                          MI      IVECT,RAM,A       CONT     ,EVEC        . IVECT WITH PROPER
          000360  16 00 002 0 004 13 2                                                                    . VALUE
          000361  03 00 365 0 00C 00 2                    MI      CMD,KU,I          CONT     ,02          . CLR EI DATA ENA
          000362  16 00 000 076 2 22 2                    MI      ..I               CBR      TRUE,ICRI    . DO BUS CYCLE
          000363  16 00 000 0 027 01 2           ICR      LDI     AC,ICAP,I         CONT     .            . CM OCAP TO ACC
                                                          MI      EICAP,ACC,I       CONT     .            . MOVE OCAP THRU ACC
                                                                                                          . TO EICAP
```

```
MICROCODE FOR HIGH SPEED SEARCH FUNCTION (HSSF)                                                DATE 041580
      000364  16 00 143 0 037 10 3           MI     IVECT,KL,A       CONT   ,0143          . IN CHAIN REQUEST
                                                                                           .   FROM RAM TO CM
                                                                                           .   (IVECT)
      000365  16 00 006 0 015 00 3   ICRI    MI     OTB,RAM,A        CONT   ,06            . VECTOR OTB RAM
                                                                                           . ADDR 06 TO OP,
                                                                                           . TYPE,BUS ADDR
                                                                                           . SAMPLE
      000366  16 00 012 0 017 10 2           MI     RMFR,KL,I        CONT   ,012           . CHAIN REQUEST TO
      000367  16 00 000 0 000 00 0           MI     ,,0              CONT   ,              . DELAY FOR RMFB
                                                                                           . RMF BUS
      000370  03 16 370 0 000 00 0           MI     ,,0              CBR    RMFB,$         . WAIT FOR RMF BUS
                                                                                           . COMPLETE, IF RMFB
      000371  03 02 373 0 000 00 0           MI     ,,0              CBR    NZ,$+2         . FALSE,CONTINUE
      000372  03 00 004 0 030 00 0           MI     ,,0              CBR    TRUE,IDLE      . RETURN TO IDLE -
                                                                                           . INTERRUPT HANDLER
T     000373  03 11 030 0 000 00 2           MI     ,,I              CBR    LKOUT,SCAN     . IF INT'S LOCKED
                                                                                           . OUT GO TO SCAN
      000374  03 00 010 0 000 00 2           MI     ,,I              CBR    TRUE,SCHI      . SEND CI
                                     . *************************************************
                                     . *                                               *
                                     . * OUTPUT CHAIN REQUEST-RESPONDES TO 502 OUT CHAIN *
                                     .                 REQUEST                          *
                                     . *************************************************
                                             SETADR 0432                . SSSSSSSSSSSSSSSSSSSSSSSSSSSSSSSSSSS
      000432  16 00 000 076 2 26 2   OCR     LDI    AC,OCAP,I        CONT   ,              . CM OCAP TO ACC
      000433  16 00 000 0 027 01 2           MI     EICAP,ACC,I      CONT   ,              . MOVE OCAP THRU ACC
                                                                                           . TO EICAP
      000434  16 00 145 0 037 10 3           MI     IVECT,KL,A       CONT   ,0145          . OUT CHAIN REQ
                                                                                           . VECTOR FROM RAM
                                                                                           . TO CM (IVECT)
      000435  16 00 006 0 015 00 3           MI     OTB,RAM,A        CONT   ,06            . VECTOR OTB RAM
                                                                                           . ADDR 06 TO OP
                                                                                           . TYPE,BUS ADDR
      000436  16 00 012 0 017 10 2           MI     RMFR,KL,I        CONT   ,012           . CHAIN REQUEST
                                                                                           . TO RMF BUS
      000437  16 00 000 0 000 00 0           MI     ,,0              CONT   ,              . DELAY FOR RMFB
                                                                                           . SAMPLE
T     000440  03 16 040 0 000 00 0           MI     ,,0              CBR    RMFB,$         . WAIT FOR RMF BUS
                                                                                           . COMPLETE, IF RMFB
                                                                                           . FALSE,CONTINUE
T     000441  03 00 030 0 000 00 0           MI     ,,0              CBR    TRUE,SCAN      . RETURN TO IDLE-
                                                                                           . INTERRUPT HANDLER
                                     . *************************************************
                                     . *                                               *
                                     . * INPUT CHAIN INTERRUPT-RESOURCE TO 502 INPUT CHAIN*
                                     . *                                               *
                                     . *************************************************
      000442  16 00 142 0 037 10 3   ICIX    MI     IVECT,KL,A       CONT   ,0142          . IN CHAIN INT
                                                                                           . VECTOR CONTENTS
                                                                                           . FROM RAM ADDR 02
                                                                                           . TO CM (IVECT)
      000443  16 00 006 0 015 00 3           MI     OTB,RAM,A        CONT   ,06            . VECTOR OTB RAM
                                                                                           . ADDR 06 TO OP,
```

```
MICROCODE FOR HIGH SPEED SEARCH FUNCTION (HSSF)                                                DATE 041500

      000444  16 00 013 0 017 10 2          MI    RMFR,KL,I     CONT   ,013         . TYPE,BUS ADDR
                                                                                     . INTERRUPT REQ TO
      000445  16 00 000 0 000 00 0          MI    ,,0           CONT   ,            . RMF BUS
                                                                                     . DELAY FOR RMFD
T     000446  03 16 046 0 000 00 0          MI    ,,0           CBR    RMFD,$       . SAMPLE
                                                                                     . WAIT FOR RMF BUS
                                                                                     . COMPLETE,IF RMFD
      000447  16 00 013 0 004 00 3          MI    CMD,RAM,A     CONT   ,RCIR        . FALSE,CONTINUE
                                                                                     . RESET IN CHAIN
                                                                                     . INTERRUPT REQ BY
                                                                                     . CONTENTS OF RAM
T     000450  03 00 030 0 000 00 0          MI    ,,0           CBR    TRUE,SCAN    . ADD7 011
                                                                                     . RETURN TO IDLE-
                                  *********************************************     . INTERRUPT HANDLER
                                  * *                                         *
                                  * * OUTPUT CHAIN INTERRUPT-RESPONSES TO 502 OUTPUT *
                                  * *              CHAIN                          *
                                  * *                                         *
                                  *********************************************
      000451  16 00 144 0 037 10 3  OCIX    MI    IVECT,KL,A    CONT   ,0144        . OUT CHAIN INT
                                                                                     . VECTOR CONTENTS
                                                                                     . FROM RAM ADDR 04
                                                                                     . IOCM (IVECT)
      000452  16 00 006 0 015 00 3          MI    OTB,RAM,A     CONT   ,06          . VECTOR OTB RAM
                                                                                     . ADDR 06 TO OP,TYPE,
                                                                                     . BUS ADDR
      000453  16 00 013 0 017 10 2          MI    RMFR,KL,I     CONT   ,013         . INTERRUPT REQ TO
      000454  16 00 000 0 000 00 0          MI    ,,0           CONT   ,            . RMF BUS
                                                                                     . DELAY FOR RMFB
T     000455  03 16 055 0 000 00 0          MI    ,,0           CBR    RMFB,$       . SAMPLE
                                                                                       . WAIT FOR RMF BU
                                                                                     . COMPLETE,IF RMFB
      000456  16 00 013 0 004 00 3          MI    CMD,RAM,A     CONT   ,RCIR        . FALSE CONTINUE
                                                                                     . RESET OUT CHAIN
                                                                                     . INT FF BY CONTENTS
T     000457  03 00 030 0 000 00 0          MI    ,,0           CBR    TRUE,SCAN    . OF RAM ADDR 07
                                                                                     . RETURN TO IDLE-
                                  ***************************************           . INTERRUPT HANDLER
                                  * *                                   *
                                  * * OUTPUT COMMAND FROM 502-INPUT THE FUN.CODE*
                                  * * AS 1ST WORD AND JUMP TO JUMP TABLE *
                                  * *                                   *
                                  ***************************************
      000460  16 00 000 076 1 25 3  OUTD    LDI   R,OUAP,A      CONT   ,BAPO        . BUFFER POINTER T
      000461  16 00 377 076 2 10 2          LDI   AC,KL,I       CONT   ,0377        . MASK
                                                                                     . RAM SO WE CAN DO
                                                                                     . OTHER OPS WHILE
                                                                                     . BUS BUSY
      000462  16 00 001 06 4 1 24 3         LI    AND,R,OWC,A   CONT   ,WCO         . WORD COUNT SAVE
                                                                                     . LATER DEC
```

```
MICROCODE FOR HIGH SPEED SEARCH FUNCTION (HSSF)                                                DATE 041580
        000463  16 00 010 0 015 00 3          M1    OTR,RAM,A          CONT    ,OTR          . OP/TYPE/DA FOR 502
                                                                                             . MEMORY READ
        000464  16 00 014 0 017 10 2          M1    RMFR,KL,I          CONT    ,014          . RMF REQ REG WITH
                                                                                             . DATA REQ TO 502
        000465  16 00 001 076 2 00 3          LD1   AC,RAM,A           CONT    ,WCO          . WORD COUNT TO ACC
        000466  16 00 001 05 3 2 10 2         AC1   SUBS,AC,KL,I       CONT    ,01           . WORD COUNT LESS 1
        000467  16 00 001 06 4 3 01 3         L1    AND,AR,ACC,A       CONT    ,WCO          . RESTORE WC
        000470  16 00 001 076 2 10 3          LD1   AC,KL,A            CONT    ,01           . 1 TO ACC
        000471  16 00 000 04 6 2 00 3         A1    ADD,AC,RAM,A       CONT    ,BAPO         . INC BUFFER ADD
                                                                                             . POINTER BY ONE
        000472  16 00 000 06 4 3 01 3         L1    AND,AR,ACC,A       CONT    ,BAPO         . RESTORE BAP
T       000473  03 16 073 0 000 00 0          M1    ,,0                CBR     RMFD,$        . JUMP TO SELF UNTIL
                                                                                             . RMF BUS NOT BUSY
        000474  16 00 000 0 025 00 3          M1    OBAP,RAM,A         CONT    ,BAPO         . RESTORE BAP AND WC
        000475  16 00 001 0 024 00 3          M1    OWC,RAM,A          CONT    ,WCO          . FOR NEXT WORD
        000476  16 00 000 076 2 35 2          LD1   AC,ODATA,I         CONT    .             . FIRST WORD OF BUF
                                                                                             . AVAILABLE AS
                                                                                             . FUN CODE - TO ACC
        000477  16 00 001 04 6 2 13 2         A1    ADD,AC,KU,I        CONT    ,01           . ADD INDEX OF 0400
                                                                                             . TO BRANCH TO
                                                                                             . JUMP TABLE
        000500  16 00 000 0 010 01 2          M1    VECR,ACC,I         CONT    .             . PLACE CORRECT ADDR
                                                                                             . FOR JUMP TABLE
        000501  06 00 000 0 000 00 0          M1    ,,0                CJD     .             . STARTING AT 064
                                  . ******************************************************
                                  . *                                                    *
                                  . * EI DATA-CHECK THE EI DATA ENABLE CONDITION AND     *
                                  . * REPORT EI GOOD/BAD STATUS                          *
                                  . *                                                    *
                                  . ******************************************************
T       000502  03 07 104 2 000 00 0   EIDAT  M2    ,,0                CBR     EIE,EIDA1     . TEST EIE NOT ENA
T       000503  03 00 030 0 000 00 0          M1    ,,0                CBR     TRUE,SCAN     . IF NOT CONTINUE
                                                                                             . TO JSCAN
        000504  16 00 356 0 010 10 2   EIDA1  M1    VECR,KL,I          CONT    ,CIST         . IF EIE ENA SEND
                                                                                             . EI STATUS -
        000505  06 00 000 0 000 00 0          M1    ,,0                CJD     TRUE,         . TO DO BUS CYCLE
                                  . ***************************************************
                                  . *                                                 *
                                  . *  LOAD FIELD COMPARISON WORD(NORMAL)-DEFINES THE *
                                  . *          INEQUALITIES FOR EACH FIELD OF RECORD  *
                                  . *                                                 *
                                  . ***************************************************
        000506  16 00 360 076 2 10 3   LFCN   LD1   AC,KL,A            CONT    ,0360         . LOAD DELAY REGISTER
        000507  16 00 210 06 4 3 01 3         L1    AND,AR,ACC,A       CONT    ,DELSA        . SAVE FOR LATER USE
T       000510  03 02 114 0 000 00 0          M1    ,,0                CBR     NZ,LFCNO      . IF WC INPUT
                                                                                             . DATA WORDS
        000511  16 00 031 0 027 00 3   ERRC   M1    EICAP,RAM,A        CONT    ,BAD1         . ERROR ENTRY
                                                                                             . STATUS PAT FROM
                                                                                             . RAM
        000512  16 00 005 0 010 10 2   ERRC1  M1    VECR,KL,I          CONT    ,OTERM        . TO SEND EI
        000513  06 00 000 0 000 00 0          M1    ,,0                CJD     TRUE,         . PAGE JUMP
        000514  16 00 177 0 010 10 2   LFCNO  M1    VECR,KL,I          CONT    ,CRO          . PAGE 0 JUMP
                                                                                             . PAGE 0 JUMP
```

```
MICROCODE FOR HIGH SPEED SEARCH FUNCTION (HSSF)                                                  DATE 041500
T   000515  05 00 031 0 000 00 0          MI    ..0                 JSBR   TRUE,TLP       . TO COMMON READ(PAGE
                                                                                          . 502 MEMORY ROUT
    000516  16 00 000 076 2 06 2          LD1   AC,ONE,I            CONT   .              . ALL 1'S TO ACC
    000517  16 00 050 06 0 3 35 3         L1    EOR,AR,ODATA,A      CONT   ,WR50          . COMP FLD CMPR SAVE
T   000520  05 00 130 0 014 01 2          MI    MDROL,ACC,I         JSDR   TRUE,WCOMP     . SEND TO FLD CP REG
                                                                                          . JP TO WRT FC ROUT
    000521  16 00 007 0 010 10 2  LFCN1   MI    VLCR,KL,I           CONT   ,07            . TO LOAD 2910
    000522  06 01 000 0 003 03 2          MI    LCTR,SFUD3,I        CJD    FALSE,         . COUNTER
    000523  16 00 050 076 2 06 3          LD1   AC,RAM,A            CONT   ,WR50          . SHIFT 8 TIMES
T   000524  11 00 124 100 3 0 2           SR1   UNO,I               RPDA   ,$             .
T   000525  05 00 130 0 014 01 2          MI    MDROL,ACC,I         JSBR   TRUE,WCOMP     . WRITE NEXT BYTE
T   000526  03 03 141 0 000 00 0          MI    ..0,                CBR    ZERO,LFCN3     . EXIT
T   000527  03 00 114 0 000 00 0          MI    ..0                 CBR    TRUE,LFCN0     .
    000530  16 00 210 0 013 00 3  WCOMP   MI    DEL,RAM,A           CONT   ,DELSA         . LOAD DELAY REG
    000531  16 00 004 076 2 10 2          LD1   AC,KL,I             CONT   ,04            . FOR FDAR FOR
                                                                                          . COMP WRITE
    000532  16 00 002 04 6 2 13 2         A1    ADD,AC,KU,I         CONT   ,02            .
    000533  16 00 000 0 006 01 2          MI    FDAR,ACC,I          CONT   .              .
    000534  16 00 001 077 2 00 3          LD1S  AC,RAM,A            CONT   ,WC0           . TEST WC FOR 0
                                                                                          .
    000535  16 00 210 076 2 00 3          LD1   AC,RAM,A            CONT   ,DELSA         . NEED TO INC FLD
                                                                                          . COMP MEM ADDR
    000536  16 00 210 05 6 3 11 3         AC1   ADD,AR,KZ,A         CONT   ,DELSA         . INC ACC
T   000537  03 12 137 0 000 00 0          MI    ..0                 CBR    SACT,$         . DELAY FOR SEQ
    000540  12 00 000 0 000 00 0          MI    ..0                 CRTN   TRUE,          . RETURN FOR 2ND
                                                                                          . WORD IF CNTR NOT 0
    000541  16 00 021 0 027 00 3  LFCN3   MI    EICAP,RAM,A         CONT   ,GOEI1         . PAIT FROM RAM FOR
                                                                                          . GOOD EI
T   000542  03 00 112 0 000 00 0          MI    ..0                CBR    TRUE,ERRC1      . PAGE JUMP TO OTERM
                                  . ***********************************************************
                                  . *                                                         *
                                  . * LOAD FIELD COMPARISON WORD RANGE-TO BE PROVIDED         *
                                  . *     LATER-FOR NOW JUMP TO ERROR ROUTINE                 *
                                  . *                                                         *
                                  . ***********************************************************
                                  . ***********************************************************
                                  . *                                                         *
                                  . * DELETE RECORD-A RECORD WILL BE DELETED FROM THE         *
                                  . *             LINK RECORD FILE-TO BE ADDED LATER          *
                                  . *                                                         *
                                  . ***********************************************************
                                  . ***********************************************************
                                  . *                                                         *
                                  . * SEARCH RECORD(RANGE) - TO BE ADDED LATER                *
                                  . *                                                         *
                                  . ***********************************************************
                                  . ***********************************************************
                                  . *                                                         *
                                  . * UPDATE RECORD - TO BE ADDED LATER                       *
                                  . *                                                         *
                                  . ***********************************************************
                                  . ***********************************************************
                                  . *                                                         *
```

```
MICROCODE FOR HIGH SPEED SEARCH FUNCTION (HSSF)                                                    DATE 041580
                                                     . * LOAD BOOLEAN EXPRESSION-ROUTINE TAKES USES      *     . (CHAR COUNT MUST
                                                     . *  EXPRESS AND MAKES IT PART OF THE SEARCH        *     . BE EVEN NUMBER)
                                                     . *                                                 *
                                                     . ***************************************************
      000543  16 00 212 076 2 10 2   LBEX   LD1   AC,KL,I          CONT   ,0212         . NOT CLEARED IF
      000544  16 00 211 06 4 3 01 3         L1    AND,AR,ACC,A     CONT   ,BSCNT        . AN ERROR HAPPENS
      000545  16 00 177 0 010 10 2          MI    VECR,KL,I        CONT   ,CRD          . TO LOWER PAGE FOR
   T  000546  05 00 031 0 000 00 0          MI    ,,0              JSBR   ,TLP          . COMM RD ROUTINE
                                                                                        . RD FIRST WORD FR
                                                                                        . 502 MEM AS CHAR
                                                                                        . COUNT
      000547  16 00 001 076 2 10 2          LD1   AC,KL,I          CONT   ,01           . SET 1ST CHAR
      000550  16 00 201 06 4 3 01 3         L1    AND,AR,ACC,A     CONT   ,CHFLG        . FLAG
      000551  16 00 121 076 1 35 3          LD1   R,ODATA,A        CONT   ,CCSAV        . SAVE CHAR COUNT
      000552  16 00 121 077 2 00 3          LD1S  AC,RAM,A         CONT   ,CCSAV        . TEST CHAR CNT=0
   T  000553  03 03 312 0 000 00 0          MI    ,,0              CBR    ZERO,XX1-1    . IF ZERO SR SET,ERR
      000554  16 00 046 076 2 13 2   OPRND  LD1   AC,KU,I          CONT   ,046          . ACC=LD FOR OP INST
                                                                                        . BITS 13,12,11
      000555  16 00 206 06 4 3 01 3         L1    AND,AR,ACC,A     CONT   ,INST         . LOAD RAM CELL WITH
      000556  16 00 177 0 010 10 2   OP1    MI    VECR,KL,I        CONT   ,CRD          . COMM RD IN PAGE 0
   T  000557  05 00 031 0 000 00 0          MI    ,,0              JSBR   ,TLP          . TO INTERPAGE JP
      000560  16 00 002 076 2 10 2          LD1   AC,KL,I          CONT   ,02           .
      000561  16 00 121 05 4 2 00 3         AC1   SBA,AC,RAM,A     CONT   ,CCSAV        . CCSAV-2
      000562  16 00 121 06 4 3 01 3         L1    AND,AR,ACC,A     CONT   ,CCSAV        .
      000563  16 00 000 076 2 35 2          LD1   AC,ODATA,I       CONT   ,             . LOAD BOTH CHAR BYT
      000564  16 00 377 06 4 2 10 2         L1    AND,AC,KL,I      CONT   ,0377         . MASK FOR 2ND CHAR
      000565  16 00 301 06 4 3 01 3         L1    AND,AR,ACC,A     CONT   ,CSAV3        . SAVE FOR LATER
      000566  16 00 000 076 2 35 2          LD1   AC,ODATA,I       CONT   ,             . USE LOAD BOTH
                 *                                                                      . CHAR'S
      000567  16 00 007 0 010 10 2          MI    VECR,KL,I        CONT   ,07           . TO LOAD 2910
      000570  06 01 000 0 003 03 2          MI    LCTR,SFUD3,I     CJD    FALSE,        . COUNTER FOR
                                                                                        . 8 SHIFTS
      000571  16 00 000 160 3 0 2           SR1   UNO,I            CONT   ,             .
   T  000572  11 00 171 0 000 00 0          MI    ,,0              RPBA   ,$-1          . SHIFT AGAIN UNTIL
                                                                                        . COUNTER=0
      000573  16 00 377 06 4 2 10 2         L1    AND,AC,KL,I      CONT   ,0377         . MASK
      000574  16 00 117 06 4 3 01 3         L1    AND,AR,ACC,A     CONT   ,CSAV1        . SAVE MASKED NO
      000575  16 00 201 077 2 00 3          LD1S  AC,RAM,A         CONT   ,CHFLG        . TST 1ST CHAR
   T  000576  03 03 205 0 000 00 0          MI    ,,0              CBR    ZERO,FDCH     . IF NOT 1ST CHAR
      000577  16 00 117 076 2 00 3          LD1   AC,RAM,A         CONT   ,CSAV1        . EXAMINE OTHER
                                                                                        .  CHARACTERS
      000600  16 00 177 05 5 2 10 2         AC1   SBAS,AC,KL,I     CONT   ,0177         . YES CONTINUE
      000601  16 00 201 04 0 3 00 3         A1    ZR,AR,RAM,A      CONT   ,CHFLG        . ZERO FLAG
   T  000602  03 04 245 0 000 00 0          MI    ,,0              CBR    NEG,NOTF      . SOUR-ACC-+VE CHAR
   T  000603  03 05 253 0 000 00 0          MI    ,,0              CBR    POS,FTCH      .
   T  000604  03 00 312 0 000 00 0          MI    ,,0              CBR    TRUE,XX1-1    . ERROR
      000605  16 00 001 0 010 10 2   FDCH   MI    VECR,KL,I        CONT   ,01           .
      000606  06 01 000 0 003 03 2          MI    LCTR,SFUD3,I     CJD    FALSE,        . CTR = 01
      000607  16 00 117 076 2 00 3   FDCH1  LD1   AC,RAM,A         CONT   ,CSAV1        .
      000610  16 00 302 06 4 3 01 3  FDCH2  L1    AND,AR,ACC,A     CONT   ,CSAV4        .
      000611  16 00 177 05 5 2 10 2         AC1   SBAS,AC,KL,I     CONT   ,0177         . SOUR-ACC=+VE FOR
                                                                                        . CHAR
```

```
MICROCODE FOR HIGH SPEED SEARCH FUNCTION (HSSF)                                                DATE 041500
T   000612  03 04 222 0 000 00 0            MI    ..0             CBR    NEG,NOT      . MAYBE NOT
T   000613  11 00 217 0 000 00 0            MI    ..0             RPBA   ,$+4         . TREAT CHAR
    000614  16 00 301 076 2 00 3            LDI   AC,RAM,A        CONT   ,CSAV3       . CHAR IN UPPER BYTE
    000615  16 00 300 06 4 3 01 3           LI    AND,AR,ACC,A    CONT   ,CSAV0       . READ
T   000616  03 00 276 0 000 00 0            MI    ..0             CBR    TRUE,OPER    . FORM THE BEM INST
    000617  16 00 117 076 2 00 3            LDI   AC,RAM,A        CONT   ,CSAV1       . FORM BEM INST
    000620  16 00 300 06 4 3 01 3           LI    AND,AR,ACC,A    CONT   ,CSAV0       . FOR 2ND CHAR
T   000621  03 00 276 0 000 00 0            MI    ..0             CBR    TRUE,OPER    .
    000622  16 00 302 076 2 00 3    NOT     LDI   AC,RAM,A        CONT   ,CSAV4       . TEST 502 WORD FOR
                                                                                      . NOT
    000623  16 00 203 05 5 2 10 2           ACI   SBAS,AC,KL,I    CONT   ,0203        . IF = 0 THEN NOT
                                                                                      .
T   000624  03 02 240 0 000 00 0            MI    ..0             CBR    NZ,REPT      .
T   000625  11 00 233 0 000 00 0            MI    ..0             RPBA   ,$+6         . 1ST OR 2ND WORD
    000626  16 00 301 076 2 00 3            LDI   AC,RAM,A        CONT   ,CSAV3       .
    000627  16 00 300 06 4 3 01 3           LI    AND,AR,ACC,A    CONT   ,CSAV0       .
    000630  16 00 044 076 2 13 2            LDI   AC,KU,I         CONT   ,044         . NOT FLAG TO INST
    000631  16 00 206 06 4 3 01 3           LI    AND,AR,ACC,A    CONT   ,INST        . TO OPER
T   000632  03 00 156 0 000 00 0            MI    ..0             CBR    TRUE,OP1     .
    000633  16 00 301 076 2 00 3            LDI   AC,RAM,A        CONT   ,CSAV3       .
    000634  16 00 300 06 4 3 01 3           LI    AND,AR,ACC,A    CONT   ,CSAV0       .
    000635  16 00 044 076 2 13 2            LDI   AC,KU,I         CONT   ,044         . NOT FLAG TO INST
    000636  16 00 206 06 4 3 01 3           LI    AND,AR,ACC,A    CONT   ,INST        . MODIFY BEM INST
T   000637  03 00 276 0 000 00 0            MI    ..0             CBR    TRUE,OPER    . TO MOD WITH OPERA
                                                                                      .  AND STORE
    000640  16 00 117 076 2 00 3    REPT    LDI   AC,RAM,A        CONT   ,CSAV1       . PREP TO 2ND PASS
    000641  16 00 120 06 4 3 01 3           LI    AND,AR,ACC,A    CONT   ,CSAV2       .
    000642  16 00 301 076 2 00 3            LDI   AC,RAM,A        CONT   ,CSAV3       .
T   000643  11 00 210 0 000 00 0            MI    ..0             RPBA   ,FDCH2       . REPEAT FOR 2ND WORD
T   000644  03 00 312 0 000 00 0            MI    ..0             CBR    TRUE,XX1-1   . REPORT BAD EI
    000645  16 00 117 076 2 00 3    NOTF    LDI   AC,RAM,A        CONT   ,CSAV1       .
    000646  16 00 203 05 5 2 10 2           ACI   SBAS,AC,KL,I    CONT   ,0203        . NOT = 0203
T   000647  03 02 312 0 000 00 0            MI    ..0             CBR    NZ,XX1-1     . REPORT BAD EI
    000650  16 00 074 076 2 13 2    NOTO    LDI   AC,KU,I         CONT   ,074         . LOAD FLAG NOT
    000651  16 00 301 04 6 2 00 3           AI    ADD,AC,RAM,A    CONT   ,CSAV3       .
T   000652  03 00 255 0 000 00 0            MI    ..0             CBR    TRUE,FTCH1   .
    000653  16 00 076 076 2 13 2    FTCH    LDI   AC,KU,I         CONT   ,076         . OPERAND DETECTED
    000654  16 00 117 04 6 2 00 3           AI    ADD,AC,RAM,A    CONT   ,CSAV1       . ADD FLAG ADDR
    000655  16 00 206 06 4 3 01 3   FTCH1   LI    AND,AR,ACC,A    CONT   ,INST        . FORM INST
    000656  16 00 301 076 2 00 3            LDI   AC,RAM,A        CONT   ,CSAV3       . OPERATION TO CSAV2
    000657  16 00 120 06 4 3 01 3           LI    AND,AR,ACC,A    CONT   ,CSAV2       .  FOR OP DECODE
    000660  16 00 121 077 2 00 3    OPND1   LDIS  AC,RAM,A        CONT   ,CCSAV       . ACC=CHAR COUNT
T   000661  03 03 271 0 000 00 0            MI    ..0             CBR    ZERO,END1    . IF CHAR COUNT = 0
                                                                                      . ALL CHAR XFR'D
                                                                                      . TO HSSF,SET END
                                                                                      . FLAG IN BEM INSTRU
    000662  16 00 211 075 2 00 3            LDI   AC,RAM,A        CONT   ,BSCNT       . CC BIT 0,LOAD
                                                                                      . INST FOR BEM SIMU
                                                                                      . RAM CELLS
    000663  16 00 000 0 002 01 2            MI    INDR,ACC,I      CONT   ,            . FIRST LOAD INDEX
                                                                                      . REGISTER RAM ADDR
    000664  16 00 001 04 6 2 10 2           AI    ADD,AC,KL,I     CONT   ,01          . TO SAVE BEM INST
                                                                                      . PRIOR TO XFR TO
```

```
MICROCODE FOR HIGH SPEED SEARCH FUNCTION (HSSF)                                                   DATE 041500
        000665  16 00 211 06 4 3 01 3           L1    AND,AR,ACC,A       CONT   ,BSCNT          . BEM,INC ADDR BY
        000666  16 00 206 076 2 00 3            LD1   AC,RAM,A           CONT   ,INST           . FABRICATED INSTRUC
                                                                                                . TO ACC
T       000667  03 03 326 06 4 3 01 2           L1    AND,AR,ACC,I       CBR    ZERO,XFRAM      . XFER TO BEM
T       000670  03 00 154 0 000 00 2            M1    ,,I                CBR    TRUE,OPRND      . BEN INST TO TEMP
                                                                                                . RAM, GO TO
                                                                                                . OPERATOR ROUTINE
        000671  16 00 206 076 2 00 3   ENDI     LD1   AC,RAM,A           CONT   ,INST           . HANDLE THE LAST
                                                                                                . BEN INSTRUC PRIOR
                                                                                                . TO XFR TO BEM FOR
                                                                                                . EVALUATION
        000672  16 00 100 04 6 2 13 2           A1    ADD,AC,KU,I        CONT   ,0100           . SET BIT 14 IN INSTR
        000673  16 00 206 06 4 3 01 3           L1    AND,AR,ACC,A       CONT   ,INST           .
                                                                                                . AS LAST BEM INSTR
        000674  16 00 023 0 027 00 3            M1    EICAP,RAM,A        CONT   ,GDEI3          . GOOD EI OF 4 TO CM
T       000675  03 00 262 0 000 00 0            M1    ,,0                CBR    TRUE,OPND1+2    . ALL CHARS INTO
                                                                                                . HSSF GO TO XFR
                                                                                                . BEM INSTR TO BEM
        000676  16 00 206 076 2 00 3   OPER     LD1   AC,RAM,A           CONT   ,INST           . OPERATOR ROUTINE
                                                                                                . TEST CC=0,SET SR
        000677  16 00 300 04 6 2 00 3           A1    ADD,AC,RAM,A       CONT   ,CSAV0          . IF ZERO TO ERROR
                                                                                                . ROUTINE
        000700  16 00 206 06 4 3 01 3           L1    AND,AR,ACC,A       CONT   ,INST           . ZERO INST CELL
        000701  16 00 120 076 2 00 3            LD1   AC,RAM,A           CONT   ,CSAV2          . LOAD ACC WITH 2ND
                                                                                                . CHAR FOR OPERATOR
                                                                                                . TEST
        000702  16 00 200 05 5 2 10 2           AC1   SBAS,AC,KL,I       CONT   ,0200           . TEST FOR AND OPTR
T       000703  03 03 315 0 000 00 0            M1    ,,0                CBR    ZERO,ANDI       . IF ZERO,AND TO
                                                                                                . BEM INSTRUC
        000704  16 00 120 076 2 00 3            LD1   AC,RAM,A           CONT   ,CSAV2          . LOAD OPTR FOR TEST
        000705  16 00 201 05 5 2 10 2           AC1   SBAS,AC,KL,I       CONT   ,0201           . TEST FOR XOR OPTR
                                                                                                . SET SR
T       000706  03 03 323 0 000 00 0            M1    ,,0                CBR    ZERO,XORI       . IF ZERO,XOR TO
                                                                                                . BEM INSTRU
        000707  16 00 120 076 2 00 3            LD1   AC,RAM,A           CONT   ,CSAV2          . LOAD OPTR FOR TEST
        000710  16 00 202 05 5 2 10 2           AC1   SBAS,AC,KL,I       CONT   ,0202           . TEST FOR OR OPTR
T       000711  03 03 320 0 000 00 0            M1    ,,0                CBR    ZERO,REST2      . IF ZERO, OR TO
                                                                                                . BEM INSTRUC
                                                                                                . FAIL, ERROR,RESET
                                                                                                . OD ACTIVE, REPORT
                                                                                                . ERROR
        000712  16 00 037 0 027 00 3            M1    EICAP,RAM,A        CONT   ,BAD7           . EICAP HAS BED EI
        000713  16 00 005 0 010 10 2   XXI      M1    VLCR,KL,I          CONT   ,DIERM          .
                                                                                                . CODE
        000714  06 00 000 0 000 00 0            M1    ,,0                CJD    TRUE,           . EIDATA(PAGE 1)
        000715  16 00 020 076 2 13 2   ANDI     LD1   AC,KU,I            CONT   ,020            . SET BIT 12 OF OP
                                                                                                . CODE FOR AND
                                                                                                . OPERATION IN BEM
        000716  16 00 206 04 6 2 00 3           A1    ADD,AC,RAM,A       CONT   ,INST           . INSTRU
        000717  16 00 206 06 4 3 01 3  RESTI    L1    AND,AR,ACC,A       CONT   ,INST           . RESTORE IN RAM FOR
                                                                                                . OTHER CHANGES
        000720  16 00 301 076 2 00 3   REST2    LD1   AC,RAM,A           CONT   ,CSAV3          .
        000721  16 00 120 06 4 3 01 3           L1    AND,AR,ACC,A       CONT   ,CSAV2          .
```

```
MICROCODE FOR HIGH SPEED SEARCH FUNCTION (HSSF)                                                    DATE 041580
T  000722  03 00 260 0 000 00 0            MI    ..0                 CBR    TRUE,OPNDI    . TO OPERAND FOR NEXT
                                                                                          . WORD FROM 502 MEM
   000723  16 00 010 076 2 13 2   XORI     LDI   AC,KU,I             CONT   ,010          . SET BIT 11 OF OP
   000724  16 00 206 04 6 2 00 3           AI    ADD,AC,RAM,A        CONT   ,INST         . CODE FOR XOR OPER
                                                                                          . IN DEM INSTRUC
T  000725  03 00 317 0 000 00 0            MI    ..0                 CBR    TRUE,RESTI    . RESTORE NEW INST
                                                                                          . INST
   000726  16 00 000 0 012 10 2   XFRAM    MI    ZDMA,KL,I           CONT   ,0            . XFR INSTRUCTIONS
                                                                                          . TO DEM ZERO DEM
   000727  16 00 212 0 002 10 2            MI    INDR,KL,I           CONT   ,0212         . LOAD RAM ADDR
   000730  16 00 037 076 2 10 2            LDI   AC,KL,I             CONT   ,037          . INDEX REG TO BEG
   000731  16 00 000 0 011 00 1   XFI      MI    DEM,RAM,II          CONT   ,             . LOAD RAM TO DEM
   000732  16 00 001 05 3 2 10 2           ACI   SUSS,AC,KL,I        CONT   ,01           . XFERRED SET SR
T  000733  03 03 313 0 000 00 2            MI    ..I                 CBR    ZERO,XXI      . FIN TO OTERM
T  000734  03 00 331 0 000 00 2            MI    ..I                 CBR    TRUE,XFI      . STORE NEXT WORD
                                  . ************************************************
                                  . *
                                  . * COMMON FUNCTION ERROR ROUTINE                 *
                                  . *                                               *
                                  . ************************************************
   000735  16 00 044 0 027 00 3   ERRO     MI    EICAP,RAM,A         CONT   ,ERRO         . REPORT ERROR TYPE
T  000736  03 00 102 0 000 00 0            MI    ..0                 CBR    TRUE,EIDAT    .
                                   . *******************************************
                                   . *                                         *
                                   . * PREP THE RAM WITH CONTANTS NEEDED AS IOI*
                                   . * INTERRUPT VECTOR ADDRESS. THIS OCCURS AT*
                                   . *           INITIALIZATION                *
                                   . *******************************************
   000737  16 00 377 0 010 10 2   PREP     MI    VLCR,KL,I           CONT   ,0377         . SETUP COUNTER
   000740  06 01 000 0 003 00 2            MI    LCTR,.I             CJD    FALSE,        . TO ZERO
T  000741  11 00 341 04 0 1 01 1  PREPI    AI    ZR,R,ACC,II         RPDA   ,PREPI        . ALL LOCATIONS
   000742  16 00 006 0 002 10 2            MI    INDR,KL,I           CONT   ,06           . LOAD INDEX WITH 6
   000743  16 00 030 076 2 13 2            LDI   AC,KU,I             CONT   ,030          .
   000744  16 00 001 04 6 1 10 1           AI    ADD,R,KL,II         CONT   ,01           . 014001=6
   000745  16 00 232 076 2 13 2            LDI   AC,KU,I             CONT   ,0232         .
   000746  16 00 001 04 6 1 10 1           AI    ADD,R,KL,II         CONT   ,01           . 115001=7
   000747  16 00 233 076 2 13 2            LDI   AC,KU,I             CONT   ,0233         .
   000750  16 00 001 04 6 1 10 1           AI    ADD,R,KL,II         CONT   ,01           . 115401=10
   000751  16 00 002 0 010 10 2            MI    VLCR,KL,I           CONT   ,02           . SETUP COUNTER TO
   000752  06 01 000 0 003 00 2            MI    LCTR,.I             CJD    FALSE,        . WRITE NEXT 4 LOC
   000753  16 00 001 076 2 13 2            LDI   AC,KU,I             CONT   ,01           .
   000754  16 00 004 04 6 3 10 1           AI    ADD,AR,KL,II        CONT   ,04           . 000404=11
   000755  16 00 002 04 6 3 10 2  PREP2    AI    ADD,AR,KL,I         CONT   ,02           . 000406=12
T  000756  11 00 355 0 000 00 1            MI    ..II                RPDA   ,PREP2        . 000410=13
                                                                                          . 000412=14
   000757  16 00 002 076 2 13 2            LDI   AC,KU,I             CONT   ,02           .
   000760  16 00 040 04 6 3 10 1           AI    ADD,AR,KL,II        CONT   ,040          . 001040=15
   000761  16 00 200 04 6 3 10 1           AI    ADD,AR,KL,II        CONT   ,0200         . 001240=16
   000762  16 00 006 0 010 10 1            MI    VLCR,KL,II          CONT   ,06           . SKIP LOC 17 AND SET
                                                                                          . UP CNTR FOR NEXT 8
   000763  16 00 001 076 3 10 1            LDI   AR,KL,II            CONT   ,01           . 000001=21 GOOD EI
   000764  06 01 000 0 003 00 2            MI    LCTR,.I             CJD    FALSE,        . LOCATIONS
```

```
MICROCODE FOR HIGH SPEED SEARCH FUNCTION (HSSF)                                                    DATE 041580
 1206.          000765  16 00 001 04 6 3 10 2  PREP3    A1    ADD,AR,KL,I       CONT   .01           . 000002*21
 1207. T        000766  11 00 365 0 000 00 1            M1    ..II              RPBA   ,PREP3        .
 1208.                                                                                               . 000010*27
 1209.          000767  16 00 017 0 010 10 2            M1    VECR,KL,I         CONT   .017          . SETUP COUNTER
 1210.          000770  06 01 000 0 003 00 2            M1    LCTR,.I           CJD    FALSE,        . TO WRITE NEXT 16 LO
 1211.          000771  16 00 200 076 2 13 2            LD1   AC,KU,I           CONT   .0200         . SET UPPER BIT INDIC
 1212.                                                                                               . ATF BAD EI'S
 1213.          000772  16 00 001 04 6 3 10 2  PREP4    A1    ADD,AR,KL,I       CONT   .01           . 100001*30
 1214. T        000773  11 00 372 0 000 00 1            M1    ..II              RPBA   ,PREP4        . INC INDEX AND
 1215.                                                                                               . BRANCH IF CNTR=0
 1216.          000774  16 00 030 076 2 13 2            LD1   AC,KU,I           CONT   .030          . SET BITS 11,12
 1217.          000775  16 00 141 04 6 2 10 2           A1    ADD,AC,KL,I       CONT   .0141         .
 1218.          000776  16 00 116 06 4 3 01 3           L1    AND,AR,ACC,A      CONT   .EVEC         . EVEC FOR IVECT
 1219.                                                                                               . EI STATUS
 1220. T        000777  03 00 030 0 000 00 2            M1    ..I               CBR    TRUE,SCAN     . PREP FINISHED
 1221.                                                                                               . GO TO IDLE VIA SCAN
 1222.                                                        END
                        SRA
@CULL.SE ASM/GO,KMIKE*TUNA1.HSSFMICRO
CULL 3R2 73R1Q7 04/15/80 09:12:44

KMIKE*TUNA1.HSSFMICRO                                          18 APR 79   13:43:13   CYCLE: 20
A              99*    356    368    373    375    391    392    396    397    400    404    407    415
              418    421    422    436    438    440    441    405    408    491    500    505    508
              510    512    514    515    517    519    524    531    538    552    557    550    561
              564    568    571    579    582    583    584    585    586    587    589    592    593
              602    603    604    609    611    613    615    618    619    633    630    641    642
              650    656    657    659    663    669    678    679    687    710    713    718    723
              777    784    787    811    814    831    835    845    857    861    871    882    887
              889    893    895    896    897    899    902    903    931    932    935    945    950
              955    960    962    964    968   1000   1007   1008   1009   1013   1017   1018   1021
             1031   1032   1034   1037   1043   1044   1049   1050   1052   1053   1055   1061   1062
             1064   1066   1067   1069   1072   1073   1074   1077   1081   1084   1085   1086   1087
             1088   1093   1100   1101   1107   1112   1114   1118   1120   1122   1123   1129   1134
             1141   1148   1149   1151   1152   1156   1173   1218
AC            103*    346    350    369    377    390    405    420    421    436    451    459    463
              466    485    500    517    519    521    522    540    541    552    557    561    562
              583    584    586    587    600    601    608    609    612    613    633    636    637
              644    645    649    650    657    658    668    669    670    676    680    691    696
              697    701    717    720    776    761    808    883    893    894    896    897    904
              907    931    944    950    956    958    960    962    999   1006   1009   1011   1016
             1017   1019   1020   1022   1030   1032   1034   1036   1043   1045   1049   1052   1055
             1057   1061   1063   1066   1068   1072   1074   1077   1078   1080   1081   1083   1084
             1086   1088   1093   1098   1101   1107   1111   1118   1120   1123   1126   1129   1130
             1134   1135   1145   1148   1151   1155   1156   1163   1165   1166   1188   1190   1194
             1199   1211   1216   1217
ACC           163*    391    406    422    524    543    564    585    589    611    615    638    646
              651    659    671    677    689    702    718    729    782    809    895    899    910
              932    946    952    959   1000   1007   1013   1018   1021   1031   1044   1050   1053
             1062   1064   1067   1069   1073   1085   1087   1096   1100   1103   1112   1122   1149
             1152   1184   1218
AC1          4210   5190   5620   5870   6090   6500   6580   6940   9640  10170  10360  10450  10570
            10700  11260  11300  11350  11650
```

MICROCODE FOR HIGH SPEED SEARCH FUNCTION (HSSF) DATE 041580

| | | | | | | | | | | | | | |
|---|---|---|---|---|---|---|---|---|---|---|---|---|---|
| ADD | 112• | 522 | 541 | 584 | 601 | 613 | 637 | 645 | 680 | 697 | 720 | 897 | 907 |
| | 958 | 964 | 1081 | 1084 | 1090 | 1111 | 1120 | 1148 | 1156 | 1187 | 1189 | 1191 | 1195 |
| | 1196 | 1200 | 1201 | 1206 | 1213 | 1217 | | | | | | | |
| ADDS | 113• | | | | | | | | | | | | |
| ALSO | 94• | | | | | | | | | | | | |
| AND | 119• | 391 | 422 | 524 | 564 | 585 | 589 | 602 | 615 | 630 | 659 | 669 | 701 |
| | 887 | 895 | 899 | 932 | 1000 | 1007 | 1013 | 1018 | 1020 | 1021 | 1030 | 1031 | 1044 |
| | 1050 | 1053 | 1062 | 1064 | 1067 | 1069 | 1073 | 1085 | 1087 | 1100 | 1103 | 1112 | 1122 |
| | 1149 | 1152 | 1218 | | | | | | | | | | |
| ANDI | 1145• | 1127 | | | | | | | | | | | |
| ANDS | 120• | 611 | | | | | | | | | | | |
| AR | 104• | 391 | 392 | 400 | 422 | 441 | 524 | 564 | 585 | 589 | 602 | 611 | 615 |
| | 639 | 659 | 887 | 895 | 899 | 932 | 945 | 964 | 1000 | 1007 | 1013 | 1018 | 1021 |
| | 1031 | 1037 | 1044 | 1050 | 1053 | 1062 | 1064 | 1067 | 1069 | 1073 | 1085 | 1087 | 1100 |
| | 1103 | 1112 | 1122 | 1149 | 1152 | 1195 | 1196 | 1200 | 1201 | 1204 | 1206 | 1213 | 1218 |
| A0 | 88• | | | | | | | | | | | | |
| A1 | 391D | 392D | 441D | 522D | 541D | 584D | 601D | 613D | 637D | 645D | 688D | 697D | 728D |
| | 887D | 907D | 958D | 1037D | 1081D | 1084D | 1090D | 1111D | 1120D | 1140D | 1156D | 1184D | 1187D |
| | 1189D | 1191D | 1195D | 1196D | 1200D | 1201D | 1206D | 1213D | 1217D | | | | |
| AIS | 87• | | | | | | | | | | | | |
| BAD0 | 290• | 488 | | | | | | | | | | | |
| BAD1 | 291• | 935 | | | | | | | | | | | |
| BAD10 | 298• | | | | | | | | | | | | |
| BAD11 | 299• | | | | | | | | | | | | |
| BAD12 | 300• | | | | | | | | | | | | |
| BAD13 | 301• | | | | | | | | | | | | |
| BAD2 | 292• | 505 | | | | | | | | | | | |
| BAD3 | 293• | | | | | | | | | | | | |
| BAD4 | 294• | 440 | | | | | | | | | | | |
| BAD5 | 295• | | | | | | | | | | | | |
| BAD6 | 296• | | | | | | | | | | | | |
| BAD7 | 297• | 1141 | | | | | | | | | | | |
| BAPH | 333• | 687 | 710 | | | | | | | | | | |
| BAPI | 258• | 603 | 613 | 615 | 618 | | | | | | | | |
| BAPO | 254• | 584 | 585 | 592 | 882 | 897 | 899 | 902 | | | | | |
| BCM | 133• | 1164 | | | | | | | | | | | |
| BSCNT | 336• | 1000 | 1093 | 1100 | | | | | | | | | |
| CDP | 207• | | | | | | | | | | | | |
| CDR | 199• | 347 | 359 | 370 | 378 | 382 | 399 | 401 | 411 | 412 | 413 | 424 | 428 |
| | 432 | 437 | 439 | 444 | 454 | 456 | 461 | 464 | 465 | 467 | 468 | 484 | 486 |
| | 489 | 493 | 501 | 506 | 526 | 537 | 544 | 549 | 554 | 558 | 560 | 565 | 569 |
| | 572 | 590 | 616 | 626 | 634 | 660 | 662 | 673 | 683 | 684 | 685 | 690 | 692 |
| | 703 | 705 | 719 | 724 | 741 | 743 | 745 | 746 | 747 | 748 | 749 | 750 | 751 |
| | 752 | 753 | 754 | 755 | 756 | 757 | 780 | 794 | 796 | 797 | 799 | 801 | 821 |
| | 824 | 842 | 849 | 868 | 874 | 900 | 919 | 920 | 933 | 953 | 954 | 965 | 970 |
| | 1010 | 1033 | 1038 | 1039 | 1040 | 1047 | 1051 | 1054 | 1059 | 1065 | 1070 | 1076 | 1079 |
| | 1082 | 1089 | 1103 | 1104 | 1115 | 1127 | 1132 | 1136 | 1153 | 1158 | 1166 | 1167 | 1174 |
| | 1220 | | | | | | | | | | | | |
| CCSAV | 325• | 1008 | 1009 | 1017 | 1018 | 1088 | | | | | | | |
| CHFLG | 327• | 1007 | 1032 | 1037 | | | | | | | | | |
| CI17 | 228• | | | | | | | | | | | | |
| CJD | 202• | 653 | 730 | 759 | 761 | 763 | 765 | 768 | 912 | 924 | 939 | 949 | 1025 |
| | 1042 | 1144 | 1183 | 1193 | 1205 | 1210 | | | | | | | |

MICROCODE FOR HIGH SPEED SEARCH FUNCTION (HSSF) DATE 041580

| | | | | | | | | | | | | | |
|---|---|---|---|---|---|---|---|---|---|---|---|---|---|
| CUS | 197• | | | | | | | | | | | | |
| CMD | 120• | 356 | 368 | 380 | 397 | 663 | 779 | 845 | 871 | | | | |
| CONT | 210• | 348 | 356 | 358 | 360 | 369 | 373 | 375 | 376 | 377 | 380 | 390 | 391 |
| | 392 | 396 | 397 | 400 | 404 | 405 | 406 | 407 | 408 | 409 | 415 | 416 | 417 |
| | 418 | 420 | 421 | 422 | 436 | 438 | 440 | 441 | 451 | 459 | 463 | 466 | 470 |
| | 482 | 483 | 485 | 488 | 491 | 500 | 505 | 508 | 510 | 512 | 514 | 515 | 516 |
| | 517 | 519 | 521 | 522 | 524 | 525 | 531 | 535 | 536 | 538 | 539 | 540 | 541 |
| | 543 | 546 | 548 | 551 | 552 | 556 | 557 | 559 | 561 | 562 | 564 | 566 | 568 |
| | 571 | 579 | 582 | 583 | 584 | 585 | 586 | 587 | 589 | 592 | 593 | 600 | 601 |
| | 602 | 603 | 604 | 606 | 608 | 609 | 611 | 612 | 613 | 615 | 618 | 619 | 628 |
| | 632 | 633 | 636 | 637 | 638 | 640 | 641 | 642 | 643 | 644 | 645 | 646 | 647 |
| | 648 | 649 | 650 | 651 | 652 | 654 | 655 | 656 | 657 | 658 | 659 | 663 | 664 |
| | 668 | 669 | 670 | 671 | 676 | 677 | 678 | 679 | 680 | 681 | 687 | 688 | 689 |
| | 691 | 696 | 697 | 698 | 701 | 709 | 710 | 712 | 713 | 717 | 718 | 723 | 728 |
| | 729 | 750 | 760 | 762 | 764 | 766 | 776 | 777 | 779 | 781 | 782 | 784 | 787 |
| | 791 | 792 | 808 | 809 | 811 | 814 | 817 | 819 | 831 | 835 | 838 | 840 | 845 |
| | 857 | 861 | 864 | 866 | 871 | 892 | 883 | 887 | 889 | 891 | 893 | 894 | 895 |
| | 896 | 897 | 899 | 902 | 903 | 904 | 907 | 910 | 922 | 931 | 932 | 935 | 938 |
| | 940 | 944 | 945 | 948 | 950 | 955 | 956 | 958 | 959 | 960 | 962 | 964 | 968 |
| | 999 | 1000 | 1001 | 1006 | 1007 | 1008 | 1009 | 1011 | 1013 | 1014 | 1016 | 1017 | 1018 |
| | 1019 | 1020 | 1021 | 1022 | 1024 | 1027 | 1030 | 1031 | 1032 | 1034 | 1036 | 1037 | 1041 |
| | 1043 | 1044 | 1045 | 1049 | 1050 | 1052 | 1053 | 1055 | 1057 | 1061 | 1062 | 1063 | 1064 |
| | 1066 | 1067 | 1068 | 1069 | 1072 | 1073 | 1074 | 1077 | 1078 | 1080 | 1081 | 1083 | 1084 |
| | 1085 | 1086 | 1087 | 1088 | 1093 | 1096 | 1098 | 1100 | 1101 | 1107 | 1111 | 1112 | 1114 |
| | 1118 | 1120 | 1122 | 1123 | 1126 | 1129 | 1130 | 1134 | 1135 | 1141 | 1142 | 1145 | 1148 |
| | 1149 | 1151 | 1152 | 1155 | 1156 | 1160 | 1162 | 1163 | 1164 | 1165 | 1173 | 1182 | 1185 |
| | 1186 | 1187 | 1188 | 1189 | 1190 | 1191 | 1192 | 1194 | 1195 | 1196 | 1199 | 1200 | 1201 |
| | 1202 | [illegible] | 1206 | 1209 | 1211 | 1213 | 1216 | 1217 | 1218 | | | | |
| CRD | 579• | 395 | 476 | 507 | 509 | 511 | 513 | 550 | 555 | 629 | 940 | 1001 | 1014 |
| CRTN | 200• | 594 | 620 | 966 | | | | | | | | | |
| CSAV0 | 337• | 1050 | 1053 | 1062 | 1067 | 1120 | | | | | | | |
| CSAV1 | 323• | 1031 | 1034 | 1043 | 1052 | 1072 | 1077 | 1084 | | | | | |
| CSAV2 | 324• | 1073 | 1087 | 1123 | 1129 | 1134 | 1152 | | | | | | |
| CSAV3 | 338• | 1021 | 1049 | 1061 | 1066 | 1074 | 1081 | 1086 | 1151 | | | | |
| CSAV4 | 339• | 1044 | 1055 | | | | | | | | | | |
| CWR | 600• | 426 | 429 | 702 | 714 | | | | | | | | |
| C10 | 238• | | | | | | | | | | | | |
| C14 | 242• | | | | | | | | | | | | |
| C15 | 243• | | | | | | | | | | | | |
| C16 | 244• | | | | | | | | | | | | |
| C17 | 245• | | | | | | | | | | | | |
| C31E | 240• | | | | | | | | | | | | |
| DECHP | 125• | [illegible] | | | | | | | | | | | |
| DEL | 135• | 416 | 482 | 525 | 641 | 684 | 955 | | | | | | |
| DELSA | 334• | 932 | 955 | 962 | 964 | | | | | | | | |
| DFUD23 | 143• | | | | | | | | | | | | |
| DFUD30 | 148• | | | | | | | | | | | | |
| DFUD32 | 150• | | | | | | | | | | | | |
| DFUD33 | 151• | | | | | | | | | | | | |
| DFUD34 | 152• | | | | | | | | | | | | |
| DFUD36 | 154• | | | | | | | | | | | | |
| DICAP | 147• | 105• | 406 | 438 | 440 | 488 | 491 | 505 | 571 | 677 | 709 | 723 | 782 |

MICROCODE FOR HIGH SPEED SEARCH FUNCTION (HSSF) DATE 041500

| | | | | | | | | | | | | | |
|---|---|---|---|---|---|---|---|---|---|---|---|---|---|
| EIDAT | 919* | 358 | 369 | 377 | 1174 | | | | | | | | |
| EIDAI | 922* | 919 | | | | | | | | | | | |
| EIL | 237* | 919 | | | | | | | | | | | |
| EIST | 776* | 922 | | | | | | | | | | | |
| ENABLED | 221 | | | | | | | | | | | | |
| END | 1222D | | | | | | | | | | | | |
| ENDI | 1107* | 1009 | | | | | | | | | | | |
| EOR | 115* | 945 | | | | | | | | | | | |
| EORS | 116* | | | | | | | | | | | | |
| EQU | 87D | 88D | 89D | 90D | 91D | 92D | 93D | 94D | 96D | 97D | 98D | 99D | 101D |
| | 102D | 103D | 104D | 106D | 107D | 108D | 109D | 110D | 111D | 112D | 113D | 115D | 116D |
| | 117D | 118D | 119D | 120D | 121D | 122D | 124D | 125D | 126D | 127D | 128D | 129D | 130D |
| | 131D | 132D | 133D | 134D | 135D | 136D | 137D | 138D | 139D | 140D | 141D | 142D | 143D |
| | 144D | 145D | 146D | 147D | 148D | 149D | 150D | 151D | 152D | 153D | 154D | 155D | 156D |
| | 157D | 158D | 159D | 162D | 163D | 164D | 165D | 166D | 167D | 168D | 169D | 170D | 171D |
| | 172D | 173D | 174D | 175D | 176D | 177D | 178D | 179D | 180D | 181D | 182D | 183D | 184D |
| | 185D | 186D | 187D | 188D | 189D | 190D | 191D | 192D | 193D | 194D | 196D | 197D | 198D |
| | 199D | 200D | 201D | 202D | 203D | 204D | 205D | 206D | 207D | 208D | 209D | 210D | 211D |
| | 213D | 214D | 215D | 216D | 217D | 218D | 219D | 220D | 221D | 222D | 223D | 224D | 225D |
| | 226D | 227D | 228D | 230D | 231D | 232D | 233D | 234D | 235D | 236D | 237D | 238D | 239D |
| | 240D | 241D | 242D | 243D | 244D | 245D | 254D | 256D | 257D | 258D | 260D | 262D | 266D |
| | 270D | 272D | 274D | 276D | 278D | 280D | 281D | 282D | 283D | 284D | 285D | 286D | 287D |
| | 288D | 289D | 290D | 291D | 292D | 293D | 294D | 295D | 296D | 297D | 298D | 299D | 300D |
| | 301D | 302D | 303D | 304D | 305D | 306D | 307D | 308D | 309D | 310D | 311D | 312D | 313D |
| | 314D | 315D | 316D | 317D | 318D | 320D | 321D | 322D | 323D | 324D | 325D | 326D | 327D |
| | 328D | 329D | 330D | 331D | 332D | 333D | 334D | 336D | 337D | 338D | 339D | | |
| ERRC | 935* | | | | | | | | | | | | |
| ERRC1 | 938* | 970 | | | | | | | | | | | |
| ERRO | 1173* | 745 | 748 | 750 | 752 | 753 | 754 | 755 | 756 | 757 | | | |
| ERRO | 302* | 1173 | | | | | | | | | | | |
| ERR1 | 303* | | | | | | | | | | | | |
| EVEC | 322* | 777 | 1218 | | | | | | | | | | |
| EVEN | 220* | | | | | | | | | | | | |
| FALSE | 214* | 653 | 949 | 1025 | 1042 | 1103 | 1193 | 1205 | 1210 | | | | |
| FDAR | 130* | 418 | 483 | 536 | 543 | 559 | 560 | 656 | 671 | 959 | | | |
| FOCH | 1041* | 1033 | | | | | | | | | | | |
| FOCH1 | 1043* | | | | | | | | | | | | |
| FOCH2 | 1044* | 1075 | | | | | | | | | | | |
| FIRST | 540* | 526 | | | | | | | | | | | |
| FPFLG | 329* | | | | | | | | | | | | |
| FTCH | 1083* | 1039 | | | | | | | | | | | |
| FTCH1 | 1085* | 1082 | | | | | | | | | | | |
| GOF10 | 282* | 491 | | | | | | | | | | | |
| GDE11 | 283* | 968 | | | | | | | | | | | |
| GDE12 | 284* | | | | | | | | | | | | |
| GDE13 | 285* | 1114 | | | | | | | | | | | |
| GDE14 | 286* | 571 | | | | | | | | | | | |
| GDE15 | 287* | | | | | | | | | | | | |
| GDE16 | 288* | 438 | | | | | | | | | | | |
| GDE17 | 289* | | | | | | | | | | | | |
| GOP | 230* | | | | | | | | | | | | |
| HCNT | 321* | 713 | 718 | | | | | | | | | | |
| HITR | 164* | 701 | | | | | | | | | | | |

MICROCODE FOR HIGH SPEED SEARCH FUNCTION (HSSF) DATE 041580

| | | | | | | | | | | | | | |
|---|---|---|---|---|---|---|---|---|---|---|---|---|---|
| IDA | 239• | 401 | 673 | | | | | | | | | | |
| IDATA | 149• | 187• | 426 | 429 | 702 | 713 | | | | | | | |
| IDLE | 451• | 382 | 456 | 468 | 766 | 797 | | | | | | | |
| IDOTD | 262• | 604 | | | | | | | | | | | |
| II | 97• | 632 | 654 | 655 | 1164 | 1184 | 1187 | 1189 | 1191 | 1195 | 1197 | 1200 | 1201 |
| | 1202 | 1204 | 1207 | 1214 | | | | | | | | | |
| IMI | 232• | | | | | | | | | | | | |
| INDAA | 404• | | | | | | | | | | | | |
| INDAB | 415• | 401 | | | | | | | | | | | |
| INDAB1 | 416• | 432 | | | | | | | | | | | |
| INDAT1 | 401• | 399 | 413 | | | | | | | | | | |
| INDA2 | 436• | 428 | | | | | | | | | | | |
| INDA3 | 446• | 437 | | | | | | | | | | | |
| INDA4 | 441• | 439 | | | | | | | | | | | |
| INDR | 126• | 628 | 640 | 1096 | 1162 | 1185 | | | | | | | |
| INOV | 241• | | | | | | | | | | | | |
| INST | 332• | 1013 | 1064 | 1069 | 1065 | 1101 | 1107 | 1112 | 1118 | 1122 | 1140 | 1149 | 1156 |
| INTLO | 550• | 565 | | | | | | | | | | | |
| IOSE | 221• | 412 | 456 | 664 | | | | | | | | | |
| ITERM | 356• | 444 | 719 | | | | | | | | | | |
| IVECT | 155• | 193• | 373 | 404 | 678 | 777 | 784 | 811 | 831 | 857 | | | |
| IWC | 140• | 178• | 602 | 619 | 691 | | | | | | | | |
| JBR | 203• | | | | | | | | | | | | |
| JSBR | 201• | 395 | 426 | 429 | 476 | 507 | 509 | 511 | 513 | 550 | 555 | 629 | 702 |
| | 714 | 942 | 946 | 952 | 1002 | 1015 | | | | | | | |
| JSCAN | 198• | | | | | | | | | | | | |
| JZ | 196• | 739 | | | | | | | | | | | |
| KD | 172• | | | | | | | | | | | | |
| KL | 170• | 346 | 358 | 369 | 373 | 376 | 377 | 390 | 404 | 408 | 416 | 420 | 451 |
| HSSF | 20 | | | | | | | | | | | | |
| I | 98• | 221 | 346 | 358 | 369 | 376 | 377 | 380 | 390 | 405 | 406 | 408 | 412 |
| | 416 | 417 | 420 | 426 | 429 | 437 | 451 | 459 | 463 | 466 | 478 | 482 | 483 |
| | 516 | 521 | 522 | 525 | 535 | 536 | 539 | 540 | 541 | 543 | 546 | 548 | 551 |
| | 556 | 562 | 566 | 590 | 594 | 600 | 601 | 606 | 608 | 612 | 616 | 620 | 628 |
| | 629 | 634 | 636 | 637 | 640 | 643 | 644 | 645 | 646 | 647 | 648 | 649 | 651 |
| | 652 | 653 | 658 | 660 | 661 | 662 | 664 | 668 | 670 | 671 | 676 | 677 | 680 |
| | 688 | 683 | 691 | 692 | 696 | 697 | 698 | 701 | 702 | 709 | 712 | 728 | 729 |
| | 758 | 760 | 762 | 764 | 766 | 776 | 779 | 780 | 781 | 782 | 791 | 799 | 801 |
| | 808 | 809 | 817 | 838 | 864 | 883 | 891 | 894 | 904 | 907 | 910 | 922 | 938 |
| | 940 | 944 | 946 | 948 | 949 | 951 | 952 | 956 | 958 | 959 | 999 | 1001 | 1006 |
| | 1011 | 1014 | 1016 | 1019 | 1020 | 1022 | 1024 | 1025 | 1027 | 1030 | 1036 | 1041 | 1042 |
| | 1045 | 1057 | 1063 | 1068 | 1078 | 1080 | 1083 | 1096 | 1098 | 1103 | 1104 | 1111 | 1126 |
| | 1130 | 1135 | 1142 | 1145 | 1155 | 1160 | 1162 | 1163 | 1165 | 1166 | 1167 | 1182 | 1183 |
| | 1185 | 1186 | 1188 | 1190 | 1192 | 1193 | 1194 | 1196 | 1199 | 1205 | 1206 | 1209 | 1210 |
| | 1211 | 1213 | 1216 | 1217 | 1220 | | | | | | | | |
| IBAP | 141• | 179• | 603 | 618 | 687 | 689 | 710 | | | | | | |
| ICA | 236• | 465 | | | | | | | | | | | |
| ICAP | 142• | 180• | 701 | | | | | | | | | | |
| ICI | 234• | 461 | | | | | | | | | | | |
| ICIX | 831• | 459 | | | | | | | | | | | |
| ICR | 781• | 465 | | | | | | | | | | | |
| ICR1 | 787• | 786 | | | | | | | | | | | |

MICROCODE FOR HIGH SPEED SEARCH FUNCTION (HSSF) DATE 041580

| | | | | | | | | | | | | | |
|---|---|---|---|---|---|---|---|---|---|---|---|---|---|
| | 459 | 463 | 466 | 482 | 522 | 525 | 536 | 541 | 562 | 566 | 582 | 583 | 587 |
| | 600 | 606 | 608 | 612 | 620 | 637 | 640 | 641 | 645 | 649 | 652 | 650 | 664 |
| | 668 | 670 | 680 | 688 | 696 | 698 | 709 | 712 | 717 | 758 | 760 | 762 | 764 |
| | 766 | 776 | 784 | 791 | 811 | 817 | 831 | 838 | 857 | 864 | 883 | 891 | 894 |
| | 896 | 922 | 931 | 930 | 940 | 948 | 956 | 999 | 1001 | 1006 | 1014 | 1016 | 1020 |
| | 1024 | 1030 | 1036 | 1041 | 1045 | 1057 | 1070 | 1098 | 1126 | 1130 | 1135 | 1142 | 1160 |
| | *1162 | 1163 | 1165 | 1182 | 1185 | 1187 | 1189 | 1191 | 1192 | 1195 | 1196 | 1200 | 1201 |
| | 1202 | 1204 | 1206 | 1209 | 1213 | 1217 | | | | | | | |
| KU | 173• | 380 | 483 | 521 | 540 | 548 | 601 | 636 | 644 | 670 | 697 | 720 | 779 |
| | 957 | 958 | 1011 | 1063 | 1068 | 1080 | 1083 | 1111 | 1145 | 1155 | 1186 | 1188 | 1190 |
| | 1194 | 1199 | 1211 | 1216 | | | | | | | | | |
| KZ | 171• | 964 | | | | | | | | | | | |
| LBEX | 999• | 746 | | | | | | | | | | | |
| LCTR | 127• | 653 | 949 | 1025 | 1042 | 1103 | 1193 | 1205 | 1210 | | | | |
| LDCT | 208• | | | | | | | | | | | | |
| LDFF | 476• | 750 | | | | | | | | | | | |
| LDFFX | 750• | 741 | | | | | | | | | | | |
| LDF2 | 491• | 486 | | | | | | | | | | | |
| LD1 | 3410D | 3580D | 3690D | 3770D | 3900D | 3960D | 4050D | 4200D | 4510D | 4590D | 4630D | 4660D | 5000D |
| | 5100D | 5120D | 5140D | 5170D | 5210D | 5400D | 5610D | 5830D | 5860D | 6000D | 6030D | 6000D | 6120D |
| | 6320D | 6360D | 6140D | 6490D | 6570D | 6680D | 6760D | 6870D | 6960D | 7170D | 7100D | 7810D | 8000D |
| | 8820D | 8830D | 8930D | 8960D | 9040D | 9310D | 9440D | 9500D | 9560D | 9620D | 9990D | 10060D | 10060D |
| | 10110D | 10160D | 10190D | 10220D | 10340D | 10430D | 10490D | 10520D | 10550D | 10610D | 10630D | 10660D | 10680D |
| | 10720D | 10740D | 10770D | 10800D | 10830D | 10860D | 10930D | 11010D | 11070D | 11100D | 11230D | 11290D | 11340D |
| | 11450D | 11510D | 11550D | 11630D | 11660D | 11800D | 11900D | 11940D | 11990D | 12040D | 12110D | 12160D | |
| LDIS | 4060D | 4850D | 5000D | 5520D | 5570D | 6330D | 6910D | 7760D | 9600D | 10690D | 10320D | 10880D | |
| LFCN | 531• | 743 | | | | | | | | | | | |
| LFCNO | 946• | 933 | 954 | | | | | | | | | | |
| LFCN1 | 948• | | | | | | | | | | | | |
| LFCN3 | 968• | 953 | | | | | | | | | | | |
| LKOUT | 222• | 799 | | | | | | | | | | | |
| LKSAV | 312• | 510 | | | | | | | | | | | |
| LOOP | 209• | | | | | | | | | | | | |
| LSAV | 314• | 514 | | | | | | | | | | | |
| L1 | 4000D | 4220D | 5240D | 5640D | 5850D | 5890D | 6020D | 6110D | 6150D | 6380D | 6590D | 6690D | 6700D |
| | 7010D | 8870D | 8950D | 8990D | 9320D | 9450D | 10000D | 10070D | 10130D | 10180D | 10200D | 10210D | 10300D |
| | 10310D | 10440D | 10500D | 10530D | 10620D | 10640D | 10670D | 10690D | 10730D | 10850D | 10870D | 11000D | 11030D |
| | 11120D | 11220D | 11490D | 11520D | 12180D | | | | | | | | |
| MAN | 174• | | | | | | | | | | | | |
| MANR | 158• | 643 | | | | | | | | | | | |
| MANA | 156• | 417 | 516 | 535 | 546 | 648 | | | | | | | |
| MAR1 | 157• | 647 | | | | | | | | | | | |
| MAR2 | 159• | | | | | | | | | | | | |
| MOO | 91• | | | | | | | | | | | | |
| MDRL | 166• | 417 | 429 | 516 | 539 | 643 | 647 | 640 | | | | | |
| MOHOL | 136• | 415 | 470 | 515 | 539 | 556 | 566 | 642 | 646 | 655 | 946 | 952 | |
| MOHOU | 138• | 531 | 538 | 548 | 551 | 654 | | | | | | | |
| MDRU | 167• | 426 | 535 | 546 | | | | | | | | | |
| MD15 | 92• | | | | | | | | | | | | |
| M1 | 3470D | 3560D | 3590D | 3680D | 3700D | 3730D | 3750D | 3760D | 3780D | 3800D | 3820D | 3950D | 3970D |
| | 3990D | 4040D | 4060D | 4070D | 4080D | 4090D | 4110D | 4120D | 4130D | 4150D | 4160D | 4170D | 4180D |
| | 4240D | 4260D | 4280D | 4290D | 4320D | 4370D | 4380D | 4390D | 4400D | 4440D | 4540D | 4560D | 4600D |
| | 4760D | 4780D | 4820D | 4830D | 4840D | 4860D | 4880D | 4890D | 4910D | 4930D | 5010D | 5050D | 5060D |

MICROCODE FOR HIGH SPEED SEARCH FUNCTION (HSSF) DATE 041580

| | | | | | | | | | | | | | |
|---|---|---|---|---|---|---|---|---|---|---|---|---|---|
| | 5070 | 5090 | 5110 | 5130 | 5150 | 5160 | 5250 | 5260 | 5310 | 5350 | 5360 | 5370 | 5380 |
| | 5390 | 5430 | 5440 | 5460 | 5480 | 5490 | 5500 | 5510 | 5540 | 5550 | 5560 | 5580 | 5590 |
| | 5600 | 5650 | 5660 | 5680 | 5690 | 5710 | 5720 | 5790 | 5820 | 5900 | 5920 | 5930 | 5940 |
| | 6040 | 6060 | 6160 | 6180 | 6190 | 6200 | 6260 | 6280 | 6290 | 6340 | 6400 | 6410 | 6420 |
| | 6430 | 6460 | 6470 | 6480 | 6510 | 6520 | 6530 | 6540 | 6550 | 6560 | 6600 | 6610 | 6620 |
| | 6630 | 6640 | 6710 | 6770 | 6780 | 6790 | 6800 | 6810 | 6830 | 6840 | 6850 | 6890 | 6900 |
| | 6920 | 6980 | 7020 | 7040 | 7050 | 7090 | 7100 | 7120 | 7130 | 7140 | 7190 | 7230 | 7240 |
| | 7290 | 7300 | 7390 | 7410 | 7430 | 7450 | 7460 | 7470 | 7480 | 7490 | 7500 | 7510 | 7520 |
| | 7530 | 7540 | 7550 | 7560 | 7570 | 7580 | 7590 | 7600 | 7610 | 7620 | 7630 | 7640 | 7650 |
| | 7660 | 7680 | 7770 | 7790 | 7800 | 7820 | 7840 | 7870 | 7910 | 7920 | 7940 | 7960 | 7970 |
| | 7990 | 8010 | 8090 | 8110 | 8140 | 8170 | 8190 | 8210 | 8240 | 8310 | 8350 | 8380 | 8400 |
| | 8420 | 8450 | 8490 | 8570 | 8610 | 8640 | 8660 | 8680 | 8710 | 8740 | 8890 | 8910 | 9000 |
| | 9020 | 9030 | 9100 | 9120 | 9200 | 9220 | 9240 | 9330 | 9350 | 9380 | 9390 | 9400 | 9420 |
| | 9460 | 9480 | 9490 | 9520 | 9530 | 9540 | 9550 | 9590 | 9650 | 9660 | 9680 | 9700 | 10010 |
| | 10020 | 10100 | 10140 | 10150 | 10240 | 10250 | 10280 | 10330 | 10380 | 10390 | 10400 | 10410 | 10420 |
| | 10470 | 10480 | 10510 | 10540 | 10590 | 10600 | 10650 | 10700 | 10750 | 10760 | 10790 | 10820 | 10890 |
| | 10960 | 11040 | 11140 | 11150 | 11270 | 11320 | 11360 | 11410 | 11420 | 11440 | 11530 | 11580 | 11600 |
| | 11620 | 11640 | 11660 | 11670 | 11730 | 11740 | 11820 | 11830 | 11850 | 11920 | 11930 | 11970 | 12020 |
| | 12050 | 12070 | 12090 | 12100 | 12140 | 12200 | | | | | | | |
| M2 | 4010 | 4610 | 4640 | 4650 | 4670 | 6730 | 9190 | | | | | | |
| NEG | 217• | 1038 | 1047 | | | | | | | | | | |
| NO | 101• | | | | | | | | | | | | |
| NOD | 124• | | | | | | | | | | | | |
| NOHIT | 225• | 690 | | | | | | | | | | | |
| NOT | 1055• | 1047 | | | | | | | | | | | |
| NOTF | 1077• | 1038 | | | | | | | | | | | |
| NOTO | 1080• | | | | | | | | | | | | |
| NSA | 224• | | | | | | | | | | | | |
| NTFLG | 330• | | | | | | | | | | | | |
| NZ | 215• | 432 | 437 | 561 | 634 | 796 | 933 | 1059 | 1079 | | | | |
| O | 221 | | | | | | | | | | | | |
| OBAP | 145• | 183• | 592 | 882 | 902 | | | | | | | | |
| OCA | 235• | 467 | | | | | | | | | | | |
| OCAP | 146• | 184• | 405 | 676 | 888 | | | | | | | | |
| OCI | 233• | 464 | | | | | | | | | | | |
| OCIA | 857• | 463 | | | | | | | | | | | |
| OCR | 809• | 766 | | | | | | | | | | | |
| ODA | 226• | 454 | | | | | | | | | | | |
| ODATA | 153• | 191• | 396 | 478 | 508 | 510 | 512 | 514 | 551 | 556 | 632 | 904 | 945 |
| | 1008 | 1019 | 1022 | | | | | | | | | | |
| ODD | 219• | | | | | | | | | | | | |
| OFW | 304• | 723 | | | | | | | | | | | |
| OMI | 231• | | | | | | | | | | | | |
| ONE | 121• | 400 | 944 | | | | | | | | | | |
| ONES | 122• | | | | | | | | | | | | |
| OPER | 1118• | 1051 | 1054 | 1070 | | | | | | | | | |
| OPNDI | 1088• | 1115 | 1153 | | | | | | | | | | |
| OPRND | 1011• | 1104 | | | | | | | | | | | |
| OPI | 1014• | 1065 | | | | | | | | | | | |
| OR | 117• | 870 | | | | | | | | | | | |
| ORS | 116• | | | | | | | | | | | | |
| OTB | 137• | 375 | 407 | 579 | 604 | 679 | 787 | 814 | 835 | 861 | 889 | | |

MICROCODE FOR HIGH SPEED SEARCH FUNCTION (HSSF) DATE 041580

| | | | | | | | | | | | | | |
|---|---|---|---|---|---|---|---|---|---|---|---|---|---|
| OIR | 266• | 579 | 889 | | | | | | | | | | |
| OUTD | 862• | 451 | | | | | | | | | | | |
| OSC | 144• | 182• | 593 | 887 | 903 | | | | | | | | |
| PHSSFS | 30 | | | | | | | | | | | | |
| POS | 218• | 1039 | | | | | | | | | | | |
| PREP | 1182• | 346 | | | | | | | | | | | |
| PREP1 | 1184• | 1184 | | | | | | | | | | | |
| PREP2 | 1196• | 1197 | | | | | | | | | | | |
| PREP3 | 1206• | 1207 | | | | | | | | | | | |
| PREP4 | 1213• | 1214 | | | | | | | | | | | |
| PRFLG | 328• | | | | | | | | | | | | |
| PRSAV | 313• | 512 | 519 | 531 | | | | | | | | | |
| PUSH | 200• | | | | | | | | | | | | |
| R | 102• | 396 | 508 | 510 | 512 | 514 | 603 | 632 | 718 | 802 | 887 | 1000 | 1184 |
| | 1187 | 1109 | 1191 | | | | | | | | | | |
| RAM | 162• | 356 | 360 | 375 | 392 | 397 | 400 | 407 | 415 | 418 | 421 | 436 | 430 |
| | 440 | 441 | 465 | 480 | 491 | 500 | 505 | 515 | 517 | 519 | 531 | 530 | 552 |
| | 557 | 559 | 561 | 568 | 571 | 579 | 584 | 586 | 592 | 593 | 604 | 609 | 613 |
| | 618 | 619 | 633 | 642 | 650 | 654 | 655 | 656 | 657 | 663 | 669 | 679 | 710 |
| | 713 | 723 | 777 | 787 | 814 | 835 | 845 | 861 | 871 | 889 | 893 | 897 | 902 |
| | 953 | 935 | 950 | 955 | 960 | 962 | 968 | 1009 | 1017 | 1032 | 1034 | 1037 | 1043 |
| | 1049 | 1052 | 1055 | 1061 | 1066 | 1072 | 1074 | 1077 | 1081 | 1084 | 1086 | 1088 | 1093 |
| | 1101 | 1107 | 1114 | 1118 | 1120 | 1123 | 1129 | 1134 | 1141 | 1148 | 1151 | 1156 | 1164 |
| | 1173 | | | | | | | | | | | | |
| RAM6 | 266• | | | | | | | | | | | | |
| RCIR | 274• | 845 | 871 | | | | | | | | | | |
| RCOR | 276• | | | | | | | | | | | | |
| RDRE | 390• | 762 | | | | | | | | | | | |
| RDREX | 762• | 749 | | | | | | | | | | | |
| RLID | 260• | 356 | | | | | | | | | | | |
| RLOD | 278• | 360 | 397 | 663 | | | | | | | | | |
| REPT | 1072• | 1059 | | | | | | | | | | | |
| REST1 | 1149• | 1150 | | | | | | | | | | | |
| REST2 | 1151• | 1136 | | | | | | | | | | | |
| RMFD | 227• | 378 | 411 | 590 | 616 | 683 | 794 | 821 | 842 | 868 | 900 | | |
| RMFR | 139• | 376 | 408 | 582 | 606 | 680 | 791 | 817 | 830 | 864 | 891 | | |
| RMIF | 272• | | | | | | | | | | | | |
| RMOF | 270• | | | | | | | | | | | | |
| RPDA | 205• | 661 | 951 | 1028 | 1040 | 1060 | 1075 | 1184 | 1197 | 1207 | 1214 | | |
| RPST | 204• | | | | | | | | | | | | |
| RS | 317• | 391 | 418 | 421 | 422 | 441 | | | | | | | |
| RSAVR | 316• | 396 | 415 | | | | | | | | | | |
| RSAVW | 311• | 508 | 515 | 517 | 538 | | | | | | | | |
| RSS | 318• | 638 | 656 | 657 | 659 | | | | | | | | |
| SACT | 223• | 424 | 484 | 537 | 544 | 560 | 569 | 626 | 660 | 705 | 965 | | |
| SAVE | 331• | | | | | | | | | | | | |
| SBA | 110• | 609 | 1017 | | | | | | | | | | |
| SBAS | 111• | 1036 | 1045 | 1057 | 1078 | 1126 | 1130 | 1135 | | | | | |
| SBS | 108• | 562 | 650 | 658 | | | | | | | | | |
| SBSS | 109• | 519 | 587 | 894 | 1165 | | | | | | | | |
| SCAN | 766• | 221 | 799 | 824 | 849 | 874 | 920 | 1220 | | | | | |
| SCHI | 373• | 801 | | | | | | | | | | | |

MICROCODE FOR HIGH SPEED SEARCH FUNCTION (HSSF) DATE 041580

| | | | | | | | | | | | | | |
|---|---|---|---|---|---|---|---|---|---|---|---|---|---|
| SCLFT | 340• | | | | | | | | | | | | |
| SETADR | 345D | 7270 | 7300 | 7750 | 8070 | | | | | | | | |
| SFUD3C | 186• | | | | | | | | | | | | |
| SFUD14 | 175• | | | | | | | | | | | | |
| SFUD15 | 176• | | | | | | | | | | | | |
| SFUD16 | 177• | | | | | | | | | | | | |
| SFUD17 | 194• | | | | | | | | | | | | |
| SFUD23 | 181• | | | | | | | | | | | | |
| SFUD3 | 165• | 949 | 1025 | 1042 | | | | | | | | | |
| SFUD32 | 188• | | | | | | | | | | | | |
| SFUD33 | 189• | | | | | | | | | | | | |
| SFUD34 | 190• | | | | | | | | | | | | |
| SFUD36 | 192• | | | | | | | | | | | | |
| SFUD6 | 160• | | | | | | | | | | | | |
| SFUD7 | 169• | | | | | | | | | | | | |
| SIGN | 93• | | | | | | | | | | | | |
| SLR | 131• | 651 | | | | | | | | | | | |
| SPSE | 129• | 712 | | | | | | | | | | | |
| SRA | 421 | | | | | | | | | | | | |
| SRCH | 626• | 764 | | | | | | | | | | | |
| SRCHX | 763• | 751 | | | | | | | | | | | |
| SRCH1 | 828• | | | | | | | | | | | | |
| SRCH10 | 723• | 692 | | | | | | | | | | | |
| SRCH2 | 629• | | | | | | | | | | | | |
| SRCH3 | 640• | 634 | | | | | | | | | | | |
| SRCH4 | 654• | 661 | | | | | | | | | | | |
| SRCH5 | 663• | 662 | | | | | | | | | | | |
| SRCH6 | 673• | 665 | | | | | | | | | | | |
| SRCH7 | 676• | | | | | | | | | | | | |
| SRCH8 | 687• | 673 | | | | | | | | | | | |
| SRCH8A | 710• | | | | | | | | | | | | |
| SRCH8B | 709• | 724 | | | | | | | | | | | |
| SRCH8H | 690• | 703 | | | | | | | | | | | |
| SRCH8N | 705• | 690 | | | | | | | | | | | |
| SRT | 951D | 1027D | | | | | | | | | | | |
| TBP | 720• | 347 | 359 | 370 | 454 | 461 | 464 | 467 | | | | | |
| TLP | 760• | 942 | 1002 | 1015 | | | | | | | | | |
| TNUC | 213• | 347 | 359 | 370 | 382 | 395 | 413 | 426 | 429 | 439 | 444 | 460 | 476 |
| | 489 | 493 | 506 | 507 | 509 | 511 | 513 | 549 | 550 | 555 | 565 | 572 | 629 |
| | 662 | 685 | 702 | 703 | 714 | 719 | 724 | 730 | 741 | 743 | 745 | 746 | 747 |
| | 740 | 749 | 750 | 751 | 752 | 753 | 754 | 755 | 756 | 757 | 759 | 761 | 763 |
| | 765 | 768 | 780 | 797 | 801 | 824 | 849 | 874 | 920 | 924 | 939 | 942 | 946 |
| | 952 | 954 | 966 | 970 | 1040 | 1051 | 1054 | 1065 | 1070 | 1076 | 1082 | 1104 | 1115 |
| | 1144 | 1153 | 1158 | 1167 | 1174 | 1220 | | | | | | | |
| TWO | 211• | | | | | | | | | | | | |
| ULTRA | 2• | | | | | | | | | | | | |
| UNO | 90• | 951 | 1027 | | | | | | | | | | |
| VECR | 132• | 652 | 729 | 758 | 760 | 762 | 764 | 766 | 910 | 922 | 930 | 940 | 948 |
| | 1001 | 1014 | 1024 | 1041 | 1142 | 1182 | 1192 | 1202 | 1209 | | | | |
| WCI | 257• | 602 | 609 | 611 | 619 | | | | | | | | |
| WCO | 256• | 485 | 500 | 552 | 557 | 586 | 589 | 593 | 633 | 887 | 893 | 895 | 903 |
| | 960 | | | | | | | | | | | | |

```
MICROCODE FOR HIGH SPEED SEARCH FUNCTION (HSSF)                                                   DATE 041500
WCOMP          955*   946    952
WCS            370*
WR             315*   524    559    561    564    560
WRRO           590*   760
WRROA          760*   747
WRRO1          507*   501
WRU            555*   549
WR2            566*   554
WR21           566*   550
WR200          326*
WR50           306*   642    945    950
WR51           307*   669
WR52           308*   650
WR53           309*
WR54           310*
XFRAM         1160*  1103
XF1           1164*  1167
XOR1          1155*  1132
XAX            305*   392    400    436
XAY            281*
XA1           1142*  1010   1040   1076   1079   1166
ZBMA           134*   662   1160
ZEN             89*
ZERO           216*   399    428    486    526    554    558    692    953   1010   1033   1089   1103
              1127   1132   1136   1166
ZR             106*   392    441   1037   1104
ZRS           ,107*
END CULL  -  DATE: 04/15/80  TIME: 09:12:56  CARD COUNT: 1222  LABEL COUNT: 315  ITEM COUNT: 3112
*PACK KMIKE*TUNAT.
FURPUR 28R1 E35 S74T11 04/15/80 09:12:57
END PACK. TEXT*457,TOC*2,SYM*53,ABS*1,OMN*20
@URKPT PRINTS
```

Figure 42:
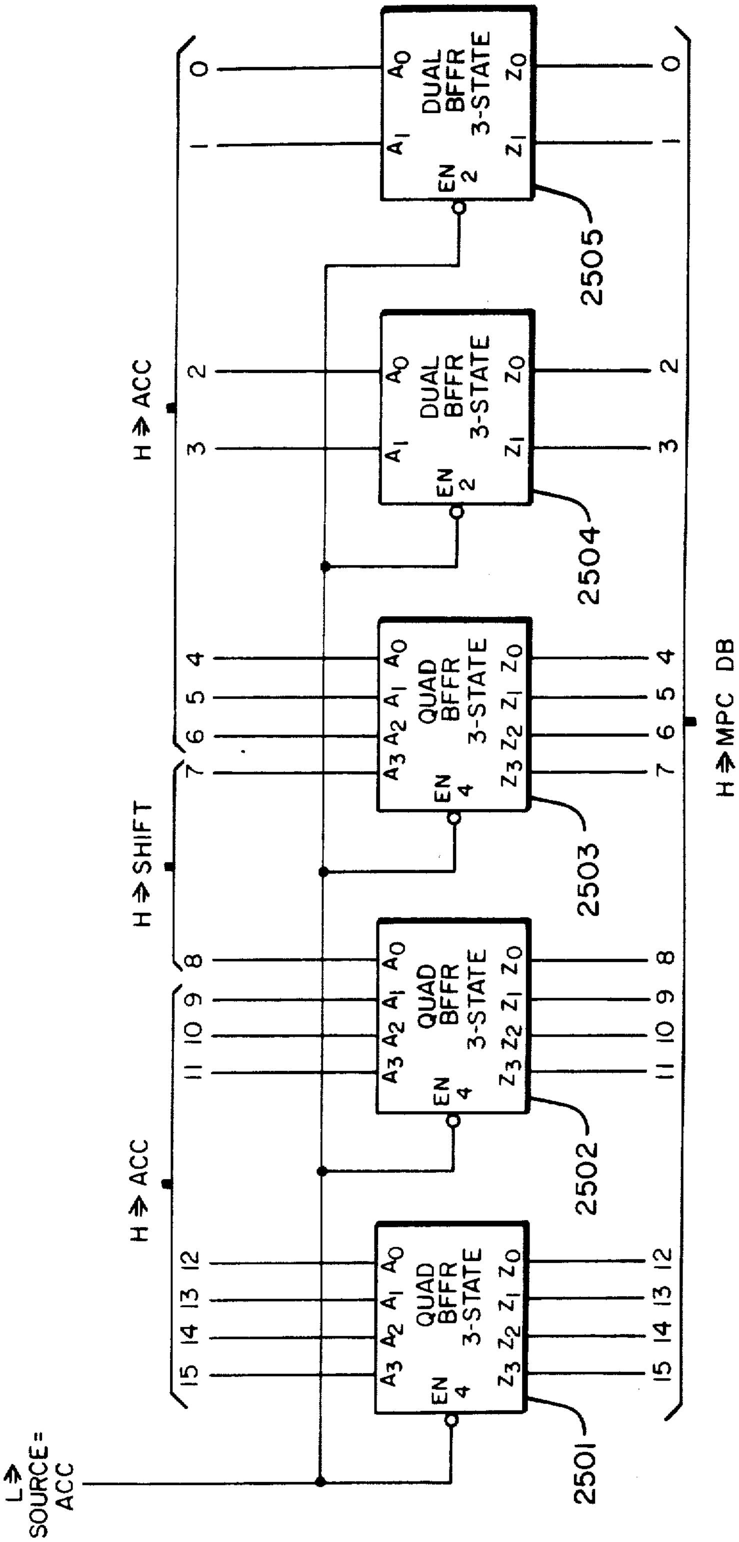
FIG. 42 shows the detailed construction of ACC BUFFER 255.

FIG. 42 shows the three state buffers (i.e., QUAD BFFR 3 STATE 2501, 2502, and 2503 and DUAL BFFR 3 STATE 2504 and 2505) which interface the output of ACC 250 to MPC BUS 103. ACC BUFFER 255 permits the output of ACC 250 to be placed on MPC BUS 103 (see also FIG. 16). As is seen in FIG. 42, ACC BUFFER 255 is enabled by signal L→SOURCE=ACC generated by FUNCTION, DEST, SOURCE DECODE 254 (see also FIG. 47).

Figure 43:
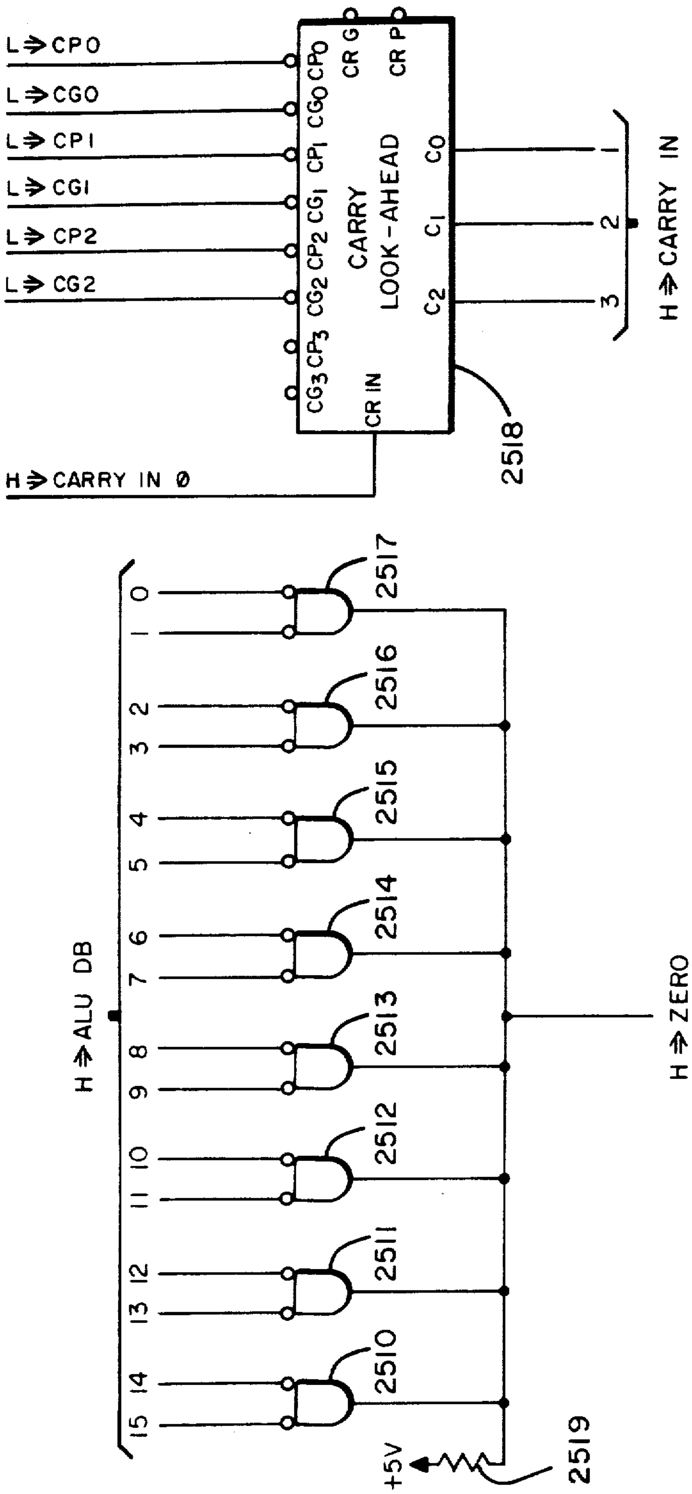
FIG. 43 shows the detailed construction of ZERO DETECT 251.

FIG. 43 shows the use of CARRY LOOK-AHEAD 2518 which is a monolithic device of Type 74182. Its inputs and outputs are to and from ALU 245. CARRY LOOK-AHEAD 2518 simply provides the carry look-ahead function for ALU 245. Also shown in FIG. 43 is ZERO DETECT 251 which contains gates 2510, 2511, 2512, 2513, 2514, 2515, 2516, and 2517. These gates transfer signal H→ZERO to FUNCTION, DEST, SOURCE DECODE 254 whenever ALU 245 generates a zero at all 16 bit positions. This provides a fast way of determining when an Input or Output buffer (i.e., multi-word transfer) is complete and should be terminated.

Figure 44:
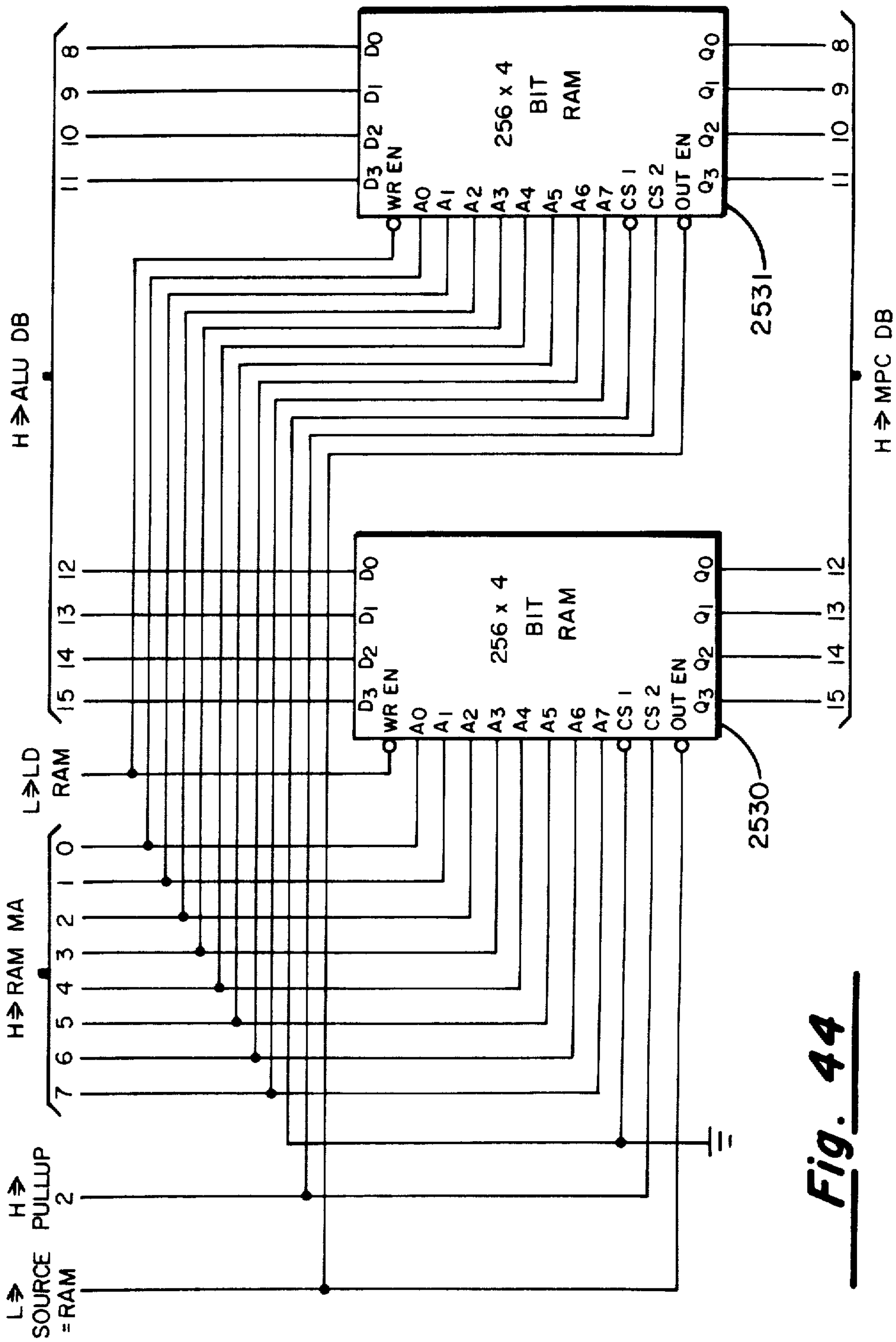
FIG. 44 shows the upper bits of RAM 253.
Figure 45:
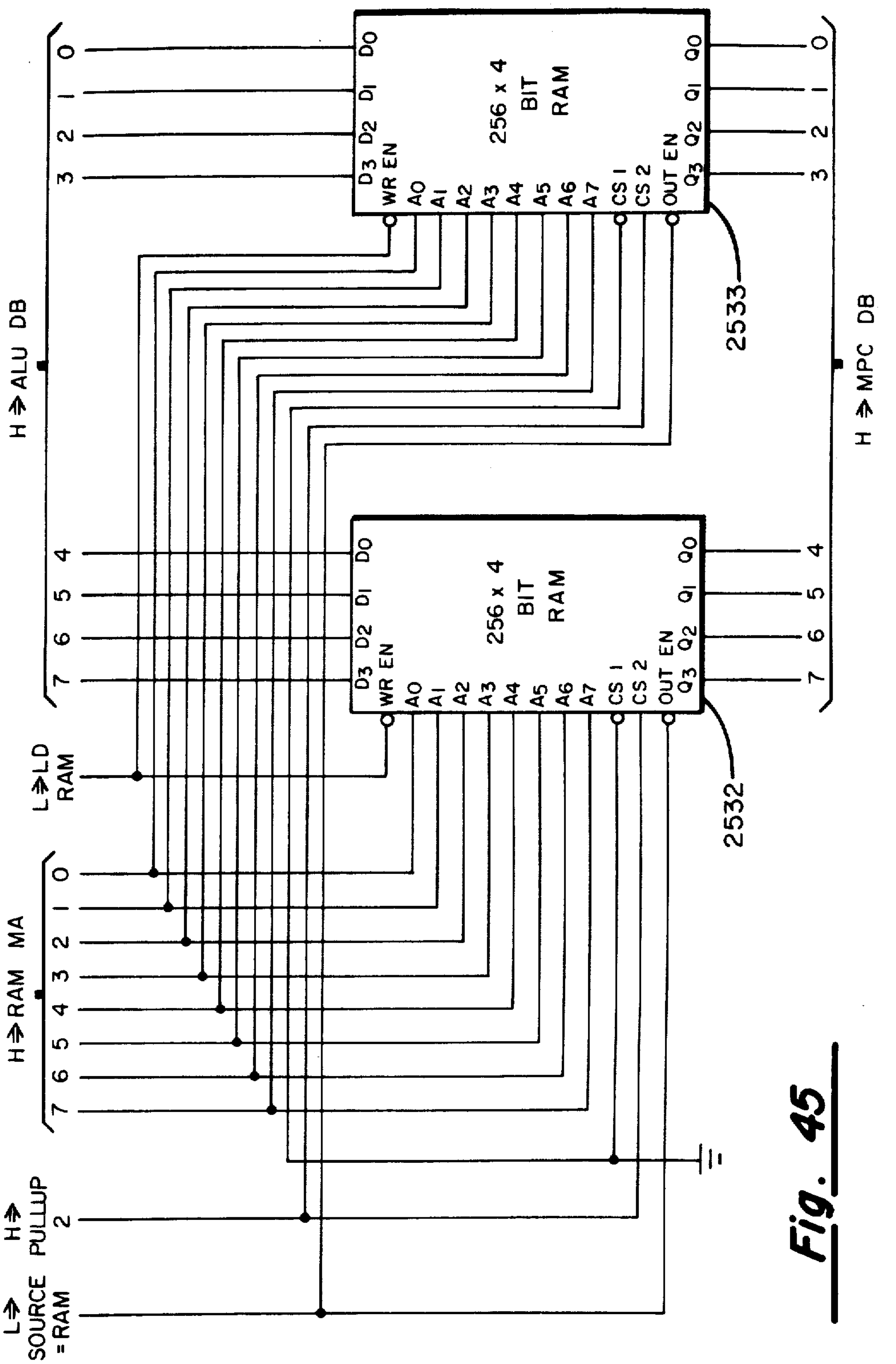
FIG. 45 shows the lower bits of RAM 253.
Figure 46:
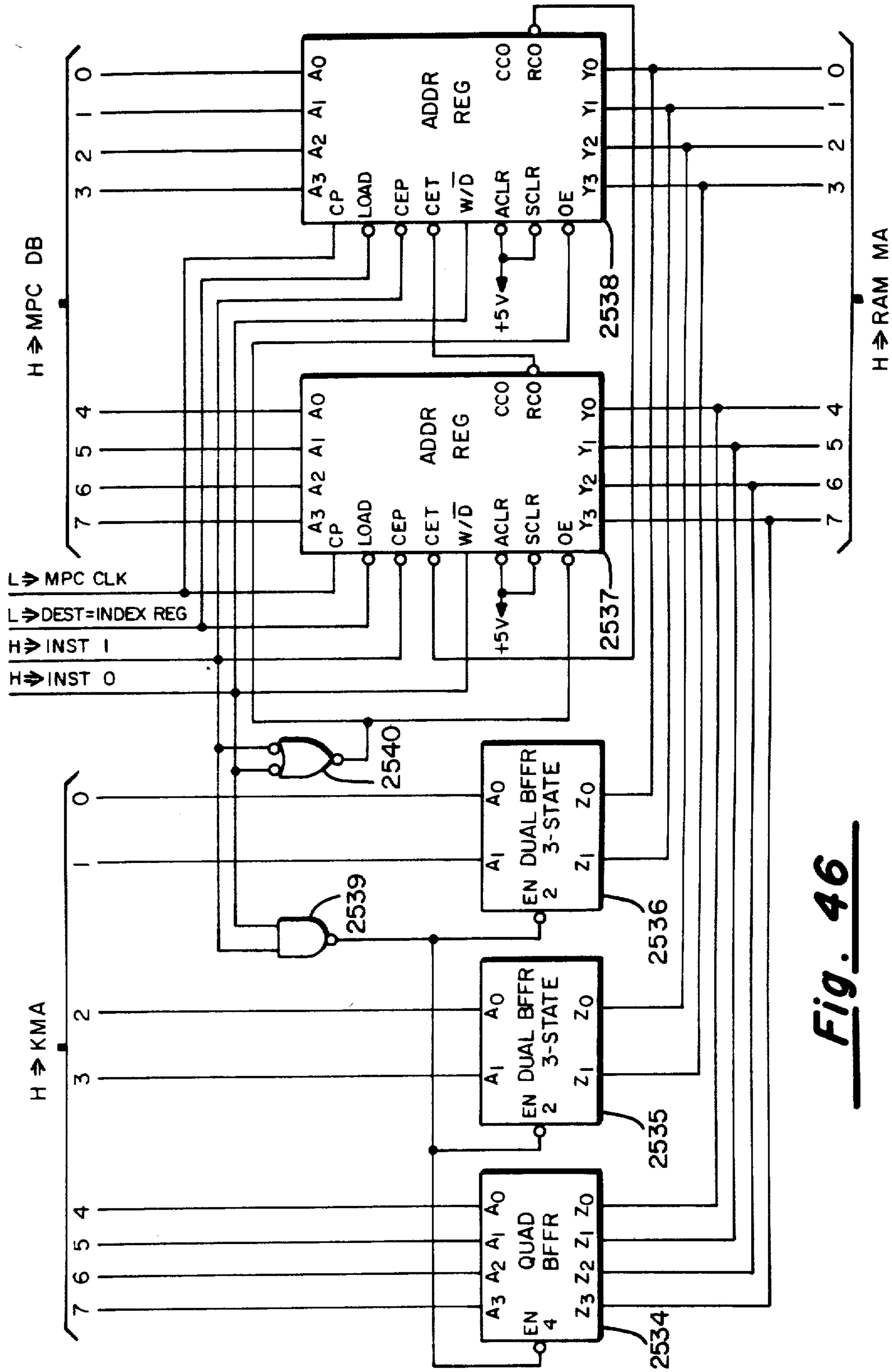
FIG. 46 shows the addressing circuitry of RAM 253.

RAM 253 is shown in detail in FIGS. 44, 45 and 46. RAM 253 provides the main working storage for MPC 240. 256×4 BIT RAM 2530, 2531, 2532, and 2533 (see both FIGS. 46 44 and 45) are configured to provide 256 addressable locations of 16 bit positions each. Industry standard part type 93L422 is used. The data input to RAM 253 is from ALU 245 as shown in FIG. 16. The data output of RAM 253 is transferred to MPC BUS 103. The write enable (i.e., input WR EN) for RAM 253 is generated by 32×8 BIT PROM 2458 (see FIG. 39). The output is enabled by signal L→SOURCE=RAM which is generated by FUNCTION, DEST, SOURCE DECODE 254. See FIG. 47.

The addressing for RAM 253 is provided by INDEX REG 249 and PROM BUFFER 256 in FIG. 46. ADDR REG 2537 and 2538 is a monolithic, index address register of the Type 25LS2569. These devices receive eight bit addresses from MPC BUS 103, temporarily store this information and supply the eight bit address required by RAM 253. Clocking is provided by signal L→MPC CLK which is generated by CLOCK 276 (see also FIG. 78). Referring to FIG. 46, control signals are provided by PROM/IR 248 (i.e., signals H→INST 0 and H→INST 1) and FUNCTION, DEST, SOURCE DECODE 254 (i.e., Signal L→DEST=INDEX REG (see also FIG. 47).

FIG. 46 also shows QUAD BFFR 2534 and DUAL BFFR 3 STATE 2535 and 2536 whose outputs are wire-ored with the address outputs of ADDR REG 2537 and 2538. This provides a means of addressing RAM 253 via PROM/IR 248 (see also FIG. 41). As shown in FIG. 46 QUAD BFFR 2534 and DUAL BFFR 3 STATE 2535 and 2535 are enabled for output by gate 2539 whenever both signals H→INST 0 and H→INST 1 (generated by PROM/IR 248) are present, whereas ADDR REG 2537 and 2538 are enabled for output by gate 2540 whenever either signal H→INST 0 or signal H→INST 1 is not present.

Figure 47:
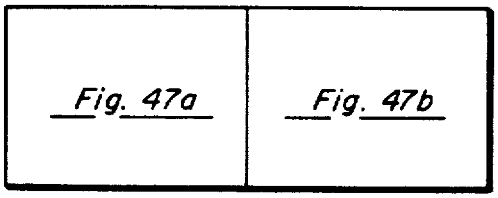
FIG. 47, consisting of FIGS. 47*a* and *b*, shows in detail FUNCTION, DEST, SOURCE DECODE 254.

FIG. 47 shows element FUNCTION, DEST, SOURCE DECODE 254 in detail. FUNCTION, DEST, SOURCE DECODE 254 decodes the microinstructions and provides the primary control for transfers made via MPC BUS 103. Each transfer needs a data transmitter or source and a data receiver or destination. Therefore, to complete a transfer the source must be enabled for transmitting and the destination must be enabled for receiving. FUNCTION, DEST, SOURCE DECODE 254 also generates various control signals which are associated with control of MPC BUS 103.

Figure 47A:
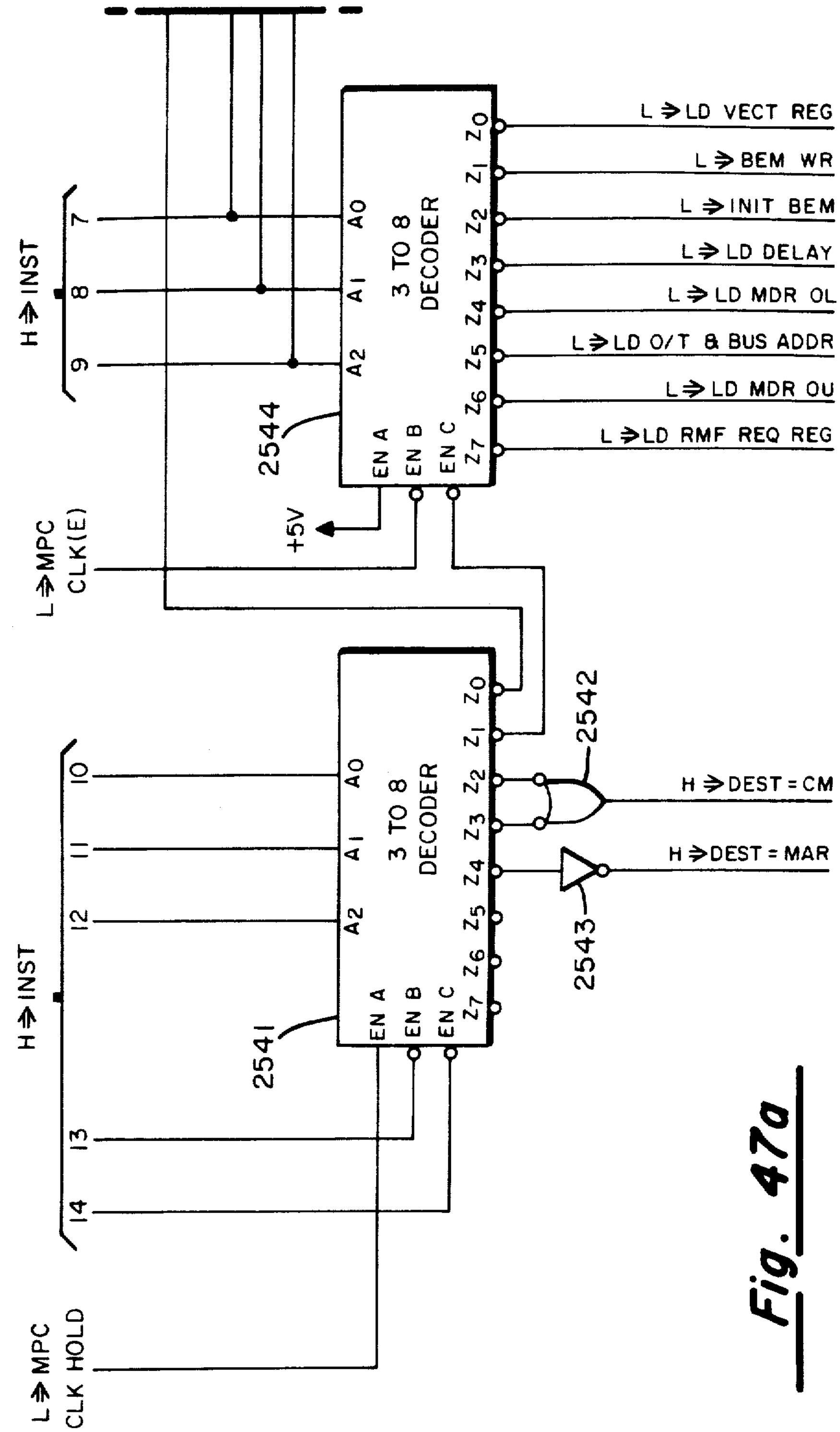
Figure 47B:
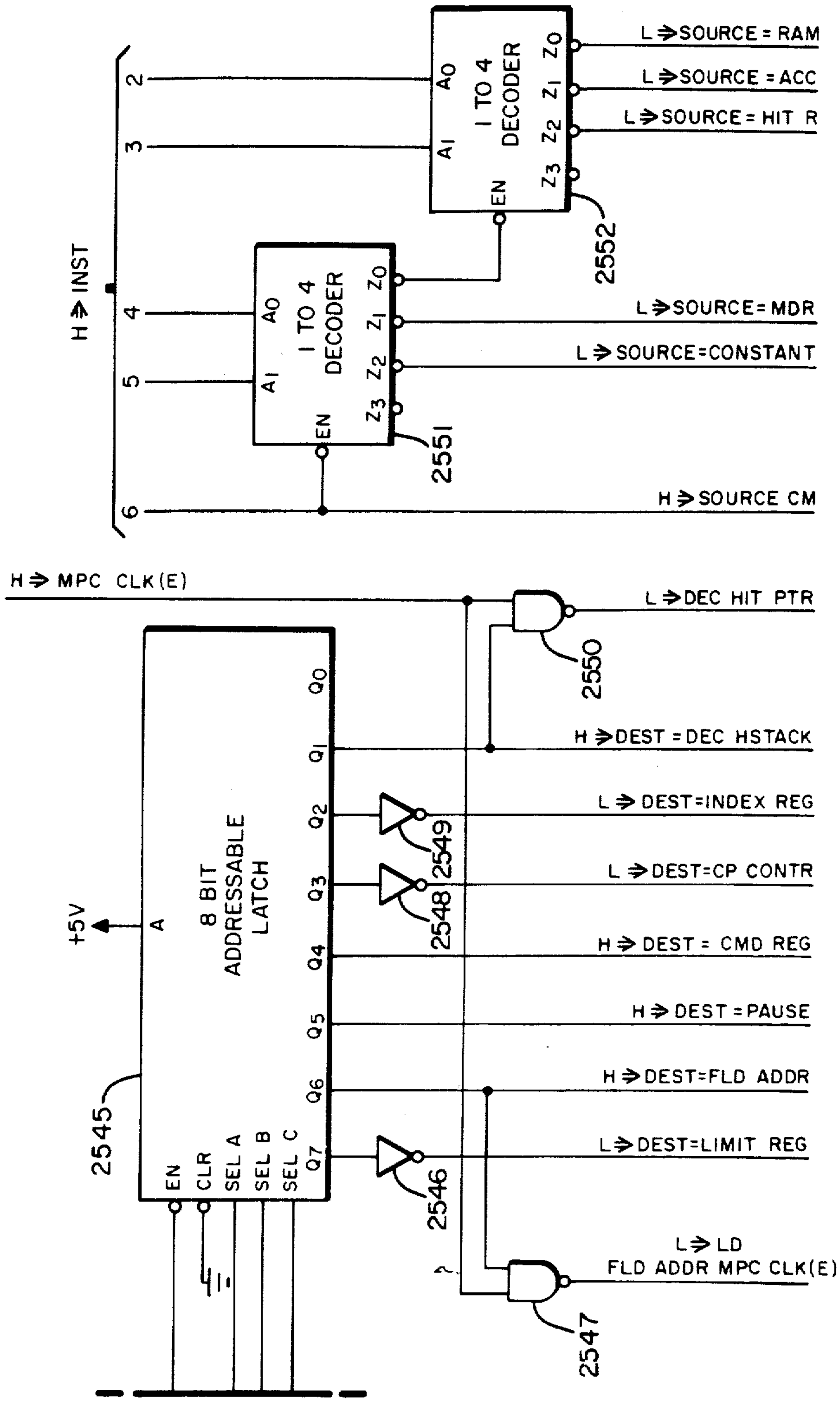

Referring to FIG. 47, consisting of FIGS. 47*a* and *b*, 3 to 8 DECODER 2541 generates control signals H→DEST=MAR and H→DEST=CM which causes the memory address register (see also FIG. 76 and FIG. 77) and CONTROL MEMORY 222 (see also FIG. 30 and FIG. 22), respectively, to be enabled as destinations. 3 to 8 DECODER 2541 is standard part 54LS138 which generates signal H→DEST=MAR as inverted by inverter 2543 whenever signal H→INST 12 is present and signals H→INST 10 and 11 are not present. Similarly, signal H→DEST=CM is generated whenever signal H→INST 11 is present and signal H→INST 12 is not present. Notice that enables are supplied by signals H→INST 13 and 14 and L→MPC CLK HOLD.

Whenever enabled, 3 to 8 DECODER 2544 translates instruction bits 7, 8, and 9 (i.e., H→INST 7-9) to generate a one of the eight control signals:

- L→LD VECT REG (i.e., load vector register);
- L→BEM WR (i.e., Boolean Evaluator Memory Write);
- L→INIT BEM (i.e., Initiate Boolean Evaluator Memory);
- L→LD DELAY (i.e., Load Delay register);
- L→LD MDROL (i.e., Load Memory Data Register Output Lower);
- L→LD O/T & BUS ADDR (i.e. Load Op code, Type Code and Bus Address);
- L→LD MDROU (i.e., Load Memory Data Register Output Upper); and
- L→LD RMF REQ REG (i.e., Load RMF BUS Request Register).

Enables for 3 to 8 DECODER 2544 are provided by 3 to 8 DECODER 2541 and signal L→MPC CLK (e) (see also FIG. 78) as shown in FIG. 47.

8 BIT ADDRESSABLE LATCH 2545 is enabled by 3 to 8 DECODER 2541 whenever Instruction Bits 10, 11, and 12 are all clear. Instruction Bits 7, 8 and 9 are used to address one of the eight outputs of 8 BIT ADDRESSABLE LATCH 2545. The outputs of 8 BIT ADDRESSABLE LATCH 2545 generate signals to enable as destinations LIMIT REG 262 (see also FIG. 56), FLD ADDR REG 263 (see also FIG. 57), Pause Flip-flop 2676 (see also FIG. 63), CHANNEL CMD REG 224 (see also FIG. 26), Input RLD of 2910 SEQUENCER 247 (see also FIG. 40), ADDR (i.e., Index) REG 2537 and 2538 (see also FIG. 46), and the Hit Stack Decrement Counter (see also FIG. 65).

Instruction bits 4, 5 and 6 are decoded by 1 to 4 DECODER 2551. If signal H→INST 6 is present, signal H→SOURCE CM is generated and 1 to 4 DECODER 2551 is disabled. Signals L→SOURCE CONSTANT and L→SOURCE=MDR are translations of Instruction bits 4 and 5. Instruction bits 2 and 3 are translated by 1 to 4 DECODER 2552 to generate signals L→SOURCE=RAM, L→SOURCE=ACC, and L→SOURCE=HITR whenever enabled by 1 to 4 DECODER 2551 (i.e., whenever Instruction bits 4, 5 and 6 are all zero).

Notice in summary that Instruction bits 2-6 are translated to enable sources to transmit data via MPC BUS 103. Similarly, Instruction bits 7-14 are translated to enable destinations to receive data via MPC BUS 103.

Figure 48:
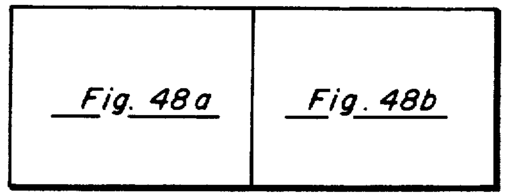
FIG. 48, consisting of FIGS. 48*a* and *b*, shows CONDITION MUX 246.
Figure 48A:
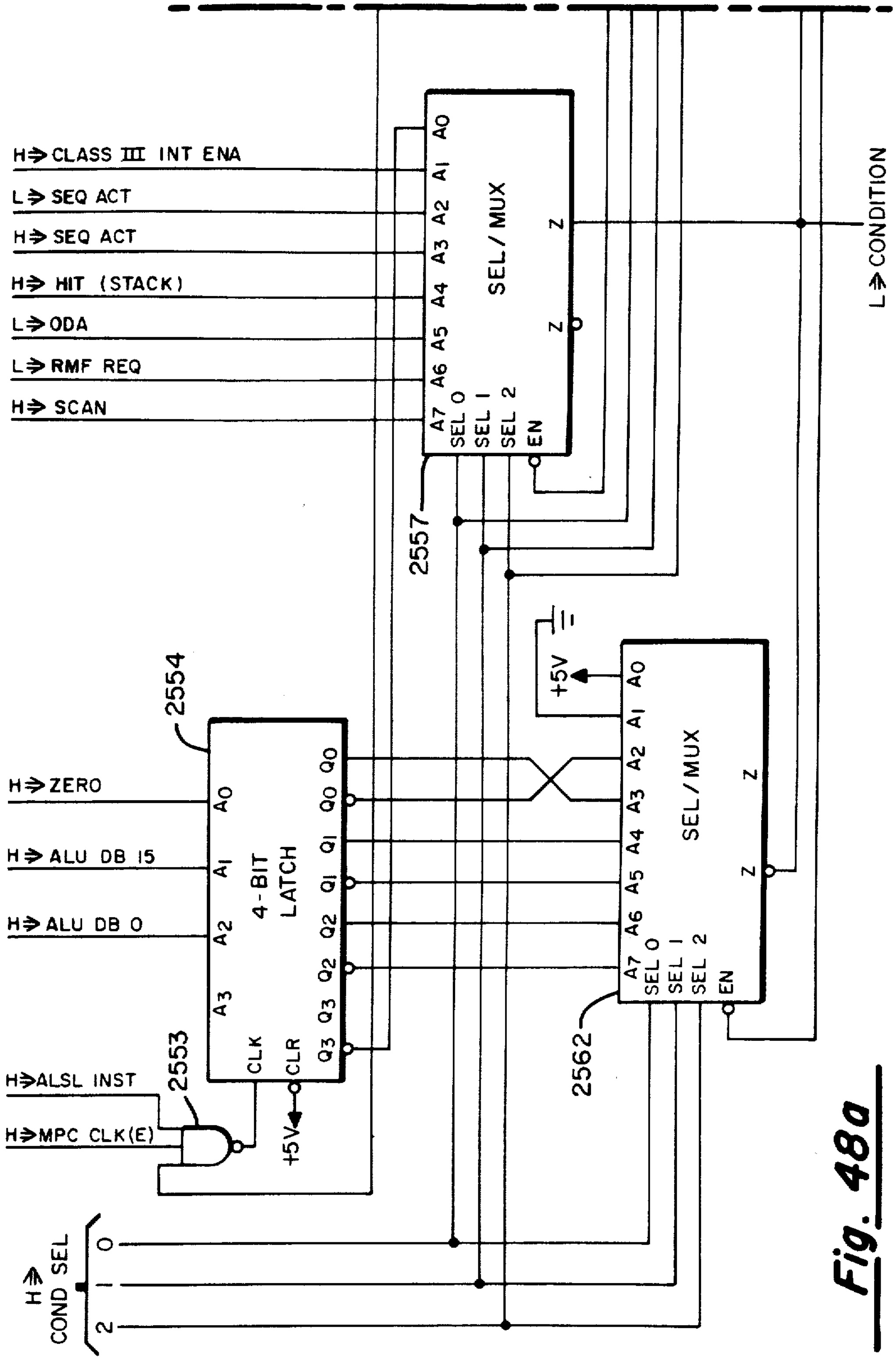
Figure 48B:
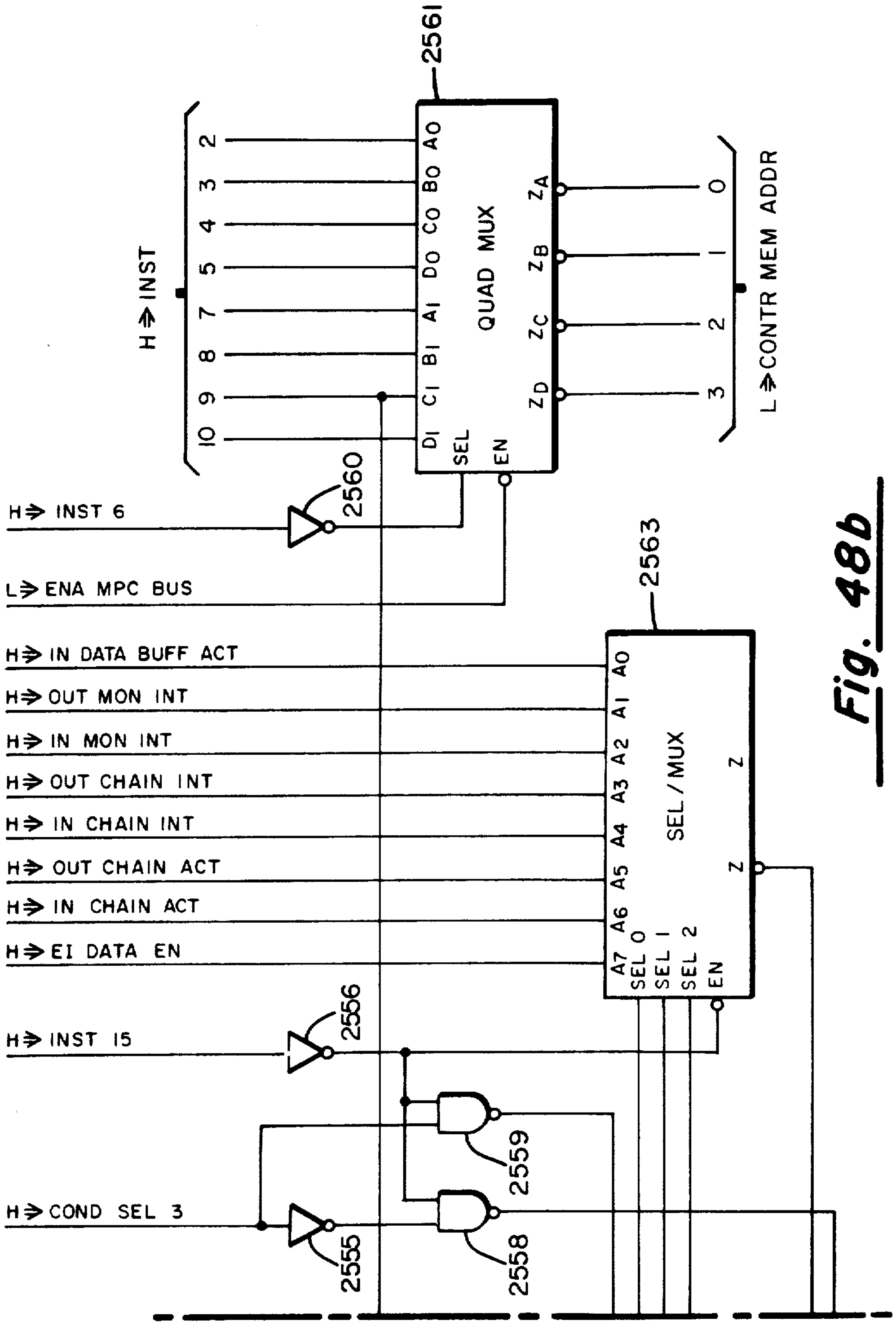

The remainder of FUNCTION, DEST, SOURCE DECODE 254 is found in FIG. 48, consisting of FIGS. 48*a* and *b*, QUAD MUX 2561 selects the addressing for CONTROL MEMORY 222 (see also FIG. 23). The selection is either Instruction Bits 2–5 or Instruction Bits 7–10. The selection is based upon the state of Instruction Bit 6 as shown. Signal L→ENA MPC BUS, generated by BIU CONTROL (see also FIG. 30) enables QUAD MUX 2561.

The other circuitry in FIG. 48 (i.e., CONDITION MUX 246) is used to signal 2910 SEQUENCER 247 of a required branch condition by the generation of Signal L→CONDITION. This signal is generated by the wire-ored outputs of SEL/MUX 2562, SEL/MUX 2563, and SEL/MUX 2557. The selection of each of SEL/MUX 2557, 2562, and 2563 is made based upon the outputs of PROM/IR 248 (see also FIG. 41) called signals H→COND SEL 0, 1 and 2. SEL/MUX 2563 is enabled for output by Instruction Bit 15. SEL/MUX 2557 is enabled for output by the output of gate 2559 which AND's signals H→COND SEL 3 (from PROM/IR 248) and the output of inverter 2556 (Instruction Bit 15). SEL/MUX 2562 is enabled for output by gate 2558 which AND's the output of Inverters 2555 and 2556. Therefore, it can be seen that one of SEL/MUX 2557, 2562, and 2563 is always enabled.

SEL/MUX 2563 has as its inputs, the Input/Output status signals stored by CHANNEL CMD REG 224 (see also FIG. 25). Therefore, 2910 SEQUENCER 247 is instructed to branch (i.e., receive signal L→CONDITION) from SEL/MUX 2563 whenever the selected Input/Output status is present. The inputs to SEL/MUX 2562 are arithmetic conditions which are stored by 4-BIT LATCH 2554. The arithmetic conditions are signified by signal H→ZERO, generated by ZERO DETECT 251, and signals H→ALU BD 0 and 15, generated by ALU 245. 4-BIT LATCH 2554 is clocked by the output of gate 2553 as shown.

SEL/MUX 2557 receives mode control signals as its inputs. These signals indicate major changes to operational mode. Signal H→CLASS III INT ENA is received from BIU CONTROL 227. Signal L→SEQ ACT is received from RD/WR/SEARCH SEQUENCER 265. Signal H→HIT (STACK) is received from Gate 2894 (see also FIG. 68). Signal L→ODA is received from CHANNEL CMD REG 224. Signal L→RMF REQ is received from 4-BIT LATCH 2590 (see also FIG. 52). And signal H→SCAN is received from TRANSCEIVER 221 (see also FIG. 21).

QUAD MUX 2561 determines the four bit address to be used for CONTROL MEMORY 222 (see also FIG. 23). Selection is based upon signal H→INST 6 as inverted by inverter 2560. QUAD MUX 2561 is enabled by signal L→ENA MPC BUS generated by BIU CONTROL 227. QUAD MUX 2561 selects for output from Instruction bits 2–5 or 7–10. These instruction bits, selected by Instruction bit 6, become the address for CONTROL MEMORY 222.

As can be seen from the above description, MPC 240 is a microprogrammed controller based upon the AMD 1910. MPC 240 provides overall control for HSSF 100, controlling all major modes of operation and data transfers. Because MPC 240 is too slow to achieve the desired search performance, however, the detailed timing of the search operations is provided by the hardwired logic of SEQUENCER 260.

Referring again to FIG. 17, the various major elements of SEQUENCER 260 can be seen. MPC BUS 103 is the major communication path between SEQUENCER 260 and the other elements (e.g., INTERFACE LOGIC 220 and MPC 240) of CONTROLLER 200. HSSF BUS 101 is the communication path between SEQUENCER 260 and the COMPARE ARRAY's. BOOLEAN EVALUATOR MEMORY 261 contains 32 addressable locations of 16 bits each in which is stored a representation of the user supplied Boolean Expression. This Boolean Expression defines a search "hit" or "miss" using Boolean Operators and the "flags", stored in FLAG MEMORY 321 (see also FIGS. 6 and 13). These flags are the field-by-field results of the logical comparison, as explained above.

RD/WR/SEARCH SEQUENCER 265 controls the timing of the various search functions, including the evaluation of the Boolean Expression. LIMIT REG 262 counts the records searched and terminates the search if too many records are searched. This is done because a large number of records searched implies a loop in the link field addressing.

DELAY REG 264 slows down the search cycle time depending upon the number of terms in the Boolean Expression (since Boolean Evaluation is a serial process) and the number of bytes in the largest field (to provide for the carry forward propagation time in the arithmetic comparator). FLD ADDR REG 263 saves the byte positions within a record which define the link field. The link field of a given record contains the record address of the next (not necessarily sequential) record to be searched. By using the link field, the data base may contain subfiles which may be searched rather than the entire data base. HIT STACK 266 temporarily stores the addresses of the records which were found to be hits until they can be stored away in the host computer's MEMORY 25. HIT STACK 266 has 16 addressable locations of 16 bits each wherein each of the 16 locations can store the record address of one record found to be a hit.

MAR STACK 272 stores the addresses to be used in accessing the data base. The address for a given record is read from the link field of the previous record. The Memory Data Register contains four elements, MDROU 268, MDROL 269. MDRIU 270 and MDRIL 271. The Memory Data Register temporarily stores data to be transmitted and received via MPC BUS 103 and HSSF BUS 101. CLOCK 276 provides master synchronization for all elements of HSSF 100.

For ease of understanding of the detailed construction and operation of SEQUENCER 260, the reader is encouraged to refer to FIGS. 17 and 20 as convenient.

Figure 52:
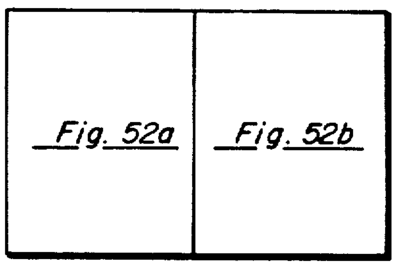
FIG. 52, consisting of FIGS. 52*a* and *b*, shows the address sequencer clock for the BOOLEAN EVALUATOR MEMORY 261 and control logic for INTERFACE LOGIC 220.
Figure 53:
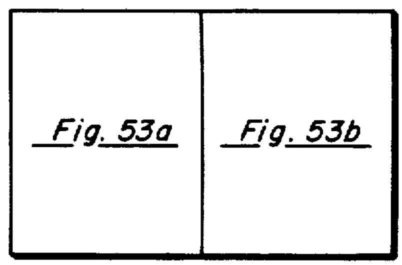
FIG. 53, consisting of FIGS. 53*a* and *b*, shows Stage 1 and Stage 2 of the Boolean Evaluator circuitry.
Figure 55:
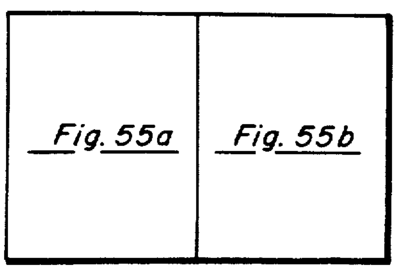
FIG. 55, consisting of FIGS. 55*a* and *b*, shows the Boolean Evaluator circuitry.
Figure 49:
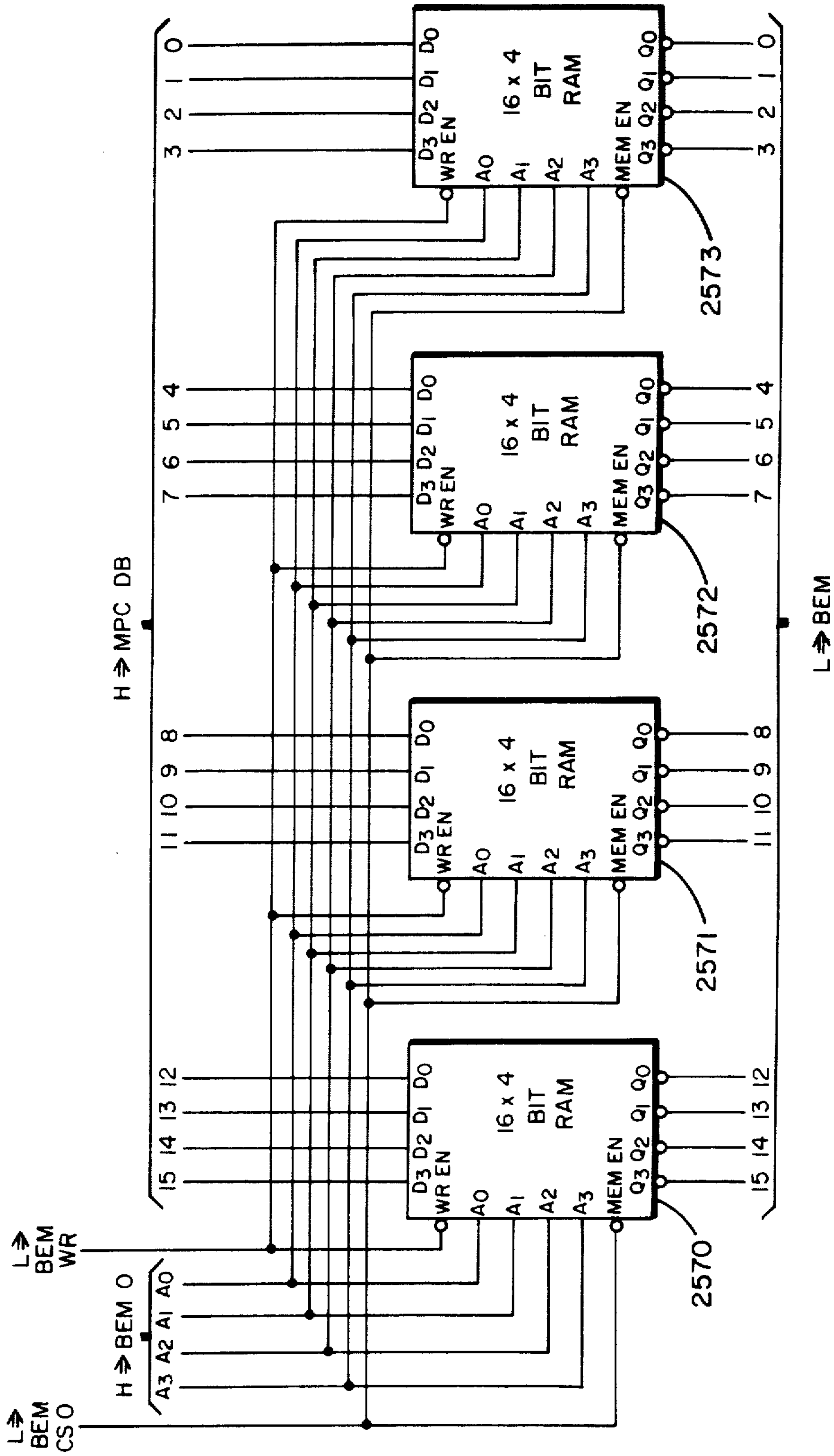
FIG. 49 shows Bank Ø of the BOOLEAN EVALUATOR MEMORY 261.
Figure 50:
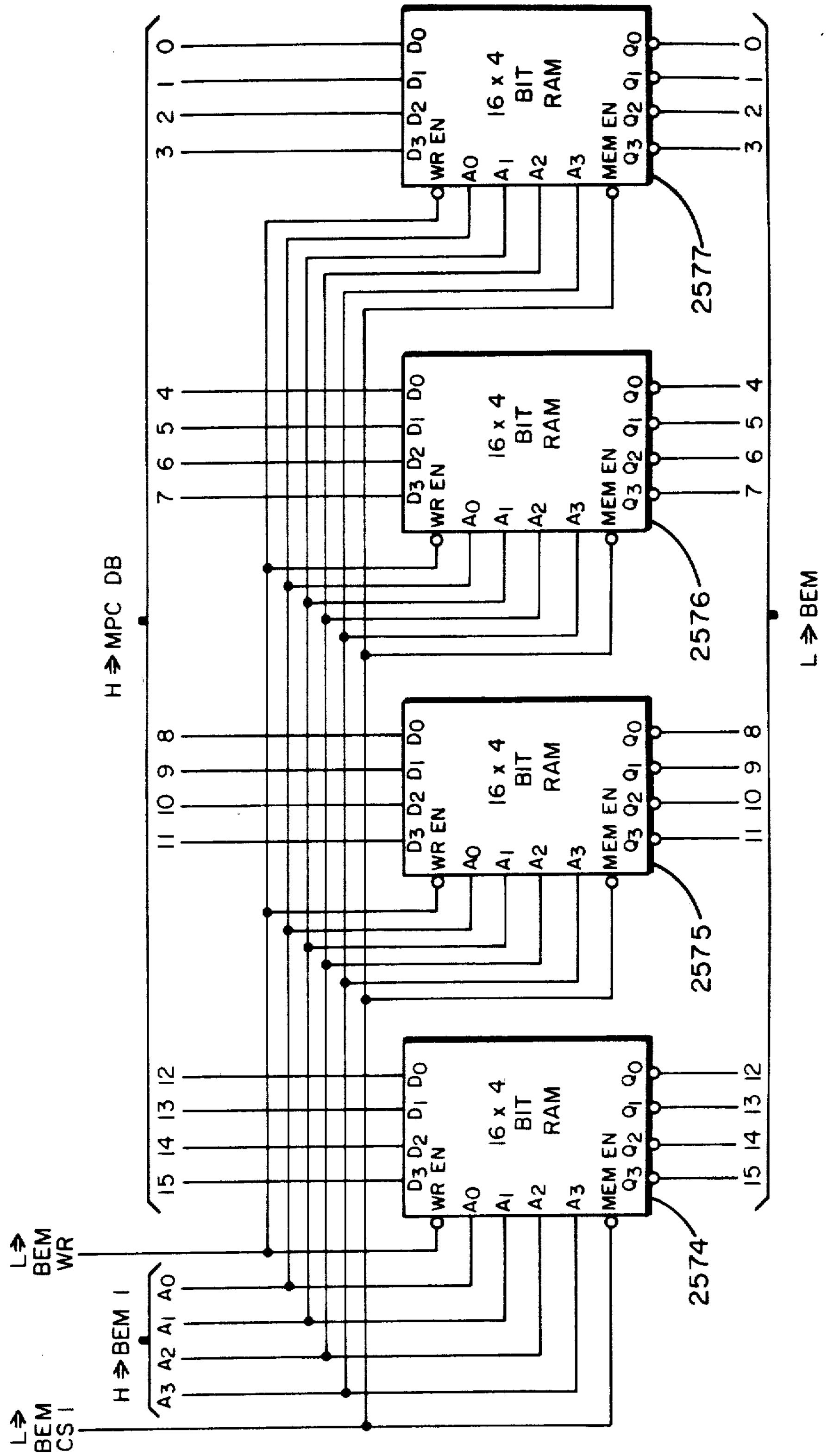
FIG. 50 shows Bank 1 of the BOOLEAN EVALUATOR MEMORY 261.
Figure 51:
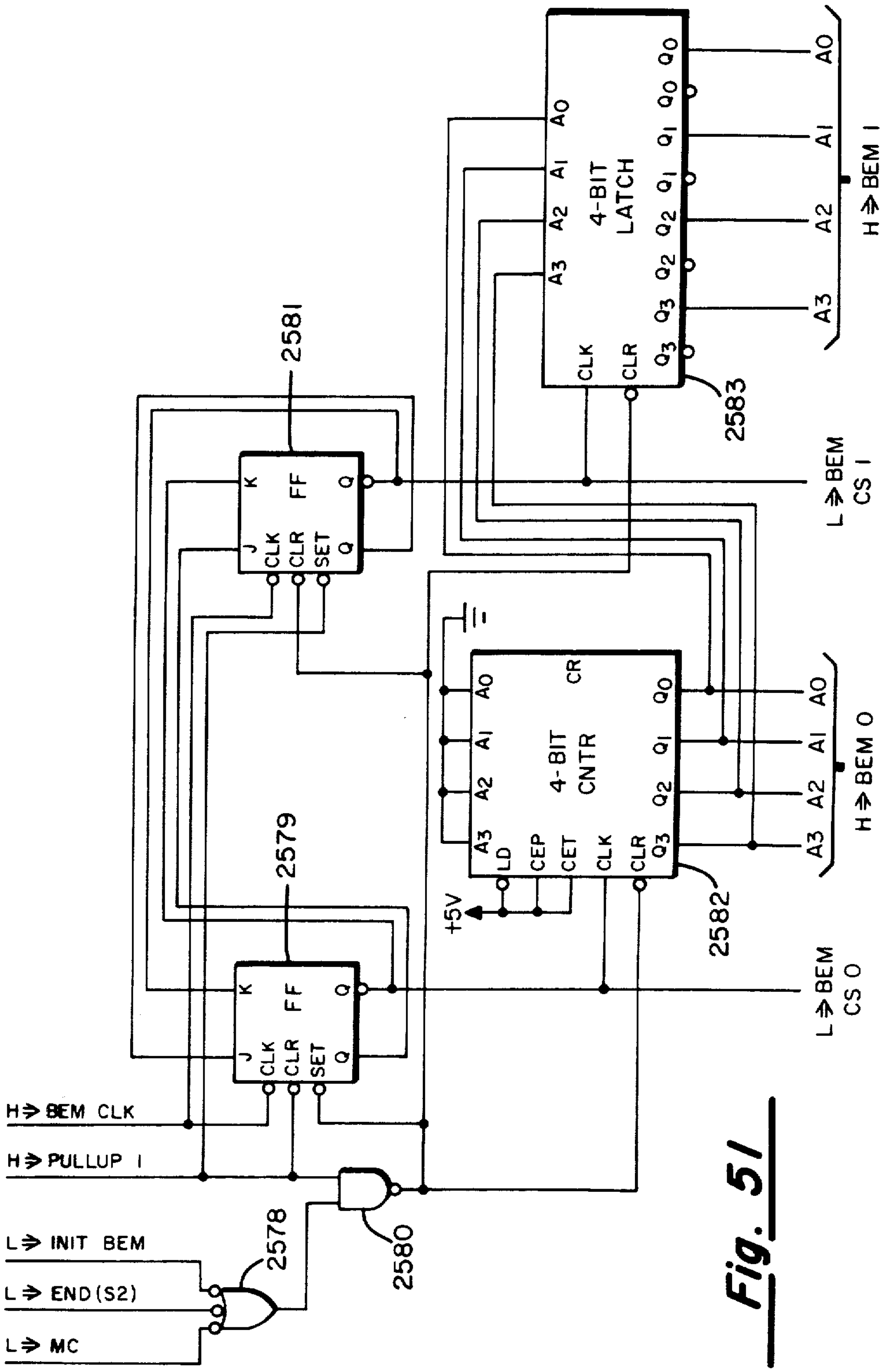
FIG. 51 shows the addressing circuitry for the BOOLEAN EVALUATOR MEMORY 261.
Figure 54:
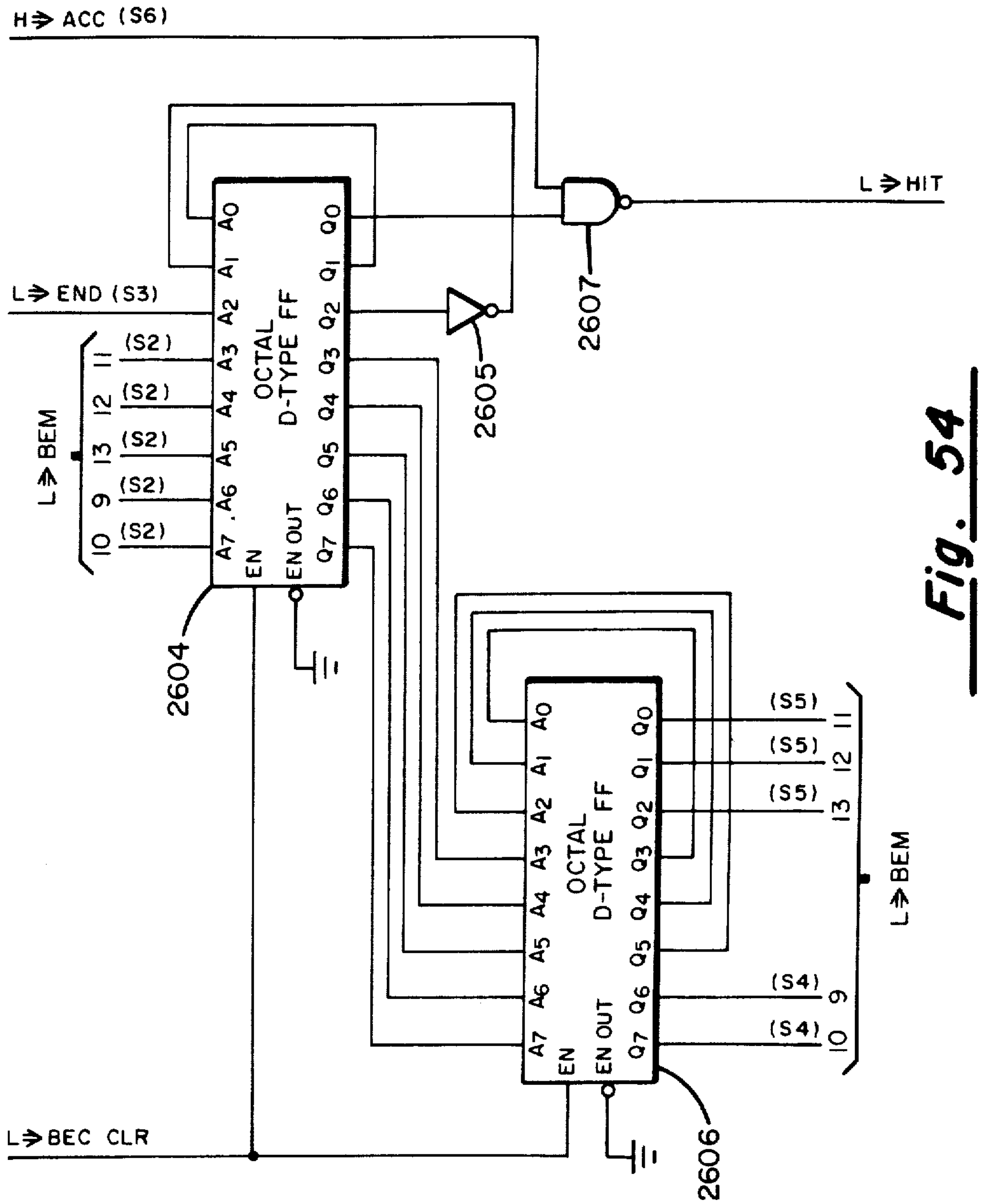
FIG. 54 shows the memory staging circuitry for the BOOLEAN EVALUATOR MEMORY 261.

FIGS. 49 and 50 show the detailed construction and operation of the memory elements of BOOLEAN EVALUATOR MEMORY 261. FIGS. 51 and 52 show the addressing circuitry. FIGS. 53, 54, and 55 show the detailed construction and operation of the Boolean Evaluator Circuitry. To enhance performance, Boolean Evaluation processes the Boolean Expression in a six stage pipeline. To assist the reader, the pipeline control and data signals are noted with the appropriate pipeline stages (i.e., SX, where X=1–6).

FIG. 49 shows Bank 0 of BOOLEAN EVALUATOR MEMORY 261. 16×4 BIT RAM's 2570, 2571, 2572, and 2573 provide storage for 16 words of 16 bits each (only 15 bit positions are actually used). Similarly FIG. 50 shows Bank 1 of BOOLEAN EVALUATOR MEMORY 261 wherein 16×4 BIT RAM 2574, 2575, 2576, and 2577 are used. Both Bank 0 and Bank 1 are loaded from MPC BUS 103. The data loaded is the user supplied Boolean Expression as formatted by MPC 240. The microprogram used to format the data may be found in the above microcode listing at address 00543 which is a logical address LBEX. Bit positions 0–8 specify a flag address which defines a variable (i.e., flag) to be used in Boolean Evaluation. Bit positions 9–13 define specific functions to be performed. Bit position 9 selects the true or compliment of the flag memory or stack. Bit position 10 selects from flag memory or the stack output and, if stack "pops" the stack is up. Bit positions 11 and 12 select LOAD, AND, OR or XOR boolean functions. Bit position 13 "pushes" the stack down. Bit position 14 signifies the end of the Boolean Expression. These functions are explained in detail below.

Signal L→BEM WR, generated by FUNCTION, DEST, SOURCE DECODE 254 (see also FIG. 47) enables both Bank 0 and Bank 1 for writing, as shown in FIGS. 49 and 50. Bank 0 (see FIG. 49) is enabled by Signal L→BEM CS 0, and Bank 1 (see FIG. 50) is enabled by Signal L→BEM CS 1. The generation of these signals is discussed below.

The addressing of Bank 0 and Bank 1 of BOOLEAN EVALUATOR MEMORY 261 are also overlapped to enhance performance. Therefore, each must be addressed separately. FIG. 51 shows the addressing circuitry. 4-BIT CNTR 2582 is simply incremented to address sequential addressable locations of BOOLEAN EVALUATOR MEMORY 261. The output of 4-BIT CNTR 2582 is the address for Bank 0. The output of CENTR 2582 is loaded into 4-BIT LATCH 2583 at the appropriate time permitting the output of 4-BIT LATCH 2583 to directly address Bank 1. 4-BIT CNTR 2582 and 4-BIT LATCH 2583 are cleared by gates 2580 and 2578 upon the presence of a one of the signals L→MC, L→END (S2), or L→INIT BEM. JK FF's 2579 and 2581 are connected such that one is always set and the other is always clear. JK FF 2579 is set and JK FF 2581 is cleared upon receiving a low output from gate 2580. Signal L→BEM CS 0 is generated enabling Bank 0 (see also FIG. 49). At the next clock signal (i.e., H→BEM CLK) generated by gate 2585 (see also FIG. 52), JK FF's 2579 and 2581 change state, generating signal L→BEM CS 1 enabling Bank 1. Upon the next clock signal, JK FF's 2579 and 2581 again change state and 4-BIT CNTR 2582 is incremented. In this maner, Bank 0 and Bank 1 are alternately enabled and sequentially addressed.

Figure 52A:
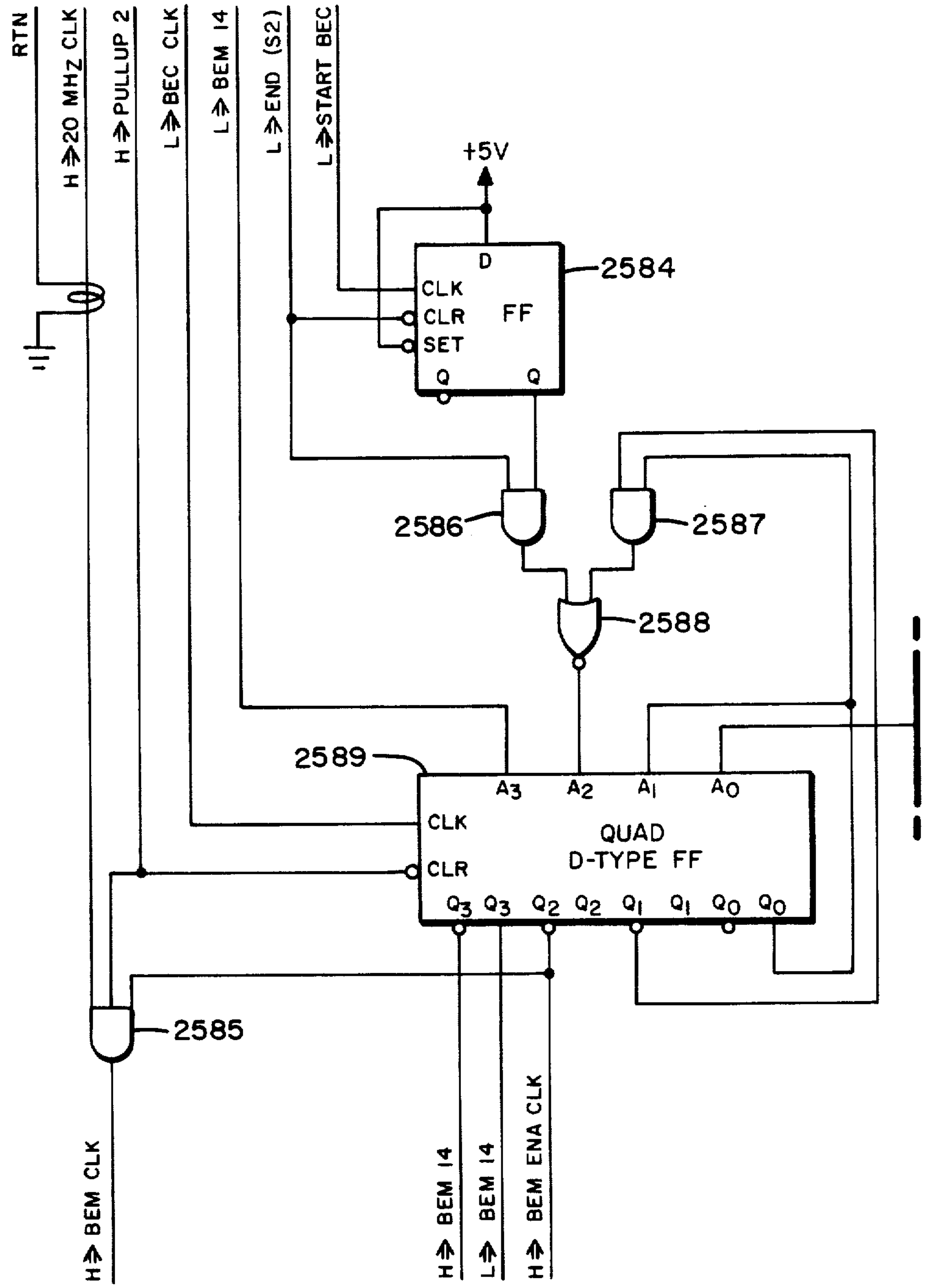
Figure 52B:
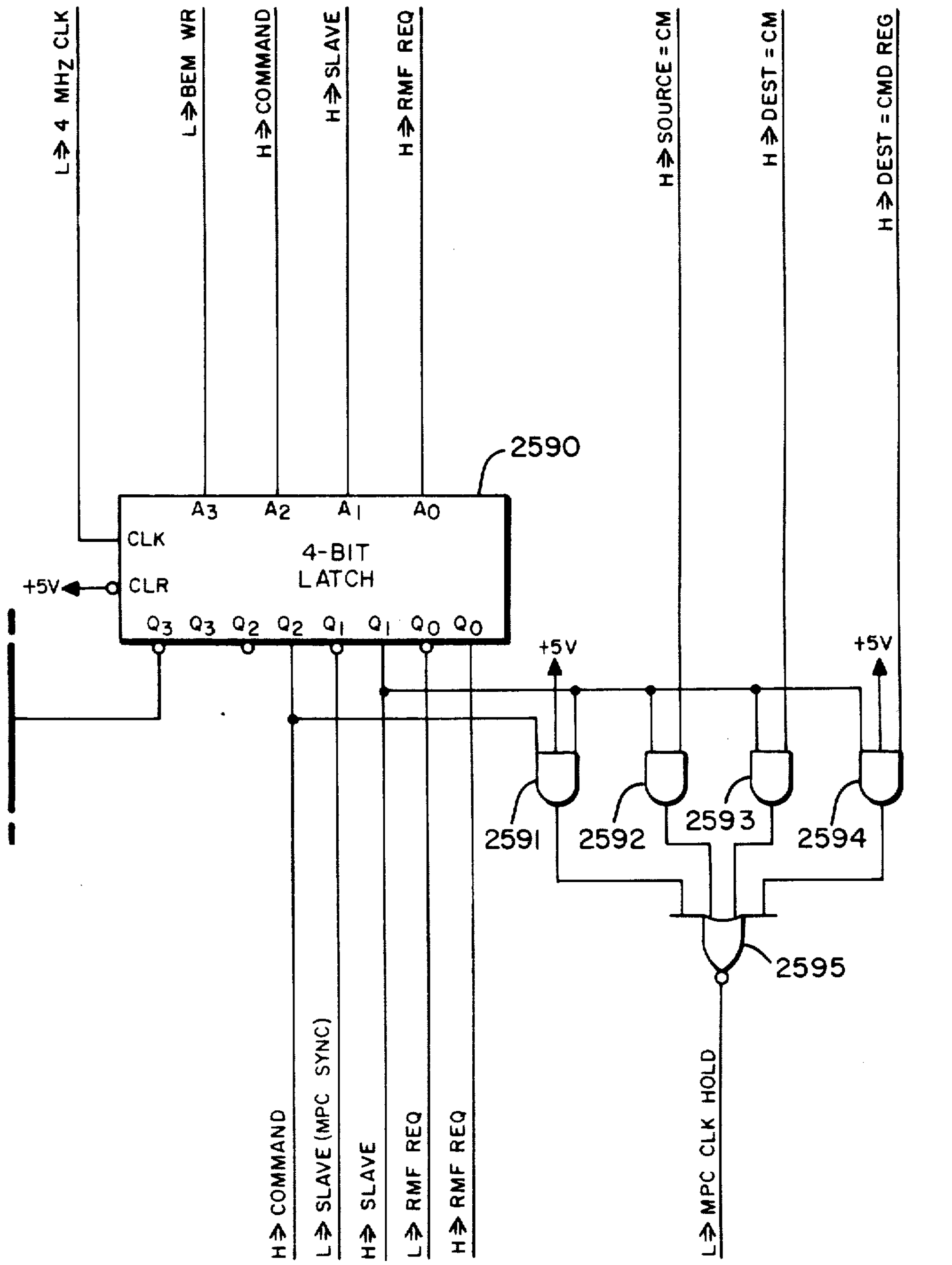

FIG. 52, consisting of FIGS. 52*a* and *b*, shows the basic Boolean Evaluator timing circuitry. Gate 2585 generates the Boolean Evaluator Clock (i.e., signal H→BEM CLK) from the 20 MHz clock signal and signal H→BEM ENA CLK generated by QUAD D-TYPE FF 2589. Although QUAD D-TYPE FF 2589 stores Boolean Evaluator Memory Bit position 14 (i.e., BEM 14) during stage 1 (i.e., S1), the primary function of QUAD D-TYPE FF 2589 is generation of signal H→BEM ENA CLK. QUAD D-TYPE FF 2589 is clocked by signal L→BEC CLK generated by CLOCK 276 (see also FIG. 79). D-TYPE FF 2584 is cleared by signal L→END (S2) and clocked (and therefore set) by signal L→START BEC. Whenever D-TYPE FF 2584 is set and signal L→END (S2) is not present, gate 2586 outputs a high to gate 2588 which outputs a low to QUAD D-TYPE FF 2589 causing generation of signal H→BEM ENA CLK. Gate 2588 also outputs a low whenever gate 2587 receives two high signals from QUAD D-TYPE FF 2589. Notice that in this manner, D-TYPE FF 2589 receives an input from 4-BIT LATCH 2590, and generates signal H→BEM ENA CLK for one clock pulse (i.e., used to step the BEM address logic when writing into BEM 261).

4-BIT LATCH 2590 latches the commands shown and synchronizes them to 4 MHz CLK. Gate 2595 generates signal L→MPC CLK HOLD (see also FIG. 78 temporarily extend the cycle time of the MPC clock This signal is generated in response to any of the gate 2591, 2592, 2593, or 2594 receiving all high inputs a shown in FIG. 52. Signals H→DEST=CMD REG H→SOURCE=CM, and H→DEST=CM are gener ated by FUNCTION, DEST, SOURCE DECODE 254 (see also FIG. 47).

Figure 53A:
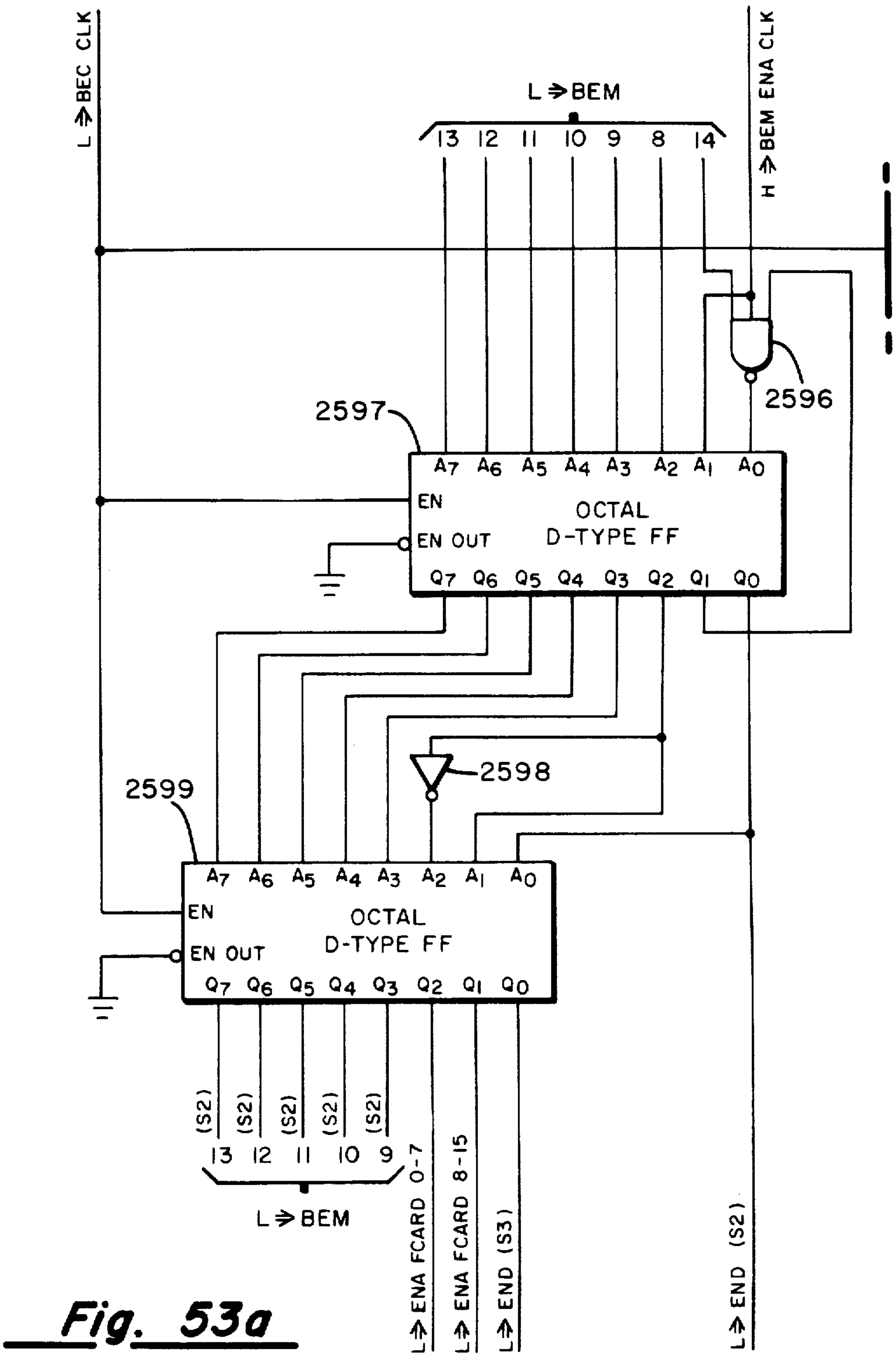
Figure 53B:
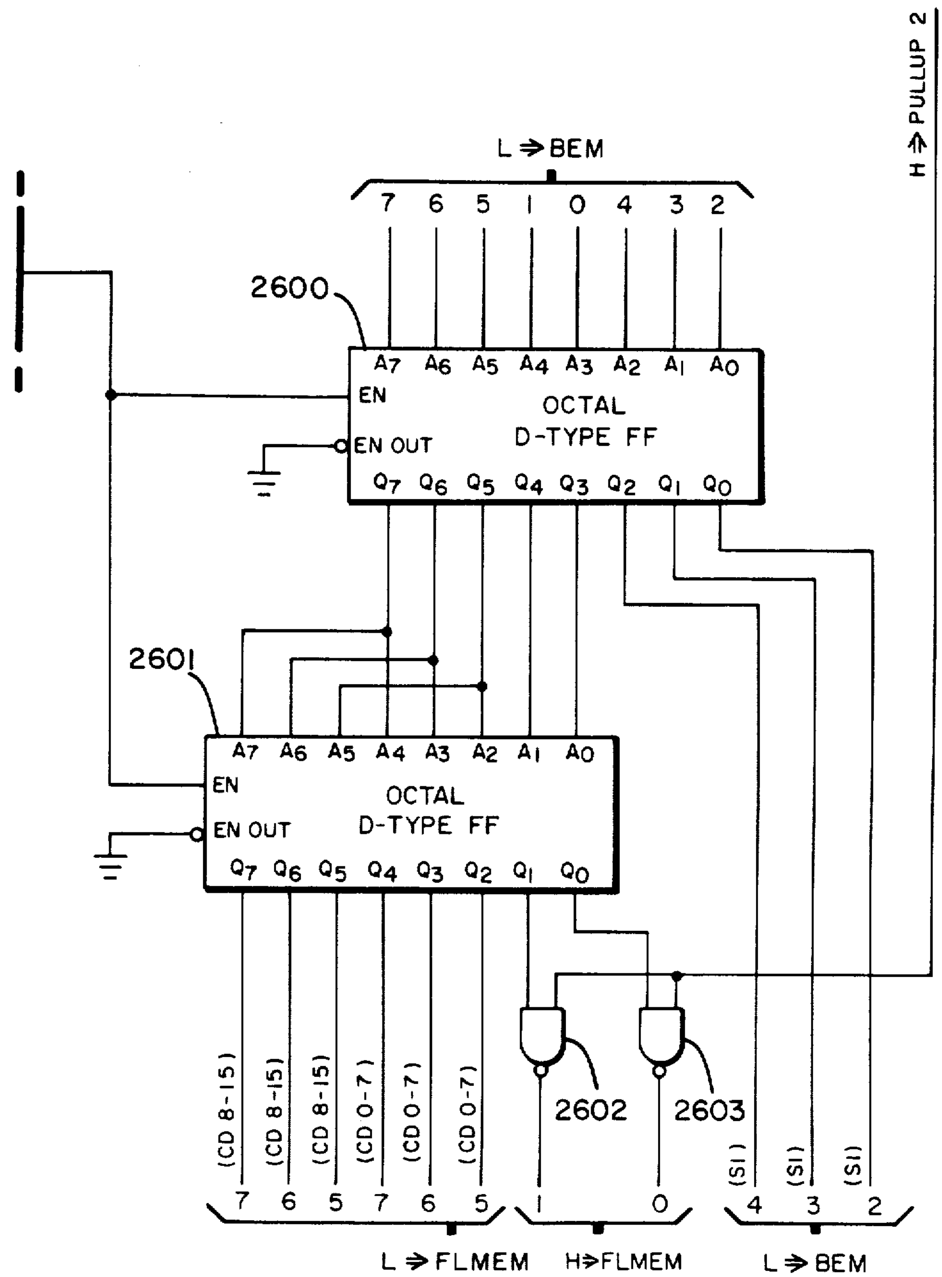
Figure 55A:
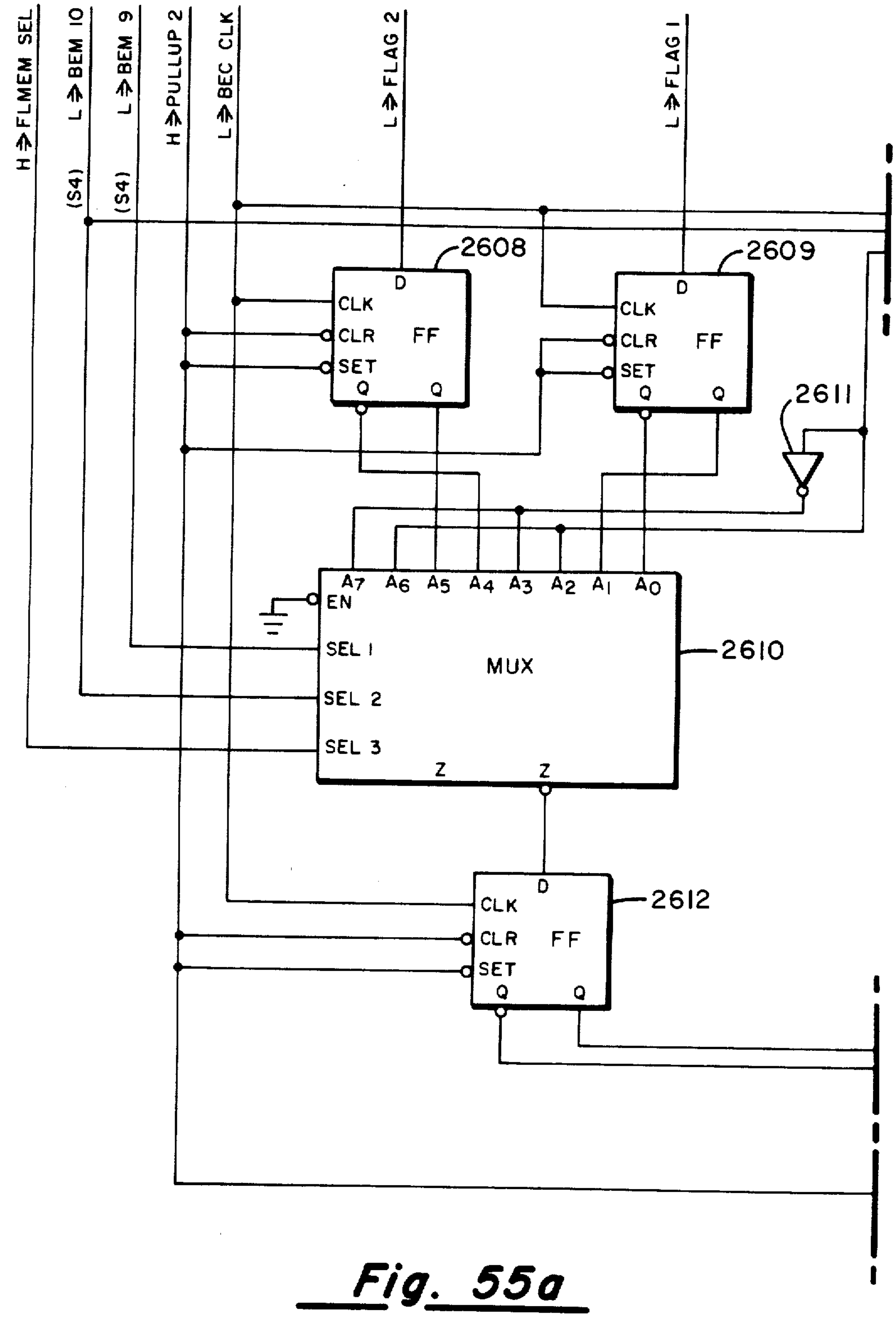
Figure 55B:
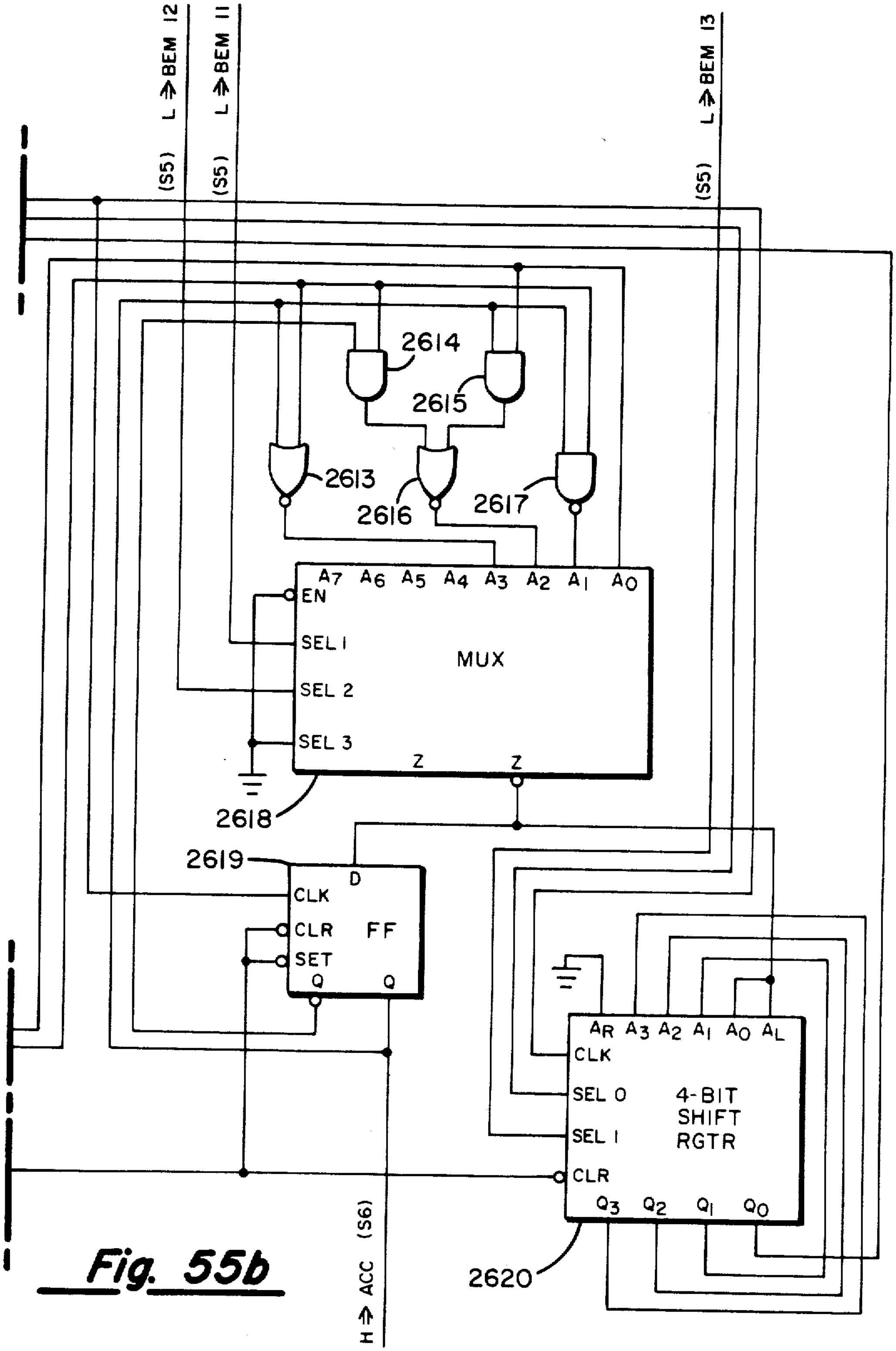

The circuitry which performs the Boolean Evalua tion is shown in FIGS. 53, 54, and 55. Stages 1 and 2 which form FLAG MEMORY 321 addressing ar shown in FIG. 53, consisting of FIGS. 53*a* and *b*, show stages 3 and 4, which access FLAG MEMORY 321 FIG. 55, consisting of FIGS. 55*a* and *b*, shows stages 5 and 6, which perform the Boolean operations.

Referring to FIG. 53, it can be seen that the 15 bi output (as explained above, only 15 bits are used) of th Boolean Evaluator Memory are loaded into OCTAL D-TYPE FF 2600 and 2597 during stage 1. Signa L→BEC CKL, generated by CLOCK 276 (see als FIG. 79) provides the enable. Bit positions 0–7 (i.e. BEM 0–7) are addressing information which is used t select the desired flag bits. Bit positions 9–14 are contro signals. Stage 1 is the reading of an entry (i.e., address able location) of the Boolean Evaluator Memory an loading the corresponding 15 bit positions into OCTAL D-TYPE FF 2597 and 2600. Notice that bit position 14 (i.e., BEM 14) is ANDed with signal H→BEN ENA CLK and output Q1 of OCTAL D-TYPE FF 259 generating signal L→END (S2) which is delayed by two cycles of BEC CLK.

Figure 67:
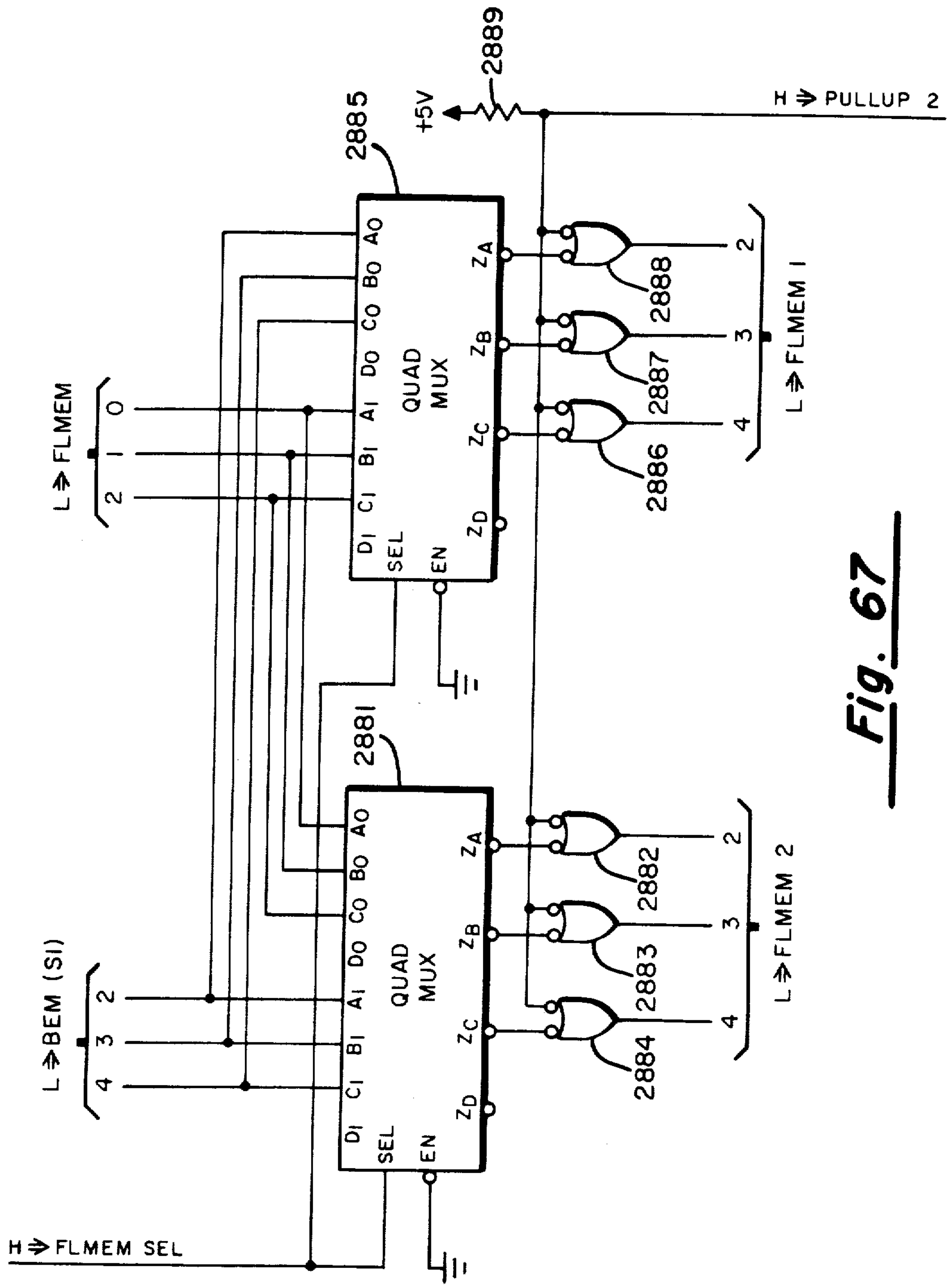
FIG. 67 shows circuitry for the control of FLAG MEMORY 321.

Bit positions 2, 3 and 4 are transferred from OCTAL D-TYPE FF 2600 (i.e., signals L→BEM 2, 3, and 4 (S1)) to the addressing circuitry of FIG. 67 from whic these signals are transferred to the COMPARE AR RAY's to the address FLAG MEMORY 321 (see als FIG. 6). The remaining bit positions (i.e., 0, 1, and 5–13 are stored in OCTAL D-TYPE FF 2601 and 2599 dur ing stage 2. Bit position 5–7 are stored redundantly t increase the drive to fan-out to all of the COMPARE ARRAY's. Bit positions 0 and 1 are inverted by gate 2603 and 2602, respectively, before transfer to th COMPARE ARRAY's. Signals H→FLMEM 0 and 1 and L→FLMEM 5–7 are transferred to FLAG MEMORY 321 (see also FIG. 13). Bit position 8 (i.e., BEM 8 is stored by OCTAL D-TYPE FF 2599 in both true an compliment as shown in FIG. 53. The resulting signa L→ENA F CARD 0–7 or L→ENA F CARD 8–15 i generated thereby to access the desired one-half of th possible 16 COMPARE ARRAY's. The resulting signal received by a single COMPARE ARRAY is designated L→ENA CARD as shown in FIG. 13*a*.

Referring again to FIG. 53, it can be seen that th control signals (i.e., BEM 9–13 and END (S3)) ar simply stored by OCTAL D-TYPE FF 2599 during stage 2. Therefore, it can be seen that the primary activity during stage 2 is the addressing of FLAG MEMORY 321 on the selected COMPARE ARRAY.

FIG. 54 shows the circuitry for stages 3 and 4 of th Boolean Evaluator. OCTAL D-TYPE FF 2604 store the control bits 9–13 for stage 3. OCTAL D-TYPE FF 2606 stores these same signals for stage 4. Notice tha signals L→BEM 9 and 10 are used for stage 4 (as explained below), whereas bit positions 11, 12 and 13 ar stored for another cycle of BEC CLK by OCTAL D-TYPE FF 2606.

Signal L→END (S3) was derived from signal L→BEM 14 as explained above. It arrives at OCTAL D-TYPE FF 2604 delayed by one stage more than the other control signals. Inverter 2605 inverts the signal and OCTAL D-TYPE FF 2604 delays two more cycles of BEC CLK. Output Q0 of OCTAL D-TYPE FF 2604 is ANDed by gate 2607 with signal H→ACC (S6) which is the output of the Boolean Evaluation. If both signals are present (i.e., high) gate 2607 generates signal L→HIT which is transferred to HIT STACK 266. In this manner BEM 14, which signifies the end of a Boolean Expression, is propagated through the entire six stages to enable the Hit (or Miss) output from gate 2607. As can be seen from FIG. 54, stages 3 and 4 involve storage and delay of the control signals (i.e., BEM 9–14). The primary activity during this time is the reading of FLAG MEMORY 321 on the selected COMPARE ARRAY. The reader may wish to review the above discussion concerning FLAG MEMORY 321 and again consult FIG. 13.

The remaining stages of the Boolean Evaluator are shown in FIG. 55. During stages 5 and 6, the Flags to be used as Boolean Variables are received from the COMPARE ARRAY's via HSSF BUS 101, the Boolean Operation is performed, and the result accumulated for further use. The Flags (i.e., signals L→FLAG 1 and L→FLAG 2) are received by D-TYPE FF's 2609 and 2608, respectively. As explained above, FLAG MEMORY 321 has two overlapped flag memory elements in each COMPARE ARRAY to enhance performance. Because they are overlapped, only one of the Flags is valid at any one time.

D-TYPE FF 2608 and 2609 are clocked by signal L→BEC CLK. MUX 2610 selects one variable to be used for a given Boolean Operation. As can be seen this may be FLAG 1, FLAG 1, FLAG 2, FLAG 2, Output Q0 of 4-BIT SHIFT RGTR 2620, or Output Q0 of 4-BIT SHIFT RGTR 2620 inverted by inverter 2611. Selection is based upon input signals L→BEM 9, L→BEM 10, and H→FLMEM SEL. Signal BEM 9 selects whether a true or compliment signal is selected. Therefore, the NOT operator for a given Boolean Expression is seen to be controlled by bit position 9 of the BOOLEAN EVALUATOR MEMORY 261. Signal L→BEM 10 controls selection of a Flag or the output of a 4-BIT SHIFT RGTR 2620. Signal H→FLMEM SEL is generated by D-TYPE FF 2876 (see also FIG. 66). As is explained below, signal H→FLMEM SEL is simply toggled to permit alternate selection of FLAG 1 and FLAG 2.

The output of MUX 2610 is stored by D-TYPE FF 2612. The output of D-TYPE FF 2612 is transferred to MUX 2618 via the network comprising gates 2613, 2614, 2615, 2616 and 2617. This network, along with MUX 2618, performs the major Boolean Operations. Also an input to the network of gates 2613, 2614, 2615, 2616, and 2617 is the output of D-TYPE FF 2619, which is called the Boolean Evaluator Accumulator. In this fashion, D-TYPE FF 2619 stores the current result of the Boolean Evaluation.

Gate 2613 performs an OR of the outputs of D-TYPE FF 2612 (i.e., new Boolean Variable) and D-TYPE FF 2619 (i.e., accumulated partial result). Similarly, gate 2617 performs an AND. Gates 2614, 2615, and 2616 combined perform an exclusive OR (i.e., XOR). MUX 2618 also has a direct input from D-TYPE FF 2612 which is called LOAD. Therefore, MUX 2618 can select LOAD, AND XOR, or OR of a Boolean Variable based upon signals L→BEM 11 and L→BEM 12.

4-BIT SHIFT RGTR 2620 is wired to provide a one-bit, four stage, push down/pop up stack. This function is required to provide the capability to process parentheses in a Boolean Expression. An open parentheses (i.e., left paren) causes the stack to be pushed down. This is accomplished by BEM 13 right shifting the output of MUX 2618 by one bit position. Similarly, a left shift, cause by BEM 10 performs a pop-up. Notice that BEM 10 also selects the output (true or compliment) of 4-BIT SHIFT RGTR 2620 at MUX 2610. A pop-up (i.e., right paren) means that the stack contents are to be used as the input variable. As explained above, D-TYPE FF 2619 maintains the cumulative results. Signal H→ACC (S6) is transferred to gate 2607 (see also FIG. 54) for anding with the stop signal (generated from BEM 14).

Figure 56:
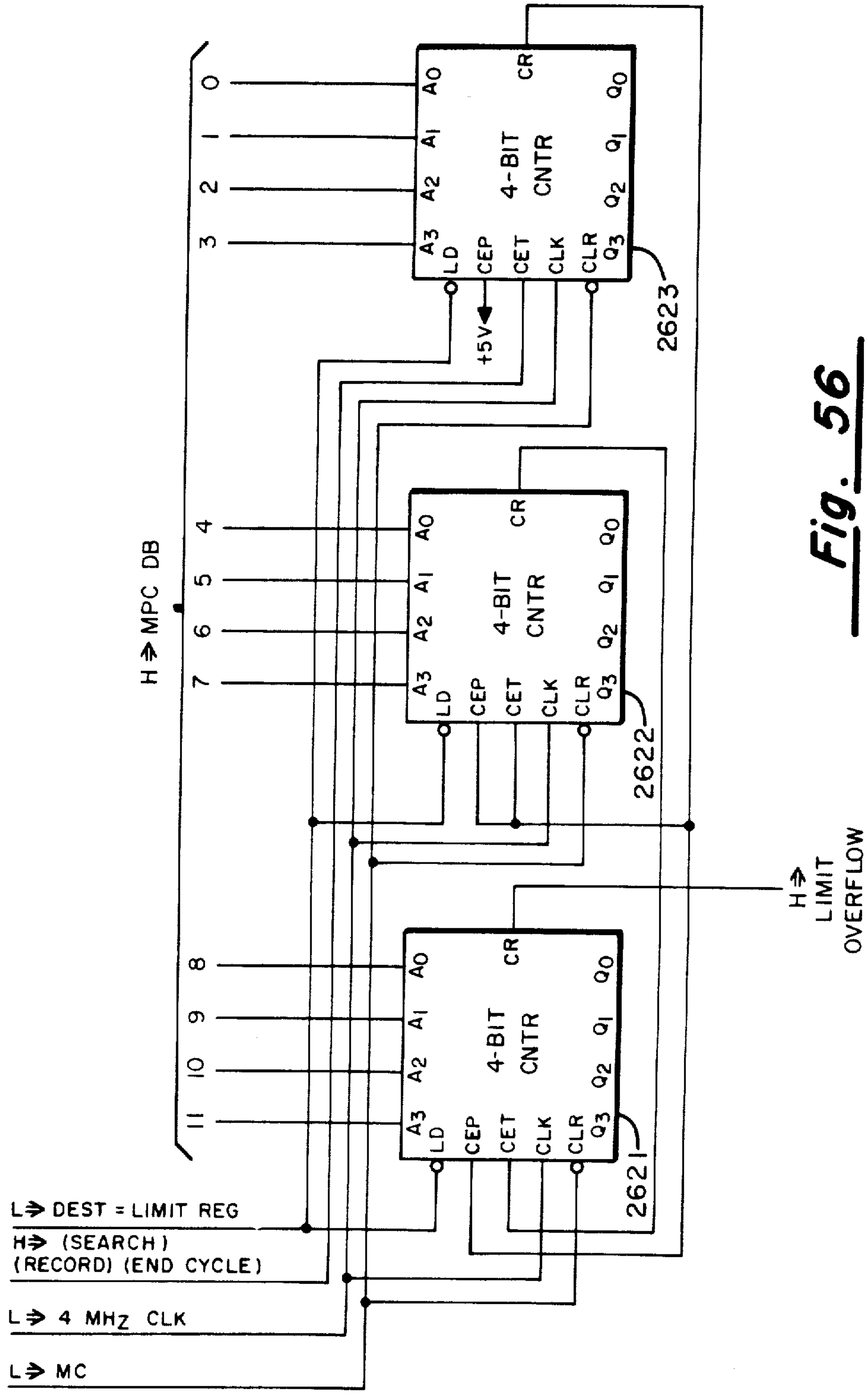
FIG. 56 shows the detailed construction of LIMIT REG 262.

LIMIT REG 262 is shown in detail in FIG. 56. LIMIT REG 262 provides a means to terminate a search before overflow of HIT STACK 266. Even more significant is that it permits a user to specify a maximum desired number of records to be searched. If the maximum number is exceeded, the search is terminated and the user is informed.

LIMIT REG 262 contains 4-BIT CNTR's 2621, 2622, and 2623 which are wired as a 12 bit counter. LIMIT REG 262 is loaded with a 12 bit value from MPC BUS 103 before search initiation as shown. Signal L→DEST=LIMIT REG generated by FUNCTION, DEST, SOURCE DECODE 254 (see also FIG. 47) supplies the load enable signal. During the search, LIMIT REG 262 is incremented by signal H→(SEARCH) (RECORD) (END CYCLE) indicating completion of a search on a record. 4-BIT CNTR 2622 is incremented upon overflow of 4-BIT CNTR 2623. Similarly 4-BIT CNTR 2621 is incremented upon overflow of 4-BIT CNTR 2622. Upon overflow of 4-BIT CNTR 2621, the signal H→LIMIT OVERFLOW is generated and the search is terminated (see also FIG. 59).

Figure 57:
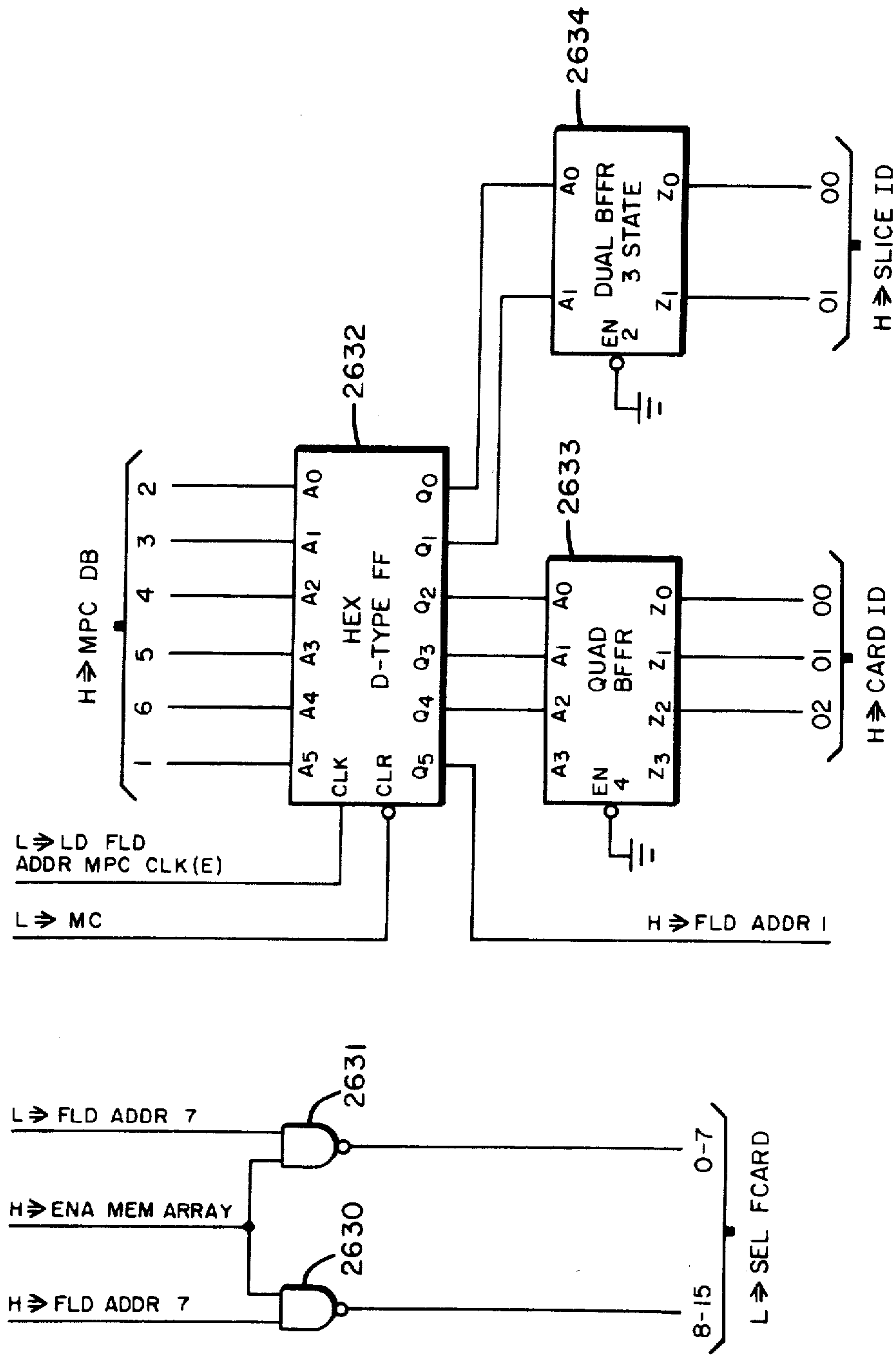
FIG. 57 shows the detailed construction of FLD ADDR REG 263.

FLDDADDR REG 263 circuitry is shown in FIG. 57. Referring to FIG. 57, HEX D-TYPE FF 2632 is loaded with a six bit word from MPC BUS 103. Signal L→LD FLD ADDR MPC CLK (e) enables the loading of HEX D-TYPE FF 2632. As can be seen in FIG. 17, FLD ADDR REG 263 receives 11 bit positions from MPC BUS 103. The remaining bit positions are used for control purposes and are loaded into QUAD D-TYPE FF 2654, contained in RD/WR/SEARCH SEQUENCER 265 (see also FIG. 61). These control signals are discussed further, below. Referring again to FIG. 57, five outputs of HEX D-TYPE FF 2632 are transferred via HSSF BUS 101 to the COMPARE ARRAYS by DUAL BFFR 3 STATE 2634 and QUAD BFFR 2633. These signals (i.e., H→SLICE ID 00 and 01 andH→CARD ID 00–02) are used by COMPARE CONTROL 322 (see also FIG. 14) for COMPARE ARRAY card and 32 bit slice addressing.

As shown in FIG. 57, gates 2630 and 2631 generate signals L→SEL F CARD 0–7 and 8–15 for transfer to the COMPARE ARRAY's (see also FIG. 14). These signals are compliments and the generated by ANDing signal H→ENA MEM ARRAY (see also FIG. 62) with H→FLD ADDR 7 and L→FLD ADDR 7 received from QUAD D-TYPE FF 2654 (see also FIG. 61).

Figure 58:
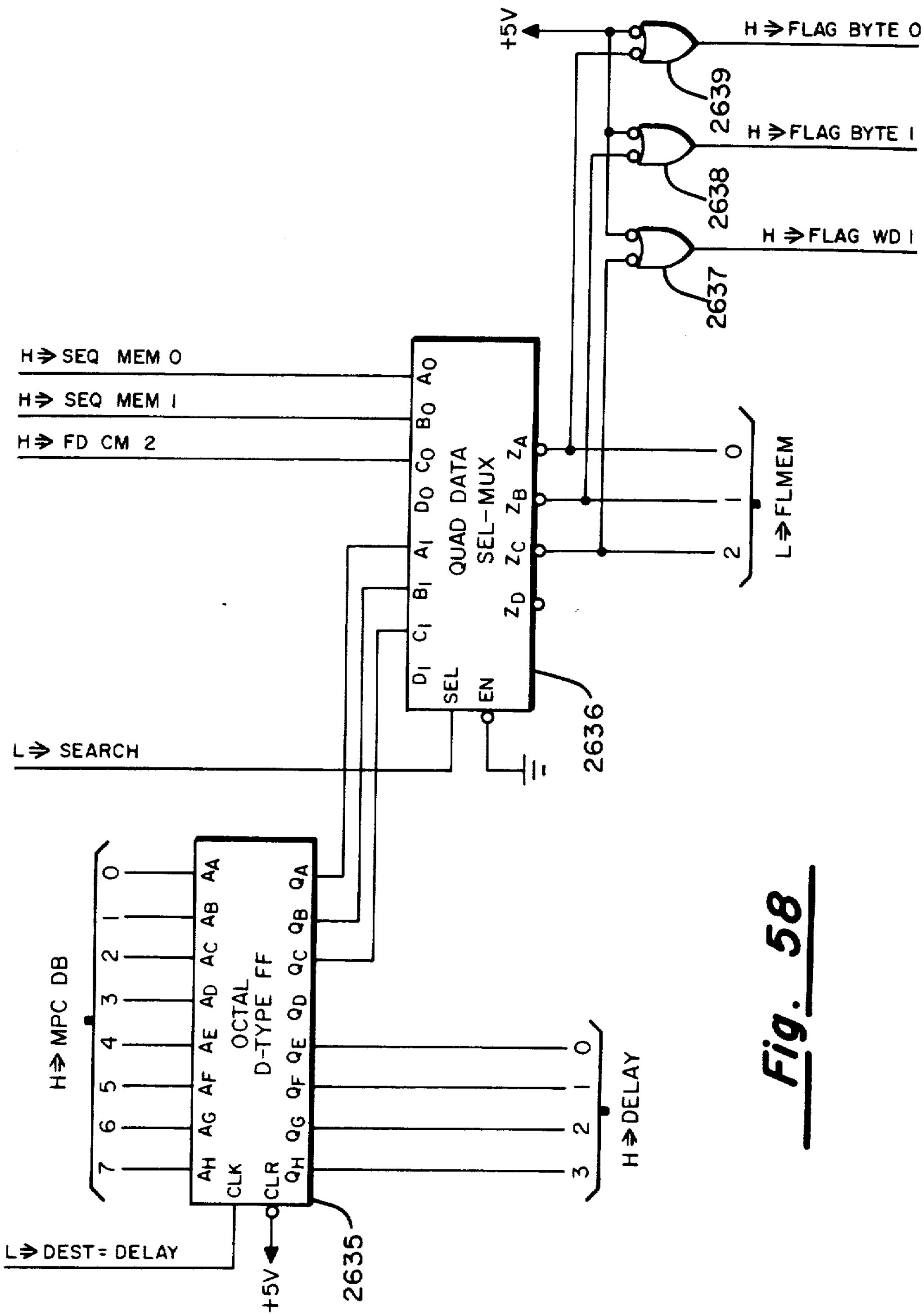
FIG. 58 shows the detailed construction of DELAY REGISTER 264 and FLAG MEMORY 321 addressing logic.

FIG. 58 contains DELAY REG 264. OCTAL D-TYPE FF 2635 is loaded from MPC BUS 103 as shown. Signal L→DEST=DELAY generated by FUNCTION, DEST, SOURCE DECODE 254 provides the enable. Output QE, QF, QG, and QH are the four bit delay code (i.e., signals H→DELAY 0–3). These signals are used by RD/WR/SEARCH SEQUENCER 265

(see FIG. 60) to determine the required per record cycle time for a given search. The cycle time is a minimum of one microsecond and a maximum of 4.75 microseconds. The variation in 250 nanosecond increments occurs because of the propagation delays for fields having many bytes and for Boolean Expressions having many terms. For a detailed explanation please refer to the above cited U.S. patent application entitled, Variable Speed Cycle Time for Synchronous Machines.

QUAD DATA SEL-MUX 2636 selects for output three signals L→FLMEM 0-2 which are transferred to FLAG MEMORY address logic (see also FIG. 67). These signals are also inverted by gates 2637, 2638, and 2639 and transferred via HSSF BUS 101 to the COMPARE ARRAY's. These three signals (i.e., H→FLAG BYTE 0 and 1 and H→FLAG WD1) are transferred to COMPARE CONTROL 322 (see also FIG. 14). They serve as field addresses for FLAG REG 317 (see also FIG. 10) and FIELD COMPARISON REG 316 (see also FIG. 12). The inputs to QUAD DATA SEL-MUX 2636 are received from OCTAL D-TYPE FF 2635 and RD/WR/SEARCH SEQUENCER 265 (see also FIGS. 60 and 61). Signal L→SEARCH determines the selection by QUAD DATA SEL-MUX 2636.

FIGS. 59, 60, 61, 62, 63 and 64 show the detailed construction and operation of RD/WR/SEARCH SEQUENCER 265.

Figure 59:
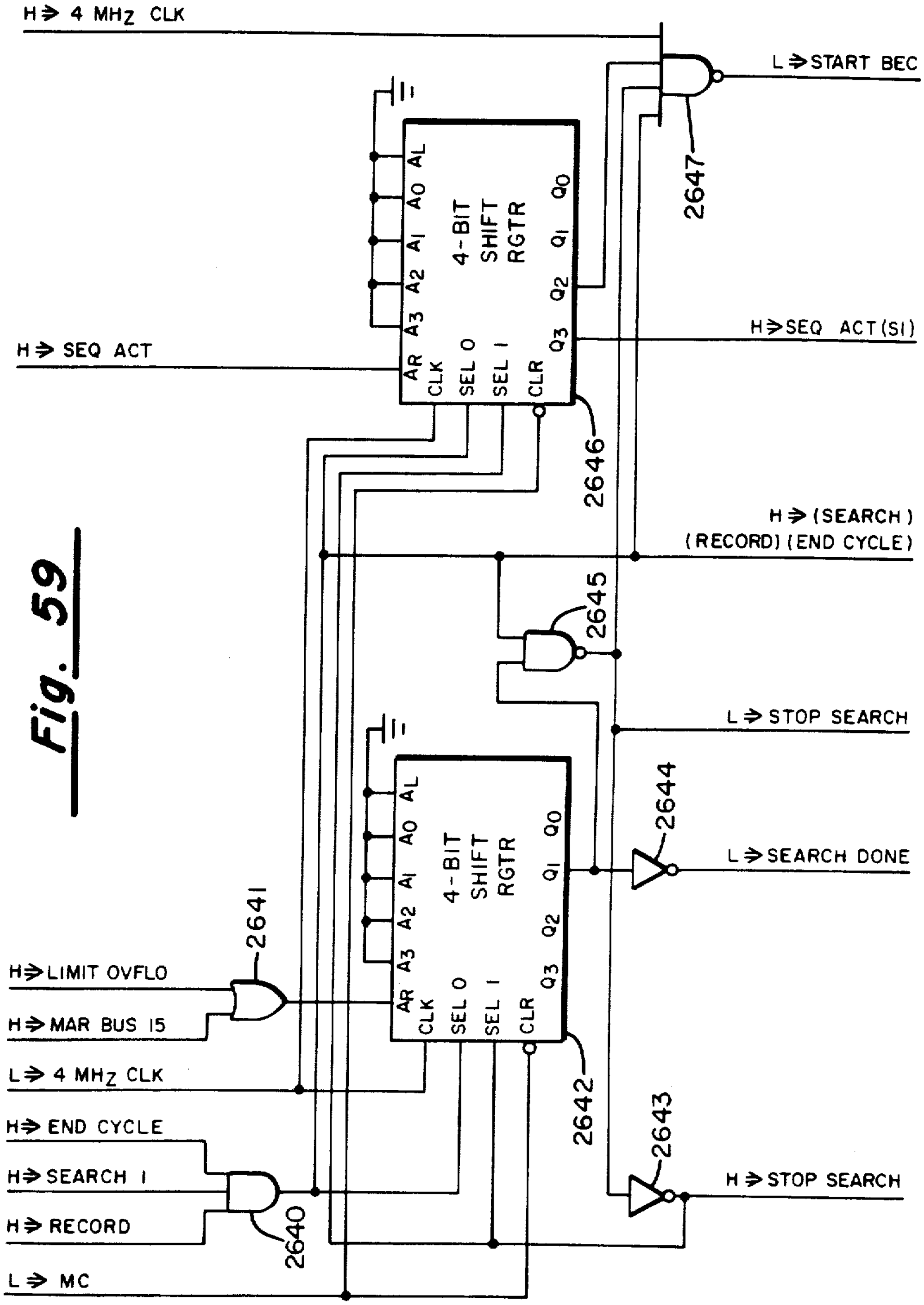
FIG. 59 shows a portion of RD/WR/SEARCH SEQUENCER 265.

Referring to FIG. 59, it can be seen that 4-BIT SHIFT RGTR 2642 generates the signals which terminate the search activity. 4-BIT SHIFT RGTR 2642 is clocked by signal L→4 MHz CLK. Input AR is loaded by gate 2641 which receives signal H→MAR BUS 15 from MDRIU 270 and MDRIL 271 (see also FIG. 74) and signal LIMIT OVERFLOW from LIMIT REG 262 (see also FIG. 56). Shifting of 4-BIT SHIFT RGTR 2642 is controlled by signal H→STOP SEARCH and the output of gate 2640 which ANDs signals H→RECORD, H→SEARCH (see also FIG. 61), and H→END CYCLE (see also FIG. 65).

FIG. 59 shows that 4-BIT SHIFT RGTR 2646 generates signal H→SEQ ACT (S1) which is used (see also FIG. 66) to toggle between Flag Memories. The major input (i.e., input AR) to 4-BIT SHFT RGTR 2646 is signal H→SEQ ACT generated by JK FF 2674 (see also FIG. 63). 4-BIT SHIFT RGTR 2646 is controlled in the same manner as 4-BIT SHIFT RGTR 2642. Signal L→START BEC used by BOOLEAN EVALUATOR MEMORY 261 (see also FIG. 52), is generated by gate 2647 as shown in FIG. 59.

Figure 60:
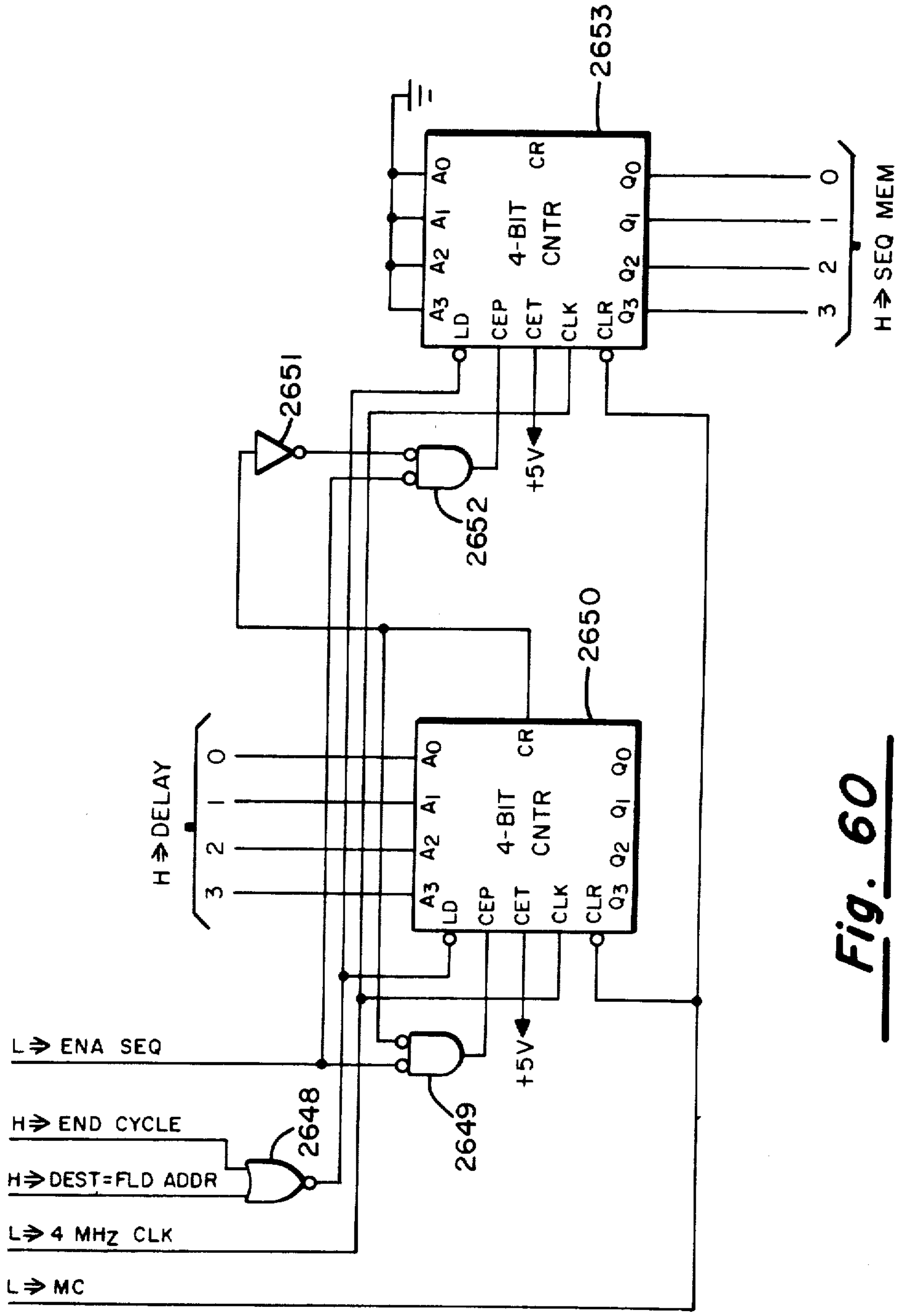
FIG. 60 shows a portion of RD/WR/SEARCH SEQUENCER 265.

The circuitry used to provide overall sequence control of the COMPARE ARRAY's is found in FIG. 60. 4-BIT CNTR 2653 produces signals H→SEQ MEM 0, 1, 2 and 3 which are used to exercise this control (see also FIG. 62). 4-BIT CNTR 2653 is loaded with zeroes at the presence of either signal H→DEST=FLD ADDR (see also FIG. 47) or signal H→END CYCLE (see also FIG. 65) as inverted by gate 2648. 4-BIT CNTR 2643 is clocked (i.e. caused to increment) by signal L→4 MHz CLK, whenever enabled by gate 2652. To be enabled, therefore 4-BIT CNTR 2650 must be at overflow and signal L→ENA SEQ (see also FIG. 63) must be present. Whenever enabled, 4-BIT CNTR 2653 counts at the 4 MHz rate, thereby generating output signals H→SEQ MEM 0, 1, 2 and 3.

To enable 4-BIT CNTR 2653, 4-BIT CNTR 2650 must be at overflow. 4-BIT CNTR 2650 is loaded, cleared, clocked, and enabled in the same manner as 4-BIT CNTR 2653 except that 4-BIT CNTR 2650 ceases to increment when it is at overflow, whereas 4-BIT CNTR 2653 only increments when 4-BIT CNTR 2650 is at overflow. Also, 4-BIT CNTR 2650 is loaded with the contents of DELAY REG 264 (see also FIG. 58). Therefore, 4-BIT CNTR 2653 delays in incrementation (and generation of signals H→SEQ MEM 0, 1, 2 and 3) for a number of 250 nanosecond (from 4 MHz clock) time periods equivalent to the number of 4 MHz clock cycles when added to the contents of DELAY REG 264 causes 4-BIT CNTR 2650 to overflow. This is the means whereby the per record search cycle time is synchronously varied to accomodate propagation times for large fields and Boolean Evaluation time for Boolean Expressions having a large number of terms.

Figure 61:
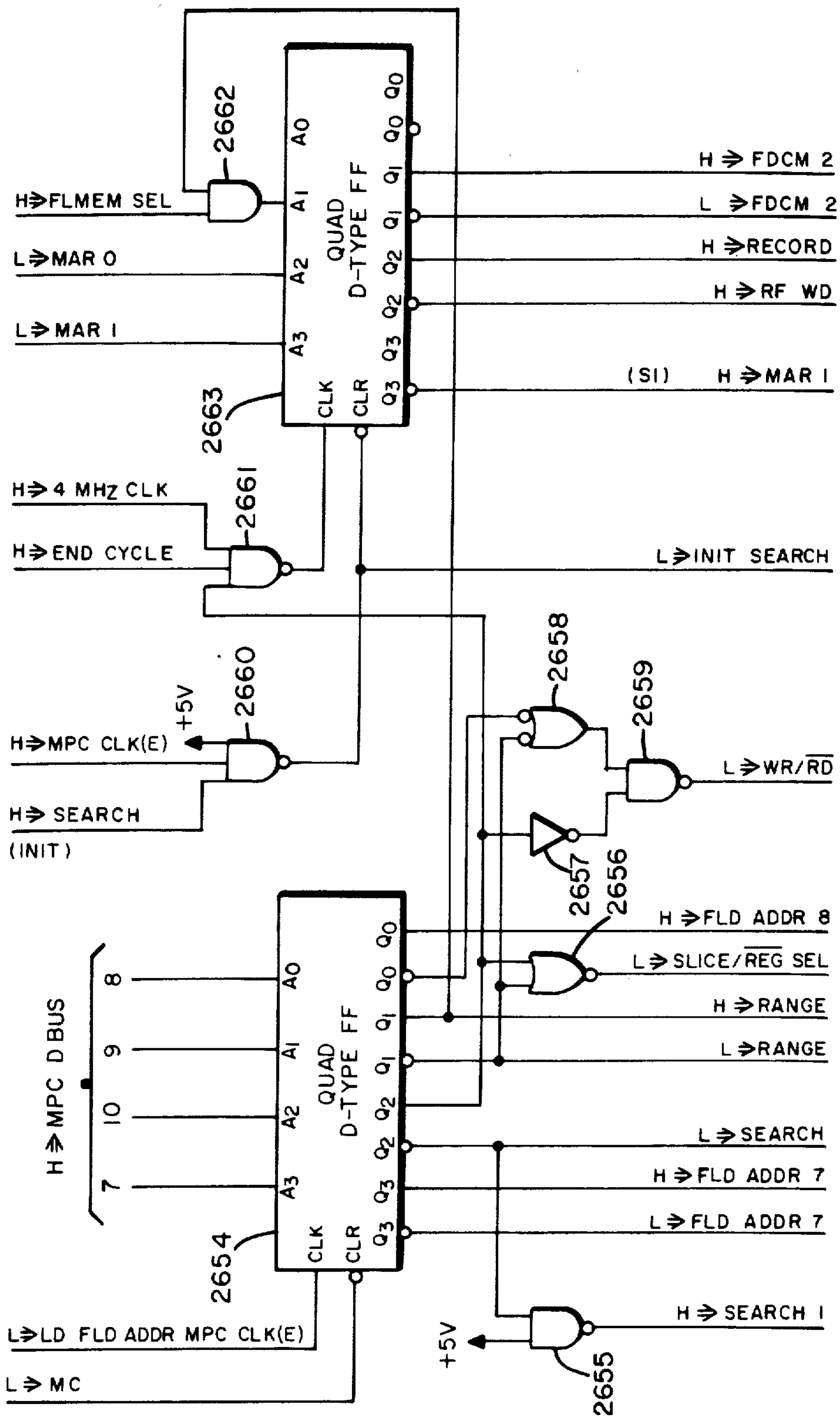
FIG. 61 shows a portion of RD/WR/SEARCH SEQUENCER 265.

Additional timing and control signals are generated by the circuitry shown in FIG. 61. QUAD D-TYPE FF 2663 generates signals H→FDCM 2, L→FDCM 2, H→RECORD, H→RF WD, and H→MAR 1 (S1). QUAD D-TYPE FF 2663 is cleared by gate 2660 at the occurrence of signals H→SEARCH (INIT) (see also FIG. 63) and H→MPC CLK (e) (see also FIG. 78). QUAD D-TYPE FF 2663 is clocked by gate 2661 as shown. Signal H→END CYCLE is generated by HIT STACK 266 (see also FIG. 65). Signals L→MAR Ø and L→MAR 1 are generated by MAR STACK 272 (see also FIG. 76). Signal H→FLMEM SEL is generated by D-TYPE FF 2876 (see also FIG. 66).

Signal H→FD CM 2 is used by FLD ADDR REG 263 (see also FIG. 58) in the generation of FLAG MEMORY 321 addresses. Signal H→RECORD is used to generate the command to the COMPARE ARRAY's (see also FIG. 64) to load a record into REG 2 312 (see also FIGS. 6 and 9). Signal H→RF (i.e., Reference) WD (i.e., Word) is used to generate the command to the COMPARE ARRAY's (see also FIG. 64) to load the Reference Word into REG 1 313 (see also FIGS. 6 and 9). MAR STACK 272 (see also FIG. 76) uses signal H→MAR 1 (S1) to control addressing of the Memory Address Register.

QUAD D-TYPE FF 2654 is loaded by bit positions 7, 8, 9, and 10 from MPC BUS 103 when clocked by signal L→LD FLD ADDR MPC CLK (e) generated by FUNCTION, DEST, SOURCE DECODE 254 (see also FIG. 47). The outputs are the various control signals shown. Signal L→W/$\overline{RD}$ is used to enable writing of the data base into MEMORY 311 (see also FIGS. 6, 9, and 14). As can be seen in FIG. 61, signal L→W/$\overline{RD}$ is generated by gates 2658 and 2659 and inverter 2657 whenever bit position 8 or 9 is set and bit position 10 is not set. Signals H→FLD ADDR 7 and L→FLD ADDR 7 are used for byte addressing on the COMPARE ARRAY's as explained above (see also FIG. 57). Whenever bit position 9 is set, signal L→RANGE (i.e., Range Search) is generated. Bit position 7 causes the generation of signal L→SEARCH or the complimentary signal H→SEARCH 1 generated by gate 2655. Signals H→FLD ADDR 8 addresses 32×8 PROM 2664 (see also FIG. 62).

Figure 62:
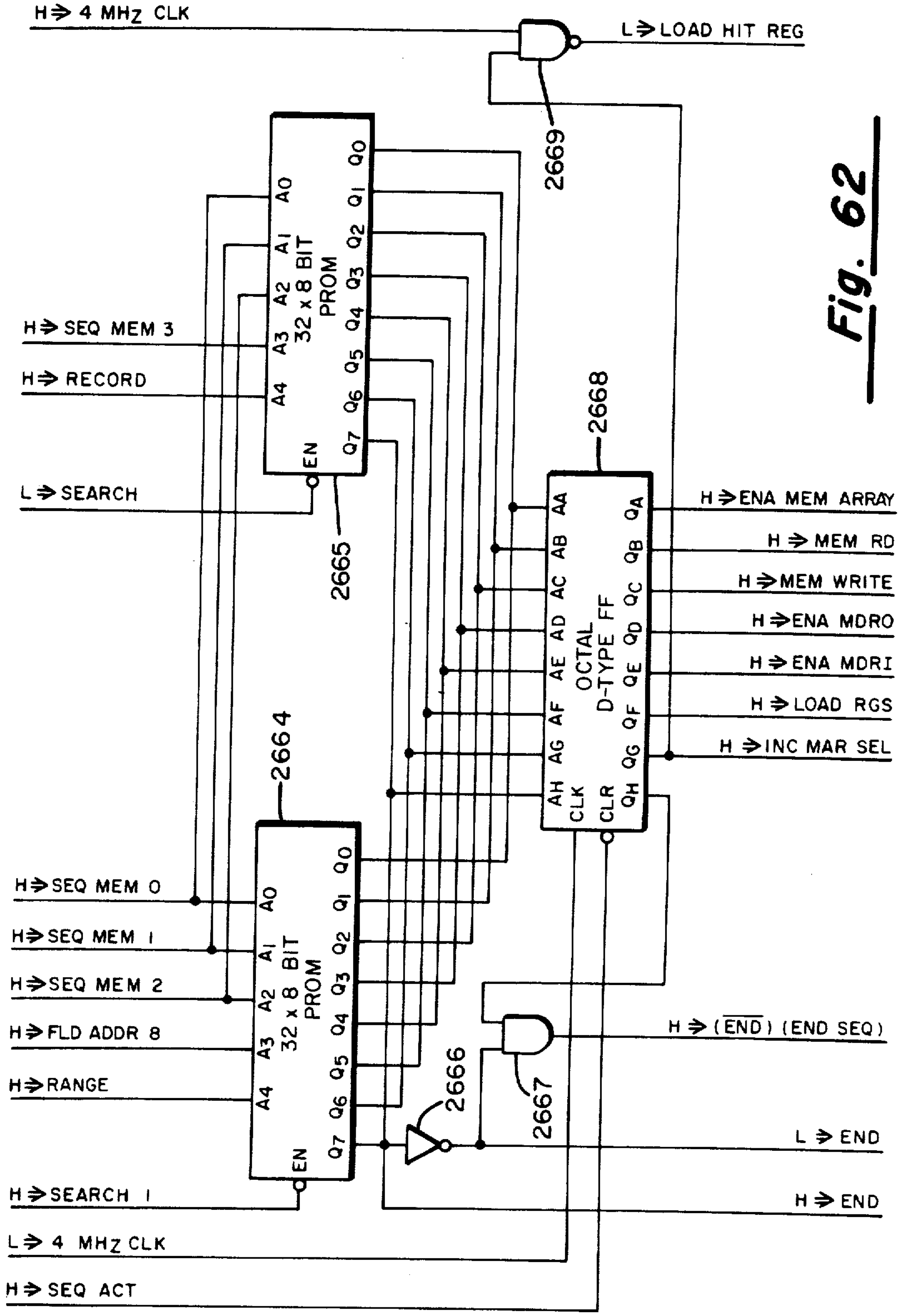
FIG. 62 shows a portion of RD/WR/SEARCH SEQUENCER 265.

FIG. 62 shows additional control circuitry of RD/WR/SEARCH SEQUENCER 265. 32×8 BIT PROM 2664 is enabled by signal H→SEARCH 1 and 32×8 BIT PROM 2665 is enabled by signal L→SEARCH. From the discussion above, 32×8 BIT PROM 2665 is enabled if bit position 10 of QUAD D-TYPE FF 2654 (see also FIG. 61) is set signifying a search function, whereas 32×8 BIT PROM 2664 is enabled if bit position 7 is clear signifying a read or write (into MEMORY 311 of the COMPARY ARRAY's) function. The outputs are wire-ored and coupled to OCTAL D-TYPE FF 2668 which holds the output and synchronizes it with signal L→4 MHz CLK. The control signals output from OCTAL D-TYPE FF 2668 are used primarily to control MDROU 268, MDROL 269, MDRIU 270, MDRIL 271, MAR STACK 272, and COMPARE ARRAY's 300, . . . , 301, 302, 303.

The three lower order addressing bits of 32×8 BIT PROM 2664 and 2665 are generated by 4-BIT CNTR 2653 (see also FIG. 60) as explained above. Signal H→SEQ MEM 3 is similarly generated. The remaining addressing bits (i.e., signals H→RECORD, H→FLD ADDR 8, and H→FLD ADDR 9) are all generated by the circuitry shown in FIG. 61.

Figure 63:
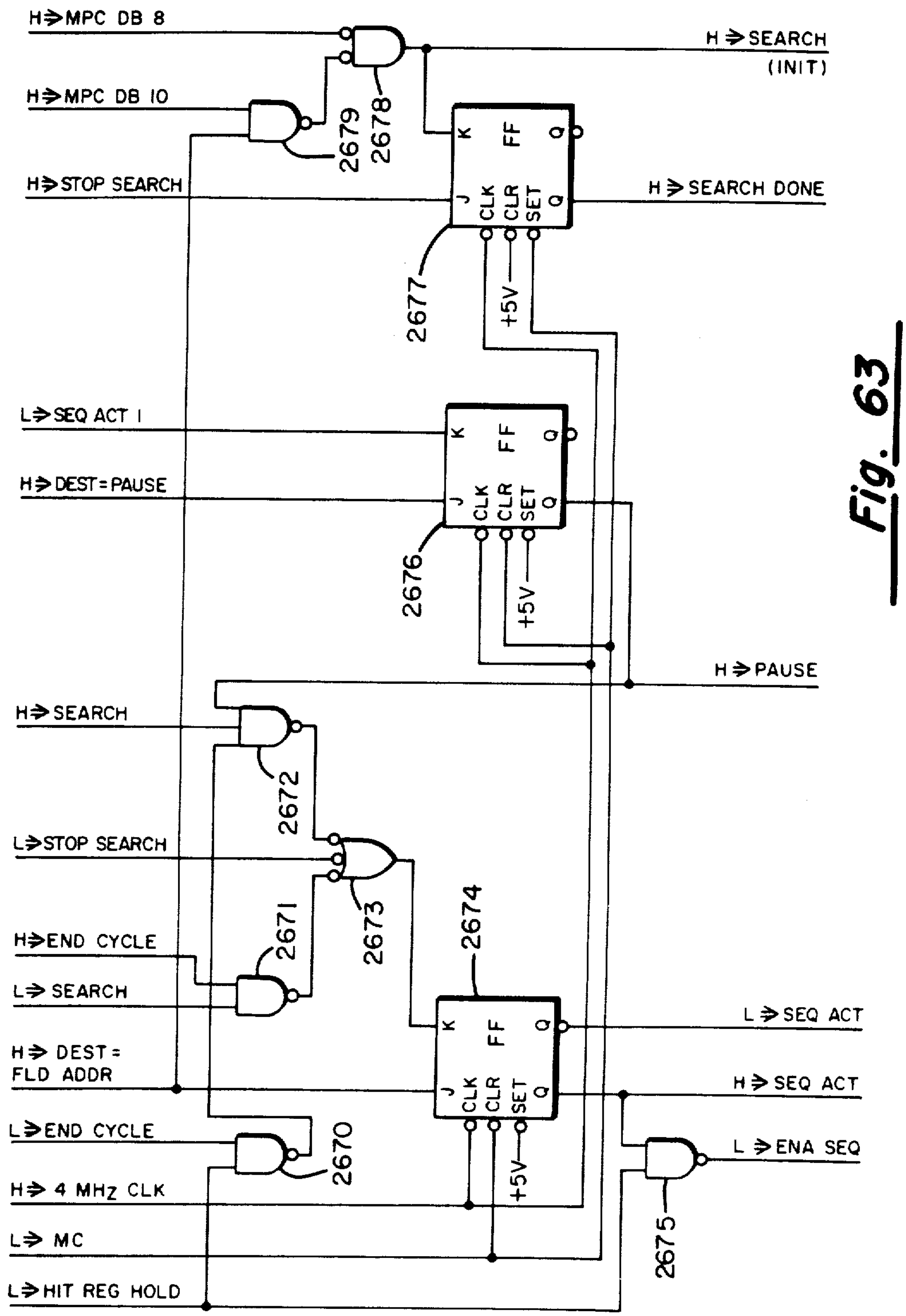
FIG. 63 shows a portion of RD/WR/SEARCH SEQUENCER 265.

FIG. 63 shows additional control circuitry of RD/WR/SEARCH SEQUENCER 265. JK FF's 2674, 2676, and 2677 each provide an important status indication. JK FF 2674 generates signals H→SEQ ACT and L→SEQ ACT which is used by many elements to indicate that a COMPARE ARRAY operation is in progress. JK FF 2676 is directly addressed by FUNCTION, DEST, SOURCE DECODE 254 (see also FIG. 45) via signal H→DEST=PAUSE to cause a hold in the operation of RD/WR/SEARCH SEQUENCER 265. This pause will normally be generated to permit MPC 240 to respond to a command from a host processor.

JK FF 2677 signifies when a search is complete. Completion may occur as a result of a number of conditions as indicated above (see also FIG. 59).

Figure 64:
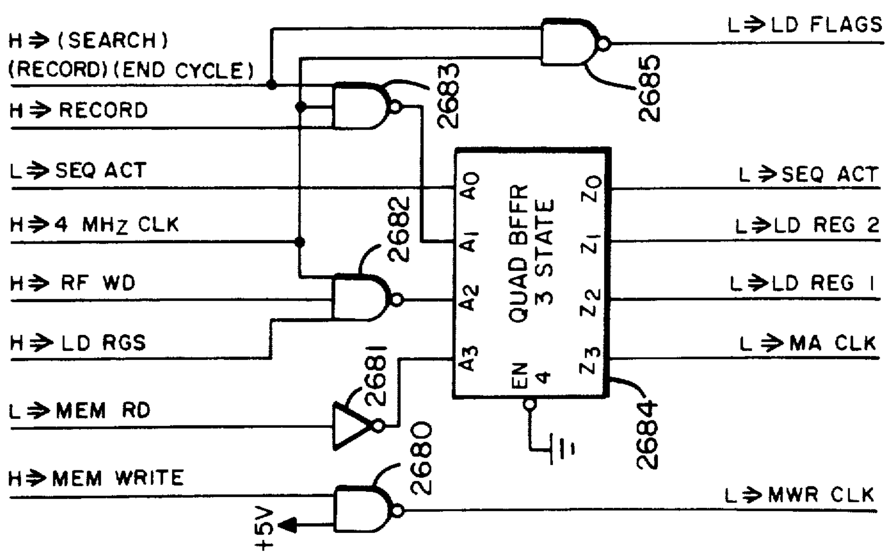
FIG. 64 shows the output circuitry of RD/WR/SEARCH SEQUENCER 265.

The remaining control circuitry of RD/WR/SEARCH SEQUENCER 265 is found in FIG. 64. Gate 2680 is used as an inverter and driver to transfer the write signal to the COMPARE ARRAY's. The outputs of QUAD BFFR 3 STATE 2684 are used by the COMPARE ARRAY's for enabling REG 1 313, REG 2 312, and MEMORY 311 (see also FIGS. 6, 9, and 14). Gate 2685 generates signal L=LD FLAGS which enables FLAG REG 317 via COMPARE CONTROL 322.

FIGS. 65, 68, 69, 70, and 71 show the detailed construction and operation of HIT STACK 266 and its associated control circuits. The primary function of HIT STACK 266 is the storing of the record address of each record found to be a hit during a search.

Figure 65:
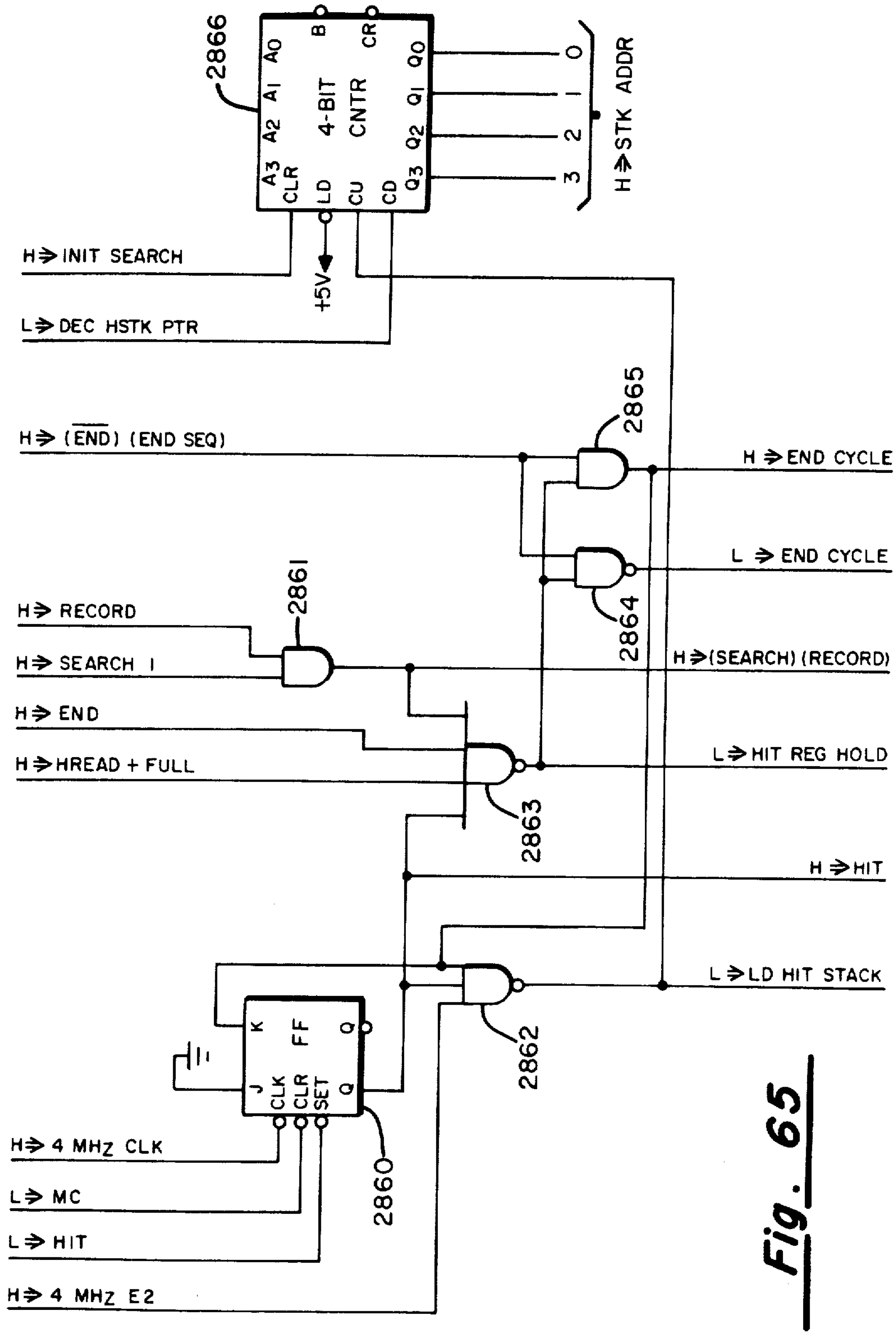
FIG. 65 shows circuitry for the control of HIT STACK 266.

As shown in FIG. 65, the addresses for HIT STACK 266 are generated by 4-BIT CNTR 2866. The address signals H→STK ADDR 0, 1, 2 and 3 are the outputs of 4-BIT CNTR 2866 which is cleared by signal H→INIT (i.e., Initiate) SEARCH. Signal L→LD HIT STACK causes incrementation of 4-BIT CNTR 2866 to record each sequential hit during a search. Signal L→DEC (i.e., Decrement) HSTK PTR (i.e., Pointer) generated by FUNCTION, DEST, SOURCE DECODE 254 (see also FIG. 47) causes 4-BIT CNTR 2866 to be decremented following the removal of a hit value from HIT STACK 266.

JK FF 2860 receives signal L→HIT from the Boolean Evaluator (see also FIG. 54) causing generation of signal H→HIT and signal L→LD HIT STACK. The remaining circuitry shown in FIG. 65 generates timing signals L→HIT REG HOLD, H→(SEARCH)-(RECORD) L→END CYCLE, and H→END CYCLE.

Figure 66:
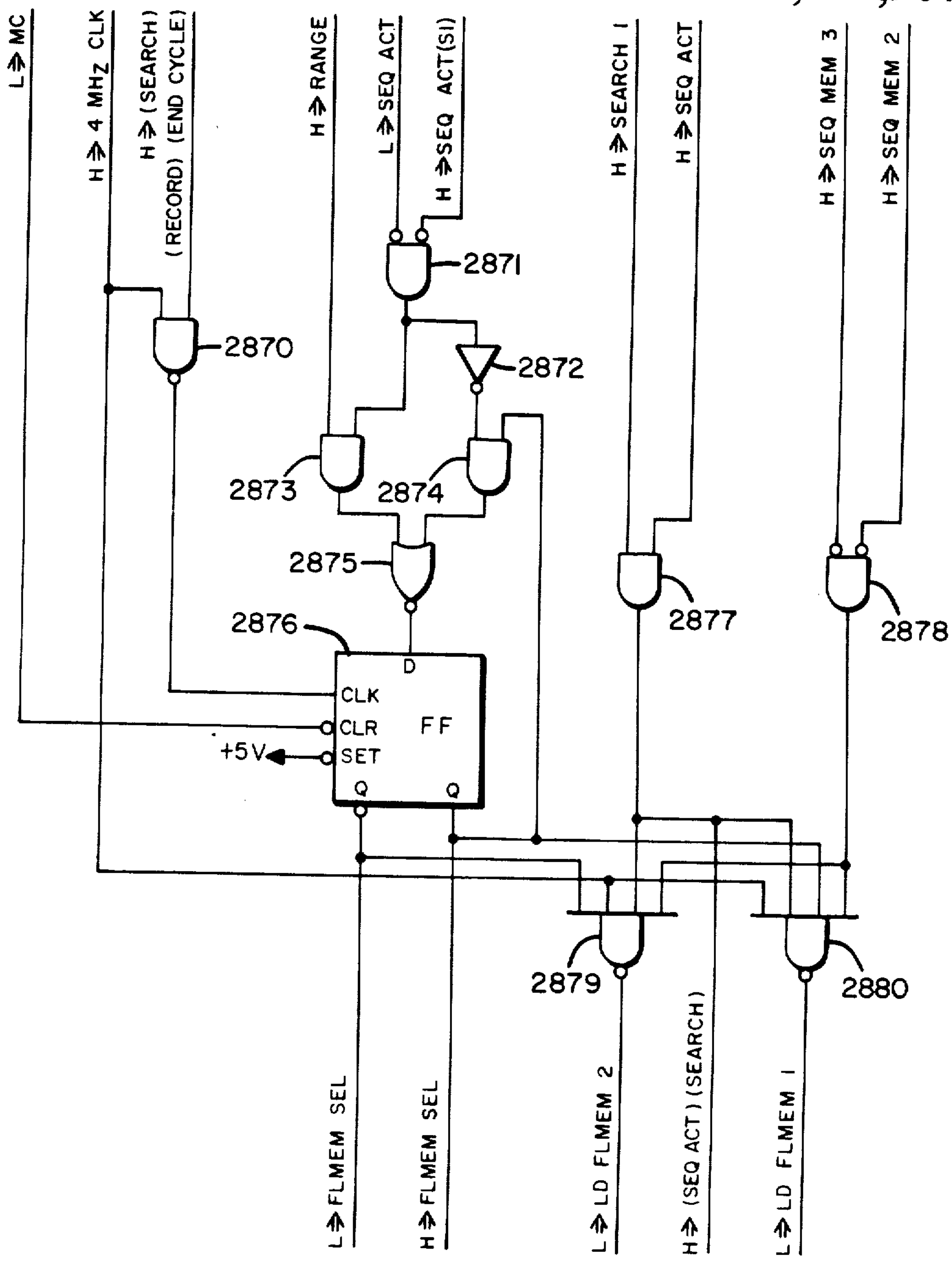
FIG. 66 shows circuitry for the control of FLAG MEMORY 321.

FIG. 66 and FIG. 67 show the detailed construction and operation of circuitry to address the Flag Memories (i.e., FLAG MEMORY 321 located on the COMPARE ARRAY's). As shown in FIG. 65, signals L→LD FLMEM 1 and L→FLMEM 2 are transferred via cable 101*f* (i.e., portion of HSSF BUS 101) to FLAG MEMORY 321 (see also FIGS. 6 and 13) wherein these signals are the write enables for 16×4 BIT RAM 385 and 386. The gates 2879 and 2880 have equivalent inputs except these gates are wired to opposite sides of D-TYPE FF 2876. Therefore, it can be seen that these signals are alternately generated permitting one of 16×4 BIT RAM 385 and 386 to be read from and one to be written into.

Figure 76:
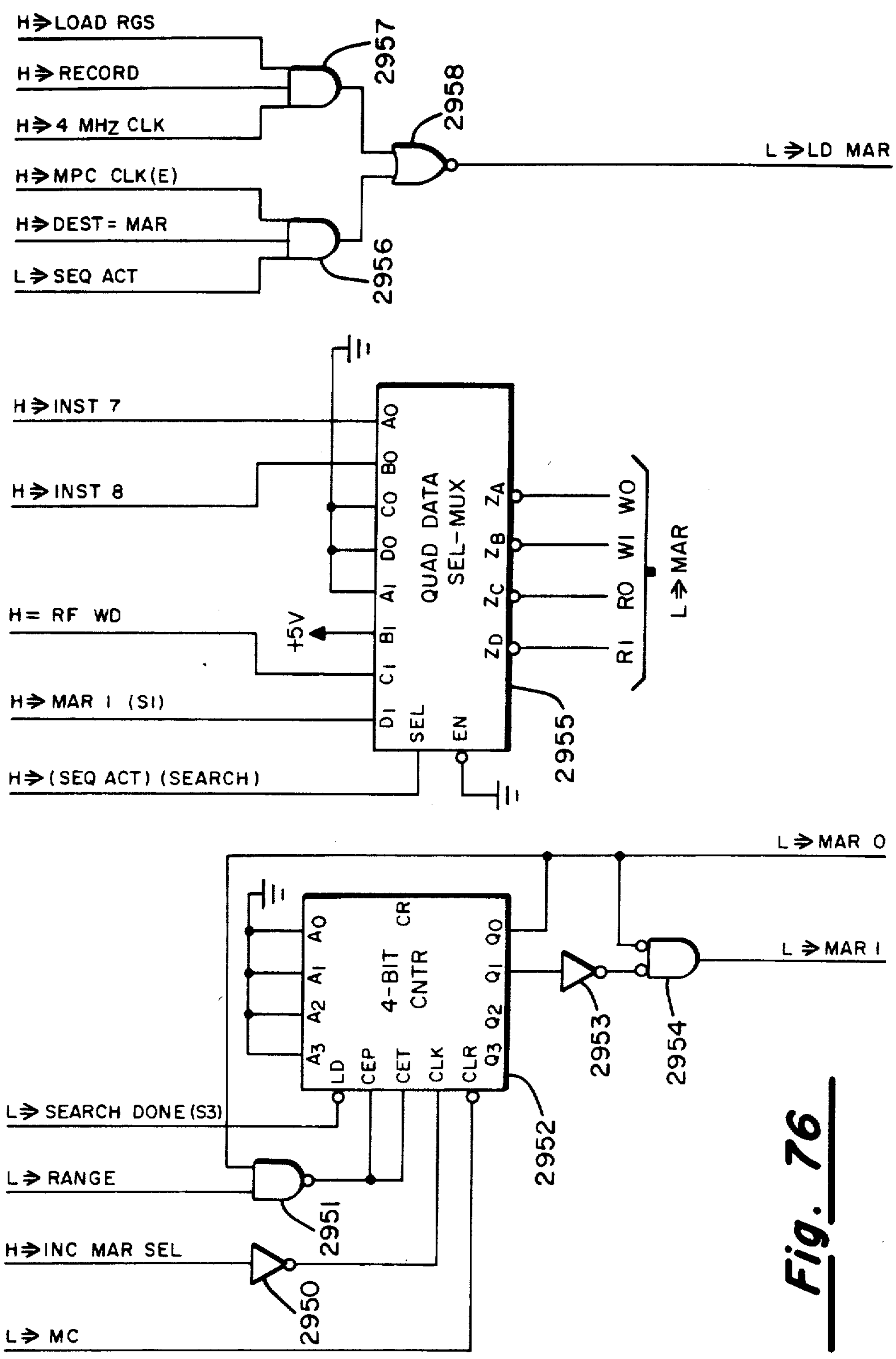
FIG. 76 shows the circuitry for controlling MAR STACK 272.

Signal H→(SEQ ACT)(SEARCH) is generated in the manner shown for use by MAR STACK 272 (see also FIG. 76). D-TYPE FF 2876 controls the alternation in FLAG MEMORY 321 as discussed above. Signal H→FLMEM SEL provides the corresponding alternation for BOOLEAN EVALUATOR MEMORY 261 (see also FIG. 55), RD/WR/SEARCH SEQUENCER 265 (see also FIG. 61), and FLAG MEMORY 321 addressing (see also FIG. 67).

FIG. 67 shows additional circuitry for addressing FLAG MEMORY 321 (see also FIG. 13). QUAD MUX 2885 supplies a three bit address to 16×4 BIT RAM 386 whereas QUAD MUX 2885 supplies the three bit address to 16×4 BIT RAM 385. As explained above, only eight of the 16 addressable locations of each 16×4 BIT RAM is needed but two 16×4 BIT RAM's are used to provide the performance enhancement achieved by alternating reading and writing as discussed above. FIG. 6 shows that these address signals (i.e., L→FLMEM 1 x and L→FLMEM 2 y) are transferred via cable 101*e* (i.e., portion of HSSF BUS 101).

Referring again to FIG. 67, it can be seen that QUAD MUX 2881 and 2885 make a selection based upon signal H→FLMEM SEL generated by D-TYPE FF 2876 (see also FIG. 66). The data inputs to QUAD MUX 2881 and 2885 are L→BEM (S1) 2, 3 and 4 and L→FLMEM 0, 1, and 2. The latter three signals (i.e., L→FLMEM 0, 1, and 2) are received from QUAD DATA SEL-MUX 2636 (see also FIG. 58) permitting FLAG MEMORY 321 to be addressed from MPC BUS 103 or 4-IBT CNTR 2653 (see also FIG. 60) for loading. The former three signals are read from BOOLEAN EVALUATOR MEMORY 261 (see also FIG. 53) to permit FLAG MEMORY 321 to be addressed during Boolean Evaluation. Notice that QUAD MUX 2881 and 2885 are wired such that signals L→BEM (S1) 2, 3, and 4 are transferred to one of 16×4 BIT RAM 385 and 386 while signals L→FLMEM 0, 1, and 2 are transferred to the other. This is required to enable 16×4 BIT RAM 385 and 386 to alternate as described above.

Figure 68:
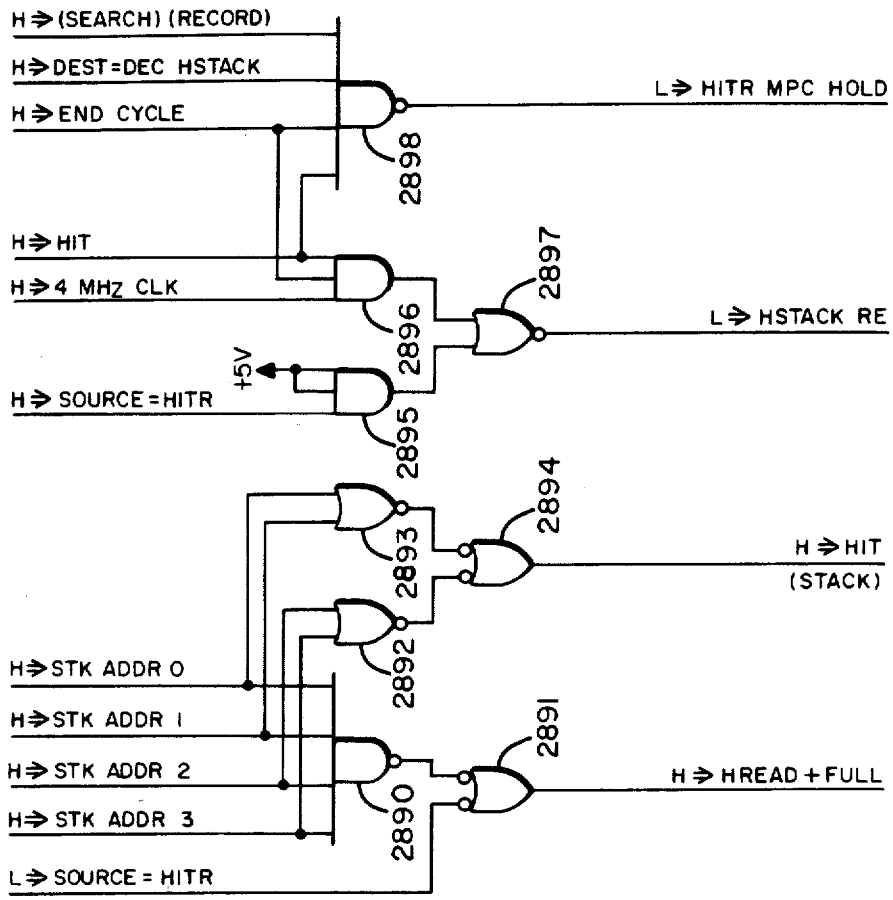
FIG. 68 shows circuitry for the control of HIT STACK 266.

FIG. 68 shows some miscellaneous circuitry used to control HIT STACK 266. Gate 2898 generates signal L→HITR MPC HOLD which is transferred to CLOCK 276 (see also FIG. 78). This signal is used to hold MPC 240 if it attempts to read HIT STACK 266 while the RD/WR/SEARCH SEQUENCER 265 is loading the HIT STACK 266 with a hit record address. The signal is generated by gate 2898 at the simultaneous occurrence of signals H→HIT, H→END CYCLE, H→DEST=DEC HSTACK, and H→(SEARCH)-(RECORD).

Figure 69:
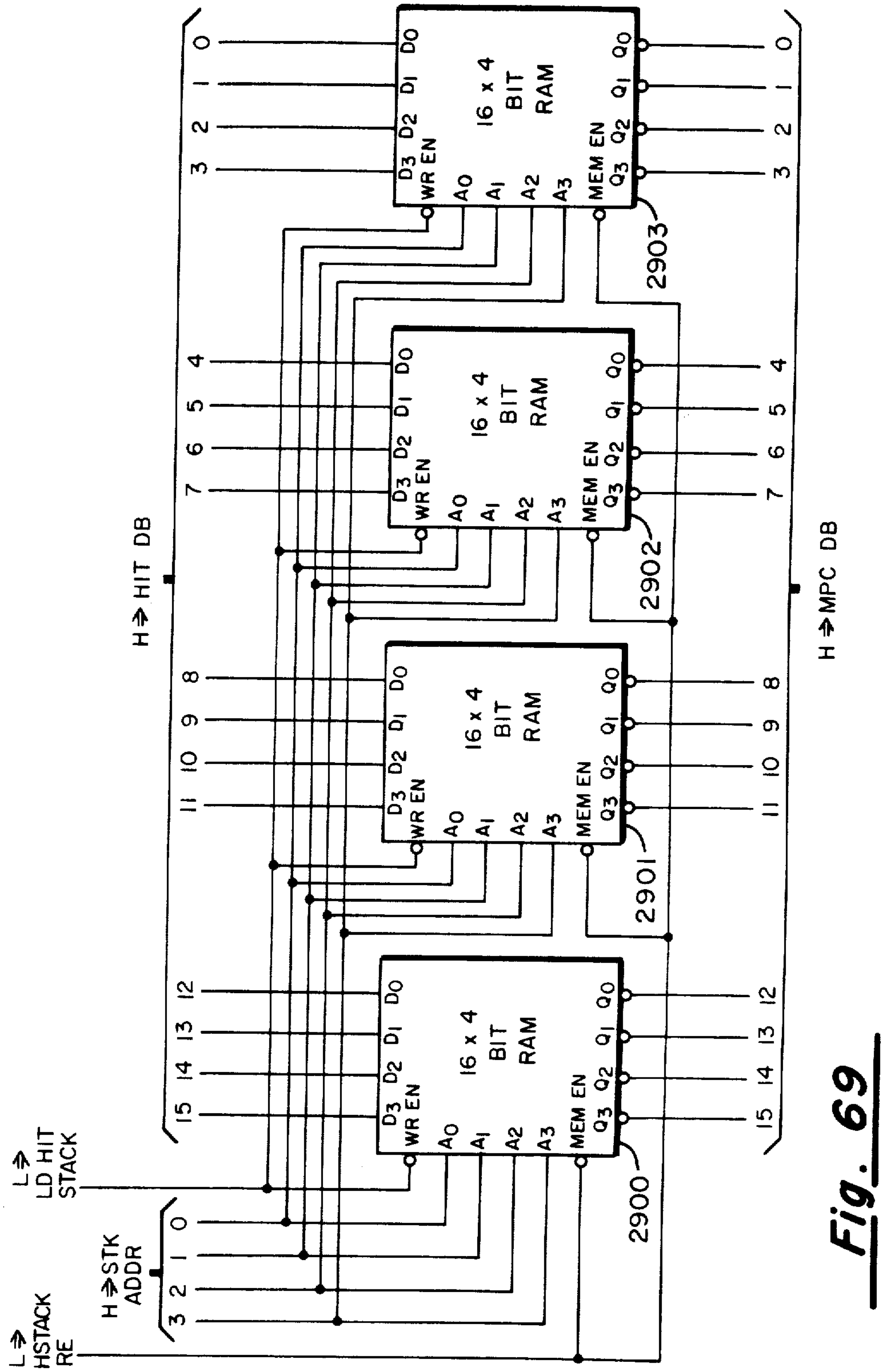
FIG. 69 shows the detailed construction of HIT STACK 266.

Signal L→HSTACK RE (i.e., Read Enable) enables the data output of HIT STACK 266 (see also FIG. 69). Gate 2897 generates this signal if signal H→SOURCE=HITR is received from 1 to 4 DECODER 2552 (see also FIG. 47) via DUAL INV 3 STATE 2236 (see also FIG. 24). This occurs when MPC 240 commands that HIT STACK 266 is to be read. Signal L→HSTACK RE is also generated by gate 2897 if gate 2896 receives signals H→4 MHz CLK, H→HIT, and H→END CYCLE. This signal is needed to load HIT STACK 266.

Signal H→HIT (STACK) is generated whenever any one of the address signals (i.e., signals H→STK ADDR Ø, 1, 2, and 3) is present. As can be seen from FIG. 65, at least one of these signals is generated unless 4-BIT CNTR 2866 is clear. Signal H→HIT (STACK) is transferred to SEL/MUX 2557 (see also FIG. 48) where it is used as explained above to generate a branch condition for MPC 240. Signal H→HREAD+FULL is generated if all of the HIT STACK 266 address signals (i.e., H→STK ADDR Ø, 1, 2, and 3) are present. This occurs whenever HIT STACK 266 is full requiring the search to be held until MPC 240 can remove at least one value from HIT STACK 266 to make room to store additional hit(s) (see also FIG. 65). Referring again to FIG. 68, signal H→HREAD+FULL is also generated by gate 2891 whenever signal L→SOURCE=HITR is received from FUNCTION, DEST, SOURCE DECODE 254 indicating that MPC 240 is about to read from HIT STACK 266.

The addresses of the records found to be hits during a search are stored in 16×4 BIT RAM 2900, 2901, 2902, and 2903 as shown in FIG. 69. The output is enabled by signal L→HSTACK RE (see also FIG. 68). The 16 bit output is transferred directly via MPC BUS 103 as shown. The write enable is called signal L→LD HIT STACK (see also FIG. 65). Loading is accomplished during a search whenever a hit is found. The data input to 16×4 BIT RAM 2900, 2901, 2902, and 2903 is received as discussed below. Addressing is supplied by 4-BIT CNTR 2866 as can be seen in FIG. 65.

Figure 70:
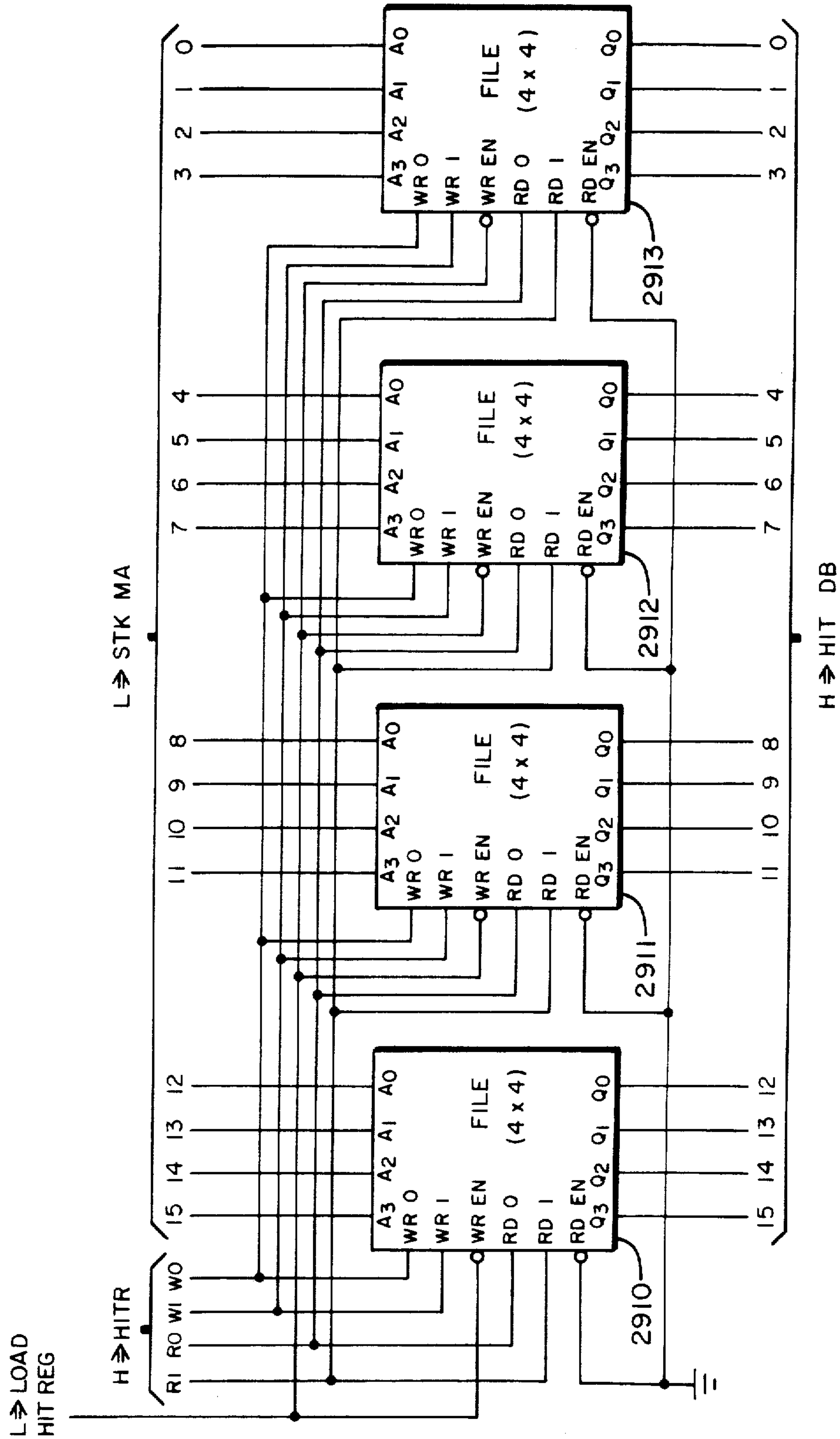
FIG. 70 shows the detailed construction of the Hit Register.

As is shown in FIG. 70, the input to 16×4 BIT RAM 2900, 2901, 2902, and 2903 is received from FILE (4×4) 2910, 2911, 2912 and 2913. These devices are collectively called the Hit Register. They provide temporary storage. Notice that input (i.e., write) and output (i.e., read) are separately addressed and enabled. Standard device type 54LS670 is used for implementation of the Hit Register. The 16 bit data input (i.e., signals L→STK MA Ø-15) is received from MAR STACK 272 (see also FIG. 77). The read and write addressing for the Hit Register is explained in detail below. Since only four addressable locations are present, a two bit address is sufficient.

Writing is controlled by signal L→LOAD HIT REG which serves as the write enable. This signal is generated by gate 2669 as shown in FIG. 62. Referring again to FIG. 70, it can be seen that FILE (4×4) 2910, 2911, 2912, and 2913 are always enable for output (i.e., input RD EN is connected to ground). This means that the Hit Register always outputs from whatever addressable location is specified by the read address (i.e., signals H→HIT R0 and R1).

Figure 71:
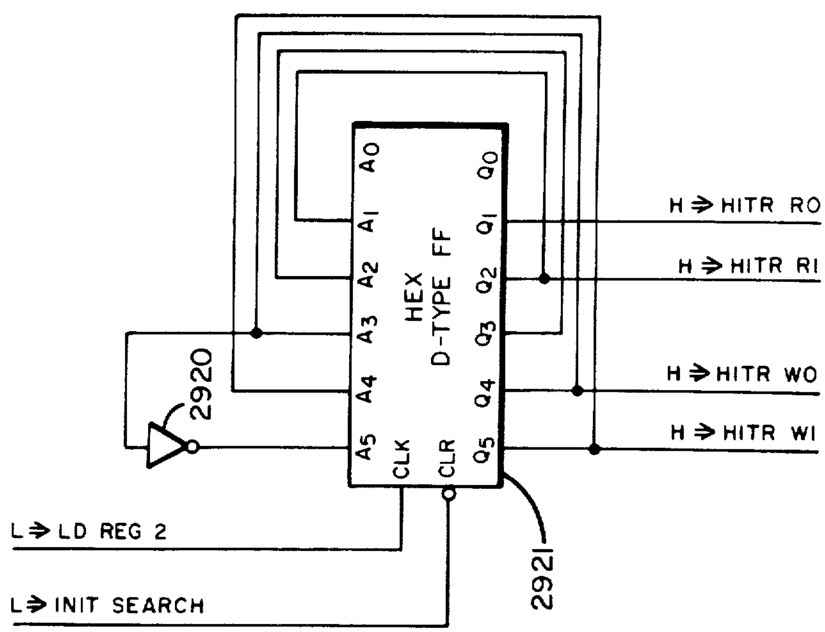
FIG. 71 shows the detailed construction of the Hit Register addressing circuitry.

FIG. 71 shows the circuitry used to address the Hit Register. The write address (i.e., signals H→HITR W0 and W1) and the read address (i.e., signals H→HITR R0 and R1) are produced by HEX D-TYPE FF 2921. Upon initiation of a search, HEX D-TYPE FF 2921 is cleared by signal L→INIT SEARCH (see also FIG. 61), forcing both the write address and the read address to zeroes. HEX D-TYPE FF 2921 is clocked by signal L→LD REG 2 (see also FIG. 64). After being clocked once, output Q5 of HEX D-TYPE FF 2921 becomes high by the action of inverter 2920. A next clock pulse later outputs Q5 becomes low and outputs Q4 and Q3 become high. With each succeeding clock pulse, the two highs get shifted left one position. When Q3 and Q2 are high, and Q4 and Q5 are low, Q5 will become high after the next clock pulse and the cycle repeats itself. It can be seen, therefore, that the various addressable locations of the Hit Register are used with a given addressable location not being addressed for reading until three clock pulses (i.e., transition of signal L→LD REG 2) later than it was addressed for writing.

The Memory Data Register serves as a 16 bit holding register for the transfer of data between HSSF BUS 101 and MPC BUS 103. The Memory Data Register has an Input Register for transferring data received from MPC BUS 103 to HSSF BUS 101. The Input Register has two parts, MDRIU 270 (i.e., most significant 16 bits) and MDRIL 271 (i.e., least significant 16 bits). Similarly, the Output register has MDROU 268 and MDROL 269. This conversion is necessary since HSSF BUS 101 is 32 bits wide and MPC BUS 103 is only 16 bits wide. See FIG. 17 to view the overall relationship of MDROU 268, MDROL 269, MDRIU 270 and MDRIL 271.

Figure 72:
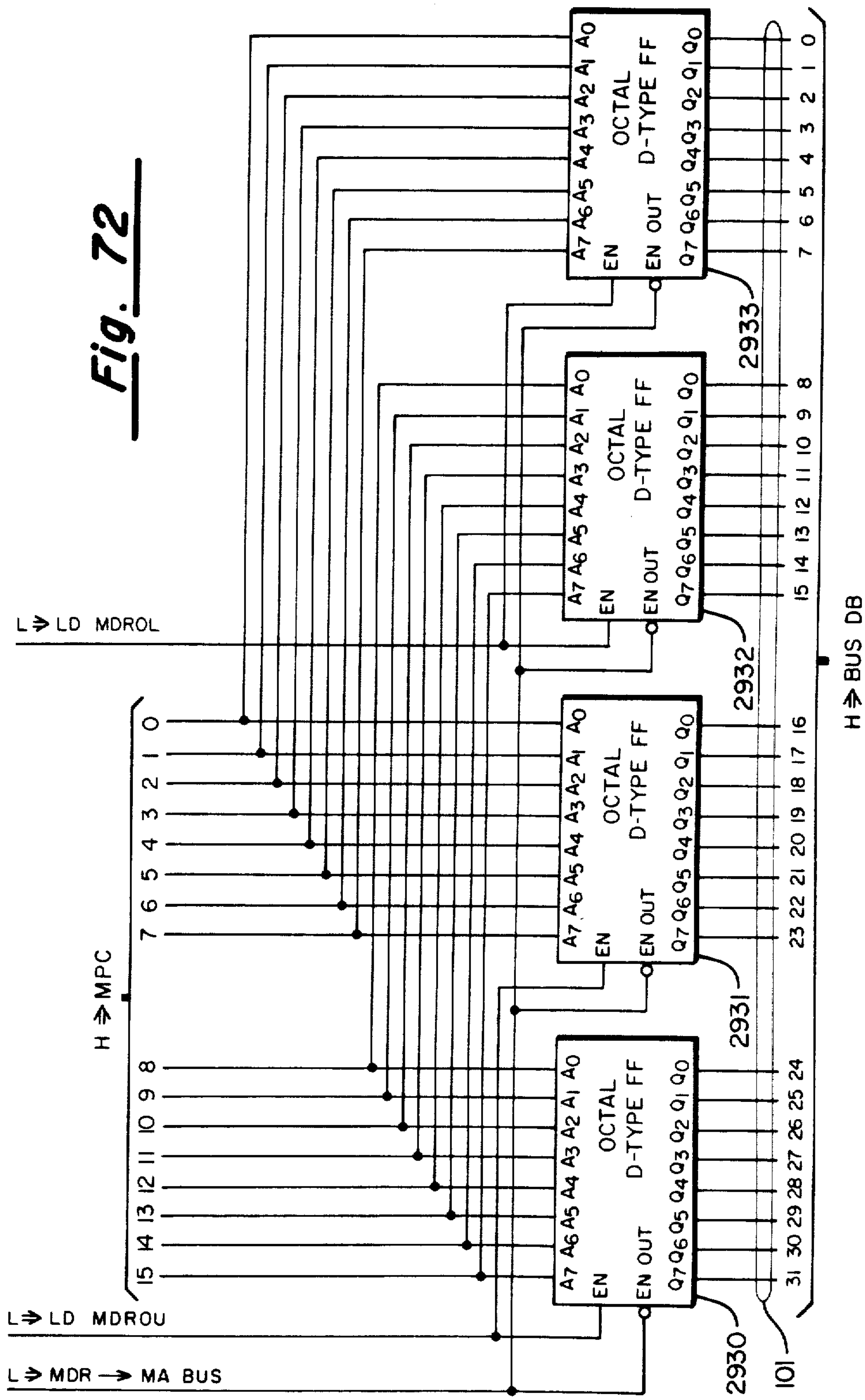
FIG. 72 shows the detailed construction of the Memory Data Register Out comprising MDROU 268 and MDROL 269.

Referring to FIG. 72, the detailed construction of MDROU 268 and MDROL 269 can be seen. OCTAL D-TYPE FF 2930, 2931, 2932, and 2933 are used. The 16 bit data input to OCTAL D-TYPE FF 2930, 2931, 2932, and 2933 is received directly from MPC BUS 103. MDROU 268 is enabled for input by signal L→LD MDROU, and MDROL 269 is enabled for input by signal L→LD MDROL. These signals are generated by 3 to 8 DECODER 2544 (see also FIG. 47). Thus it can be seen that MDROU 268 and MDROL 269 may be separately loaded with 16 bit data words by command from MPC 240. Both MDROU 268 and MDROL 269 are enabled for output as a 32 bit word by signal L→MDR→MA BUS. This signal is generated by QUAD MUX 2937 (see also FIG. 73). The 16 bit output of OCTAL D-TYPE DD 2930, 2931, 2932, and 2933 (i.e., signals H→BUS DB 0-31) is coupled directly to HSSF BUS 103.

Figure 73:
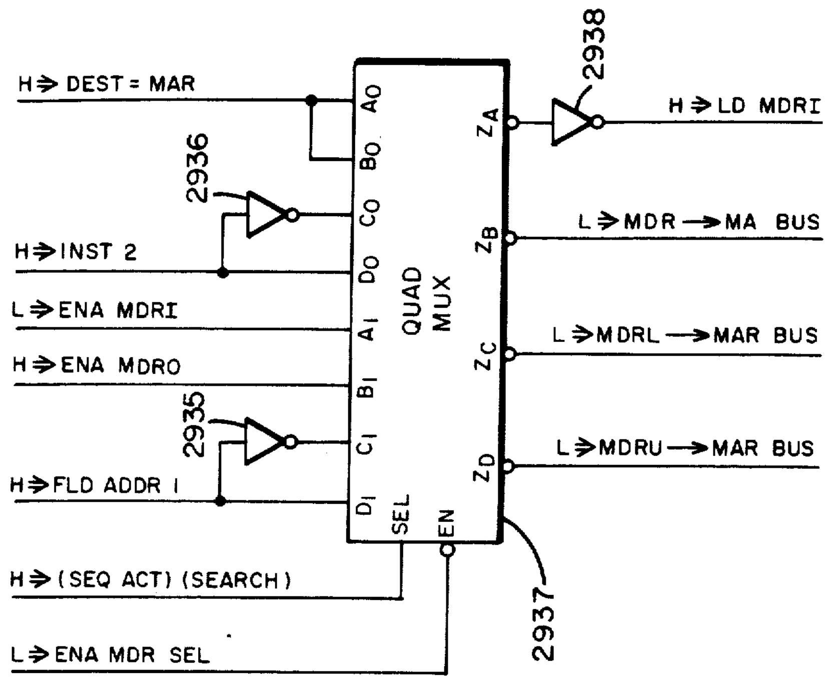
FIG. 73 shows circuitry to control the Memory Data Register.

FIG. 73 shows the circuitry used to control the HSSF BUS 101 interfaces of MDROU 268, MDROL 269, MDRIU 270, and MDRIL 271. Signals L→MDRU→MAR BUS, L→MDRL→MAR BUS, and L→MDR→MA BUS are generated directly by QUAD MUX 2937 as shown. Signal H→LD MDRI is similarly generated but inverted by inverter 2938. Signal L=ENA MDR SEL, generated by gate 2979 (see also FIG. 79), enables QUAD MUX 2937 for output. Selection by QUAD MUX 2937 is based upon signal H→(SEQ ACT)(SEARCH). See FIG. 66.

Referring again to FIG. 73, it can be seen that the data inputs to QUAD MUX 2937 are various control signals indicating special conditions requiring use of the Memory Data Register. Inputs A0 and B0 are signal H→DEST=MAR which is generated by FUNCTION, DEST, SOURCE DECODE 254 (see also FIG. 47). Instruction bit two (see also FIG. 41) of MPC 240 supplies input D0 and is inverted by inverter 2936 to supply input C0. Inputs A1 and A2 are signals L→ENA MDRI and H→ENA MDRO, respectively (see also FIG. 62). Signal H→FLD ADDR 1 (see also FIG. 57), along with inverter 2935, toggle inputs C1 and D1.

Figure 74:
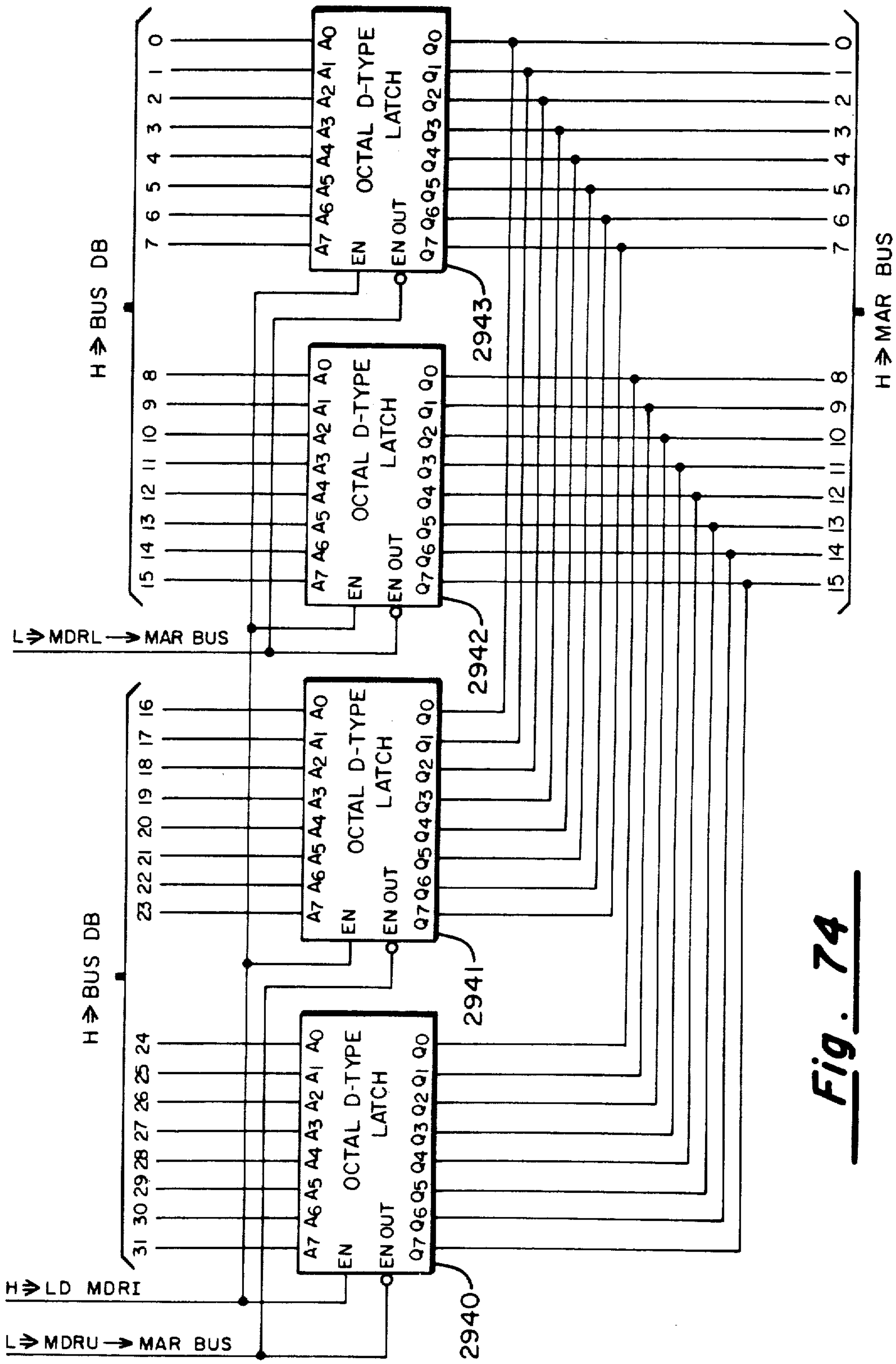
FIG. 74 shows the detailed construction of the Memory Data Register In comprising MDRIU 270 and MDRIL 271.

FIG. 74 shows MDRIU 270 and MDRIL 271. OCTAL D-TYPE LATCH 2940, 2941, 2942, and 2943 are used. The 32 bit data input is from 32 bit HSSF BUS 101. The output of MDRIU 270 and MDRIL 271 are coupled together as shown for eventual transfer via MPC BUS 103. Signal H→LD MDRI (see also FIG. 73) enables both MDRIU 270 and MDRIL 271 for input. Signals L→MDRU→MAR BUS and L→MDRL→MAR BUS enable MDRIU 270 and MDRIL 271 for output, respectively.

Figure 75:
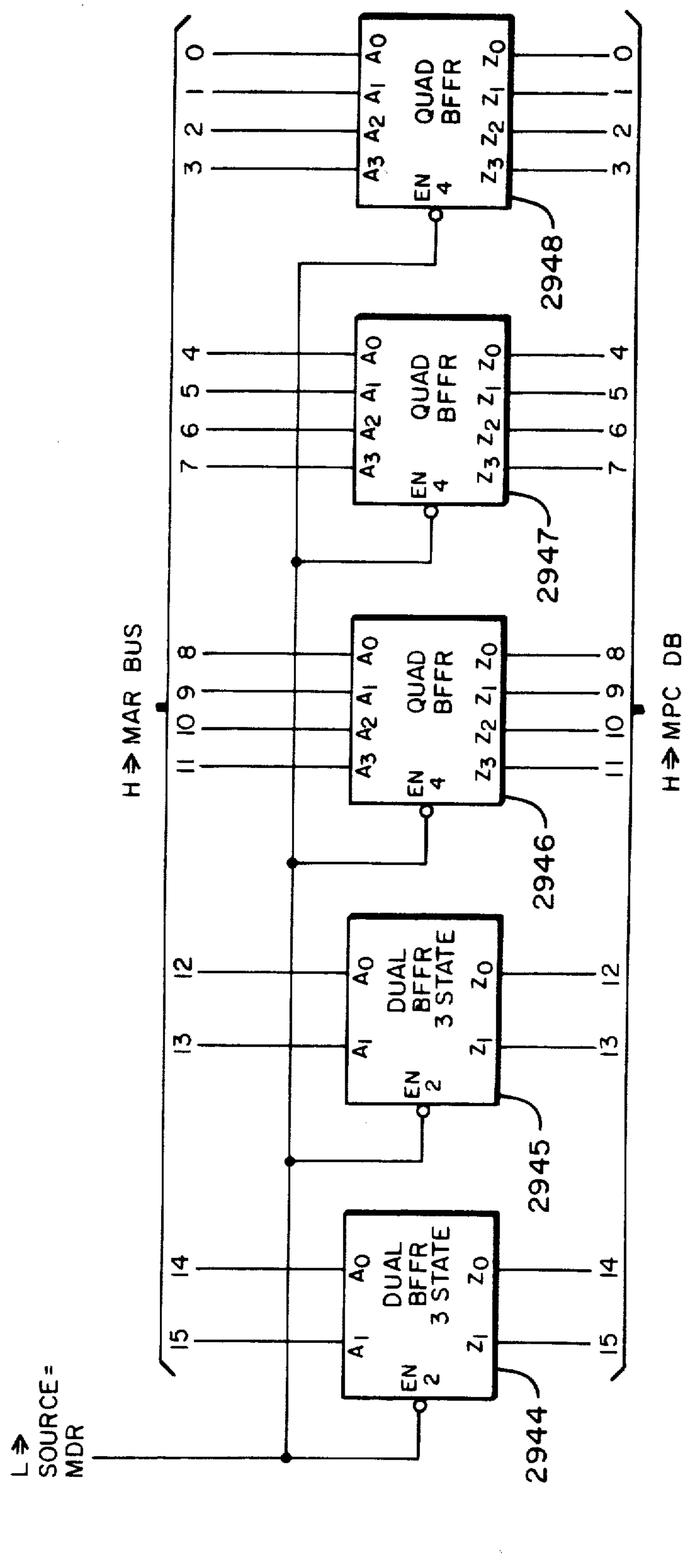
FIG. 75 shows the circuitry for coupling the Memory Data Register to the MPC BUS 103 (i.e., BUFFER 267).

BUFFERS 267 (see also FIG. 17) are shown in FIG. 75. DUAL BFFR 3 STATE 2944 and 2945 and QUAD BFFR 2946, 2947, and 2948 receive the 16 bit outputs from MDRIU 270 and MDRIL 271 for transfer via MPC BUS 103. Signal L→SOURCE=MDR, generated by FUNCTION, DEST, SOURCE DECODE 254 (see also FIG. 47) serves as the output enable.

Figure 77:
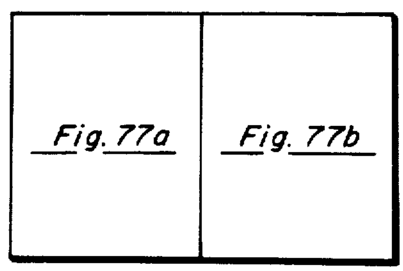
FIG. 77, consisting of FIGS. 77*a* and *b*, shows the detailed construction of MAR STACK 272.

The circuitry of MAR (i.e., Memory Address Register) STACK 272 is shown in FIGS. 76 and 77. FIG. 76 shows the addressing and control circuitry. FIG. 77 shows the memory address storage circuitry.

Referring to FIG. 76, it can be seen that 4-BIT CNTR 2952 is loaded to an all zeroes value by signal L→SEARCH DONE (S3), received from inverter 2644 (see also FIG. 59). Signal H→INC MAR SEL (see also FIG. 62), as inverted by inverter 2590, then clocks 4-BIT CNTR 2952, which is enabled for incrementation by gate 2951 is signal L→RANGE is present or output Q0 is low. It can be seen from FIG. 76 that 4-BIT CNTR 2952, along with inverter 2953 and gate 2594, thereby produces all combinations of signals L→MAR Ø and 1 which are used by QUAD D-TYPE FF 2663 as shown in FIG. 61.

Referring again to FIG. 76, it can be seen that QUAD DATA SEL-MUX 2955 produces the write address (i.e., signals L→MAR W0 and W1) and the read address (i.e., signals L→MAR R0 and 1) for MAR STACK 272. QUAD DATA SEL-MUX 2955 is enabled constantly and makes a selection based upon signal H→(SEQ ACT)(SEARCH) generated by gate 2877 (see also FIG. 66). As is seen in FIG. 76, write address is either MPC 240 Instruction bits 7 and 8 (see also FIG. 41) or a constant. Similarly, the read address is either a constant or derived from signals H→RF WD and H→MAR 1 (S1). See FIG. 61.

Signal L→LD MAR is generated by gates 2956, 2957, and 2958 as shown in FIG. 76. Signal L→LD MAR is used as the write enable for MAR STACK 272 (see also FIG. 77).

Figure 77A:
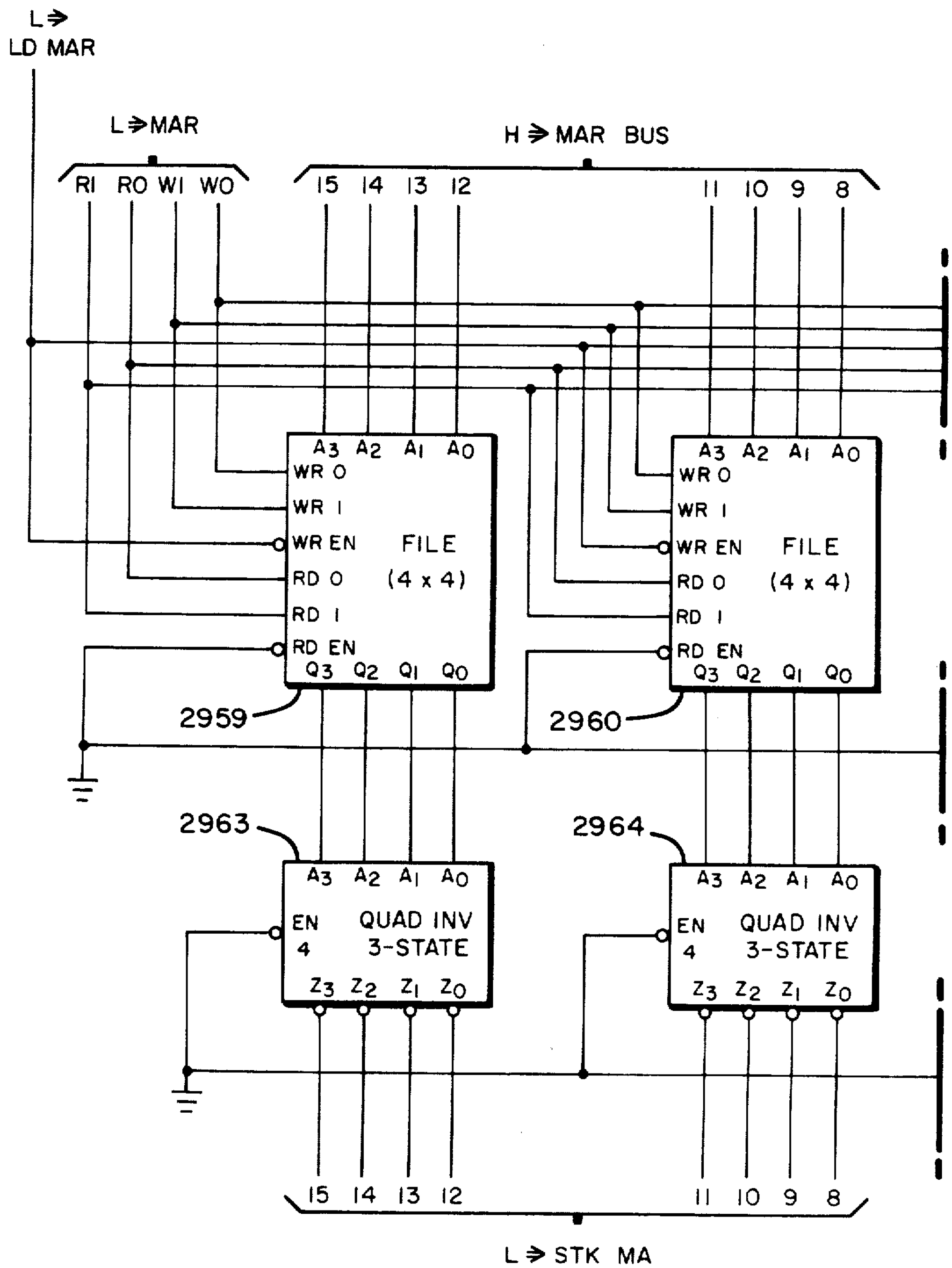
Figure 77B:
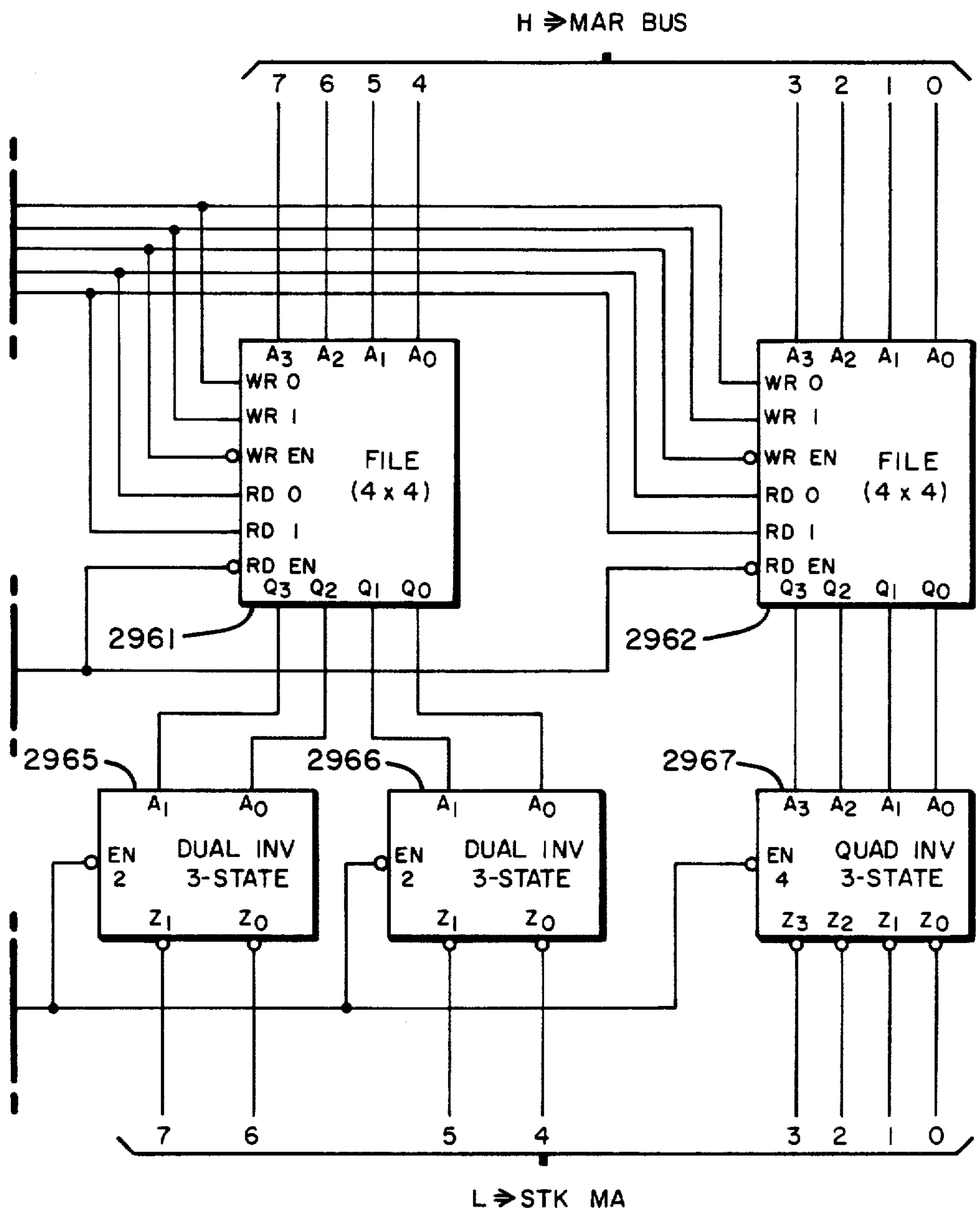

Referring to FIG. 77, consisting of FIGS. 77*a* and *b*, FILE (4×4) 2959, 2960, 2961 and 2962 are the storage elements of MAR STACK 272. Device type 9LS670 is used. The 16 bit data input is received from MDRIU 270 and MDRIL 271 (see also FIG. 74). The write addressing (i.e., signals L→MAR W0 and 1) and write enable (i.e., signal L→LD MAR) are discussed above (see also FIG. 76). FILE (4×4) 2959, 2960, 2961, and 2962 are enabled for output constantly. The read addressing (i.e., signals L→MAR R0 and 1) are supplied by the circuitry discussed above (see also FIG. 76).

BUFFER 276 is also shown in FIG. 77. BUFFER 275 uses QUAD INV 3 STATE 2963, 2964, and 2967 and DUAL INV 3 STATE 2965 and 2966, which are all constantly enabled for output. The output of BUFFER 275 is coupled to the Hit Register (see also FIG. 70) and to the COMPARE ARRAYS via HSSF BUS 101. FIG. 6 shows that signals L→STK MA X is received by COMPARE CONTROL 322 via cable 101*h* (i.e., portion of HSSF BUS 101). FIG. 14 shows that only ten address bits are required on any one COMPARE ARRAY (i.e., only 1024 addressable locations). The remaining bit positions are used to address other COMPARE ARRAY's to permit addressing of the expanded memory capacity.

Figure 79:
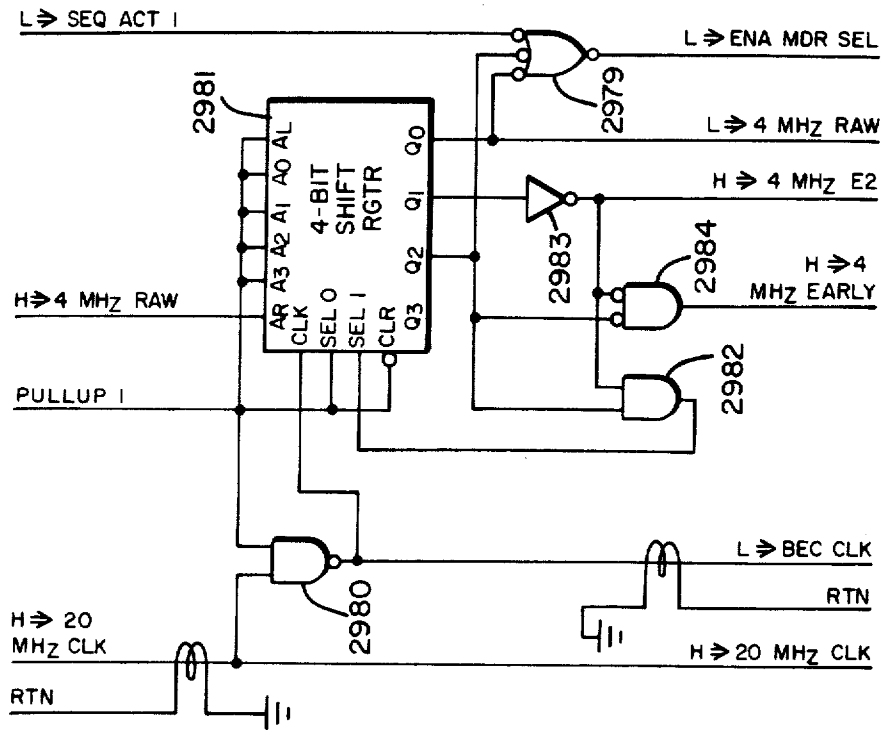
FIG. 79 shows the detailed construction of CLOCK 276.
Figure 78:
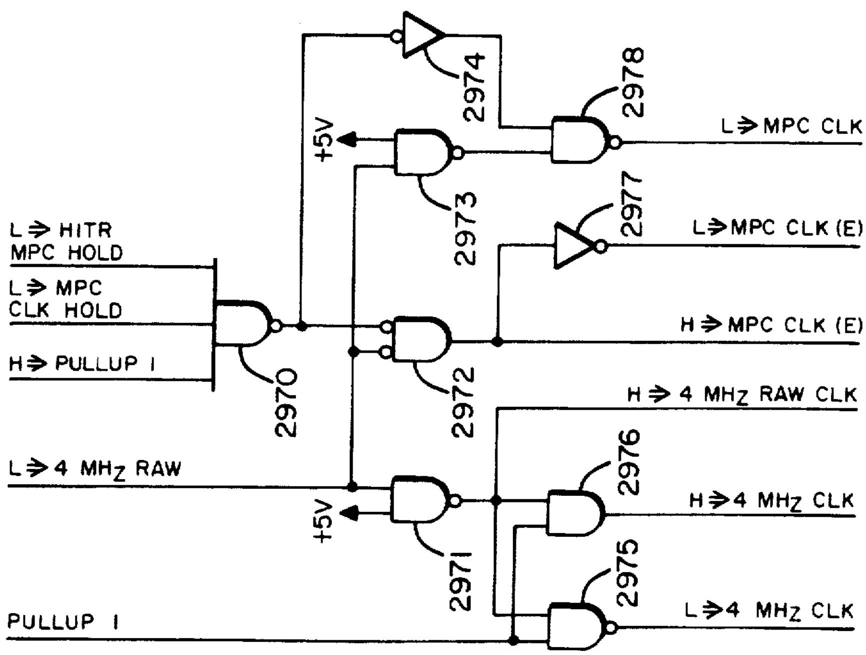
FIG. 78 shows control circuitry for CLOCK 276.

FIGS. 78 and 79 show the circuitry of CLOCK 276 which is used to synchronize all of HSSF 100. FIG. 79 shows receipt of signal H→20 MHz CLK which is the overall time standard supplied by an external oscillator. The 20 MHz frequency is primarily used by the Boolean Evaluator (see also FIG. 52). The majority of HSSF 100 circuitry uses a 4 MHz frequency generated by 4-BIT SHIFT RGTR 2981 from the 20 MHz frequency as shown in FIG. 79. Gate 2979 generates signal L→ENA MDR SEL for use by the Memory Data Register as shown (see also FIG. 73).

FIG. 78 shows additional clock signals which are derived from the basic 4 MHz rate.

The above describes the present invention as incorporated into its preferred embodiment in the High Speed Search Function product. Those of skill in the art will be able to readily apply the present invention to other applications.

What is claimed is:

1. In a digital computer system wherein a special purpose processor used for searching receives a plurality of records to be searched, plus receives search criteria which define both what is to be searched for and how said records are to be searched meaning how the hit or miss results of searching are to be qualified, plus receives commands to enter into a search, a said special purpose search processor responsive to said commands for searching said plurality of records in accordance with said search criteria in order to produce a hit or a miss result of said searching comprising: controller means controlled by a microprocessor comprising first interfacing means for receiving via an interface said plurality of records plus said search criteria plus said commands from said computer system;

second interfacing means for supplying via a bus said plurality of records to comparison array means for storage therein, and for also supplying via said bus a first partial part of said search criteria, which first partial part includes the reference word to which said plurality of records are compared plus at least some, first, criteria of comparison, to said comparison array means;

sequencer means for first causing, responsively to said commands, said comparison array means to sequentially search each of said plurality of records in accordance with said first partial part of said search criteria in order to produce comparison first results of said search, evaluation means for firstly sequentially comparing said comparison first results produced by said comparison array means in accordance with a second partial part of said search criteria, which search criteria partial part includes at least some further, second, criteria of comparison, in order to produce a final comparison result, said hit or miss result of said searching; and a comparison array means formed as a matrix of identical comparison circuits, being of a first number of said comparison circuits in a first dimension which first number is proportional to the number of said plurality or records, and being of a second number of said comparison circuits in a second dimension which second number is proportional to the size in bits of each said plurality of records, said first number times said second number of indentical comparison circuits in a matrix forming said comparison array means comprising memory means for storing said entirety of said plurality of records; and sequential comparison means for secondly sequentially comparing each of said plurality of records in accordance with said first partial part of said search criteria; and comparison results means for developing first comparison results resultantly to said secondly sequentially comparing.

2. A computer system according to claim 1 wherein said memory means within each of said identical comparison circuits which in aggregate form said comparison array means further comprises:

memory means having a plurality of addressable locations responsively coupled to said controller means for receiving and for storing a different portion of said entire said plurality of records;

and wherein said sequential comparison means within each of said identical comparison circuits which in aggregate form said comparison array further comprises:

register means responsively coupled to said controller means for receiving and for storing a first part of said first partial part of said search criteria as a reference word;

arithmetic comparator means responsively coupled to said memory means and said register means for receiving from said memory means one record of said portion of said entire said plurality of records stored therein, and for receiving from said register means said reference word, and for arithmetically comparing said one record to said reference word in order to yield for each of a plurality off fields within said one record actual comparison results which are less than or equal or greater than; and wherein said comparison results means within each of said identical comparison circuits which in aggregate from said comparison array means further comprises:

field comparison register means responsively coupled to said controller means for receiving and for storing a second part of said first partial part of said search criteria as an expected arithmetic comparison result; and flag generator means responsively coupled to said arithmetic comparator means for receiving said actual arithmetic comparison result, responsively coupled to said field comparison register means for receiving said expected arithmetic comparison result, and for logically comparing said actual arithmetic comparison result to said expected arithmetic comparison result in order to yield a logical true/or false comparison result as said first result;

whereby said first partial part of said search criteria included said reference word plus, as said at least some first criteria of comparison, said expected arithmetic comparison result;

whereby said first result is logical, meaning that said second sequentially comparing said plurality of records in accordance with said first partial part of said search criteria has developed a logical true/or false comparison result.

3. A computer system according to claim 1 wherein said first interfacing means within said controller means further comprises:

first interfacing means responsively coupled to said computer system for receiving all of said commands plus said plurality of records plus said search criteria, and for transmitting said hit or miss search result, upon an interface to said computer system;

and wherein said sequencer means within said controller means further comprises:

sequencer means responsively coupled to said each of said comparison circuits within said comparison array means for causing said comparison circuite to perform said secondly sequentially comparing of said plurality of records and additionally responsively coupled to Boolean evaluator means within said evaluation means within said controller means for causing the sequencing of comparisons by said Boolean evaluator means;

and wherein said evaluation means within said controller means further comprises:

Boolean evaluator means, responsively coupled to said sequencer means for being sequenced thereby, responsively coupled to said first interfacing means for receiving said second partial part of said search criteria as a Boolean logical expression, and responsively coupled to said each of said comparison circuits within said comparison array means for receiving said first results therefrom and for making a comparison hit or miss determination whether said first results satisfy said second part of said search criteria; and microprogrammed controller means responsively coupled to said first interfacing means, said second interfacing means, said Boolean evaluator means, and said sequencer means, for causing said plurality of records received by said first interfacing means to be supplied by said second interfacing means to said comparison array means for storage therein, for causing said first partial, arithemetic expression, part of said search criteria received by said first interfacing means to be supplied by said second comparison means to said comparison array means, for enabling said sequencer means controlling of said secondly sequentially comparing by each of said comparison circuits, for causing said second partial, Boolean expression, part of said search criteria to be supplied to said Boolean evaluator means by said first interfacing means, and for causing said determination of said Boolean evaluator means to be transferred as said hit or miss result of said searching to said computer system via said first interfacing means.

4. A computer system according to claim 2 wherein said first interfacing means within said controller means further comprises:

first interfacing means responsively coupled to said computer system for receiving all of said commands plus said plurality of records plus said search criteria, and for transmitting said hit or miss search result, upon an interface to said computer system;

and wherein said sequencer means within said controller means further comprises:

sequencer means responsively coupled to said each of said comparison circuits within said comparison array means for causing said comparison circuite to perform said secondly sequentially comparing of said plurality of records and additionally responsively coupled to Boolean evaluator means within said evaluation means within said controller means for causing the sequencing of comparisons by said Boolean evaluator means;

and wherein said evaluation means within said controller means further comprises:

Boolean evaluator means, responsively coupled to said sequencer means for being sequenced thereby, responsively coupled to said first interfacing means for receiving said second partial part of said search criteria as a Boolean logical expression, and responsively coupled to said each of said comparison circuits within said comparison array means for receiving said first results therefrom and for making a comparison hit or miss determination whether said first results satisfy said second part of said search criteria; and microprogrammed controller means responsively coupled to said first interfacing means, said second interfacing means, said Boolean evaluator means, and said sequencer means, for causing said plurality of records received by said first interfacing means to be supplied by said second interfacing means to said comparison array means for storage therein, for causing said first partial, arithemetic expression, part of said search criteria received by said first interfacing means to be supplied by said second comparison means to said comparison array means, for enabling said sequencer means controlling of said secondly sequentially comparing by each of said comparison circuits, for causing said second partial, Boolean expression, part of said search criteria to be supplied to said Boolean evaluator means by said first interfacing means, and for causing said determination of said Boolean evaluator means to be transferred as said hit or miss result of said searching to said computer system via said first interfacing means.

5. A special purpose processor for searching a data base having a plurality of records according to claim 2 wherein said controller means further comprises:

selective addressing means responsively coupled to said memory means for successively selectively addressing ones of said plurality of addressable locations; and linking means responsively coupled to said selective addressing means and said memory means for causing said selective addressing means to address a one of said plurality of addressable locations dependently upon the contents of a field within a one of said plurality of records stored a different one of said plurality of addressable locations.

6. A special purpose digital processor for searching a data base having a plurality of records, each of which records possesses a plurality of fields, comprising:

a matrix of replicatable, identical, comparison circuits interconnected as an array, which array is of a first plurality of said comparison circuits in a first dimension, which first plurality is in number proportional to number of said plurality of records, times a second plurality of said comparison circuits in a second dimension, which second plurality is in number proportional to the size in bits of each of said plurality of records;

and wherein each of said replicatable, identical, comparison circuits comprises:

memory means having a plurality of addressable locations for storing said data base such that each one of said plurality of records is stored at a different one of said plurality of addressable locations;

reference register means for storing a first constant, reference word;

field format register means for storing a second constant value which defines the boundaries of each of said plurality of fields within each of said plurality of records as are stored at said plurality of addressable locations;

arithmetic comparator means responsively coupled to said memory means, said reference register means, and said field format register means for arithmetically comparing each field of a one of said plurality of records as delimited by said field format register means to a corresponding field of said reference word in order to produce an arithmetic comparison result for each field within said one record;

field comparison register means for storing as a third constant value an expected arithmetic comparison result for each field defined by said field format register means;

flag generator means responsively coupled to said arithmetic comparator means and said field comparison register means for logically comparing said arithmetic comparison result for each field to said expected arithmetic comparison result for each field in order to produce a flag for each field for which said arithmetic comparison result is the same as said expected arithmetic result; and controller means responsively coupled to said memory means, said reference register means, said field format register means, said field comparison register means, and said flag generator means for loading said memory with said data base of said plurality of records, for loading said reference register means with said second constant value defining the said boundaries of said fields of each of said plurality of records, for loading said field comparison register with said third constant expected arithmetic result, and for reading said flag for each field as generated by said flag generator means.

7. A special purpose processor for searching a data base having a plurality of records according to claim 6 wherein said controller means further comprises:

selective addressing means responsively coupled to said memory means for successively selectively addressing ones of said plurality of addressable locations; and linking means responsively coupled to said selective addressing means and said memory means for causing said selective addressing means to address a one of said plurality of addressable locations dependently upon the contents of a field within a one of said plurality of records stored of a different one of said plurality of addressable locations.

8. A computer system comprising:

general purpose processor means for directing independent searching of data records;

data base means for storing a plurality of data records;

special purpose processor means responsively coupled to said data base means and said general purpose processor means for searching predetermined ones of said data records against predetermined criteria specified by said general purpose processor means wherein said special purpose processor means includes:

controller means for controlling comparison functions, and a plurality of compare array means responsively coupled to said controller means, each of said compare array means for performing a search upon a selected different portion of said data records, and wherein each of said compare array means includes:

array memory means having a plurality of addressable locations responsively coupled to said controller means for storing said different portion of said data records, reference means responsively coupled to said controller means for storing a reference word, arithmetic comparator means responsively coupled to said array memory means and said reference means wherein the contents of a one of said plurality of addressable locations of said memory means is arithmetically compared to said reference word for yielding an arithmetic comparison result, field comparison register means responsively coupled to said controller means for storing an expected arithmetic comparison result, and flag generator means responsively coupled to said arithmetic comparator means and said field comparison register means for logically comparing said arithmetic comparison results to said expected arithmetic comparison result for yielding a logical comparison result.

9. A computer system according to claim 8 wherein said controller means includes:

interfacing means responsively coupled to said general purpose processor means for interfacing said general purpose processor means to said special purpose processor means;

sequencer means responsively coupled to said plurality of compare array means for controlling said plurality of compare array means;

Boolean evaluator means responsively coupled to said sequencer means and said plurality of compare array means for making a determination whether one of said plurality of records of said data records meets a search criteria supplied by said general purpose processor means; and microprogrammed controller means responsively coupled to said interfacing means, said Boolean evaluator means, and said sequencer means for causing said sequencer means to control said plurality of compare array means in response to commands received from said general purpose processor means through said interfacing means and for causing said determination of said Boolean evaluator means to be transferred to said general purpose processor means through said interfacing means.

10. A special purpose processor for searching a data base having a plurality of records comprising:

memory means having a plurality of addressable locations for storing said data base such that each of said plurality of records is stored at a different one of said plurality of addressable locations;

reference register means for storing a reference word;

field format register means for storing a value which defines the fields of each of said plurality of records;

arithmetic comparator means responsively coupled to said memory means, said reference register means, and said field format register means, for arithmetically comparing each field, as defined by said field format register means, of a record stored within said memory means to a corresponding field of said reference word, and for producing an actual arithmetic comparison result for each field defined by said field format register means;

field comparison register means for storing an expected arithmetic comparison result for each field defined by said field format register means;

flag generator means responsively coupled to said arithmetic comparator means and said field comparison register means for logically comparing said actual arithmetic comparison result for each field to said expected arithmetic comparison result, and for providing a flag for each field for which said actual arithmetic comparison result has a predetermined relationship to said expected arithmetic comparison result; and controller means coupled to said memory means, said reference register means, said field format register means, said field comparison register means, and said flag generator means for loading said data base in said memory means, for loading said reference word in said reference register means, for loading said expected arithmetic comparison result in said field comparison register means, and for reading said flag for each field generated by said flag generator means.

11. The special purpose processor of claim 10 wherein said memory means, said field format register means, said arithmetic comparator means, said field comparison register means, and said flag generator means are collectively comprised of a multiplicity of replicatable, identical, comparison circuits interconnected in a matrix, or array, which is of a first plurality of said comparison circuits in a first dimension, which first plurality is in number proportional to the number of said plurality of records searched, times a second plurality of said comparison circuits in a second dimension, which second plurality is in number proportional to the size in bits of each of said plurality of records searched—which multiplicity of comparison circuits interconnected as an array does thusly subtend the entire said data base to be searched whereas each said comparison circuit does subtend, and search, a portion of said data base.

12. A special purpose processor as in claim 11 wherein said controller means further includes:

addressing means responsively coupled to said memory means for selectively addressing a one of said plurality of addressable locations; and linking means responsively coupled to said addressing means and said memory means for causing said addressing means to address a one of said plurality of addressable locations based upon the contents of a field of a different one of said plurality of records stored at a different one of said plurality of addressable locations.

13. The special purpose processor of claim 10 wherein said controller means further includes:

addressing means responsively coupled to said memory means for selectively addressing a one of said plurality of addressable locations, and linking means responsively coupled to said addressing means and said memory means for causing said addressing means to address a one of said plurality of addressable locations based upon the contents of a field of a different one of said plurality of records stored at a different one of said plurality of addressable locations.

* * * * *